United States Patent
Dubey

(10) Patent No.: US 10,392,307 B2
(45) Date of Patent: *Aug. 27, 2019

(54) DIMENSIONALLY STABLE GEOPOLYMER COMPOSITION AND METHOD

(71) Applicant: UNITED STATES GYPSUM COMPANY, Chicago, IL (US)

(72) Inventor: Ashish Dubey, Grayslake, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/452,054

(22) Filed: Mar. 7, 2017

(65) Prior Publication Data

US 2017/0174570 A1    Jun. 22, 2017

Related U.S. Application Data

(63) Continuation of application No. 15/071,424, filed on Mar. 16, 2016, now Pat. No. 9,656,916, which is a continuation of application No. 13/842,100, filed on Mar. 15, 2013, now Pat. No. 9,890,082.

(60) Provisional application No. 61/653,696, filed on May 31, 2012, provisional application No. 61/639,803, filed on Apr. 27, 2012.

(51) Int. Cl.

| | | |
|---|---|---|
| C04B 28/00 | (2006.01) | |
| C04B 11/28 | (2006.01) | |
| C04B 12/00 | (2006.01) | |
| C04B 28/18 | (2006.01) | |
| C04B 24/32 | (2006.01) | |
| C04B 111/00 | (2006.01) | |
| C04B 111/34 | (2006.01) | |
| C04B 111/62 | (2006.01) | |
| C04B 111/72 | (2006.01) | |
| C04B 103/32 | (2006.01) | |

(52) U.S. Cl.
CPC ........... *C04B 28/006* (2013.01); *C04B 11/28* (2013.01); *C04B 12/005* (2013.01); *C04B 24/32* (2013.01); *C04B 28/003* (2013.01); *C04B 28/18* (2013.01); *C04B 2103/32* (2013.01); *C04B 2111/0075* (2013.01); *C04B 2111/00482* (2013.01); *C04B 2111/00586* (2013.01); *C04B 2111/34* (2013.01); *C04B 2111/343* (2013.01); *C04B 2111/346* (2013.01); *C04B 2111/62* (2013.01); *C04B 2111/72* (2013.01); *Y02P 40/165* (2015.11); *Y02W 30/92* (2015.05)

(58) Field of Classification Search
CPC ....... C04B 28/00; C04B 11/28; C04B 12/005; C04B 24/32; C04B 28/003; C04B 28/006; C04B 28/18; C04B 2111/0075; C04B 2111/00586; C04B 2111/34; C04B 2111/343; C04B 2111/346; C04B 2111/62; C04B 2111/72; C04B 2103/32
See application file for complete search history.

(56) References Cited

U.S. PATENT DOCUMENTS

| | | | |
|---|---|---|---|
| 2,248,032 | A | 7/1941 | Stanley et al. |
| 3,147,129 | A | 9/1964 | Armstrong et al. |
| 3,251,701 | A | 5/1966 | Klein |
| 3,819,393 | A | 6/1974 | Ono et al. |
| 3,854,968 | A | 12/1974 | Minnick et al. |
| 3,857,714 | A | 12/1974 | Mehta |
| 3,997,353 | A | 12/1976 | Chervenka, Jr. et al. |
| 4,302,251 | A | 11/1981 | Udagawa et al. |
| 4,350,533 | A | 9/1982 | Galer et al. |
| 4,404,031 | A | 9/1983 | Sudoh et al. |
| 4,488,909 | A | 12/1984 | Galer et al. |
| 4,655,979 | A | 4/1987 | Nakano et al. |
| 4,659,385 | A | 4/1987 | Costopoulos et al. |
| 4,661,159 | A | 4/1987 | Ortega et al. |
| 4,842,649 | A | 6/1989 | Heitzmann et al. |
| 5,109,030 | A | 4/1992 | Chao et al. |
| 5,273,580 | A | 12/1993 | Totten et al. |
| 5,374,308 | A | 12/1994 | Kirkpatrick et al. |
| 5,387,283 | A | 2/1995 | Kirkpatrick et al. |
| 5,439,518 | A | 8/1995 | Francis et al. |
| 5,536,310 | A | 7/1996 | Brook et al. |
| 5,556,458 | A | 9/1996 | Brook et al. |
| 5,714,003 | A | 2/1998 | Styron |

(Continued)

FOREIGN PATENT DOCUMENTS

| | | |
|---|---|---|
| CN | 101134892 A | 3/2008 |
| CN | 101508557 A | 8/2009 |

(Continued)

OTHER PUBLICATIONS

Christine Angos, "A Guide to Understanding and Mixing Thickeners", Charles Ross & Son Company, New York, Mar. 20, 2013.

(Continued)

*Primary Examiner* — Anthony J Green
(74) *Attorney, Agent, or Firm* — Vorys, Sater Seymour and Pease LLP; Pradip Sahu; Philip T. Petti

(57) ABSTRACT

A method for making geopolymer cementitious binder compositions for cementitious products such as concrete, precast construction elements and panels, mortar, patching materials for road repairs and other repair materials, and the like is disclosed. The geopolymer cementitious compositions of some embodiments are made by mixing a synergistic mixture of thermally activated aluminosilicate mineral, calcium sulfoaluminate cement, a calcium sulfate and a chemical activator with water.

20 Claims, 56 Drawing Sheets

(56) References Cited

U.S. PATENT DOCUMENTS

| | | | |
|---|---|---|---|
| 5,763,508 A | 6/1998 | Hess et al. | |
| 6,149,724 A | 11/2000 | Ulibarri et al. | |
| 6,554,894 B2 | 4/2003 | Styron et al. | |
| 6,572,698 B1 | 6/2003 | Ko | |
| 6,620,487 B1 | 9/2003 | Tonyan et al. | |
| 6,641,658 B1 | 11/2003 | Dubey | |
| 6,730,162 B1 | 5/2004 | Li et al. | |
| 6,827,776 B1 | 12/2004 | Boggs et al. | |
| 6,869,474 B2 | 3/2005 | Perez-Pena et al. | |
| 6,923,857 B2 | 8/2005 | Constantinou et al. | |
| 7,288,148 B2 | 10/2007 | Hicks et al. | |
| 7,326,290 B2 | 2/2008 | Guinot et al. | |
| 7,326,478 B2 | 2/2008 | Bouscal et al. | |
| 7,618,490 B2 | 11/2009 | Nakashima et al. | |
| 7,651,564 B2 | 1/2010 | Francis | |
| 7,670,427 B2 | 3/2010 | Perez-Pena et al. | |
| 7,892,351 B1 | 2/2011 | Kirkpatrick et al. | |
| 7,956,113 B2 | 6/2011 | Killat et al. | |
| 8,016,937 B2 | 9/2011 | Schumacher et al. | |
| 8,038,790 B1 | 10/2011 | Dubey et al. | |
| 8,070,878 B2 | 12/2011 | Dubey | |
| 8,298,332 B2 | 10/2012 | Dubey | |
| 8,366,823 B2 | 2/2013 | Perez-Pena | |
| 8,519,016 B2 | 8/2013 | Perez-Pena | |
| 8,551,241 B2 | 10/2013 | Perez-Pena | |
| 8,747,547 B1 | 6/2014 | Peters et al. | |
| 8,795,428 B1* | 8/2014 | Hill | C04B 28/021 106/705 |
| 8,864,901 B2* | 10/2014 | Lloyd | C04B 28/065 106/692 |
| 8,999,057 B2 | 4/2015 | Clodic et al. | |
| 9,321,681 B2 | 4/2016 | Dubey | |
| 9,643,888 B2* | 5/2017 | Dubey | C04B 7/32 |
| 9,656,916 B2* | 5/2017 | Dubey | C04B 11/28 |
| 10,221,096 B2* | 3/2019 | Dubey | C04B 7/32 |
| 2006/0269752 A1 | 11/2006 | Holland et al. | |
| 2007/0079733 A1 | 4/2007 | Crocker | |
| 2007/0144404 A1 | 6/2007 | Sorrentino et al. | |
| 2008/0134943 A1 | 6/2008 | Godfrey et al. | |
| 2010/0071597 A1 | 3/2010 | Perez-Pena | |
| 2010/0089293 A1 | 4/2010 | Guynn et al. | |
| 2010/0310846 A1 | 12/2010 | Berke et al. | |
| 2011/0259228 A1 | 10/2011 | Mills et al. | |
| 2012/0024196 A1 | 2/2012 | Gong et al. | |
| 2012/0167804 A1 | 7/2012 | Perez-Pena | |
| 2013/0054694 A1 | 2/2013 | Maeng et al. | |
| 2013/0087076 A1 | 4/2013 | Hill et al. | |
| 2013/0087078 A1 | 4/2013 | Hill et al. | |
| 2013/0139729 A1 | 6/2013 | Ong et al. | |
| 2013/0284069 A1 | 10/2013 | Dubey | |
| 2013/0284070 A1 | 10/2013 | Dubey | |
| 2014/0371351 A1 | 12/2014 | Dantin et al. | |
| 2015/0000568 A1 | 1/2015 | Bescher et al. | |
| 2015/0141554 A1 | 5/2015 | Mikaelsson | |
| 2016/0194247 A1 | 7/2016 | Dubey | |

FOREIGN PATENT DOCUMENTS

| | | |
|---|---|---|
| CN | 101712546 A | 5/2010 |
| CN | 101786854 A | 7/2010 |
| CN | 101921548 A | 12/2010 |
| CN | 102007085 A | 4/2011 |
| CN | 102159516 A | 8/2011 |
| CN | 102173711 A | 9/2011 |
| CN | 102180626 A | 9/2011 |
| CN | 102770388 A | 11/2012 |
| FR | 2940275 A1 | 6/2010 |
| FR | 2952050 A1 | 5/2011 |
| FR | 2955102 A1 | 7/2011 |
| GB | 2166430 A | 5/1986 |
| JP | 07305827 A | 11/1955 |
| JP | 58110451 A | 7/1983 |
| JP | S5957934 A | 4/1984 |
| JP | S60127252 A | 7/1985 |
| JP | 62179903 A | 8/1987 |
| JP | 01299913 A | 12/1989 |
| JP | H04270157 A | 9/1992 |
| JP | H05229864 A | 9/1993 |
| JP | H0986979 A | 3/1997 |
| JP | 2002226251 A | 8/2002 |
| JP | 2002316860 A | 10/2002 |
| KR | 549958 B1 | 2/2006 |
| KR | 100549958 B1 | 2/2006 |
| KR | 826258 B1 | 1/2007 |
| KR | 2009025683 A | 9/2007 |
| KR | 100814962 B1 | 3/2008 |
| KR | 100826258 | 4/2008 |
| KR | 20090025683 A | 3/2009 |
| KR | 2010129104 A | 6/2009 |
| KR | 100909997 B1 | 7/2009 |
| KR | 2009085451 A | 8/2009 |
| KR | 959587 B1 | 10/2009 |
| KR | 100959587 | 5/2010 |
| RU | 2268148 C2 | 1/2006 |
| RU | 2365548 C2 | 8/2009 |
| TW | 201139322 A | 11/2011 |
| WO | 2011131998 A1 | 10/2011 |

OTHER PUBLICATIONS

Personal Care, "ACULYN™ 22 Rheology Modifier/Stabilizer A Very Efficient Thickener for Difficult to Thicken Surfactant Systems", Rohm and Haas Company, Sep. 2002.

"Air-Entrainment", U.S. Department of Transportation—Federal Highway Administration, [online], [retrieved on Sep. 28, 2015]. Retrieved from the Internet: <http://www.fhwa.dot.gov/infrastructure/materialsgrp/airentr.htm>, pp. 1-3 (last modified Feb. 24, 2015).

Designation: C666/C666M—15, "Standard Test Method for Resistance of Concrete to Rapid Freezing and Thawing", ASTM International, West Conshohocken, PA, [online], [retrieved on Oct. 21, 2015], Retrieved from the Internet: <www.astm.org>, Feb. 1, 2015.

ASTM C672/C672M—12, "Standard Test Method for Scaling Resistance of Concrete Surfaces Exposed to Deicing Chemicals", ASTM International, West Conshohocken, PA, [online], [retrieved on Oct. 21, 2015], Retrieved from the Internet: <www.astm.org>.

"Freeze Thaw and ASTM C-672", US Spec Engineered Concrete Products, posted on May 21, 2010, [online], [retrieved on Sep. 28, 2015], Retrieved from the Internet: <http://www.usspec.com/blog/detail/freeze-thaw-and-astm-c-672/8/>, May 2012.

"Acronal® acrylic resins", BASF Corporation, Dispersion & Pigments North America, [online], [retrieved on Sep. 17, 2015], Retrieved from the Internet: <http://www.dispersions-pigments.basf.us/p02/USWeb-Internet/pigments/en_GB/content/microsites/pigmentsdispersions/products/Acronal>.

Adhesives, Technical Data Sheet, "Acronal® S 695 P", BASF Corporation, Rev 3, pp. 1-2, Mar. 2015.

Construction, Technical Data Sheet, "Acronal® S 695 P", BASF Corporation, Rev 3, pp. 1-3, Apr. 2015.

Construction Polymers, Technical Data Sheet, "Castament® FS 20", BASF Corporation, Rev 1, pp. 1-3, Oct. 2011.

A. Buchwald et al., "The suitability of thermally activated illite/smectite clay as raw material for geopolymer binders", Applied Clay Science 46 (2009), pp. 300-304.

"5.3 The Hydration Reactions", [online], [retrieved on Aug. 28, 2015], Retrieved from the Internet: <http://www.iti.northwestern.edu/cement/monograph/Monograph5_3.html>.

Technical Datasheet, "Bentone® CT", SpecialChem 2015, Elementis, [online], [retrieved on Sep. 17, 2015], Retrieved from the Internet: <http://adhesives.specialchem.com/product/a-elementis-bentone-ct>.

"Extracellular polymeric substance", From Wikipedia, the free encyclopedia, [online], [retrieved on Sep. 18, 2015], Retrieved from the Internet: <http://en.wikipedia.org/wiki/Extracellular_polymeric_substance>.

ASTM, C 666/C 666M—03, "Standard Test Method for Resistance of Concrete to Rapid Freezing and Thawing", ASTM International, West Conshohocken, PA, [online], [retrieved on Nov. 25, 2008], Retrieved from the Internet: <www.astm.org>.

(56) References Cited

OTHER PUBLICATIONS

"Methyl cellulose", From Wikipedia, the free encyclopedia, [online], [retrieved on Sep. 18, 2015], Retrieved from the Internet: <http://en.wikipedia.org/wiki/Methyl_cellulose>.
Product Bulletin, Building and Construction, "AXILAT Redispersible Powders, Dispersions and Additives", Momentive Specialty Chemicals Inc., 2012.
"Air-Entrainment", U.S. Department of Transportation—Federal Highway Administration, [online], [retrieved on Feb. 18, 2001]. Retrieved from the Internet: <http://www.fhwa.dot.gov/infrastructure/materialsgrp/airentr.htm>, pp. 1-3 (2001 edition).
"5.3 The Hydration Reactions", [online], [retrieved on Jun. 11, 2010], Retrieved from the Internet: <http://www.iti.northwestern.edu/cement/monograph/Monograph5_3.html> (2010 edition).
English Translation of CN 102173711 A published Sep. 7, 2011.
"The Worlds Only Commercially Available, High Performance & Sustainable Alternative to Traditional Portland Cement", www.ceratechinc.com, May 22, 2012.
Collepardi, M.M. "Water Reducers/Retarders" in "The Concrete Admixtures Handbook" edited by V.S. Ramachandran. Noyes Publications, New Jersey, 1995. pp. 286-297.
Kearsley, E.P.; Wainwright, P.J. The effect of high fly ash content on the compressive strength of foamed concrete. cement and Concrete Research 31 (2001) pp. 105-112.
Tzouvalas, G, Dermatas, N, Tsimas, S, "Alternative Calcium Sulfate-Bearing Materials as Cement Retarders. Part I. Anhydrite", Cement and Concrete Research, Feb. 8, 2005, pp. 2113-2118, vol. 34, Elsevier, Orlando, FL.
Wayne S. Adaska et al., "Beneficial Uses of Cement Kiln Dust", May 19-22, 2008.
"Redispersible Powders, Dispersions and Additives for Building and Construction", 2009, HEXION.
Wikipedia, "Ye'elimite", http://en.wikipedia.org/wiki/Ye%27elimite, Apr. 12, 2012.
Machine Translation of JPH0986979, published Mar. 31, 1997 for Chichibu Onoda Cement Corp.
Machine Translation of KR100814962, published Mar. 19, 2008 for Refresh Technology Co Ltd et al.
Machine Translation of KR20100129104 A, published Dec. 8, 2010 for Korea Institute of Construction Technology et al.
Machine Translation of KR100909997 B1, published Jul. 29, 2009 for Samwon Inst of Construction SY et al.
Machine Translation of CN102173711 A, published Sep. 7, 2011 for Wuhan Iron & Steel Group Corp.
Machine Translation of JPS58110451, published Jul. 1, 1983 for Nippon Sheet Glass Co Ltd et al.
Machine Translation of CN102180626, published Sep. 14, 2011 for Shanghai Sunrise Chemical Co Ltd.
C. Costa, C. Ferreira, M. Filipa Ribeiro, A. Fernandes. "Alkali-Activated Binders Produced from Petrochemical Fluid Catalytic Cracking Catalyst Waste" IJRET: Int 1 Journal of Research in Engineering and Technology 3(13) (2014) 114-122.
I. Garcia-Lodeiro, A. Palomo, A Fernandez-Jimenez, D.E. Macphee. "Compatibility studies between N-A-S-H and C-A-S-H gels. Study in the ternary diagram Na2O—CaO—Al2O3—SiO2—H2O" Cement and Concrete Research 41 (2011) 923-931.
Geopolymers: Structure, Processing, Properties and Industrial Applications, Edited by J. L. Provis and J. S.J. van Deventer, CRC Press, Woodhead Publishing Limited, Cambridge, UK, 2009, pp. 96-97 and 365-367.
International Search Report dated Jan. 10, 2017 for International Application No. PCT/US2016/056720 to United States Gypsum Company filed Oct. 13, 2016.
Office Action with a search report dated Feb. 16, 2017 from Taiwanese Patent Application No. 102114041 to United States Gypsum Company.
Notice of Allowance with a Search Report dated Feb. 6, 2017 from Russian Patent Application No. 2014146785 to United States Gypsum Company.
Notice of Allowance with a Search Report dated Feb. 6, 2017 from Russian Patent Application No. 2014146124 to United States Gypsum Company.
Office Action dated Jan. 17, 2017 from Japanese Patent Application No. 2015-509035 to United States Gypsum Company.
Office Action dated Jan. 17, 2017 from Japanese Patent Application No. 2015-509036 to United States Gypsum Company.
May 27, 2016, Office Action for U.S. Appl. No. 15/071,529, Ashish Dubey filed Mar. 16, 2016.
Copending U.S. Appl. No. 14/920,022, filed Oct. 22, 2015.

\* cited by examiner

FIG. 4B                                    FIG. 4C

DIMENSIONALLY STABLE GEOPOLYMER COMPOSITION AND METHOD

CROSS-REFERENCE TO RELATED APPLICATIONS

This is a continuation of U.S. patent application Ser. No. 15/071,424, filed Mar. 16, 2016, which is a continuation of U.S. patent application Ser. No. 13/842,100, filed Mar. 15, 2013, which claims the benefit of U.S. Provisional Application No. 61/639,803, filed Apr. 27, 2012 and U.S. Provisional Application No. 61/653,696, filed May 31, 2012, each incorporated herein by reference.

FIELD OF THE INVENTION

This invention relates generally to cementitious compositions containing aluminosilicate based geopolymers that can be used for a variety of applications. In particular, the invention generally relates to such cementitious compositions which offer properties that are desirable in terms of setting times, exothermal dimensional stability, reduced overall material shrinkage upon curing and other such desirable properties.

BACKGROUND OF THE INVENTION

U.S. Pat. No. 6,572,698 to Ko discloses an activated aluminosilicate binder containing aluminosilicates, calcium sulphate and an activator containing alkali metal salts is disclosed. The aluminosilicates are selected from a group consisting of blast furnace slag, clay, marl and industrial by-products, such as fly ash, and has an $Al_2O_3$ content greater than 5% by weight. Blast furnace slag is present in an amount less than 35% by weight, and cements kiln dust (CKD), in an amount of from 1 to 20% by weight, is added to the mixture as an activator.

U.S. Pat. No. 4,488,909 to Galer et al discusses cementitious compositions including Portland cement, high alumina cement, calcium sulfate and lime. The cementitious composition includes Portland cement, high alumina cement, calcium sulfate and lime. Pozzolans such as fly ash, montmorillonite clay, diatomaceous earth and pumicite may be added up to about 25%. The cement composition includes about 14 to 21 wt % high alumina cement.

U.S. Pat. No. 6,869,474 to Perez-Pena et al, discusses cementitious compositions for producing cement-based products such as cement boards. This is achieved by adding an alkanolamine to hydraulic cement such as Portland cement, and forming a slurry with water under conditions that provide an initial slurry temperature of at least 90° F. (32° C.). Additional reactive materials may be included such as high alumina cement, calcium sulfate and a pozzolanic material such as fly ash.

U.S. Pat. No. 7,670,427 of Perez-Pena et al, discusses extremely fast setting of cementitious compositions with early-age compressive strength for producing cement-based products such as cement boards achieved by adding an alkanolamine and a phosphate to a hydraulic cement such as Portland cement, and forming a slurry with water under conditions that provide an initial slurry temperature of at least 90° F. (32° C.). Additional reactive materials may be included such as high alumina cement, calcium sulfate and a pozzolanic material such as fly ash.

US published patent application No. US 2010-0071597 A1 of Perez-Pena discloses formulations using fly ash and alkali metal salts of citric acid such as sodium citrate to form concrete mixes. Hydrolaulic cement and gypsum can be used up to 25 wt % of the formulation, although their use is not preferred. The activated fly ash binders described in this application may interact with the traditional foaming systems used to entrain air and thereby make lightweight boards.

U.S. Pat. No. 5,536,310 to Brook et al disclose a cementitious composition containing 10-30 parts by weight (pbw) of a hydraulic cement such as Portland cement, 50-80 pbw fly ash, and 0.5-8.0 pbw expressed as a free acid of a carboxylic acid such as citric acid or alkali metal salts thereof, e.g., tripotassium citrate or trisodium citrate, with other conventional additives, including retarder additives such as boric acid or borax.

U.S. Pat. No. 6,641,658 to Dubey discloses a Portland cement based cementitious composition which contains 35-90% Portland cement, 0-55% of a pozzolan, 5-15% of high alumina cement and 1 to 8% of insoluble anhydrite form of calcium sulfate in place of the soluble conventional landplaster/gypsum to increase the release of heat and decrease setting time despite the use of high amounts of pozzolan, e.g., fly ash. The cementitious composition can include lightweight aggregates and fillers, superplasticizers and additives such as sodium citrate as a reaction retarder.

U.S. Pat. No. 7,618,490 B2 to Nakashima et al. discloses a spraying material comprising one or more of calcium sulfoaluminate, calcium aluminosilicate, calcium hydroxide, a source of fluorine and Portland cement concrete. Calcium sulfate may be added as anhydrous or hemihydrate gypsum.

U.S. Pat. No. 4,655,979 to Nakano et al. discloses a process for making a cellular concrete using calcium silicate based cement, alkali metal retarder, calcium sulfoaluminate (CSA) cement and an optional calcium sulfate that can be added to the concrete composition.

US 2008/0134943 A1 to Godfrey et al. discloses a waste encapsulation material composed of at least one sulphoaluminate salt of an alkaline earth metal with calcium sulphate, and optional inorganic filler such as blast furnace slag, pulverized fuel ash, finely divided silica, limestone, and organic and inorganic fluidizing agents. Preferably at least one sulphoaluminate salt of an alkaline earth metal comprises calcium sulphoaluminate (CSA). A suitable composition may, for example, comprise at least one sulphoaluminate salt of an alkaline earth metal in combination with gypsum and pulverized fuel ash (PFA), wherein about 86% of the gypsum particles have a particle size of less than 76 um, and roughly 88% of the PFA particles have a particle size below 45 um. One example comprises 75% (70:30CSA: CaSO4.2H2O); 25% Pulverized Fuel Ash; water/solids ratio 0.65.

U.S. Pat. No. 6,730,162 to Li et al. discloses dual cementitious compositions including a first hydraulic composition having 2.5% to 95 wt. % $C_4A_3S$ which is chemical notation wherein C=CaO, S=$SiO_2$, A=$Al_2O_3$ (in other words calcium sulfo-alumina) and 2.5 to 95 wt. % a hemihydrate and/or an anhydrite of calcium sulfate. Sulfoalumina cements or ferroalumina cements are examples of cements that contain $C_4A_3S$. It may also include mineral filler additives selected from the group consisting of slag, fly ash, pozzolan, silica soot, limestone fines, lime industrial by-products and wastes.

Chinese published application CN 101921548 A to Deng et al. discloses a composition of sulfoaluminate cement made from 90-95 wt % sulfoaluminate clinker and anhydrous gypsum, quartz sand, fly ash from waste incineration, hydroxypropyl methylcellulose ether, redispersible glue powder and fiber. The sulfoaluminate clinker and anhydrous gypsum meets the standard of sulfoaluminate cement, i.e. GB20472-2006.

Korean published application KR 549958 B1 to Jung et al. discloses a composition of alumina cement, CSA, gypsum, calcium citrate, and hydroxyl carboxylic acid.

Korean published application KR 2009085451 A to Noh, discloses a composition of powdered blast furnace slag, gypsum and CSA. The gypsum can have an average particle size of 4 micron or less.

KR 2009025683 A discloses powder type waterproof material used for concrete and mortar, is obtained by pulverizing cement, anhydrous gypsum, silica powder, waterproof powder, fly ash, calcium sulfoaluminate type expansion material and inorganic binder.

Korean published application KR 2010129104 A to Gyu et al. discloses composition for blending shotcrete, comprises (in wt. %): metakaolin (5-20), calcium sulfoaluminate (5-20), anhydrous gypsum (20-45), and fly ash (30-50).

There is a need for dimensionally stable cementitious materials containing geopolymeric compositions that provide reduced shrinkage after curing, improved initial and final temperature behavior, controlled and/or optimized setting times, improved strength and other properties beneficial to the use of such materials in building construction, formed cementitious products and other applications, such as cementitious structures, cementitious structural elements, and molded cementitious products, as well as methods for preparing such materials and forming such structures, elements, and products.

SUMMARY OF THE INVENTION

The present invention provides improved geopolymer cementitious compositions and methods for making such compositions having at least one, and in many instances more than one, highly desirable property such as significantly improved dimensional stability during and after curing; improved and modifiable initial and final setting times; extended working times; modified temperature generation during mixing, setting and curing; and other improved properties as discussed herein. In many, if not all, of such embodiments, the improved properties are provided without significant (if any) loss in early age compressive strength, final compressive strength or other strength properties. Some embodiments, in fact, provide a surprising increase in early age and final compressive strength.

The improved properties of those and other embodiments of the invention provide distinct advantages over prior geopolymeric binders, such as fly ash based binders, as well as other cementitious binders that may contain a significant geopolymer content. In some preferred embodiments, the geopolymer cementitious compositions of the invention are formed from solutions or slurries of at least water and one or more cementitious reactive components in a dry or powder form. The cementitious reactive components comprise effective amounts of thermally activated geopolymer aluminosilicate materials, such as fly ash; calcium sulfoaluminate cements; and calcium sulfates. One or more alkali metal chemical activator, such as an alkali metal salt of citric acid, or an alkali metal base, also is added to the solutions, either in a dry form to the reactive powder, or as a liquid addition to the slurry. Optionally, the slurry or solution may incorporate other additives such as water reducing agents, set accelerating or retarding agents, air-entraining agents, foaming agents, wetting agents, lightweight or other aggregates, reinforcing materials, or other additives to provide or modify the properties of the slurry and final product.

In many preferred compositions of the invention, the cementitious reactive components in their dry or powder form comprise about 65 to about 97 weight percent thermally activated aluminosilicate mineral such as fly ash, about 2 to about 30 weight percent calcium sulfoaluminate cement, and about 0.2 to about 15 weight percent calcium sulfate, based upon the total dry weight of all the cementitious reactive components. In preferred compositions of invention, the cementitious reactive components comprise calcium sulfoaluminate cement in about 1 to about 200 parts by weight relative to 100 parts by weight of thermally activated aluminosilicate mineral.

In other embodiments, a blend of two or more types of calcium sulfoaluminate cement and calcium aluminate cement may be used, and the amounts and types of calcium sulfoaluminate cements and calcium aluminate cements can vary depending upon their chemical composition and particle size (Blaine fineness). The Blaine fineness of calcium sulfoaluminate cement in such embodiments and other embodiments preferably is greater than about 3000, more preferably greater than about 4000, even more preferably greater than 5000, and most preferably greater than about 6000.

In some preferred embodiments, the amount of alkali metal chemical activator is from about 0.5% to about 10% by weight based upon the total dry weight of the cementitious reactive materials. More preferably, the range of alkali metal chemical activator about 1% to about 6% by total weight of the cementitious reactive materials, preferably about 1.25% to about 4%, more preferably about 1.5% to about 3.5%, and most preferably about 1.5% to 2.5%. Sodium citrate and potassium citrate are preferred alkali metal acid activators, although a blend of sodium and potassium citrate can also be used. Alkali metal bases, such as alkali metal hydroxides, and alkali metal silicates also may be used depending on the application and the needs of that application.

These and other preferred embodiments of the invention, unlike prior fly ash geopolymer compositions, are formulated to provide geopolymer cementitious compositions that are dimensionally stable and resistant to cracking upon setting and hardening under both unrestrained and restrained conditions. For example, the short term free shrinkage of certain preferred embodiments of the invention typically is less than about 0.3%, preferably less than about 0.2%, and more preferably less than about 0.1%, and most preferably less than about 0.05% (measured after initial set and within 1 to 4 hours of mixing). In such preferred embodiments, the long term shrinkage of the compositions during curing also typically is less than about 0.3%, more preferably less than about 0.2%, and most preferably less than about 0.1%.

For additional control regarding the dimensional stability and shrinkage in those embodiments, the amount of calcium sulfoaluminate cement is about 2.5 to about 100 parts by weight relative to 100 parts by weight of the thermally activated aluminosilicate mineral, more preferably about 2.5 to about 50 parts by weight relative to 100 parts by weight of the thermally activated aluminosilicate mineral, and most preferably about 5 to about 30 parts by weight relative to 100 parts by weight of thermally activated aluminosilicate mineral. For embodiments where the control on dimensional stability as indicated by the material shrinkage is of importance, the amount of alkali metal activator more preferably ranges from about 1 to about 3% by total dry weight of the cementitious reactive materials (i.e., thermally activated aluminosilicate mineral such as fly ash, calcium sulfoaluminate cement and calcium sulfate), even more preferably from about 1.25% to about 2.75% by total dry weight of the cementitious reactive materials, and most preferably from about 1.5% to about 2.5% by total dry weight of the cementitious reactive materials.

The dimensionally stable geopolymer compositions of preferred embodiments of the invention further evidence a surprising reduction in the maximum temperature rise during curing of the composition relative to prior geopolymer cementitious products. For this and related reasons, these embodiments resist thermal cracking to an unexpected degree. For example, in some preferred embodiments, the temperature rise typically is less than about 50° F. (28° C.), more preferably less than about 40° F. (22° C.), and most preferably less than about 30° F. (17° C.).

These and other preferred embodiments of the invention also exhibit an unexpected rate of early age strength development. For example, in some such embodiments, their 4-hour compressive strength may exceed about 1000 psi (6.9 MPa), preferably exceeding about 1500 psi (10.3 MPa), most preferably exceeding about 2500 psi (17.2 MPa). In such embodiments, their 24-hour compressive strength development may exceed about 1500 psi (10.3 MPa), more preferably exceeding about 2500 psi (17.2 MPa), and most preferably exceeding about 3500 psi (24.1 MPa). In those and other preferred embodiments, the 28-day compressive strength further may exceed about 3500 psi (24.1 MPa), more preferably exceeding about 4500 psi (31.0 MPa), and most preferably exceeding about 5500 psi (37.9 MPa). In yet other embodiments, the compositions are capable of developing compressive strength after 1 to 4 hours from about 500 psi (3.5 MPa) to about 4000 psi (27.6 MPa), more preferably from about 1500 to about 5000 psi (10.3 to 34.5 MPa) after 24 hours, and most preferably from about 3500 to about 10000 psi (24.1 to 70 MPa) after 28 days.

Furthermore, the geopolymer cementitious compositions of certain of the preferred embodiments of the invention also have extremely good durability under wet conditions, with ultimate wet compressive strengths similar to dry compressive strengths. For example, in certain embodiments, their water saturated compressive strength at 28-days typically may exceed about 3500 psi (24.1 MPa), more preferably exceeding about 4500 psi (31.0 MPa), and most preferably exceeding about 5500 psi (37.9 MPa).

Because the set times from slurry to solid state for alkali metal activated geopolymers, as well as the combined calcium sulfoaluminate cements and calcium sulfates, typically are relatively short, it was expected that the preferred embodiments combining all of these components also would have short set times and limited working times. Surprisingly, however, the set times provided by the preferred embodiments of the invention are not limited to short set times (often less than 15 minutes), but provide significant control over the slurry setting reactions allowing significant extensions of the slurry set and working times.

For example, in some embodiments, the composition may be formulated for a short setting time, such as less than about 10 minutes. In other preferred embodiments, the composition may be formulated for an extended setting of between about 10 to about 30 minutes. In yet other more preferred embodiments, the composition formulation is preferably selected to provide a setting time of about 30 to about 60 minutes. In still other most preferred embodiments, the composition may be formulated for setting times as long as about 60 to about 120 minutes, about 120 to about 240 minutes, or longer times if desired.

The setting times of such embodiments, in addition, can be selected, and if desired extended, without significant (if any) loss in shrink resistance properties, compressive strength and other strength properties. As a result, such embodiments unexpectedly can be used in applications where prior geopolymer based products and cementitious products with geopolymer components could not be used due to a need for extended set and working times without unacceptable shrinkage or strength loss.

In certain preferred embodiments, the compositions of the invention also develop exceptional tensile bond strength with an underlying substrate. For example, the preferable tensile bond strength between such embodiments and a concrete substrate preferably exceeds about 200 psi (1.4 MPa) and most preferably exceeds about 300 psi (2.1 MPa). In some embodiments, the surface pH of the fully cured and hardened dimensionally stable geopolymer cementitious compositions of the invention also are improved relative to Portland cement based materials and products, which typically have a surface pH of greater than 12 and more typically greater than 13. In certain preferred embodiments, such compositions are measured 16 hours after installation and preferably have a pH less than about 11, more preferably less than about 10.5, and most preferably less than about 10. In this context, surface pH is measured using the ASTM F-710 (2011) testing standard.

In many preferred embodiments, the geopolymer cementitious compositions of the invention do not require calcium silicate based hydraulic cements, such as Portland cements, for strength development and dimensional stability. In other embodiments, Portland cements can be incorporated to provide specific desired properties. However, it was surprisingly found that, depending on the specific composition of the embodiment, an excess amount of Portland cement actually decreased the composition's dimensional stability during and after curing, instead of increasing its dimensional stability.

For preferred embodiments of the invention incorporating calcium silicate based hydraulic cements, the limit on such hydraulic cements may vary depending on the specific composition of the embodiment, but can be identified by an increase in shrinkage relative to the shrinkage of the same embodiment with a reduced amount of the calcium silicate hydraulic cement. In certain of such embodiments the Portland cement content should not exceed about 15 weight % of the weight of reactive powder components in another preferred embodiment, it should not exceed 10 weight % of the weight of reactive powder components, and in yet another preferred it should not exceed about 5 weight % of the weight of reactive powder components and yet another preferred embodiment, there is no substantial amount of Portland cement in the reactive powder components.

It also has surprisingly been found in some embodiments that an excess amount of calcium sulfoaluminate cement can cause a loss of dimensional stability, as indicated by an increase in shrinkage after the initial set of the composition. For applications requiring significant degree of dimensional stability and/or shrinkage control to prevent cracking, delamination and other modes of failure, the amount of calcium sulfoaluminate cement is preferably about 10 to about 40 parts by dry weight relative to 100 parts by dry weight of thermally activated aluminosilicate mineral.

In other preferred embodiments, it also has been unexpectedly found that the amount of calcium sulfate present in proportion to calcium sulfoaluminate cement in the composition can moderate potential adverse effects, such as shrinkage, caused by the calcium sulfoaluminate cement content.

In such embodiments, the calcium sulfate amount is preferably about 2 to about 200 parts by weight relative to 100 parts by weight of calcium sulfoaluminate cement.

For the most effective control of material shrinkage of those embodiments, the amount of calcium sulfate is about 10 to about 100 parts by dry weight relative to 100 parts by dry weight of calcium sulfoaluminate cement, more preferably about 15 to about 75 parts by dry weight relative to 100 parts by dry weight of calcium sulfoaluminate cement, and most preferably about 20 to about 50 parts by dry weight relative to 100 parts by dry weight of calcium sulfoaluminate cement. In embodiments where an increase in early age compressive strength is important, it is preferred amount of calcium sulfate amount is about 10 to about 50 parts to about 100 parts by dry weight of calcium sulfoaluminate cement.

In yet other embodiments of the invention, the type of calcium sulfate (primarily dihydrate, hemihydrate, or anhydrite) added to the composition can have a significant influence on the development of the early age compressive strength of the partially cured composition (i.e. at less than about 24 hours). Surprisingly, it has been found that various embodiments using primarily calcium sulfate anhydrite have a greater early compressive strength than embodiments using primarily the dihydrate form and, in some embodiments, can have early compressive strengths comparable to those using primarily calcium sulfate hemihydrate. In other embodiments, two or more of the calcium sulfate types (dihydrate, hemihydrate, or anhydrite) can be employed together, and the amounts of the different types adjusted to provide improved control of the composition's compressive strength. Similarly, the different types and amounts of calcium sulfate can be employed alone or in combination to adjust the desired shrinkage and other properties of the composition.

Where shrinkage performance is of central concern, other embodiments of the invention incorporate calcium sulfates with average particle sizes preferably from about 1 to about 100 microns, about 1 to about 50 microns, and about 1 to about 20 microns. These embodiments provide a surprising improvement in shrinkage resistance, and in other embodiments, the calcium sulfate particle sizes in at least the preferred ranges can provide an important contribution to improved rates of strength development during curing of the compositions.

In yet other embodiments, it was surprisingly found that substantially water insoluble anhydrous calcium sulfate (anhydrite) can provide important benefits, notwithstanding its low water solubility and previously presumed limited, if any, reactivity in the composition. For example, it was unexpectedly found that anhydrite provided significant improved dimensional stability control by reducing the shrinkage during curing of those and other embodiments relative to prior art compositions. Anhydrite also provided significantly improved early and long term compressive strength relative to prior art compositions, and, in some instances, early and long term compressive strengths comparable to or better than compositions utilizing calcium sulfate hemihydrate or dihydrate as the calcium sulfate source. The selection of the type of calcium sulfate used in a particular embodiment will depend on the desired rate of early age strength development in combination with a balance of other properties, such as set time and shrinkage resistance for a particular end application.

In other embodiments, the particle size and morphology of calcium sulfate provides a significant and surprising influence on development of early age strength (less than about 24 hours) of the compositions. In such embodiments, the use of a relatively a small particle size calcium sulfate provides a more rapid development in early age compressive strength. In those embodiments, the preferred average particle size of calcium sulfate ranges from about 1 to 100 microns, more preferably from about 1 to 50 microns, and most preferably from about 1 to 20 microns.

In certain embodiments, the compositions also exhibit a self-leveling behavior after initial mixing while providing one or more of the aforementioned surprising performance characteristics. The self-leveling aspect of material is useful in a variety of situations and applications such as self-leveling underlayments for floors, concrete toppings, manufacturing of precise concrete products and panels, placement of slurry in heavily reinforced construction elements, etc. The compositions of those embodiments are self-leveling after initial mixing with water to the reactive powder of the invention at a weight ratio of about 0.15 to about 0.4, more preferably, 0.17 to 0.35, yet more preferably 0.20 to 0.30. Alternatively, in other embodiments, the compositions also can be provided in a shapeable, thick paste like consistency after initial mixing while similarly providing one or more improved performance characteristics.

A preferable formulation for self-leveling and patching compositions comprises about 65 to about 95 weight percent fly ash, about 2 to about 30 weight percent calcium sulfoaluminate cement, and about 0.2 to about 15 weight percent calcium sulfate. In some embodiments, the geopolymeric cementitious composition of the invention can be spread on a surface of a substrate, wherein the geopolymeric cementitious binder is mixed as a self-leveling product and is poured to an effective thickness of about 0.02 cm to about 7.5 cm.

The physical characteristics of such products provide good examples of benefits of those embodiments, i.e. dimensional stability, resistance to dimensional movement and physical distress, and high surface resistance to abrasion and wear, suitable for use in commercial, industrial, and other high traffic areas. Time consuming and expensive substrate surface preparation measures such as shot-blasting, scarifying, water jetting, scabbing or milling can be minimized or avoided altogether, depending on the application.

In other aspects of the invention, preferred embodiments provide methods for making dimensionally stable, cementitious compositions with setting times adaptable to specific applications, good early age strength development and ultimate compressive and other strength characteristics, improved surface pH, improved tensile bond strength with substrates and other benefits. In certain preferred embodiments, those methods comprise the steps of preparing a surprisingly effective, synergistic mixture of thermally activated aluminosilicates, preferably from Class C fly ash, calcium sulfoaluminate cement, a calcium sulfate, and an alkali metal chemical activator.

In certain preferred embodiments of such methods, the preferred mixtures are prepared using components, such as those mentioned above, to form a cementitious reactive powder comprising thermally activated Class C fly ash, calcium sulfoaluminate cement, and a calcium sulfate selected from the group consisting of calcium sulfate dihydrate, calcium sulfate hemihydrate, anhydrous calcium sulfate and mixtures thereof (preferably in a fine grain form with particle size less than about 300 microns).

In those embodiments, a chemical activator further is added to the mixture either in dry or liquid form comprising an alkali metal salt or base preferably selected from the group consisting of alkali metal salts of organic acids, alkali metal hydroxides, and alkali metal silicates. In subsequent steps, water is added and optionally a superplasticizer, particularly a carboxylated plasticizer material, to form stable slurry mixtures that can be used in applications suitable for geopolymeric cementitious products.

In the preferred methods, the mixtures are prepared at an initial temperature of about 0° C. to about 50° C., more preferably an initial temperature of about 5° C. to about 40° C., even more preferably an initial temperature of about 10° C. to about 35° C., most preferably ambient temperature of about 25° C. In such embodiments, the initial temperature of the overall mixture is measured during the first minute after the cementitious reactive powder; activator and water are first all present in the mixture. Of course the temperature of the overall mixture can vary during this first minute but in such preferred embodiments; the temperature of the slurry preferably remains within the listed range.

In some preferred embodiments, the slurry can be mixed using relatively low energies, while still achieving a well-mixed composition. In some of such preferred methods, the slurry is mixed with energies equivalent to those provided by low speed hand drill mixers or equivalent mixers having a rating of about 250 RPM or greater. Accordingly, the geopolymer compositions of such preferred embodiments are easy to mix despite the use of the relatively small amounts of water used to make the slurry used to form the final composition.

In many embodiments, other additives which are not considered cementitious reactive powder may be incorporated into the slurry and overall geopolymeric cementitious composition. Such other additives, for example, water reducing agents such as the above mentioned superplasticizers, set accelerating agents, set retarding agents, air-entraining agents, foaming agents, wetting agents, shrinkage control agents, viscosity modifying agents (thickeners), film-forming redispersible polymer powders, film-forming polymer dispersions, coloring agents, corrosion control agents, alkali-silica reaction reducing admixtures, discrete reinforcing fibers, and internal curing agents. Other additives may include fillers, such as one or more of sand and/or other aggregates, lightweight fillers, pozzolanic mineral, mineral fillers, etc.

While separately discussed above, each of the preferred geopolymeric compositions and mixtures of the invention has at least one, and can have a combination of two or more of the above mentioned distinctive advantages (as well as those apparent from the further discussion, examples and data herein) relative to prior art geopolymeric cementitious compositions.

Many, if not most, of the embodiments of the invention are environmentally sustainable, utilizing fly ash geopolymers that comprise post industrial waste as a primary raw material source. This significantly reduces the life cycle carbon footprint and the life cycle embodied energy of the manufactured product.

The geopolymer cementitious compositions of preferred embodiments of the present invention can be used where other cementitious materials are used, particularly applications where setting and working time flexibility, dimensional stability, compressive strength and/or other strength properties are important or necessary. For example, in various concrete product applications including structural concrete panels for floors, slabs, and walls, wall and floor underlayment for installation of floor-finish materials such as ceramic tiles, natural stones, vinyl tiles, VCTs and carpet, highway overlays and bridge repair, sidewalks and other slabs-on-ground, exterior stucco and finish plasters, self-leveling topping and capping underlayments, guniting and shotcrete for stabilization of earth and rocks in foundations, mountain slopes and mines, patching repair mortars for filling and smoothing cracks, holes and other uneven surfaces, statuary and murals for interior and exterior applications, as well as patching materials for repairing pot holes in roads and bridge decks.

Other examples include uses for precast concrete articles, as well as building products such as cementitious boards, masonry blocks, bricks, and pavers with excellent moisture durability. In some applications, such precast concrete products such as cement boards are preferably made under conditions which provide setting times appropriate for pouring into a stationary or moving form or over a continuously moving belt.

The geopolymer compositions of some embodiments of the invention can be used with different fillers and additives including foaming agents and air entraining agents for adding air in specific proportions to make lightweight cementitious products, including precast construction elements, construction repair products, and patching compositions which have good expansion properties and no shrinkage e.g. suitable for road repairs and pavements.

Other advantages, benefits and aspects of various embodiment of the invention are discussed below, are illustrated in the accompanying figures, and will be understood by those of skill in the art from the more detailed disclosure below. All percentages, ratios and proportions herein are by weight, unless otherwise specified.

BRIEF DESCRIPTION OF THE DRAWINGS

FIG. 4B is a photograph of initial flow behavior and slump of compositions in Example 4 for Mix 3.
FIG. 4C is a photograph of initial flow behavior and slump of compositions in Example 4 for Mix 4.

DETAILED DESCRIPTION OF THE INVENTION

Figure 1A:
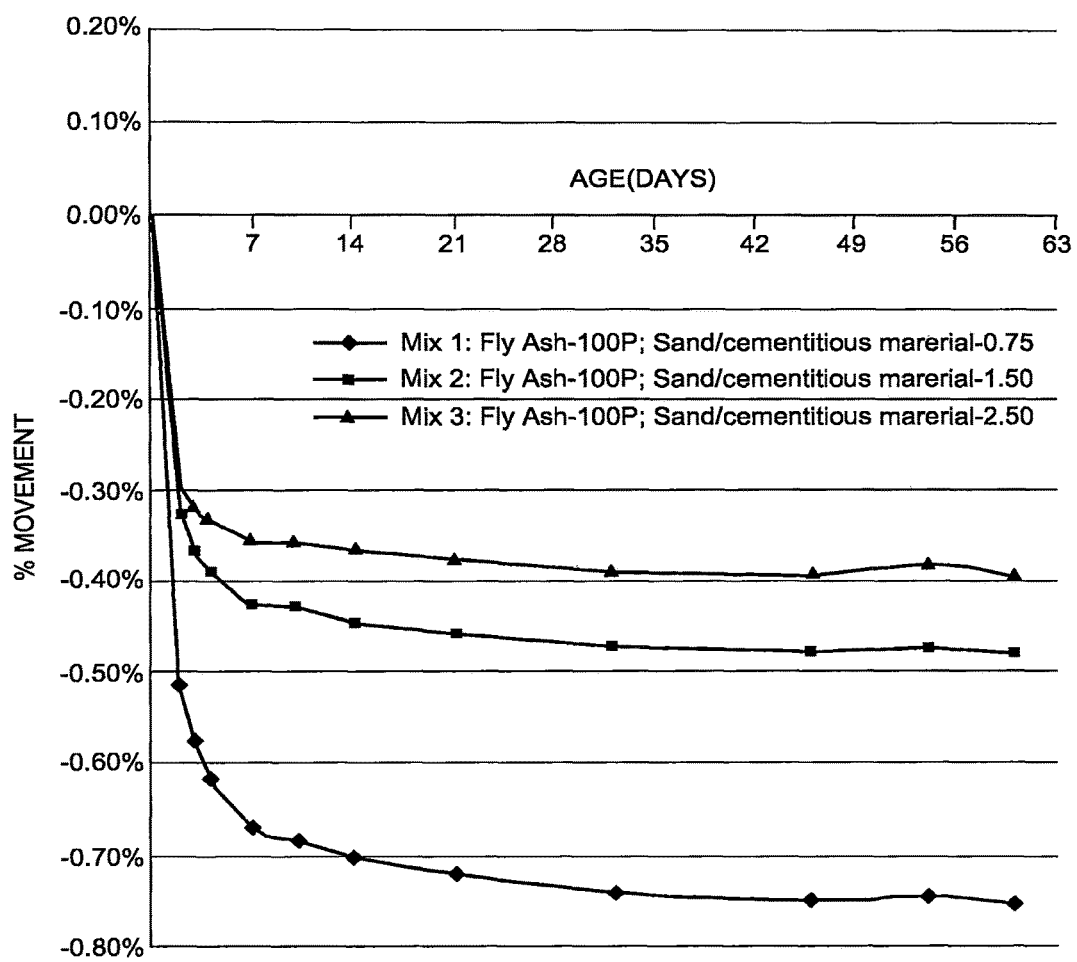
FIG. 1A—is a graph of time of shrinkage results of Comparative Example 1.

TABLE A shows the composition of the dimensionally stable geopolymer cementitious composition of some preferred embodiments of the invention expressed in parts by weight (pbw) of individual or aggregated components.

TABLE A shows the dimensionally stable geopolymer cementitious compositions of such preferred embodiments of the invention are comprised of two components—Reactive Powder Component A (also known as "Cementitious Reactive Material" and which for purposes of this invention is defined as a thermally activated aluminosilicate, calcium sulfoaluminate cement, a calcium sulfate, and any additional reactive cement to the extent it is added to the other listed ingredients) and Activator Component B. Reactive Powder Component A is blend of materials comprising thermally activated aluminosilicate mineral comprising Class C fly ash, calcium sulfoaluminate cement, and calcium sulfate. Activator Component B comprises an alkali metal chemical activator or mixtures thereof, which can be a powder or aqueous solution. Reactive Powder Component A and Activator Component B combined together form the reactive mixture of the geopolymer cementitious compositions of such preferred embodiments of the invention.

TABLE A

Reactive geopolymer cementitious compositions of some preferred embodiments of the invention

| | Broad | Preferred | More Preferred |
|---|---|---|---|
| Reactive Powder Component A: | | | |
| Thermally activated aluminosilicate mineral comprising Class C Fly ash, pbw | 100 | 100 | 100 |
| Calcium sulfoaluminate cement, pbw per 100 pbw of thermally activated aluminosilicate mineral | 1-100 | 2.5-50 | 5-30 |
| Calcium sulfate, pbw per 100 pbw of calcium sulfoaluminate cement | 2-100 | 5-75 | 10-50 |
| Activator Component B: Alkali metal chemical activator, weight % based upon the total weight of Component A (i.e., aluminosilicate, calcium sulfoaluminate cement, and calcium sulfate). | 1 to 6% | 1.25 to 4% | 1.5 to 2.5% |

TABLE B represents full density (preferable densities in the range of 100 to 160 pounds per cubic foot) formulations of preferred embodiments incorporating the binder of TABLE A and other ingredients.

TABLE B - Ingredient Amounts

| Ingredient | Broad | Preferred | More preferred |
|---|---|---|---|
| Reactive Powder Component A: | | | |
| Thermally activated aluminosilicate mineral comprising Class C Fly ash, pbw | 100 | 100 | 100 |
| Calcium sulfoaluminate cement, pbw per 100 pbw of thermally activated aluminosilicate mineral | 2-100 | 2.5-50 | 5-30 |
| Calcium sulfate, pbw per 100 pbw of calcium sulfoaluminate cement | 2-100 | 5-75 | 10-50 |
| Activator Component B: Alkali metal chemical activator, weight % based upon the total weight of Component A | 1 to 6% | 1.25 to 4% | 1.5 to 2.5% |
| Superplasticizer/Reactive Powder Component A (weight %) | 0 to 4.0% | 0.25-2.5% | 0.5-1.5% |
| Sand/Reactive Powder Component A Ratio (by weight) | 0-4 | 0.50-3 | 0.75-1.5 |
| Inorganic Mineral Filler/Reactive Powder Component A Ratio (by weight) | 0-2 | 0-1 | 0-0.5 |
| Defoaming Agent/Reactive Powder Component A (weight %) | 0-1% | 0-0.75% | 0-0.50% |
| Organic Rheology Control Agent/Reactive Powder Component A (weight %) | 0-0.5% | 0-0.25% | 0-0.15% |
| Inorganic Rheology Control Agent/Reactive Powder Component A (weight %) | 0-3% | 0-2% | 0-1% |
| Coloring Pigments/Reactive Powder Component A (weight %) | 0-5% | 0-2.5% | 0-1% |
| Efflorescence Suppression Agent/Reactive Powder Component A (weight %) | 0-3% | 0-2% | 0-1% |
| Film Forming Redispersible Polymer Powder/Reactive Powder Component A (weight %) | 0-20% | 0-10% | 0-5% |
| Film Forming Polymer Dispersion/Reactive Powder Component A (weight %) | 0-40% | 0-20% | 0-10% |
| Water/Reactive Powder Component A Ratio (by weight) | 0.17-0.40 | 0.20-0.35 | 0.22-0.30 |

TABLE C represents lightweight density (preferable densities in the range of 10 to 125 pounds per cubic foot) of preferred formulations incorporating the binder of TABLE A and other ingredients.

TABLE C - Ingredient Amounts

| Ingredient | Broad | Preferred | More preferred |
|---|---|---|---|
| Reactive Powder Component A: | | | |
| Thermally activated aluminosilicate mineral comprising Class C Fly ash, pbw | 100 | 100 | 100 |
| Calcium sulfoaluminate cement, pbw per 100 pbw of thermally activated aluminosilicate mineral | 2-100 | 2.5-50 | 5-30 |
| Calcium sulfate, pbw per 100 pbw of calcium sulfoaluminate cement. | 2-100 | 5-75 | 10-50 |
| Activator Component B: Alkali metal chemical activator weight % based upon the total weight of Component A | 1 to 6% | 1.25 to 4% | 1.5 to 2.5% |
| Superplasticizer/Reactive Powder Component A (weight %) | 0 to 4.0% | 0.25-2.5% | 0.50-1.5% |

TABLE C-continued

| TABLE C - Ingredient Amounts | | | |
|---|---|---|---|
| Ingredient | Broad | Preferred | More preferred |
| Sand/Reactive Powder Component A Ratio (by weight) | 0-4 | 0-2 | 0-1.0 |
| Inorganic Mineral Filler/Reactive Powder Component A Ratio (by weight) | 0-2 | 0-1 | 0-0.5 |
| Defoaming Agent/Reactive Powder Component A (weight %) | 0-1% | 0-0.75% | 0-0.50% |
| Organic Rheology Control Agent/Reactive Powder Component A (weight %) | 0-0.50% | 0-0.25% | 0-0.15% |
| Inorganic Rheology Control Agent/Reactive Powder Component A (weight %) | 0-3% | 0-2% | 0-1% |
| Coloring Pigments/Reactive Powder Component A (weight %) | 0-5% | 0-2.5% | 0-1% |
| Efflorescence Suppression Agent/Reactive Powder Component A (weight %) | 0-3% | 0-2% | 0-1% |
| Film Forming Redispersible Polymer Powder/Reactive Powder Component A (weight %) | 0-20% | 0-10% | 0-5% |
| Film Forming Polymer Dispersion/Reactive Powder Component A (weight %) | 0-40% | 0-20% | 0-10% |
| Lightweight Filler/Reactive Powder Component A Ratio (by weight) | 0-2 | 0.01-1 | 0.02-0.75 |
| Water/Reactive Powder Component A Ratio (by weight) | 0.17-0.40 | 0.20-0.35 | 0.22-0.30 |

TABLE D represents lightweight or full density (preferable densities in the range of 40 to 160 pounds per cubic foot) of certain preferred formulations incorporating the binder of TABLE A, coarse aggregate and other ingredients.

| TABLE D - Ingredient Amounts | | | |
|---|---|---|---|
| Ingredient | Broad | Preferred | More preferred |
| Reactive Powder Component A: | | | |
| Thermally activated aluminosilicate mineral comprising Class C Fly ash, pbw | 100 | 100 | 100 |
| Calcium sulfoaluminate cement, pbw per 100 pbw thermally activated aluminosilicate mineral | 2-100 | 2.5-50 | 5-30 |
| Calcium sulfate, pbw per 100 pbw of Calcium sulfoaluminate cement. | 2-100 | 5-75 | 10-50 |
| Activator Component B: Alkali metal chemical activator, weight % based upon the total weight of Component A | 1 to 6% | 1.25 to 4% | 1.5 to 2.5% |
| Superplasticizer/Reactive Powder Component A (weight %) | 0 to 4.0% | 0.25-2.5% | 0.50-1.5% |
| Sand/Reactive Powder Component A Ratio (by weight) | 0-4 | 0.50-3 | 1-2 |
| Inorganic Mineral Filler/Reactive Powder Component A Ratio (by weight) | 0-2 | 0-1 | 0-0.5 |
| Defoaming Agent/Reactive Powder Component A (weight %) | 0-1% | 0-0.75% | 0-0.50% |
| Organic Rheology Control Agent/Reactive Powder Component A (weight %) | 0-0.50% | 0-0.25% | 0-0.15% |
| Inorganic Rheology Control Agent/Reactive Powder Component A (weight %) | 0-3% | 0-2% | 0-1% |
| Coloring Pigments/Reactive Powder Component A (weight %) | 0-5% | 0-2.5% | 0-1% |
| Efflorescence Suppression Agent/Reactive Powder Component A (weight %) | 0-3% | 0-2% | 0-1% |

TABLE D-continued

TABLE D - Ingredient Amounts

| Ingredient | Broad | Preferred | More preferred |
| --- | --- | --- | --- |
| Film Forming Redispersible Polymer Powder/Reactive Powder Component A (weight %) | 0-20% | 0-10% | 0-5% |
| Film Forming Polymer Dispersion/Reactive Powder Component A (weight %) | 0-40% | 0-20% | 0-10% |
| Coarse Aggregate/Reactive Powder Component A Ratio (by weight) | 0.5-5 | 0.5-4 | 1-3 |
| Lightweight Filler/Reactive Powder Component A Ratio (by weight) | 0-2 | 0-1 | 0-0.50 |
| Water/Reactive Powder of Component A parts by weight water to pbw Component A | 0.20-0.40 | 0.22-0.35 | 0.25-0.30 |

The long-term free shrinkage of the geopolymer cementitious binder mixtures of some embodiments of the invention with shrinkage measurements initiated between about 1 to about 4 hours after mixing to form an aqueous mixture is about 0.3% or less, preferably less than about 0.2%, and more preferably less than about 0.1%, and most preferably less than about 0.05%. As mentioned previously, the synergistic interaction between the thermally activated aluminosilicate mineral, calcium sulfoaluminate cement, appropriately selected source and amount of calcium sulfate, and appropriately selected alkali metal activator used at appropriate amount according to some embodiments of this invention helps to minimize the material shrinkage.

The geopolymer reaction of aluminosilicate mineral such as fly ash with an alkali metal activator such as alkali metal citrate is known to involve an extremely rapid rate of reaction in which significant amount of heat is released due to the exothermic reaction involved. This rapid rate of exothermic reaction leads to the formation of aluminosilicate compounds and the material gels-up and hardens extremely quickly (in a matter of minutes). Similarly, interaction of calcium sulfoaluminate cement with calcium sulfate also is known to involve an extremely rapid rate of reaction in which significant amount of heat is released due to the exothermic reaction. As a result of this rapid exothermic reaction, hydration products of calcium sulfoaluminate compound are formed and the material gels-up and hardens extremely quickly, again in a matter of minutes. An extremely short setting time is problematic in some applications since it provides a short working life (pot life) that causes significant difficulties with processing and placement of rapid setting material in actual field applications. Also, the large amount of heat generated by the rapid exothermic reactions can lead to undesirable thermal expansion and consequent cracking and disruption of material.

Those skilled in the art would expect that if the aforementioned two rapid setting exothermic reactions (that is, the reaction of aluminosilicate mineral such as fly ash with an alkali metal salt and the reaction of calcium sulfoaluminate cement with calcium sulfate) were allowed to occur concurrently as a result of mixing aluminosilicate mineral, alkali metal activator, calcium sulfoaluminate cement and calcium sulfate together, the resulting material would undesirably release even more heat and would undesirably gel-up and harden much more rapidly in comparison with the scenarios where the above two reactions were allowed to occur independently and wherein the high heat generation and rapid set are already at undesirable levels. In embodiments of the present invention employing all four reactive components noted above, it was surprisingly found that such is not the case. When the aluminosilicate mineral, alkali metal activator, calcium sulfoaluminate cement and calcium sulfate are mixed together, the resulting material is less exothermic and has extended gelation and hardening times compared with both of the known two-component reactive systems described above. There appears to be a synergistic interaction occurring between these four raw materials that provides the surprising results in some embodiments of the invention.

Yet another very surprising result found in some embodiments of this invention is the observed significant reduction in material shrinkage when the aluminosilicate mineral and alkali metal activator are reacted together with the calcium sulfoaluminate cement and calcium sulfate. See, for example, the comparisons in the Examples below of inventive four-reactive-component systems of the invention with the non-inventive systems of Comparative Examples 1-4 containing only two or three of the reactive components. Significant reductions in material shrinkage occur even when relatively small amounts of calcium sulfoaluminate cement and calcium sulfate are included in the reactive mixture with the aluminosilicate mineral and activator.

It has been very surprisingly found that the amount of calcium sulfoaluminate cement in the geopolymer cementitious binder compositions of some embodiments of the present invention affects the degree of material shrinkage measured after the initial setting of the material. It has also been surprisingly been found that beyond some amount of calcium sulfoaluminate cement in a given embodiment the amount of material shrinkage occurring after the initial set of the material begins to increase.

TABLE D1 shows ingredient amounts for some preferred embodiments reflecting the ability to control shrinkage of the compositions after the initial set.

TABLE D1

| Ingredient | Broad | Preferred | More preferred |
| --- | --- | --- | --- |
| In general the amount of calcium sulfoaluminate cement per 100 parts by weight thermally activated aluminosilicate mineral. | 1-200 parts by weight | 2.5 to 100 parts by weight | 5 to 50 parts by weight |
| For most effective control on material shrinkage, the amount of calcium sulfoaluminate cement per 100 parts by weight thermally activated aluminosilicate mineral. | 2.5 to 75 parts by weight | 3.5 to 50 parts by weight | 5 to 30 parts by weight |

TABLE D1-continued

| Ingredient | Broad | Preferred | More preferred |
|---|---|---|---|
| For applications requiring very high degree of shrinkage control to prevent cracking, delamination and other modes of failure, the amount of calcium sulfoaluminate cement per 100 parts by weight thermally activated aluminosilicate mineral. | 5 to 40 parts by weight | 5 to 35 parts by weight | 5 to 30 parts by weight |

It has also been unexpectedly found the amount of calcium sulfate present in the mixture has a significant influence on the degree of material shrinkage of geopolymer cementitious compositions of some embodiments of the invention.

TABLE D2 shows ingredient amounts in some embodiments of the invention, of the amount of calcium sulfate per 100 parts calcium sulfoaluminate cement that can be used to control material shrinkage.

TABLE D2

| Ingredient | Broad | Preferred | More preferred |
|---|---|---|---|
| In general the amount of calcium sulfate per 100 parts by weight calcium sulfoaluminate cement. | 2 to 200 parts by weight | 10 to 100 parts by weight | 20 to 75 parts by weight |
| For most effective control on material shrinkage of the geopolymer cementitious binder compositions of some embodiments of the invention, the amount of calcium sulfate per 100 parts calcium sulfoaluminate cement. | 2 to 100 parts by weight | 5 to 75 parts by weight | 10 to 50 parts by weight |

For a given amount of alkali metal activator and other components in the composition of some embodiments of the invention, usage of calcium sulfate dihydrate has been found to provide the most effective control in minimizing the material shrinkage. Usage of anhydrous calcium sulfate (anhydrite) and calcium sulfate hemihydrate also provide excellent control in lowering the material shrinkage of the geopolymer cementitious binder compositions of some embodiments. Calcium sulfate dihydrate and anhydrous calcium sulfate (anhydrite) are the preferred form of calcium sulfate of this invention. More preferably, the calcium sulfate is provided in fine particle size.

It has been surprisingly found the amount of alkali metal activator has a significant influence on the degree of material shrinkage of geopolymer cementitious binder compositions of some embodiments of the invention. TABLE D3 shows ingredient amounts for the % amount of alkali metal activator relative to the weight of the cementitious materials (i.e. thermally activated aluminosilicate mineral, calcium sulfoaluminate cement, and calcium sulfate) preferred to achieve this benefit.

TABLE D3

| Ingredient | Broad | Preferred | More preferred |
|---|---|---|---|
| For the most effective control on shrinkage of the geopolymer cementitious binder compositions of some embodiments of the invention, the weight % of alkali metal activator based upon the total weight of the cementitious materials (i.e., thermally activated aluminosilicate mineral, calcium sulfoaluminate cement, and calcium sulfate). | 1 to 6% by weight of the cementitious materials | 1.25% to 4% by weight of the cementitious materials | 1.5% to 2.5% by weight of the cementitious materials |

It has surprisingly been found that incorporation of calcium silicate based hydraulic cements such as Portland cement in the geopolymer compositions of some embodiments of the invention has a negative influence on the dimensional stability of the resulting material. Increase in Portland cement amount added to the geopolymer compositions of such embodiments increases the shrinkage of the resulting compositions. Increase in material shrinkage in the presence of Portland cement results even when calcium sulfoaluminate cement, calcium sulfate and alkali metal chemical activator are present in such embodiments. For example, it has been found incorporation of 15%, 33%, 52%, and 74% Portland cement on a dry basis, based upon the total weight of the solid cementitious material (as used herein, "cementitious materials" include the dry components of the mixture including the thermally activated aluminosilicate mineral, all cement materials, and calcium sulfate in the reactive powder compositions of some embodiments increased the 8-week material free shrinkage, measured after the material initial set, to about 0.15%, 0.23%, 0.31%, and 0.48%, respectively.

Thus, in embodiments where shrinkage in the above amounts is a concern, it is believed, without being bound by theory, that addition of Portland cement negatively influences the synergistic interaction between the basic four reactive powders (thermally activated aluminosilicate mineral calcium sulfoaluminate cement, calcium sulfate and alkali metal chemical activator). Hence, the geopolymer cementitious compositions of embodiments where the above amount of shrinkage is a concern preferably do not incorporate sufficient Portland cement to produce such undesired degree of shrinkage.

To form the binder composition, the Reactive Powder Component A (thermally activated aluminosilicate mineral, calcium sulfoaluminate cement, and calcium sulfate), Activator Component B (alkali metal chemical activator), and water are mixed to form a cementitious slurry at an initial temperature (temperature during the first minute the ingredients are first all present in the mixture) of about 0° C. to about 50° C., and preferably about 10 to about 35° C. As a result, geopolymerization reaction ensues, leading to formation of aluminosilicate geopolymer reaction species and setting and hardening of the resulting material. Simultaneously, hydration reactions of calcium sulfoaluminate and calcium silicate phases also occur leading to setting and hardening of the resulting material.

The dimensionally stable geopolymer compositions of some preferred embodiments of the invention have extremely low water demand to achieve a workable mixture in the fresh state and to produce a strong and durable material in the hardened state.

The preferable water/total solids weight ratio of the dimensionally stable geopolymer cementitious binders of some embodiments of the invention in the absence of coarse aggregate is about 0.04 to about 0.25, preferably about 0.04 to about 0.20, more preferably about 0.05 to about 0.175 and most preferably about 0.05 to about 0.15. The preferable water/total solids ratio of the dimensionally stable geopolymer binders of some embodiments of the invention in the presence of coarse aggregate is preferably less than about 0.125, more preferably less than about 0.10 and most preferably less than about 0.075. Total solids include cementitious materials, aggregate (such as sand or other aggregate), fillers and other solid additives on a water free basis.

A minimum amount of water is provided to accomplish the chemical hydration and alumino-silicate geopolymerization reactions in such embodiments. Preferably, in the slurry, the weight ratio of the water to powder cementitious materials about 0.17 to about 0.40, more preferably about 0.2 to about 0.35, even more preferably about 0.22 to 0.3. As used herein, "cementitious materials" is defined as the thermally activated aluminosilicate mineral, calcium sulfoaluminate cement, and calcium sulfate and any additional cement which may be added to the reactive mixture. The amount of water depends on the needs of the individual materials present in the cementitious composition.

Setting of the composition of such embodiments is characterized by initial and final set times, as measured using Gilmore needles specified in the ASTM C266 test procedure. The final set time also corresponds to the time when a concrete product, e.g., a concrete panel, has sufficiently hardened so that it can be handled.

In general, geopolymeric reactions of thermally activated aluminosilicate mineral such as fly ash are exothermic. It has been again unexpectedly found in some embodiments that fly ash, calcium sulfoaluminate cement, calcium sulfate, and alkali metal chemical activator synergistically interact with each other as part of the geopolymerization reaction to significantly reduce the rate and amount of heat released by the material undergoing exothermic reaction. Appropriate selection of the type of calcium sulfate and its amount, the amount of calcium sulfoaluminate cement, and appropriate selection of alkali metal chemical activator and its amount are effective in reducing and minimizing the rate and amount of heat released due to the ensuing exothermic reaction.

In general, geopolymeric reaction of thermally activated aluminosilicate mineral such as fly ash also proceeds at a rapid rate and leads to rapid gelation and setting of the material. Typically, when fly ash alone is reacted with an alkali metal chemical activator in accordance with the prior art, the gelation of the material starts within 2 to 3 minutes and the final set is reached in less than 10 minutes after the formation of an aqueous mixture.

In preferred embodiments of the invention, it has unexpectedly been found that thermally activated aluminosilicate mineral such as fly ash, calcium sulfoaluminate cement, calcium sulfate, and alkali metal chemical activator interact synergistically with each other as part of the geopolymerization reaction to significantly increase the gelation time and final setting time of the resulting material. Appropriate selection of the type of calcium sulfate and its amount, the amount of calcium sulfoaluminate cement, and appropriate selection of alkali metal chemical activator and its amount prolong the gelation rate and period and the final setting time of the resulting material.

For a given amount of alkali metal activator in such embodiments, increase in the calcium sulfate amount has been found to increase the gelation and final setting times of the resulting geopolymer cementitious binder compositions. Additionally, for a given amount of alkali metal activator in such embodiments, increase in the particle size of calcium sulfate has been found to increase the gelation and final setting times of the resulting geopolymer cementitious binder compositions. Furthermore, amongst different types of calcium sulfate in compositions of the invention, it has been found that calcium sulfate hemihydrate provides the highest increase in the gelation and final setting times of the resulting geopolymer cementitious compositions. For the geopolymer cementitious binders of some preferred embodiments, the gelation period is about 20 to about 60 minutes, with final setting times of about 30 to about 120 minutes. The gelation and final setting times are useful in practical field applications as they provide longer open and working times for the geopolymer cementitious binders of such embodiments.

As used herein, early age strength of the composition is characterized by measuring the compressive strength after 3 to 5 hours of curing. In many applications, relatively higher early age compressive strength can be an advantage for a cementitious material because it can withstand higher stresses without excessive deformation. Achieving high early strength also increases the factor of safety relating to handling and use of manufactured products. Further, due to the achievement of high early strength, many materials and structures can be opened to traffic and allowed to support non-structural and structural loads at an early age. Typically, chemical reactions providing strength development in such compositions will continue for extended periods after the final setting time has been reached.

The geopolymer cementitious binders of some embodiments of the invention are capable of developing extremely high early age and ultimate compressive strength. For example, the geopolymer cementitious binders of some such embodiments are capable of developing compressive strength after 1 to 4 hours of about 500 psi to about 4000 psi, about 1500 to about 5000 psi after 24 hours, and about 3,500 to about 10000 psi after 28 days.

In such embodiments, a dramatic increase in early age compressive strength results when the calcium sulfate amount is about 10% to about 50% by weight of calcium sulfoaluminate cement. The type of calcium sulfate has also been surprisingly found to have a significant influence on the development of early age compressive strength (≤24 hour) of the geopolymer cementitious compositions of some embodiments of the invention. It has been found that the highest increase in early age compressive strength results when anhydrous calcium sulfate (anhydrite) is employed.

In some embodiments, it has been found that a smaller particle size of calcium sulfate leads to a more rapid development in early age (≥24 hour) strength. When it is desirable to have an extremely rapid rate of strength development, the preferred average particle size of calcium sulfate ranges from about 1 to about 30 microns, more preferably from about 1 to about 20 microns, and most preferably from about 1 to about 10 microns.

Cementitious Reactive Mixture

The cementitious reactive mixture of some preferred embodiments of the present invention comprises Reactive Powder Component A and Activator Component B with preferable ranges as shown in TABLE A. The Reactive Powder Component A comprises thermally activated aluminosilicate mineral, calcium sulfoaluminate cement, and calcium sulfate. The Activator Component B comprises alkali metal chemical activator.

Preferably, the cementitious reactive mixture contains about 10 to about 40 wt. % lime. However, this lime does not have to be separately added lime. Rather it is sometimes included as a chemical component of the thermally activated aluminosilicate mineral.

In addition to the thermally activated aluminosilicate mineral, calcium sulfoaluminate cement, and calcium sulfate, the cementitious reactive powder may include about 0 to about 5 wt. % of optional cementitious additives such as Portland cement. However, preferably there is an absence of Portland cement as its incorporation increases the material shrinkage making the material less dimensionally stable.

Class C Fly Ash and Other Thermally Activated Aluminosilicate Mineral

The thermally activated aluminosilicate minerals are in some embodiments selected from a group consisting of fly ash, blast furnace slag, thermally activated clays, shales, metakaolin, zeolites, marl red mud, ground rock, and ground clay bricks. Preferably, they have $Al_2O_3$ content greater than about 5% by weight. Typically clay or marl is used after thermal activation by heat treatment at temperatures of from about 600° to about 850° C. The preferred thermally activated aluminosilicate minerals of such embodiments of the invention have high lime (CaO) content in the composition, preferably greater than about 10 wt %, more preferably greater than about 15%, and most preferably greater than about 20%. The most preferred thermally activated aluminosilicate mineral is Class C fly ash, for example, fly ash procured from coal-fired power plants. The fly ash also possesses pozzolanic properties.

ASTM C618 (2008) defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties."

Fly ash is the preferred thermally activated aluminosilicate mineral in the cementitious reactive powder blend of some embodiments of the invention. Fly ashes containing high calcium oxide and calcium aluminate content (such as Class C fly ashes of ASTM C618 (2008) standard are preferred as explained below.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 (2008) standard recognizes two major classes of fly ashes for use in concrete—Class C and Class F. These two classes of fly ashes are generally derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal.

The ASTM C618 (2008) standard differentiates Class F and Class C fly ashes primarily according to their pozzolanic properties. Accordingly, in the ASTM C618 (2008) standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 (2008) standard, Class C fly ashes preferably have high calcium oxide (lime) content.

Class C fly ash usually has cementitious properties in addition to pozzolanic properties due to free lime (calcium oxide). Class F is rarely cementitious when mixed with water alone. Presence of high calcium oxide content provides Class C fly ashes with cementitious properties leading to the formation of calcium silicate and calcium aluminate hydrates when mixed with water. As will be seen in the examples below, Class C fly ash has been found to provide superior results in preferred embodiments of the invention.

In such embodiments, the thermally activated aluminosilicate mineral comprises Class C fly ash, preferably about 50 to about 100 parts Class C fly ash per 100 parts by weight thermally activated aluminosilicate mineral, more preferably the thermally activated aluminosilicate mineral comprises about 75 parts to about 100 parts Class C fly ash per 100 parts thermally activated aluminosilicate mineral.

Other types of fly ash, such as Class F fly ash, may also be employed in those or other preferred embodiments. Preferably, at least about 50 wt. % of the thermally activated aluminosilicate mineral in the cementitious reactive powder is Class C fly ash with the remainder Class F fly ash or any other thermally activated aluminosilicate mineral. More preferably, about 55 to about 75 wt. % of the thermally activated aluminosilicate mineral in the cementitious reactive powder is Class C fly ash with the remainder Class F or any other thermally activated aluminosilicate mineral. Preferably the thermally activated aluminosilicate mineral is about 90 to about 100% Class C fly ash, for example 100% Class C Fly ash.

The average particle size of the thermally activated alumino-silicate minerals of some embodiments of the present invention is preferably less than about 100 microns, more preferably less than about 50 microns, even more preferably less than about 25 microns, and most preferably less than about 15 microns.

Preferably the binder mixture of the present invention has at most about 5 parts metakaolin per 100 parts thermally activated aluminosilicate mineral. More preferably, the binder of the present invention does not include significant amounts of metakaolin. The presence of metakaolin has been found to increase the water demand of some mixtures hence its use is not desirable in the geopolymer binder compositions of some preferred embodiments of the invention.

Minerals often found in fly ash are quartz ($SiO_2$), mullite ($Al_2Si_2O_{13}$), gehlenite ($Ca_2Al_2SiO_7$), haematite ($Fe_2O_3$), magnetite ($Fe_3O_4$), among others. In addition, aluminum silicate polymorphs minerals commonly found in rocks such as sillimanite, kyanite and andalusite, all three represented by molecular formula of $Al_2SiO_5$, also are often found in fly ash.

Fly ash can also include calcium sulfate or another source of sulfate ions which will be in the mixture composition of some embodiments of the invention.

In some preferred embodiments, the fineness of the fly ash is preferably such that less than about 34% is retained on a 325 mesh sieve (U.S. Series) as tested on ASTM Test Procedure C-311 (2011) ("Sampling and Testing Procedures for Fly Ash as Mineral Admixture for Portland Cement Concrete"). The average particle size of the fly ash materials useful in such embodiments is preferably less than about 50 microns, more preferably less than about 35 microns, even more preferably less than about 25 microns, and most preferably less that about 15 microns. This fly ash is preferably recovered and used dry because of its self-setting nature.

Class C fly ash made from sub-bituminous coal has the following representative composition listed in TABLE E. This fly ash is preferably recovered and used dry because of its self-setting nature.

TABLE E

An example of suitable Class C fly ash

| Component | Proportion (wt. %) |
| --- | --- |
| $SiO_2$ | 20-45 |
| $Al_2O_2$ | 10-30 |
| $Fe_2O_3$ | 3-15 |
| MgO | 0.5-8 |
| $SO_3$ | 0.5-5 |
| CaO | 15-60 |
| $K_2O$ | 0.1-4 |
| $Na_2O$ | 0.5-6 |
| Loss on Ignition | 0-5 |

A preferable suitable Class F fly ash has the following composition listed in TABLE F.

TABLE F

Preferable suitable Class F fly ash

| Component | Proportion (wt. %) |
| --- | --- |
| $SiO_2$ | 50-70 |
| $Al_2O_2$ | 10-40 |
| $Fe_2O_3$ | 1-10 |
| MgO | 0.5-3 |
| $SO_3$ | 0-4 |
| CaO | 0-10 |
| $K_2O$ | 0.1-4 |
| $Na_2O$ | 0.1-6 |
| Loss on Ignition | 0-5 |

Hydraulic Cements

Hydraulic cements for purposes of this invention is a cement that undergoes a chemical setting reaction when it comes in contact with water (hydration) and which will not only set (cure) under water but also forms a water-resistant product.

Hydraulic cements include, but are not limited to, aluminum silicate cements like Portland Cement, calcium sulfoaluminate cement, calcium aluminate based cement and calcium fluoroaluminate cements.

Calcium Sulfoaluminate (CSA) Cements

Calcium sulfoaluminate cement forms an ingredient of the geopolymer binder compositions of some embodiments of the present invention. Calcium sulfoaluminate (CSA) cements are a different class of cements from calcium aluminate cement (CAC) or calcium silicate based hydraulic cements, for example, Portland cement. CSA cements are hydraulic cements based on calcium sulfoaluminate, rather than calcium aluminates which are the basis of CAC cement or calcium silicates which are the basis of Portland cement. Calcium sulfoaluminate cements are made from clinkers that include Ye'elimite ($Ca_4(AlO_2)_6SO_4$ or $C_4A_3\check{S}$) as a primary phase.

Other major phases present in the preferred calcium sulfoaluminate cement may include one or more of the following: dicalcium silicate ($C_2S$), tetracalcium aluminoferrite ($C_4AF$), and calcium sulfate ($C\check{S}$). The relatively low lime requirement of calcium sulfoaluminate cements compared to Portland cement reduces energy consumption and emission of green house gases from cement production. In fact, calcium sulfoaluminate cements can be manufactured at temperatures approximately 200° C. lower than Portland cement, thus further reducing energy and green house gas emissions. The amount of Ye'elimite phase ($Ca_4(AlO_2)_6SO_4$ or $C_4A_3\check{S}$) present in the calcium sulfoaluminate cements useful in some embodiments of this invention is preferably about 20 to about 90 wt %, more preferably about 30 to about 75 wt %, and most preferably about 40 to about 60 wt %.

Preferable compositions of the present invention comprise about 1 to about 200 parts, more preferably about 2.5 to about 100 parts, even more preferably about 2.5 to about 50 parts, and still more preferably about 5 to about 30 parts by weight calcium sulfoaluminate cement, pbw per 100 pbw of thermally activated aluminosilicate mineral.

The amount of calcium sulfoaluminate cement used in the compositions of some embodiments of the invention is adjustable based on the amount of active Ye'elimite phase ($Ca_4(AlO_2)_6SO_4$ or $C_4A_3\check{S}$) present in the CSA cement.

Portland Cement

The dimensionally stable geopolymer compositions of some embodiments of the present invention comprising aluminosilicate mineral, alkali metal chemical activator, calcium sulfoaluminate cement and calcium sulfate that demonstrate extremely low magnitudes of material shrinkage. It would then be logical and natural to expect that if another binder material with good dimensional stability were additionally incorporated into the inventive mixture, the overall material shrinkage and dimensional stability of the resulting composition would still remain low and acceptable. For example, the shrinkage of pure Portland cement based cementitious compositions has been determined to be almost an order of magnitude lower than the shrinkage of geopolymer binders composed of fly ash activated with an alkali metal citrate. However, very surprisingly, it has been discovered that addition of Portland cement to the dimensionally stable compositions of the present invention comprising aluminosilicate mineral, alkali metal chemical activator, calcium sulfoaluminate cement and calcium sulfate has a negative influence on the shrinkage behavior of resulting compositions. It has been found that addition of Portland cement to the geopolymer compositions of the present invention increases the shrinkage of the resulting compositions. The magnitude of observed shrinkage increases with increase in the amount of Portland cement in the resulting compositions. This result is highly unexpected and surprising and it underscores the extremely complex nature of chemical interactions that occur when other types of cements and/or chemical additives are introduced to the dimensionally stable geopolymer binder compositions of the present invention. Based on this understanding, no Portland cement is incorporated in some preferred embodiments of the invention. However, it is contemplated that some amount of Portland cement be used in some embodiments when desired in situations where some increase in shrinkage behavior may be acceptable. The practical limit of amount of Portland cement will depend on the amount of adverse effect on shrinkage behavior that may be acceptable, but in some preferred embodiments of the invention, no more than 15 parts by weight of Portland cement per 100 parts by weight of the thermally activated aluminosilicate mineral is included.

The low cost and widespread availability of the limestone, shales, and other naturally occurring materials make Portland cement one of the lowest-cost materials widely used over the last century throughout the world.

As used herein, "Portland cement" is a calcium silicate based hydraulic cement. ASTM C 150 defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an inter ground addition." As used herein, "clinkers" are nodules (diameters, about 0.2 to about 1.0 inch [5-25 mm]) of a sintered material that are produced when a raw mixture of predetermined composition is heated to high temperature.

Calcium Aluminate Cement

Calcium aluminate cement (CAC) is another type of hydraulic cement that may form a component of the reactive powder blend of some embodiments of the invention when particularly higher compressive strength is not required with low water content slurries containing substantial amounts of fly ash.

Calcium aluminate cement (CAC) is also commonly referred to as aluminous cement or high alumina cement. Calcium aluminate cements have a high alumina content, about 30-45 wt % is preferable. Higher purity calcium aluminate cements are also commercially available in which the alumina content can range as high as about 80 wt %. These higher purity calcium aluminate cements tend to be very expensive relative to other cements. The calcium aluminate cements used in the compositions of some embodiments of the invention are finely ground to facilitate entry of the aluminates into the aqueous phase so that rapid formation of ettringite and other calcium aluminate hydrates can take place. The surface area of the calcium aluminate cement that useful in such embodiments will be greater than about 3,000 $cm^2$/gram and preferably about 4,000 to about 6,000 $cm^2$/gram as measured by the Blaine surface area method (ASTM C 204).

Several manufacturing methods have emerged to produce calcium aluminate cement worldwide. Preferably, the main raw materials used in the manufacturing of calcium aluminate cement are bauxite and limestone. One manufacturing method for producing calcium aluminate cement is described as follows. The bauxite ore is first crushed and dried, then ground along with limestone. The dry powder comprising of bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock-pile. This granulate is then ground to the desired fineness to produce the final cement.

Typically, several calcium aluminate compounds may be formed during the manufacturing process of calcium aluminate cement. The predominant compound formed often is monocalcium aluminate ($CaO.Al_2O_3$, also referred to as CA). The other calcium aluminate and calcium silicate compounds that are formed can include $12CaO.7Al_2O_3$ also referred to as $C_{12}A_7$, $CaO.2Al_2O_3$ also referred as $CA_2$, dicalcium silicate ($2CaO.SiO_2$, called $C_2S$), dicalcium alumina silicate ($2CaO.Al_2O_3.SiO_2$, called $C_2AS$). Several other compounds containing relatively high proportion of iron oxides also can be formed. These include calcium ferrites such as $CaO.Fe_2O_3$ or CF and $2CaO.Fe_2O_3$ or $C_2F$, and calcium alumino-ferrites such as tetracalcium alumino-ferrite ($4CaO.Al_2O_3.Fe_2O_3$ or $C_4AF$), $6CaO.Al_2O_3.2Fe_2O_3$ or $C_6AF_2$) and $6CaO.2Al_2O_3.Fe_2O_3$ or $C_6A_2F$). Other minor constituents often present in the calcium aluminate cement include magnesia (MgO), titanic ($TiO_2$), sulfates and alkalis.

The calcium aluminate cements can have one or more of the aforementioned phases. Calcium aluminate cements having monocalcium aluminate ($CaO.Al_2O_3$ or CA) and/or dodeca calcium hepta aluminate ($12CaO.7Al_2O_3$ or $C_{12}A_7$) as predominant phases are particularly preferred in some embodiments of the present invention. Further, the calcium aluminate phases can be available in crystalline form and/or amorphous form. Ciment Fondu (or HAC Fondu), Secar 51, and Secar 71 are some examples of commercially available calcium aluminate cements that have the monocalcium aluminate (CA) as the primary cement phase. Ternal EV is an example of commercially available calcium aluminate cement that has the dodeca calcium hepta aluminate ($12CaO.7Al_2O_3$ or $C_{12}A_7$) as the predominant cement phase.

When calcium aluminate (CAC) cements are used in the present invention, they may partially substitute calcium sulfoaluminate cement. The amount of calcium aluminate cement substitution in the composition of some embodiments of the invention is up to about 49 wt % of the aggregated weight of calcium sulfoaluminate cement and calcium aluminate cement.

Calcium Fluoroaluminate

Calcium fluoroaluminate has the chemical formula $3CaO.3Al_2O_3.CaF_2$. Generally, calcium fluoroaluminate is produced by mixing lime, bauxite and fluorspar in such an amount that the mineral of the resulting product becomes $3CaO.3Al_2 O_3.CaF_2$ and burning the resulting mixture at a temperature of 1,200°-1,400° C. Calcium fluoroalumniate cements may optionally be used in the present invention but generally are not preferred in many embodiments.

Calcium Sulfate

Calcium sulfate forms an ingredient of the geopolymer binder compositions of certain embodiments of the present invention. Although calcium sulfate e.g. calcium sulfate dihydrate will react with water, it does not form a water resistant product and it is not considered to be hydraulic cement for purposes of this invention. Preferred calcium sulfate types that are useful in the present invention include calcium sulfate dihydrate, calcium sulfate hemihydrate and anhydrous calcium sulfate (sometimes called calcium sulfate anhydrite). These calcium sulfates can be from naturally available sources or produced industrially. When employed as discussed herein, calcium sulfates can synergistically interact with the other fundamental components of the cementitious compositions of preferred embodiments of the invention and thereby help to minimize material shrinkage while imparting other useful properties to the final material.

Different morphological forms of calcium sulfate can be usefully employed in various embodiments of the present invention. The properties of the geopolymer binders and composites of such embodiments of the invention have been found to depend significantly on the type of calcium sulfate used based on its chemical composition, particle size, crystal morphology, and chemical and thermal treatment. Among other properties, the setting behavior, rate of strength development, ultimate compressive strength, shrinkage behavior, and cracking resistance of the geopolymer binders of such embodiments can be tailored by selecting an appropriate source of calcium sulfate in the formulation. Thus, the selection of the type of calcium sulfate used in the compositions of those embodiments is based on the balance of properties sought in the end application.

While all three forms of calcium sulfate (primarily hemihydrate, dihydrate and anhydrite) are useful in the four-reactive-component mixtures of some embodiments of the invention to afford the benefits of longer setting times and higher compressive strengths than Comparative Examples 1-4 below containing only two or three of the reactive components, the three different calcium sulfate forms have been found to have different and surprising effects relative to each other on setting times and compressive strengths in various embodiments of the invention.

It is well known that the most soluble chemical form of calcium sulfate is the hemihydrate, followed by the relatively lower solubility form of the dihydrate, and then followed by the relatively insoluble form of the anhydrite. All three forms are themselves known to set (form matrices of the dihydrate chemical form) in aqueous media under appropriate conditions, and the setting times and compressive strengths of the set forms are known to follow their order of solubility. For example, all other things being equal, employed alone as the sole setting material, the hemihydrate usually has the shortest set times and the anhydrite the longest set times (typically very long set times).

Quite surprisingly, it has been found that embodiments employing predominately or all calcium sulfate hemihydrate have the longest set times, while those employing predominately or all calcium sulfate anhydrite have the shortest set times. Similarly surprisingly, various embodiments employing predominately or all anhydrous calcium sulfate (anhydrite) have greater early compressive strength, than embodiments employing primarily dihydrate form.

In the geopolymer compositions of other embodiments, a blend of two or more types of calcium sulfate also may be employed to modify the set times and early compressive strength properties of the composition relative to those embodiments using predominately or all of single type of calcium sulfate. When such a blend is used, the types of calcium sulfate utilized may vary depending upon their chemical composition, particle size, crystal shape and morphology, and/or surface treatment.

Particle size and morphology of calcium sulfate used have been found to significantly influence the development of early age and ultimate strengths of the geopolymer cementitious binder compositions of some embodiments of the invention. In general, a smaller particle size of calcium sulfate has been found to provide a more rapid development in early age strength. When it is desirable to have an extremely rapid rate of strength development, the preferred average particle size of calcium sulfate ranges from about 1 to about 100 microns, more preferably from about 1 to about 50 microns, and most preferably from about 1 to about 20 microns. Furthermore, calcium sulfates with finer particle size have also been found to reduce material shrinkage.

It has further been found that for a given amount of calcium sulfoaluminate cement and other raw material components present, an increase (but not excessive increase) in the amount of calcium sulfate leads to increase in the early age compressive strength of the geopolymer binders of some embodiments of the present invention. The most dramatic increase in the early age compressive strength results when the calcium sulfate amount is about 10 to about 50% by weight of calcium sulfoaluminate cement.

It has also been unexpectedly found the amount of calcium sulfate present in proportion to calcium sulfoaluminate cement in the mixture has a significant influence on the degree of material shrinkage of geopolymer compositions of some embodiments of the invention. Preferably, those embodiments have a calcium sulfate amount of about 5 to about 200 parts by weight relative to 100 parts by weight of calcium sulfoaluminate cement. For most effective control on material shrinkage of the geopolymer compositions in such embodiments, the amount of calcium sulfate is about 10 to about 100 parts by weight relative to 100 parts by weight of calcium sulfoaluminate cement, more preferably about 15 to about 75 parts by weight relative to 100 parts by weight of calcium sulfoaluminate cement, and most preferably about 20 to about 50 parts by weight relative to 100 parts by weight of calcium sulfoaluminate cement.

For given amounts of alkali metal activator and other raw material components in the composition of some embodiments of the invention, usage of calcium sulfate dihydrate has been found to provide the most effective control in minimizing the material shrinkage. Usage of anhydrous calcium sulfate (anhydrite) and calcium sulfate hemihydrate also provide excellent control in lowering the material shrinkage of the geopolymer cementitious binder compositions of such embodiments.

The selection of the type or types of calcium sulfate employed in the compositions of such embodiments is based on the desired rate of early age strength development, shrinkage control, and balance of other properties sought in the end application.

A part or the entire amount of calcium sulfate can be added as an additive component of the calcium sulfoaluminate cement in the compositions of many such embodiments. When this is the case, the amount of calcium sulfate added separately in the composition is reduced by an equivalent amount included in the calcium sulfoaluminate cement.

Calcium sulfate may also be included in the fly ash in some embodiments of the composition. When such is the case, the amount of calcium sulfate added separately in the composition may be reduced.

The amount of calcium sulfate added separately to the compositions of some embodiments of the invention may be adjusted based on the availability of the sulfate ions contributed by other ingredients present in the mixture.

Pozzolans

Other optional silicate and aluminosilicate minerals which are pozzolans possessing substantial, little or no cementing properties on their own in an aqueous media can be included as optional mineral additives in the compositions of some embodiments of the invention. Various natural and man-made materials have been referred to as pozzolanic materials possessing pozzolanic properties. Some examples of pozzolanic materials include silica fume, pumice, perlite, diatomaceous earth, finely ground clay, finely ground shale, finely ground slate, finely ground glass, volcanic tuff, trass, and rice husk. All of these pozzolanic materials can be used either singly or in combined form as part of the cementitious reactive powder of some embodiments of the invention.

Fillers-Aggregates, Inorganic Mineral Fillers and Lightweight Fillers

While the disclosed cementitious reactive powder blend defines the rapid setting component of the cementitious composition of many embodiments of the invention, it will be understood by those skilled in the art that other materials may be included in the composition depending on its intended use and application.

One or more fillers such as sand, fine aggregate, coarse aggregate, inorganic mineral fillers, lightweight fillers may be used as a component in the geopolymeric formulations of some embodiments of the invention. In such embodiments, these fillers preferably are not pozzolans or thermally activated aluminosilicate minerals.

Preferable inorganic mineral fillers in such embodiments are dolomite, limestone, calcium carbonate, ground clay, shale, slate, mica and talc. Generally, such fillers they have a fine particle size with preferable average particle diameter of less than about 100 microns, preferably less than about 50 microns, and more preferably less than about 25 microns in the compositions of some embodiments of the invention. Smectite clays and palygorskite and their mixtures are not considered suitable inorganic mineral fillers when used in substantial quantities for the purposes this invention.

As used herein, fine aggregate or sand is defined as an inorganic rock material typically with an average particle size of less than about 4.75 mm (0.195 inches) (although other sizes may be used depending on the application). Preferable sand in the invention has a mean particle size of about 0.1 mm to about 2 mm. Fine sand with a mean particle size of about 1 mm or less is preferred filler in some embodiments of the invention.

Sands having a maximum particle diameter of about 0.6 mm, preferably at most about 0.425 mm, a mean particle diameter within a range of about 0.1 to about 0.5 mm, preferably about 0.1 mm to about 0.3 mm are used in other embodiments of the invention. Examples of preferable fine sand include QUIKRETE FINE No. 1961 and UNIMIN 5030 having a predominant size range of US sieve number #70-#30 (0.2-0.6 mm).

The particle size distribution and amount of sand in the formulation assists in controlling the rheological behavior of the embodiments incorporating sands. Fine sand may be added in the geopolymeric cementitious compositions of some embodiments at sand/cementitious materials (reactive powder) ratio of about 0.05 to about 4. When it is desired to achieve self-leveling material rheology, the most desirable sand to cementitious materials ratio in the formulation is in the range of about 0.50 to about 2, most preferably about 0.75 to about 1.5.

Coarse aggregate is defined as an inorganic rock material with an average particle size at least about 4.75 mm (0.195 inches), for example about ¼' inch to about 1½ inch (0.64 to 3.81 cm) (although other sizes may be used depending on the specific application). Aggregate with size larger than about 1½ inch (3.81 cm) may also be used in some applications, for example, concrete pavement. The particle shape and texture of the coarse aggregate can have a variety of configurations, such as angular, rough-textured, elongated, rounded or smooth or a combination of these.

Preferable coarse aggregates are made of minerals such as granite, basalt, quartz, riolite, andesite, tuff, pumice, limestone, dolomite, sandstone, marble, chert, flint, greywacke, slate, and/or gnessis. Coarse aggregate useful in some embodiments of this invention preferably meet the specifications set out in ASTM C33 (2011) and AASHTO M6/M80 (2008) standards.

When coarse aggregates are included in the geopolymeric cementitious compositions of some embodiments of the invention, they are preferably employed at an aggregate to cementitious materials (reactive powder) ratio of about 0.25 to about 5. Some embodiments of the invention contain coarse aggregate with coarse aggregate to cementitious materials ratio of about 0.25 to about 1. Some other embodiments of the invention contain coarse aggregate with coarse aggregate to cementitious materials ratio of about 1 to about 3.

Lightweight fillers have a specific gravity of less than about 1.5, preferably less than about 1, more preferably less than about 0.75, and most preferably less than about 0.5. In some other preferred embodiments of the invention the specific gravity of lightweight fillers is less than about 0.3, more preferably less than about 0.2 and most preferably less than about 0.1. In contrast, inorganic mineral fillers preferably have a specific gravity above about 2.0. Examples of useful lightweight fillers are pumice, vermiculite, expanded forms of clay, shale, slate and perlite, scoria, expanded slag, cinders, glass microspheres, synthetic ceramic microspheres, hollow ceramic microspheres, lightweight polystyrene beads, plastic hollow microspheres, expanded plastic beads, and the like. Expanded plastic beads and hollow plastic spheres when used in the composition of some embodiments of the invention are employed in appropriate quantities on a weight basis in view of their relatively low specific gravity and the specific application.

When lightweight fillers are utilized to reduce the weight of some embodiments of the invention, they may be employed, for example, as a filler to cementitious materials (reactive powder) ratio of about 0.01 to about 2, preferably about 0.01 to about 1. A combination of two or more types of lightweight fillers also may be useful in such embodiments of the invention.

While some embodiments of the invention contain only sand as the added filler, other embodiments contain sand and inorganic mineral fillers and/or lightweight filler. Other embodiments may utilize inorganic mineral filler and lightweight fillers as the added fillers. Yet, other embodiments incorporate sand, inorganic mineral filler and lightweight filler as added fillers. Still other embodiments contain only inorganic mineral fillers or lightweight fillers and no sand, fine aggregate or coarse aggregate. Embodiments of the invention containing coarse aggregate, in addition, can include or exclude one of more of the following fillers—sand, lightweight filler, and inorganic mineral filler. Yet other embodiments are substantially free of any added fillers.

Alkali Metal Chemical Activators.

Alkali metal salts and bases are useful as chemical activators to activate the Reactive Powder Component A comprising thermally activated aluminosilicate mineral such as fly ash, calcium sulfoaluminate cement and calcium sulfate. The alkali metal activators used in some embodiments of this invention can be added in liquid or solid form. The preferred alkali metal chemical activators of such embodiments of this invention are metal salts of organic acids. The more preferred alkali metal chemical activators are alkali metal salts of carboxylic acids. Alkali metal hydroxides and alkali metal silicates are some other examples of alkali metal chemical activator useful in some embodiments of this invention. Alternatively, alkali metal hydroxides and alkali metal silicates can also be useful in combination with carboxylic acids such as citric acid to provide chemical activation of reactive powder blend comprising thermally activated aluminosilicate mineral, calcium sulfoaluminate cement and calcium sulfate.

In some embodiments of the present invention, employing alkali metal salts of citric acid such as sodium or potassium citrate in combination with reactive powder blend comprising thermally activated aluminosilicate mineral, calcium sulfoaluminate cement, and calcium sulfate, provides mixture compositions with relatively good fluidity and which do not stiffen too quickly, after mixing the raw materials at or around ambient temperatures (about 20-25° C.).

The amount of alkali metal salt of citric acid, e.g. potassium citrate or sodium citrates, is about 0.5 to about 10 wt. %, preferably about 1 to about 6 wt. %, preferably about 1.25 to about 4 wt. %, more preferably about 1.5 to about 2.5 wt. % and most preferably about 2 wt % based on 100 parts of the cementitious reactive components (i.e., Reactive Powder Component A) of some embodiments of the invention. Thus, for example, for 100 pounds of cementitious reactive powder, there may be about 1.25 to about 4 total pounds of potassium and/or sodium citrates. The preferred alkali metal citrates are potassium citrates and sodium citrates and particularly tri-potassium citrate monohydrate, and tri-sodium citrate anhydrous, tri-sodium citrate monohydrate, sodium citrate dibasic sesquihydrate, tri-sodium citrate dihydrate, di-sodium citrate, and mono-sodium citrate.

Preferably the set activator does not contain an alkanolamine. Also, preferably the activator does not contain a phosphate.

Set Retarders

Organic compounds such as hydroxylated carboxylic acids, carbohydrates, sugars, and starches are the preferred retarders of some embodiments of the present invention. Organic acids such as citric acid, tartaric acid, malic acid, gluconic acid, succinic acid, glycolic acid, malonic acid, butyric acid, malic acid, fumaric acid, formic acid, glutamic acid, pentanoic acid, glutaric acid, gluconic acid, tartronic acid, mucic acid, tridydroxy benzoic acid, etc. are useful as set retarders in the dimensionally stable geopolymer cementitious binder compositions of some preferred embodiments.

Sodium gluconate also is useful as organic set retarder in some embodiments of the present invention. Cellulose based organic polymers such as hydroxyethyl-cellulose (HEC), hydroxypropyl-cellulose (HPC), hydroxypropylmethyl-cellulose (HPMC), ethyl-cellulose (EC), methylethyl-cellulose (MEC), carboxymethyl-cellulose (CMC), carboxymethylethyl-cellulose (CMEC), carboxymethylhydroxyethyl-cellulose (CMHEC) are additional useful retarders in some of the compositions of the present invention.

These cellulose based retarders when added to the composition of some embodiments of the invention significantly increase the viscosity of the mix in addition to causing retardation. Preferably, inorganic acid based retarders such as borates or boric acid are not employed in significant amounts in some preferred embodiments of the invention because they hinder mix rheology, cause excessive efflorescence, and reduce material bond strength to other substrates.

Other Optional Set-Control Agents

Other optional set control chemical additives include a sodium carbonate, potassium carbonate, calcium nitrate, calcium nitrite, calcium formate, calcium acetate, calcium chloride, lithium carbonate, lithium nitrate, lithium nitrite, aluminum sulfate, sodium aluminate, alkanolamines, polyphosphates, and the like. These additives when included as a part of the formulation may also influence rheology of the geopolymer binder compositions of some embodiments of the invention in addition to affecting their setting behavior.

Optional Materials, Fibers, and Scrims

Other optional materials and additives may be included in geopolymer binder compositions of some embodiments of the invention. These include at least one member selected from the group consisting of film-forming redispersible polymer powders, film-forming polymer latex dispersions, defoaming and antifoaming agents, water retaining additives, set control agents, shrinkage reducing admixtures, foaming and air entraining agents, organic and inorganic rheology control agents, viscosity modifying agents (thickeners), efflorescence control (suppression) agents, corrosion control agents, wetting agents, colorants and/or pigments, discrete fibers, long and continuous fibers and reinforcement, textile reinforcement, polyvinyl alcohol fibers, and/or glass fibers and or other discrete reinforcing fibers.

Discrete reinforcing fibers of different types may be incorporated in the cementitious board compositions made pursuant to certain embodiments of the invention. Scrims made of materials such as polymer-coated glass fibers and polymeric materials such as polypropylene, polyethylene and nylon are examples of materials that can be used to reinforce the cement-based product depending upon its function and application.

Preferably the geopolymer binders of many preferred embodiments of the invention do not contain significant amounts of cement kiln dust. Cement kiln dust (CKD) can be created in the kiln during the production of cement clinker. The dust is a particulate mixture of partially calcined and unreacted raw feed, clinker dust and ash, enriched with alkali sulfates, halides and other volatiles. These particulates are captured by the exhaust gases and collected in particulate matter control devices such as cyclones, baghouses and electrostatic precipitators.

CKD consists primarily of calcium carbonate and silicon dioxide which is similar to the cement kiln raw feed, but the amount of alkalies, chloride and sulfate is usually considerably higher in the dust. CKD from three different types of operations: long-wet, long-dry, and alkali by-pass with precalciner have various chemical and physical traits. CKD generated from long-wet and long-dry kilns is composed of partially calcined kiln feed fines enriched with alkali sulfates and chlorides. The dust collected from the alkali by-pass of precalciner kilns tend to be coarser, more calcined, and also concentrated with alkali volatiles. However, the alkali by-pass process contains the highest amount by weight of calcium oxide and lowest loss on ignition (LOI). Table from Adaska et al., *Beneficial Uses of Cement Kiln Dust*, presented at 2008 IEEE/PCA 50th Cement Industry Technical Conf., Miami, Fla., May 19-22, 2008, provides the composition breakdown for the three different types of operation and includes a preferable chemical composition for Type I Portland cement for comparison.

TABLE G

Examples of Compositions of CKD from Different Operation Sources

| Constituent | Long-wet kiln (% by weight) | Long-dry kiln (% by weight) | Alkali by-pass from preheater/ precalciner (% by weight) | Typical Type I Portland cement (% by weight) |
|---|---|---|---|---|
| SiO2 | 15.02 | 9.64 | 15.23 | 20.5 |
| AL2O3 | 3.85 | 3.39 | 3.07 | 5.4 |
| Fe2O3 | 1.88 | 1.10 | 2.00 | 2.6 |
| CaO | 41.01 | 44.91 | 61.28 | 63.9 |
| MgO | 1.47 | 1.29 | 2.13 | 2.1 |
| SO3 | 6.27 | 6.74 | 8.67 | 3.0 |
| K2O | 2.57 | 2.40 | 2.51 | <1 |
| Loss on Ignition (LOI) | 25.78 | 30.24 | 4.48 | 0-3 |
| Free lime (CaO) | 0.85 | 0.52 | 27.18 | <2 |

Superplasticizers and Air Entraining Agents

Water reducing agents (superplasticizers), are preferably used in the compositions of some embodiments of the invention. They may be added in the dry form or in the form of a solution. Superplasticizers can help to reduce water demand of the mixture. Examples of superplasticizers include polynapthalene sulfonates, polyacrylates, polycarboxylates, polyether polycarboxylates, lignosulfonates, melamine sulfonates, caesins, and the like. Depending upon the type of superplasticizer used, the weight ratio of the superplasticizer (on dry powder basis) to the reactive powder blend preferably will be about 5 wt % or less, preferably about 2 wt. % or less, preferably about 0.1 to about 1 wt. %.

Superplasticizers based on polycarboxylate polyether chemistry are the most preferred water reducing chemical admixture for some embodiments of the invention. Polycarboxylate polyether superplasticizers are the most preferred since they facilitate accomplishment of the various objectives of this invention as mentioned earlier.

Air entraining agents are added to the cementitious slurry of some embodiments of the invention to form air bubbles (foam) in situ. Air entraining agents are preferably surfactants used to purposely trap microscopic air bubbles in the concrete. Alternatively, air entraining agents are employed to externally produce foam which is introduced into the mixtures of the compositions of some embodiments during the mixing operation to reduce the density of the product. Preferably to externally produce foam the air entraining agent (also known as a liquid foaming agent), air and water are mixed to form foam in a suitable foam generating apparatus. A foam stabilizing agent such as polyvinyl alcohol can be added to the foam before the foam is added to the cementitious slurry.

Examples of air entraining/foaming agents include alkyl sulfonates, alkylbenzolfulfonates and alkyl ether sulfate oligomers among others. Details of the general formula for these foaming agents can be found in U.S. Pat. No. 5,643,510 incorporated herein by reference.

An air entraining agent (foaming agent) such as that conforming to standards as set forth in ASTM C 260 "Standard Specification for Air-Entraining Admixtures for Concrete" (Aug. 1, 2006) can be employed. Such air entraining agents are well known to those skilled in the art and are described in the Kosmatka et al "Design and Control of Concrete Mixtures," Fourteenth Edition, Portland Cement Association, specifically Chapter 8 entitled, "Air Entrained Concrete," (cited in US Patent Application Publication No. 2007/0079733 A1).

Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents, sodium abietate, saturated or unsaturated fatty acids and salts thereof, tensides, alkyl-arylsulfonates, phenol ethoxylates, lignosulfonates, resin soaps, sodium hydroxystearate, lauryl sulfate, ABSs (alkylbenzenesulfonates), LASs (linear alkylbenzenesulfonates), alkanesulfonates, polyoxyethylene alkyl(phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof.

Preferably the air entraining (foaming) agent is about 0.01 to about 1 wt. % of the weight of the overall cementitious composition.

Bio-Polymers and Organic Rheology Control Agents

Succinoglycans, diutan gum, guar gum, wellan gum, xanthan gums and cellulose ether based organic compounds, are bio-polymers that act as hydrocolloids and rheology control agents in some embodiments of the invention. Synthetic organic polymers such as polyacryl amides, alkali-swellable acrylic polymers, associative acrylic polymers, acrylic/acrylamid copolymers, hydrophobically modified alkali-swellable polymers, highly water-swellable organic polymers can be usefully employed as rheology control agents and thickeners in the geopolymer binder compositions of such embodiments.

Both associative and non-associative types of rheology control agents and thickeners can be usefully employed in the geopolymer binder compositions of such embodiments. Examples of cellulose based organic polymers useful for rheology control in the geopolymer compositions of those embodiments of the present invention include hydroxyethyl-cellulose (HEC), hydroxypropyl-cellulose (HPC), hydroxypropylmethyl-cellulose (HPMC), ethyl-cellulose (EC), methylethyl-cellulose (MEC), carboxymethyl-cellulose (CMC), carboxymethylethyl-cellulose (CMEC), carboxymethylhydroxyethyl-cellulose (CMHEC). The organic rheology control agents and thickeners mentioned above are soluble both in cold and hot water. These additives also act as water retention agents and thereby minimize material segregation and bleeding in addition to controlling the material rheology.

Inorganic Rheology Control Agents

The geopolymer cementitious compositions of some embodiments of the invention may also include inorganic rheology control agents belonging to the family of phyllo-silicates. Examples of inorganic rheology control agents particularly useful in those embodiments may include palygorskite, sepiolite, smectites, kaolinites, and illite. Examples of particularly useful smectite clays are hectorite, saponite, and montmorillonite. Different varieties of bentonite clays both natural and chemically treated may also be used to control rheology of the compositions of those embodiments. Such additives also act as water retention agents and thereby minimize material segregation and bleeding. The inorganic rheology control agents may be added in the absence of or in combination with the organic rheology control agents.

Film-Forming Polymer Additives

Preferable film-forming redispersible polymer powders in some embodiments of the invention are latex powders. These polymer powders are water-redispersible and produced by spray-drying of aqueous polymer dispersions (latex).

Latex is an emulsion polymer. Latex is a water based polymer dispersion, widely used in industrial applications. Latex is a stable dispersion (colloidal emulsion) of polymer microparticles in an aqueous medium. Thus, it is a suspension/dispersion of rubber or plastic polymer microparticles in water. Latexes may be natural or synthetic.

The latex is preferably made from a pure acrylic, a styrene rubber, a styrene butadiene rubber, a styrene acrylic, a vinyl acrylic or an acrylated ethylene vinyl acetate copolymer and is more preferably a pure acrylic. Preferably latex polymer is derived from at least one acrylic monomer selected from the group consisting of acrylic acid, acrylic acid esters, methacrylic acid, and methacrylic acid esters. For example, the monomers preferably employed in emulsion polymerization include such monomers as methyl acrylate, ethyl acrylate, methyl methacrylate, butyl acrylate, 2-ethyl hexyl acrylate, other acrylates, methacrylates and their blends, acrylic acid, methacrylic acid, styrene, vinyl toluene, vinyl acetate, vinyl esters of higher carboxylic acids than acetic acid, e.g. vinyl versatate, acrylonitrile, acrylamide, butadiene, ethylene, vinyl chloride and the like, and mixtures thereof.

For example, a latex polymer can be a butyl acrylate/methyl methacrylate copolymer or a 2-ethylhexyl acrylate/methyl methacrylate copolymer. Preferably, the latex polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

Efflorescence Suppression Agent

Water repelling agents such as silanes, silicones, siloxanes, stearates can be added to the cementitious compositions of some embodiments of the invention to reduce efflorescence potential of the material. Selected examples of useful efflorescence suppression agents include octyltriethoxy silane, potassium methyl siliconate, calcium stearate, butyl stearate, polymer stearates. These efflorescence control agents reduce the transport of the water within the hardened material and thereby minimize migration of salts and other soluble chemicals that can potentially cause efflorescence. Excessive efflorescence can lead to poor aesthetics, material disruption and damage from expansive reactions occurring due to salt accumulation and salt hydration, and reduction in bond strength with other substrates and surface coatings.

Defoaming Agents

Defoaming agents can be added to the geopolymer cementitious compositions of some embodiments of the invention to reduce the amount of entrapped air, increase material strength, increase material bond strength to other substrates, and to produce a defect free surface in applications where surface aesthetics is an important criteria. Examples of suitable defoaming agents useful in the geopolymer compositions of some embodiments of the invention include polyethylene oxides, polyetheramine, polyethylene glycol, polypropylene glycol, alkoxylates, polyalkoxylate, fatty alcohol alkoxylates, hydrophobic esters, tributyl phosphate, alkyl polyacrylates, silanes, silicones, polysiloxanes, polyether siloxanes, acetylenic diols, tetramethyl decynediol, secondary alcohol ethoxylates, silicone oil, hydrophobic silica, oils (mineral oil, vegetable oil, white oil), waxes (paraffin waxes, ester waxes, fatty alcohol waxes), amides, fatty acids, polyether derivatives of fatty acids, etc.

Initial Slurry Temperature

In some embodiments of the present invention, it is preferred to form the slurry under conditions which provide a reduced initial binder mixture slurry temperature and rise of less than about 50° F. (28° C.) to a final binder mixture slurry temperature, more preferably a rise of less than about 40° F. (22° C.) and most preferably a rise of less than about 30° F. (17° C.) for improved temperature stability and more importantly, slower gelation and final setting times of from about 10 to about 240 minutes, more preferably about 60 to about 120 minutes and most preferably about 30 to about 60 minutes, allows for more controlled working time for commercial use of the binder compositions. The initial slurry temperature is preferably about room temperature.

Increasing the initial temperature of the slurry increases the rate of temperature rise as the reactions proceed and reduces the setting time. Thus, initial slurry temperature of 95° F. (35° C.) to 105° F. (41.1° C.) used in preparing conventional fly ash based geopolymeric binder compositions for rapid gelation and setting times is preferably avoided in some embodiments of the invention, since the composition formulation is designed to reduce temperature increase behavior of the mixture from the initial slurry temperatures. The benefit of the thermal stability obtained with many embodiments of the present invention for increasing the time for initial gelation and final setting times, which, in turn, provides for increased commercially workability of the composition, may be somewhat lessened if the initial slurry temperature is already relatively high.

The "initial temperature" is defined as the temperature of the overall mixture during the first minute after the cementitious reactive powder, activator, and water are first all present in the mixture. Of course the temperature of the overall mixture can vary during this first minute but, in order to achieve a preferred thermal stability, it will remain within an initial temperature range of about 0 to about 50° C., more preferably an initial temperature range of about 10 to about 35° C., even more preferably an initial temperature range of about 15 to about 25° C., preferably ambient temperature.

Material Exothermic and Temperature Rise Behavior

Compositions of some embodiments of the present invention advantageously achieve moderate heat evolution and low temperature rise within the material during the curing stage. In such compositions of some embodiments of the invention, the maximum temperature rise occurring in the material is preferably less than about 50° F. (28° C.), more preferably less than about 40° F. (22° C.), and most preferably less than about 30° F. (17° C.). This prevents excessive thermal expansion and consequent cracking and disruption of material. This aspect becomes even more beneficial when the material is utilized in a manner where large thicknesses of material pours are involved in actual field applications. The geopolymer cementitious compositions of the present invention are beneficial in this particular aspect as they exhibit lower thermal expansion and enhanced resistance to thermal cracking in actual field applications.

EXAMPLES

In the examples herein, as mentioned above, percentages of compositions or product formulae are in weight percentages, unless otherwise expressly stated. The reported measurements also in approximate amounts unless expressly stated, e.g. approximate percentages, weights, temperatures, distances or other properties. Also, unless otherwise indicated FASTROCK 500 brand calcium sulfoaluminate cement, available from CTS Cement Company is employed as a component of cementitious reactive powder. FASTROCK 500 has an average particle size of about 5 microns with 95% of particles finer than about 25 microns. The measured Blaine fineness of FASTROCK 500 was about 6780 cm$^2$/g. The oxide composition of FASTROCK 500 was analyzed and is shown in TABLE AA:

TABLE AA

| Oxide | Weight % in FASTROCK 500 | Weight % in Class C fly Ash |
| --- | --- | --- |
| CaO | 43.78 | 24.14 |
| SiO$_2$ | 14.02 | 36.90 |
| Al$_2$O$_3$ | 25.23 | 20.12 |
| Fe$_2$O$_3$ | 1.05 | 5.96 |
| SO$_3$ | 8.67 | 1.19 |
| MgO | 3.23 | 5.44 |
| Na$_2$O | 1.81 | 1.73 |
| K$_2$O | 0.32 | 0.52 |
| TiO$_2$ | 0.76 | 1.42 |
| P$_2$O$_5$ |  | 1.18 |
| Loss on Ignition | 1.58 | 0.52 |

The main phases present in the FASTROCK 500 calcium sulfoaluminate cement employed in the examples include $C_4A_3\bar{S}$, $C_2S$, $C_4AF$, and $C\bar{S}$.

In all the examples, unless otherwise indicated, the fly ash is Class C Fly Ash from Campbell Power Plant, West Olive, Mich. This fly ash has an average particle size of about 4 microns. The measured Blaine fineness of the fly ash is about 4300 cm$^2$/g. The oxide composition of the Class C fly ash employed in these examples is shown in TABLE AA.

The calcium sulfate dihydrate included in a number of examples is a fine-grained calcium sulfate dihydrate, termed here as landplaster or fine-grained landplaster, available from the United States Gypsum Company. The fine-grained landplaster has an average particle size of about 15 microns.

The anhydrous calcium sulfate (anhydrite) included in some of the examples is SNOW WHITE brand filler available from the United States Gypsum Company. The USG SNOW WHITE filler is an insoluble form of anhydrite produced by high temperature thermal treatment of calcium sulfate, typically gypsum. It has a very low level of chemically combined moisture, preferably about 0.35%. The average particle size of the USG SNOW WHITE filler is about 7 microns.

The calcium sulfate hemihydrate included in a number of the examples is USG HYDROCAL C-Base brand calcium sulfate hemihydrate available from the United States Gypsum Company. HYDROCAL C-Base is an alpha morphological form of calcium sulfate hemihydrate having blocky crystal microstructure and low water demand. The USG HYDROCAL C-Base has an average particle size of about 17 microns.

Coarse-grained calcium sulfate dihydrate, otherwise identified here as coarse landplaster or coarse-grained landplaster, employed in a number of the examples was procured from the United States Gypsum Company with commercial name USG BEN FRANKLIN AG brand Coarse Gypsum. The USG BEN FRANKLIN AG brand gypsum is a coarse grained calcium sulfate dihydrate with an average particle size of about 75 to about 80 microns.

The fine-grained calcium sulfate dihydrate included in a number of the examples is USG TERRA ALBA F&P brand from the United States Gypsum Company. The USG TERRA ALBA F&P filler is a high-purity calcium sulfate dihydrate with an average particle size of about 13 microns.

The QUIKRETE Fine-grained No. 1961 Fine Sand included in some examples has a particle size as shown in TABLE BB:

TABLE BB

| Sieve Size | Percent Passing (%) QUIKRETE FINE GRAIN No. 1961 Sand | Percent Passing (%) UNIMIN 5030 Sand |
|---|---|---|
| 30 Mesh | 100 | |
| 40 Mesh | 98 | 100 |
| 50 Mesh | 69 | 73 |
| 70 Mesh | 23 | 22 |
| 100 Mesh | 5 | 4 |
| 140 Mesh | 1 | 0 |
| 200 Mesh | 0 | |

The UNIMIN 5030 Sand included in some examples has a particle size as shown in TABLE BB.

Potassium citrate or sodium citrate is the alkali metal citrate added to some of the examples of the cementitious compositions of some embodiments of the invention and acts as a chemical activator, rheology modifier, and set control agent.

The time of initial setting and the time of final setting reported herein were measured using the ASTM C266 (2008) standard using the Gilmore needles.

The slump and flow behavior of the cementitious geopolymer compositions of some embodiments of this invention are characterized by a slump test. The slump test used herein utilizes a hollow cylinder about 5.08 cm. (2 in.) diameter and about 10.16 cm. (4 in.) length held vertically with one open end resting on a smooth plastic surface. The cylinder is filled up to the top with the cementitious mixture followed by striking off the top surface to remove the excess slurry mixture. The cylinder is then gently lifted up vertically to allow the slurry to come out from the bottom and spread on the plastic surface to form a circular patty. The diameter of the patty is then measured and recorded as the slump of the material. As used herein, compositions with good flow behavior yield a larger slump value. The flow of the slurry is characterized by rating the slurry flowability on a scale of 1 to 10 with a value of 1 representing a very poor flow behavior and a value of 10 representing excellent flow behavior.

Material shrinkage (also referred to herein as "shrinkage") as used herein is characterized by measuring the length change of prism specimen according to the ASTM C928 (2009) test standard. The initial length measurement is taken 4 hours after the individual raw material components including water are brought together. The final measurement is taken 8 weeks after the components including water were brought together. The difference between the initial and final measurements divided by the initial length times 100% gives the shrinkage as a percentage. The 1 in.×1 in. (cross-section) length change prism specimens also referred to herein as bars, are prepared according to the ASTM C157 (2008) standard.

Compressive strength of materials as used herein is measured in accordance to the ASTM C109 (2008) test method by testing the 2 in.×2 in.×2 in. cubes to failure under compression. The cubes are demolded from the brass molds after hardening and cured in sealed plastic bags until the age of testing. The cubes are tested at the age of about 4-hours, about 24-hours, about 7-days and about 28-days after the cast. In some examples, the cubes are subjected to saturation for 7-days after completion of 28-day curing in plastic bags. These cubes are tested in compression in the saturated condition immediately after taking them out of water and surface drying.

The slurry temperature rise behavior has used herein is measured in the semi-adiabatic condition by putting the slurry in an insulated container and recording the material temperature using a thermocouple.

Many of the examples show physical properties of the developed geopolymer cementitious compositions of some embodiments of the invention comprising thermally activated aluminosilicate mineral (fly ash), calcium sulfoaluminate cement, calcium sulfate and alkali metal chemical activators. This illustrates the influence of incorporating calcium sulfoaluminate cement in combination with calcium sulfate and alkali metal chemical activator on the material shrinkage behavior, early age compressive strength, ultimate compressive strength, exothermal behavior and setting characteristics of the developed geopolymer cementitious compositions of some embodiments of the invention.

Compositions of some embodiments of the present invention advantageously achieve moderate heat evolution and low temperature rise within the material during the curing stage. In such compositions, the maximum temperature rise occurring in the material is preferably less than about 50° F. (28° C.), more preferably less than about 40° F. (22° C.) and still more preferably less than about 30° F. (17° C.). This prevents excessive thermal expansion and consequent cracking and disruption of material. This aspect becomes even more beneficial when the material is utilized in a manner where large thicknesses of material pours are involved in the actual field applications. The geopolymer cementitious compositions of the present invention investigated as discussed below are beneficial in this particular aspect as they exhibit lower thermal expansion and enhanced resistance to thermal cracking in actual field applications.

The inventive compositions of some embodiments of the invention also achieve long setting times for good workability. An extremely short setting time is problematic for some embodiments of the invention for applications as a short material working life (pot life) causes significant difficulties with processing of rapid setting material using the equipment and tools involved in actual field application.

Example 1: Comparative Example of Known Geopolymer Cementitious Compositions The following example illustrates the physical properties of the comparative cementitious compositions comprising Class C fly ash and an alkali metal citrate. The test results show the shrinkage behavior, early age and ultimate compressive strength, and setting behavior of the cementitious compositions shown in TABLE 1. All three mixes were activated with potassium citrate and contained varying amounts of sand. All three mixes had about 100 parts by weight Fly Ash Class C and about 100 parts by weight Total Cementitious Materials. In other words, all the cementitious material was Fly Ash Class C.

TABLE 1

Cementitious compositions investigated in Comparative Example 1

| Raw Material | Comparative Mix 1 | Comparative Mix 2 | Comparative Mix 3 |
|---|---|---|---|
| Fly Ash Class C[1] (grams) | 3000 | 2200 | 1800 |
| Total Cementitious Materials (grams) | 3000 | 2200 | 1800 |
| Sand[2] (grams) | 2250 | 3300 | 4500 |
| Water (grams) | 825 | 605 | 495 |
| Potassium Citrate (grams) | 120 | 88 | 72 |
| Borax (grams) | 15 | 11 | 9 |
| Water/Cementitious Materials Ratio | 0.275 | 0.275 | 0.275 |
| Sand/Cementitious Materials Ratio | 0.750 | 1.50 | 2.50 |
| Potassium Citrate/Cementitious Materials, wt % | 4.0% | 4.0% | 4.0% |
| Borax Amount/Cementitious Materials, wt % | 0.5% | 0.5% | 0.5% |

[1]Class C Fly Ash, Campbell Power Plant, West Olive, MI
[2]QUIKRETE Commercial Grade Fine Sand No. 1961

FIG. 1A shows the shrinkage behavior of the cementitious compositions investigated in Comparative Example 1.

The shrinkage measurements were initiated at an age of 4-hours from the time the raw materials were mixed together and cast. It can be observed that the fly ash compositions activated with an alkali metal citrate demonstrated extremely high amount of shrinkage. The measured maximum shrinkage was found to be as high as about 0.75% after 8-weeks of curing at about 75° F./50% RH. Increase in sand content decreased the extent of shrinkage but the overall shrinkage still remained at very high levels. Such high levels of material shrinkage render the material completely unsatisfactory for most construction applications. It should be noted that for most construction applications, shrinkage in excess of about 0.10% is considered to be high and undesirable.

Initial Flow Behavior, Slump, and Early Age Cracking Behavior of Material

TABLE 2 shows the initial flow behavior and slump of the cementitious compositions investigated in Comparative Example 1.

TABLE 2

Flow and Slump of Cementitious Compositions of Comparative Example 1

|  | Flow | Slump (inches) |
|---|---|---|
| Comparative Mix 1 (sand/cementitious material = 0.75) | 10 | 9 |
| Comparative Mix 2 (sand/cementitious material = 1.5) | 8 | 7.5 |
| Comparative Mix 3 (sand/cementitious material = 2.5) | 2 | 2 |

The fly ash composition activated with an alkali metal citrate had a good flow behavior at sand/cement ratios of about 0.75. The slurry lost its fluidity to a small extent when the sand/cement ratio was increased to about 1.5. At a sand/cement ratio of about 2.5, the mix became extremely stiff and had no flow characteristics.

Figure 1B:
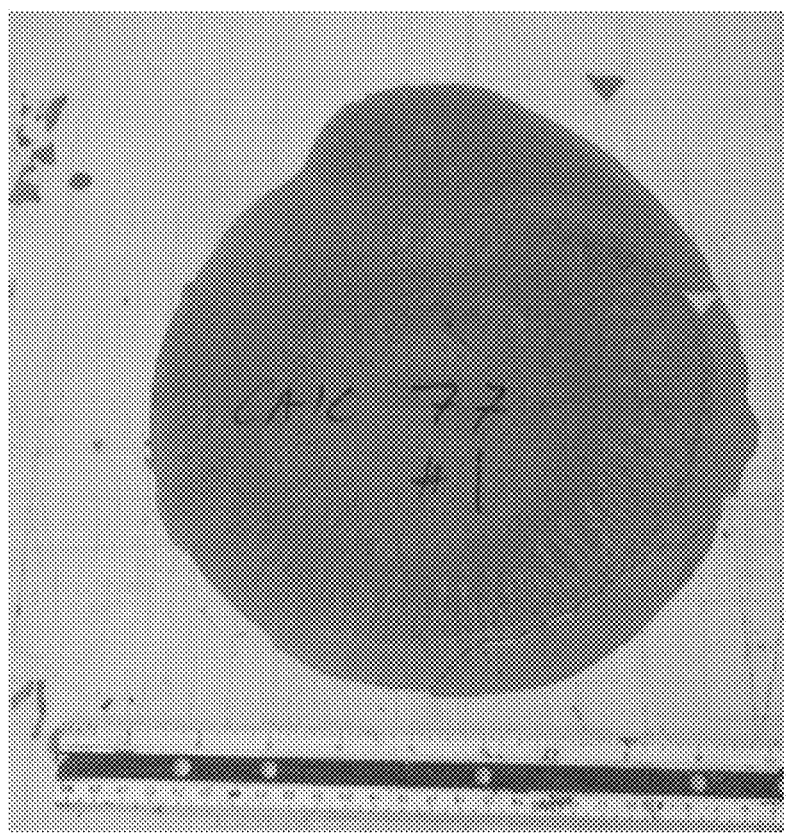
FIG. 1B is a photograph of slump of Example 1.

FIG. 1B shows photograph of slump patty for Mix #1 investigated in Comparative Example 1. The slump patty developed significant cracking upon drying. The initiation of cracks in the patties occurred in less than about 30 minutes after the slump test. The number of cracks and the size of cracks grew with subsequent material drying and hardening.

Time of Setting

TABLE 3 shows the setting behavior of the cementitious compositions investigated in Comparative Example 1.

TABLE 3

Setting Times of Cementitious Compositions of Comparative Example 1

|  | Initial Setting Time (hr:min) | Final Setting Time (hr:min) |
|---|---|---|
| Comparative Mix 1 | 0:15 | 0:16 |
| Comparative Mix 2 | 0:14 | 0:15 |
| Comparative Mix 3 | 0:7 | 0:10 |

The cementitious compositions in this Example had extremely rapid setting behavior. All mixes gelled up very quickly and lost flow behavior in less than about 5 minutes after the raw materials were blended together to form of an aqueous slurry.

Compressive Strength.

TABLE 4 shows the compressive strength behavior of the cementitious compositions investigated in Comparative Example 1. All fly ash compositions showed compressive strength development in excess of about 7000 psi at about 28 days.

TABLE 4

Compressive Strength of Cementitious Compositions Comparative Example 1

|  | 28 day (psi) |
|---|---|
| Mix 1 (sand/cementitious material = 0.75) | 9259 |
| Mix 2 (sand/cementitious material = 1.5) | 8069 |
| Mix 3 (sand/cementitious material = 2.5) | 7766 |

Example 2: Comparative Example

This example investigates early age dimensional stability and cracking resistance of the comparative cementitious compositions comprising fly ash and alkali metal citrate. TABLE 5 shows the raw material composition of the mixture composition investigated. The mixes were activated with sodium citrate and contained varying amounts of sand. The mixes had about 100 parts by weight Fly Ash Class C and about 100 parts by weight Total Cementitious Materials. In other words all the cementitious material was Fly Ash Class C.

TABLE 5

Mixture Compositions of Comparative Example 2 and Comparative Example 3

| Raw Material | Comparative Example 2 Mix 1 | Comparative Example 3 Mix 1 |
|---|---|---|
| Fly Ash Class C[1] (grams) | 3000 | 3750 |
| Total Cementitious Materials (grams) | 3000 | 3750 |
| Sand[2] (grams) | 3150 | 3938 |
| Sodium Citrate Dihydrate (grams) | 60 | 75 |
| Superplasticizer[3] (grams) | 15 | 18.75 |
| Water (grams) | 825 | 1031 |
| Water/Cementitious Materials Ratio | 0.275 | 0.275 |
| Sand/Cementitious Materials Ratio | 1.05 | 1.05 |
| Sodium Citrate Dihydrate/Cementitious Materials, wt % | 2.0% | 2.0% |
| Superplasticizer/Cementitious Materials, wt % | 0.5% | 0.5% |

[1]Class C Fly Ash, Campbell Power Plant, West Olive, MI
[2]QUIKRETE Commercial Grade Fine Sand No. 1961
[3]BASF CASTAMENT FS20

Early Age Cracking Behavior of Material

Figure 2:
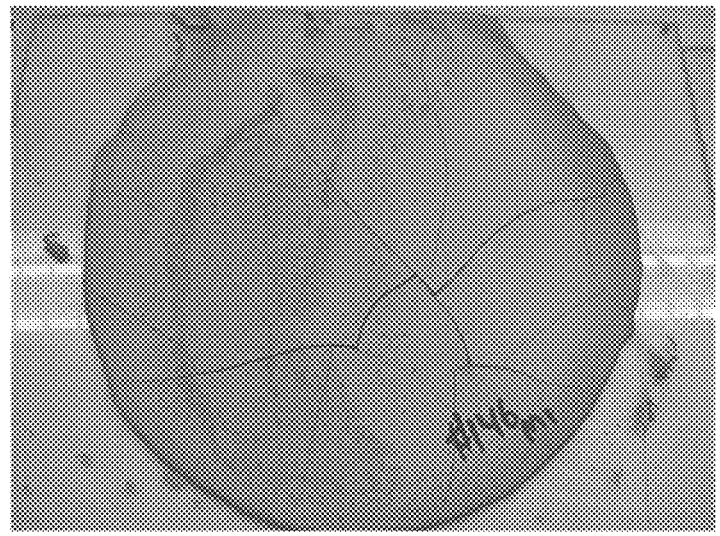
FIG. 2 is a photograph of slump of Comparative Example 2.

FIG. 2 shows a photograph of the slump patty for the mix investigated in Comparative Example 2. The slump patty developed significant cracking upon drying. The initiation of cracks in the patty occurred in less than about 30 minutes after the slump test. The number of cracks and the size of cracks grew significantly with subsequent material drying and hardening.

Compressive Strength Behavior of Composition of Comparative Example 2

Table 5A shows the compressive strength behavior of the mix in Comparative Example 2. The early age compressive strengths of the composition were relatively low, being less than about 500 psi at 4 hours and less than about 2000 psi at 24 hours. As will be shown later in the examples, the geopolymer compositions of embodiments of the invention develop significantly higher compressive strength at these same early ages with equivalent water/cement ratios. As shown in the examples of specific embodiments of the present invention the early age compressive strengths of the can easily be tailored by adjusting the type and amount of calcium sulfate, the amount of calcium sulfoaluminate cement, and the type and amount of alkali metal activator used in the compositions of embodiments of the invention.

TABLE 5A

Compressive Strength of Example 2 - (psi)

| | 4 hour | 24 hour | 7 day | 28 day |
|---|---|---|---|---|
| Mix 1 | 493 | 1749 | 6454 | 8996 |

Example 3: Comparative Example

This example investigated early age dimensional stability and cracking resistance of the comparative cementitious compositions comprising fly ash and alkali metal citrate. TABLE 5 shows the raw material composition of the mixture composition investigated.

Early Age Cracking Behavior of Material

Figure 3A:
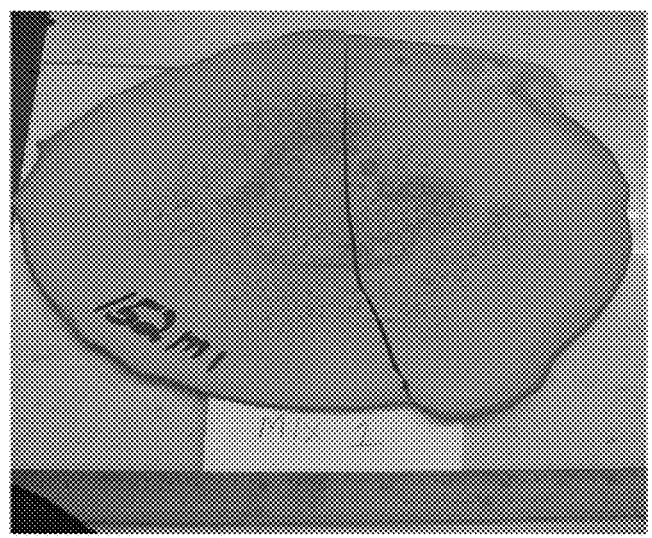
FIG. 3A is a photograph of slump of Comparative Example 3.

FIG. 3A shows a photograph of the slump patty for the mix investigated in the Comparative Example 3. The slump patty developed significant cracking upon drying. The initiation of cracks in the patty occurred in less than about 30 minutes after the slump test.

Compressive Strength Behavior of Composition of Comparative Example 3

Table 5B shows the compressive strength behavior of the mix in Comparative Example 3. The early age compressive strengths of the composition were relatively low being less than about 500 psi at 4 hours and less than about 1500 psi. As shown in later examples of embodiments of the invention, the early age compressive strengths can be tailored by adjusting the type and amount of calcium sulfate, the amount of calcium sulfoaluminate cement, and the type and amount of alkali metal activator used in the compositions of the invention.

TABLE 5B

Compressive Strength of Mixture Compositions of Comparative Example 3 - (psi)

| | 4 hour | 24 hour | 7 day | 28 day |
|---|---|---|---|---|
| Mix 1 | 484 | 1441 | 6503 | 8492 |

Shrinkage Behavior

Figure 3B:
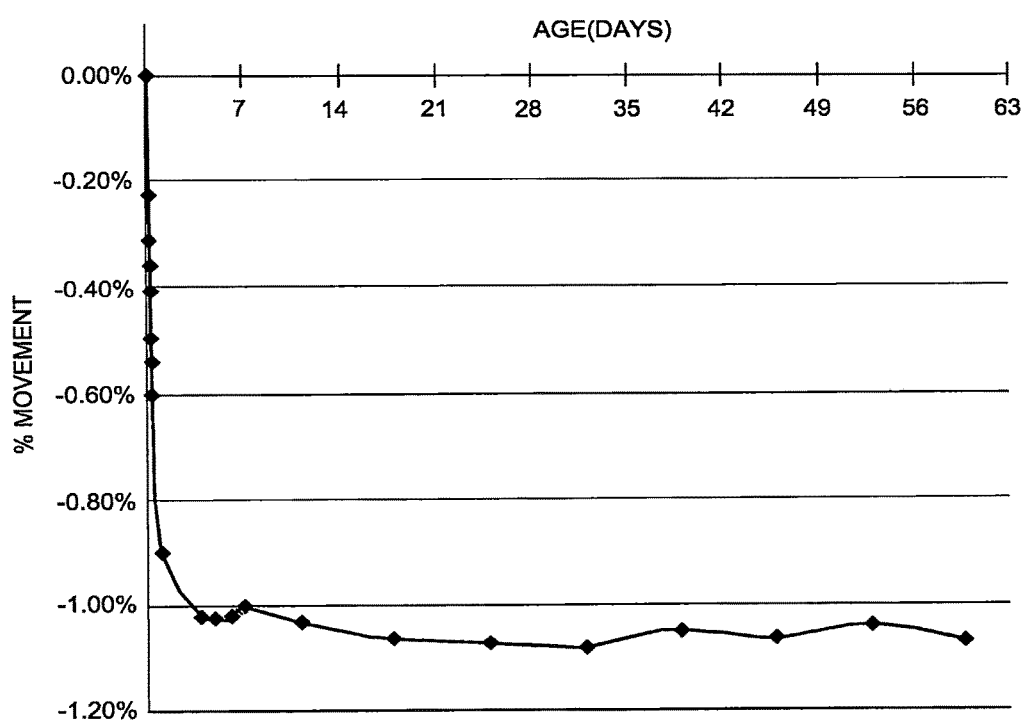
FIG. 3B is a graph of time of shrinkage results of Comparative Example 3

FIG. 3B shows the very early age shrinkage behavior of the cementitious composition in Comparative Example 3.

The very early age shrinkage measurements were initiated at an age of 1-hour from the time the raw materials were mixed together and cast. The fly ash composition activated with an alkali metal citrate demonstrated extremely high amount of shrinkage. The measured maximum shrinkage was found to be in excess of about 1% after 8-weeks of curing at about 75° F./50% RH. Such high levels of material shrinkage render the material unsatisfactory for most construction applications. In most construction applications, shrinkage in excess of about 0.10% is considered to be undesirably high.

Example 4: Addition of Calcium Sulfoaluminate Cement to Fly Ash—Comparative Example This example shows physical properties of the cementitious compositions comprising fly ash, calcium sulfoaluminate cement and alkali metal citrate. This studied the influence of incorporation of calcium sulfoaluminate cement on shrinkage and cracking resistance of the cementitious compositions comprising fly ash and alkali metal citrate.

TABLES 6 and 7 show the raw material compositions of the various cementitious mixtures 1-4 investigated in this Example. The amount of calcium sulfoaluminate cement used in the various mixture compositions was varied from about 20 wt % to about 80 wt % of the weight of fly ash.

TABLE 6

Comparative Cementitious Reactive Powder Compositions
of Example 4, Mixes 1 to 4 (Parts by Weight)

| Raw Material | Mix 1 Parts by wt. | Mix 2 Parts by wt. | Mix 3 Parts by wt. | Mix 4 Parts by wt. |
|---|---|---|---|---|
| Fly Ash Class C | 100 | 100 | 100 | 100 |
| Calcium Sulfate | 0 | 0 | 0 | 0 |
| Calcium Sulfoaluminate Cement | 20 | 40 | 60 | 80 |
| Total Cementitious Materials | 120 | 140 | 160 | 180 |

1 Class C Fly Ash, Campbell Power Plant, West Olive, MI
2 FASTROCK 500, CTS Cement Company

TABLE 7

Comparative Cementitious Compositions
Mixes 1 to 4 of Example 4

| Raw Material | Mix 1 | Mix 2 | Mix 3 | Mix 4 |
|---|---|---|---|---|
| Fly Ash Class C (grams) | 2500 | 2143 | 1875 | 1667 |
| Calcium Sulfate (grams) | 0 | 0 | 0 | 0 |
| Calcium Sulfoaluminate Cement (gms) | 500 | 857 | 1125 | 1333 |
| Total Cementitious Materials (grams) | 3000 | 3000 | 3000 | 3000 |
| Sand (grams) | 2250 | 2250 | 2250 | 2250 |
| Potassium citrate (grams) | 120 | 120 | 120 | 120 |
| Superplasticizer (grams) | 18 | 18 | 18 | 18 |
| Water (grams) | 750 | 750 | 750 | 750 |
| Water/Cementitious Materials Ratio | 0.25 | 0.25 | 0.25 | 0.25 |
| Sand/Cementitious Materials Ratio | 0.75 | 0.75 | 0.75 | 0.75 |
| Potassium Citrate/Cementitious Materials, wt % | 4.0% | 4.0% | 4.0% | 4.0% |
| Superplasticizer/Cementitious Materials, wt % | 0.6% | 0.6% | 0.6% | 0.6% |

1 Class C Fly Ash, Campbell Power Plant, West Olive, MI
2 FASTROCK 500, CTS Cement Company
3 QUIKRETE Commercial Grade Fine Sand No. 1961
4 BASF CASTAMENT FS20

Initial Flow Behavior, Slump, and Early Age Cracking Behavior of Material

TABLE 8 shows the initial flow behavior and slump of the binary blends of fly ash and calcium sulfoaluminate cement investigated in Example 4. All mixes investigated had good flow behavior and large patty diameter as observed in the slump test.

TABLE 8

Flow and Slump of Comparative Cementitious
Compositions of Example 4

|  | Flow | Slump (inches) |
|---|---|---|
| Comparative Mix 1 | 9 | 9 |
| Comparative Mix 2 | 10 | 11 |
| Comparative Mix 3 | 10 | 10 |
| Comparative Mix 4 | 10 | 9.75 |

Figure 4A:
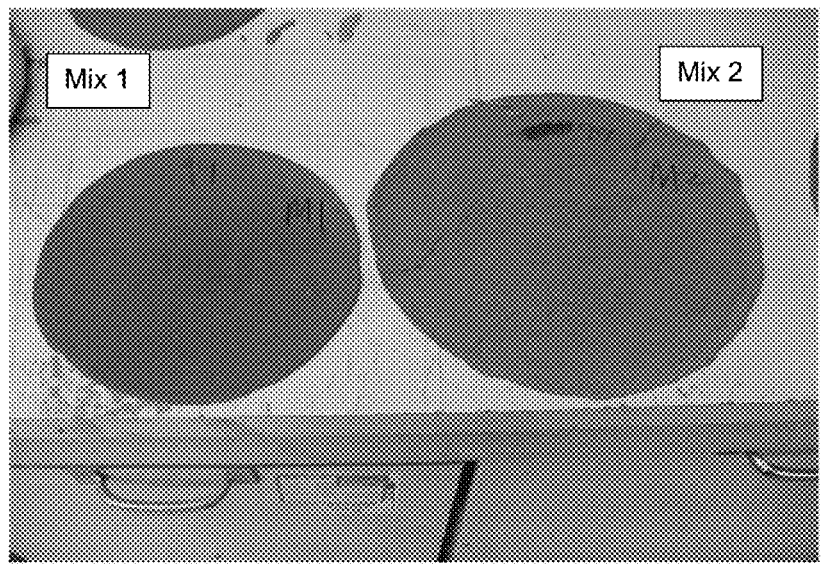
FIG. 4A is a photograph of initial flow behavior and slump of compositions in Example 4 for Mixes 1 and 2.
Figure 4A:
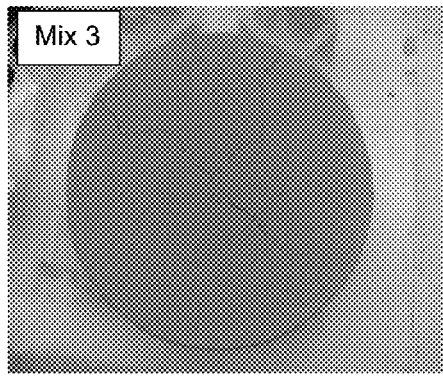
Figure 4A:
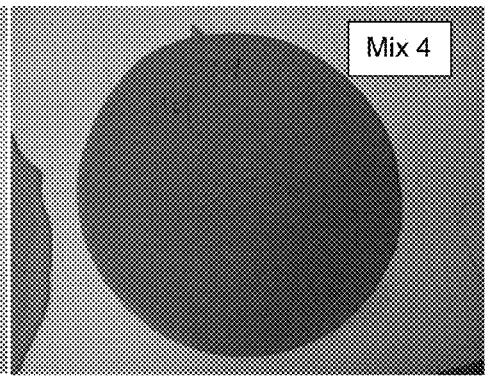

FIG. 4A shows a photograph of slump patties for the Mixes 1 and 2 investigated in Example 4. FIGS. 4B and 4C show photographs of slump patties for the Mixes 3 and 4, respectively, investigated in Example 4. All slump patties developed significant cracking upon drying. The initiation of cracks in the patties began to occur as soon as about 10 minutes after the raw materials were mixed together. The number of cracks and the size of cracks grew significantly with subsequent material drying and hardening. Mix 1 with lowest amount of calcium sulfoaluminate cement developed the least amount of cracking. Addition of calcium sulfoaluminate cement to fly ash compositions activated with alkali metal citrate led to a dimensionally unstable material prone to excessive cracking upon drying and hardening.

Shrinkage Behavior

Figure 4D:
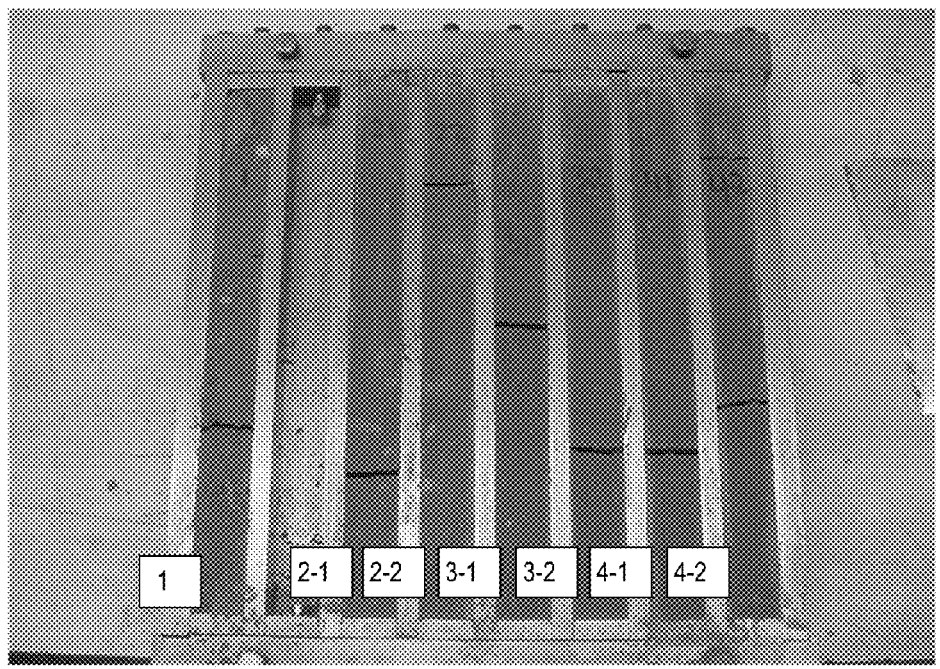
FIG. 4D is a photograph of compositions investigated in Example 4—All bars for mixes 1, 2-1 and 2-2, 3-1 and 3-2 and 4-1 and 4-2 (left to right) cracked in the mold.

Rectangular prism specimens were cast for characterization of shrinkage behavior of the mixes investigated. FIG. 4D shows photographs of the specimens for Mix 1, Mix 2 (samples 2-1 and 2-2), Mix 3 (samples 3-1 and 3-2) and Mix 4 (samples 4-1 and 4-2) (left to right) taken about 4 hours after they were cast in the mold. FIG. 4D shows that all cast prism specimen cracked in the mold. All bars shrank extremely significantly and cracked within couple of hours after the cast in the molds themselves (prior to de-molding). Crack widths were measured and the total amount of shrinkage for these mixes was determined to be in excess of about 1.0% at the specimen age of about 24 hours.

Example 5

An objective of this investigation was to study the influence of incorporation of calcium sulfate dihydrate (fine-grained landplaster) at varying amounts in the geopolymer binder compositions of some embodiments of the invention.

TABLES 9 and 10 show the raw material compositions of the geopolymer cementitious mixtures investigated in this Example. The amount of calcium sulfoaluminate cement used in the mixture compositions of this Example was equal to about 40 wt % of the weight of fly ash. Calcium sulfate dihydrate (fine-grained landplaster) was added at different amount levels (about 25 wt %, about 50 wt %, about 75 wt %, and about 100 wt % of the weight of calcium sulfoaluminate cement) in the mixture compositions investigated. The water/cementitious materials ratio utilized in this example was kept constant at 0.25.

TABLE 9

Example 5 Cementitious reactive powder
compositions in parts by weight

| Raw Material | Mix 1 Parts by wt. | Mix 2 Parts by wt. | Mix 3 Parts by wt. | Mix 4 Parts by wt. |
|---|---|---|---|---|
| Fly Ash Class C | 100 | 100 | 100 | 100 |
| Calcium Sulfate Dihydrate | 10 | 20 | 30 | 40 |
| Calcium Sulfoaluminate Cement | 40 | 40 | 40 | 40 |
| Total Cementitious Materials | 150 | 160 | 170 | 180 |

1 Class C Fly Ash, Campbell Power Plant, West Olive, MI
2 Landplaster available from USG
3 FASTROCK 500, CTS Company

TABLE 10

Example 5 Compositions

| Raw Material | Mix 1 | Mix 2 | Mix 3 | Mix 4 |
|---|---|---|---|---|
| Fly Ash Class C (grams) | 2000 | 1875 | 1765 | 1667 |
| Calcium Sulfate Dihydrate (grams) | 200 | 375 | 529.4 | 667 |
| Calcium Sulfoaluminate Cement (grams) | 800 | 750 | 705.9 | 667 |
| Total Cementitious Materials (grams) | 3000 | 3000 | 3000 | 3000 |

TABLE 10-continued

Example 5 Compositions

| Raw Material | Mix 1 | Mix 2 | Mix 3 | Mix 4 |
|---|---|---|---|---|
| Sand (grams) | 2250 | 2250 | 2250 | 2250 |
| Potassium Citrate Dihydrate (grams) | 120 | 120 | 120 | 120 |
| Superplasticizer (grams) | 18 | 18 | 18 | 18 |
| Water (grams) | 750 | 750 | 750 | 750 |
| Water/Cementitious Materials Ratio | 0.25 | 0.25 | 0.25 | 0.25 |
| Sand/Cementitious Materials Ratio | 0.75 | 0.75 | 0.75 | 0.75 |
| Calcium Sulfoaluminate Cement/Fly Ash, wt % | 40% | 40% | 40% | 40% |
| Calcium sulfate/Calcium Sulfoaluminate Cement, wt % | 25% | 50% | 75% | 100% |
| Potassium Citrate/Cementitious Materials, wt % | 4.0% | 4.0% | 4.0% | 4.0% |
| Superplasticizer/Cementitious Materials, wt % | 0.6% | 0.6% | 0.6% | 0.6% |

1 Class C Fly Ash, Campbell Power Plant, West Olive, MI
2 Landplaster available from USG
3 FASTROCK 500, CTS Company
4 QUIKRETE Commercial Grade Fine Sand No. 1961
5 BASF CASTAMENT FS20

Initial Flow Behavior, Slump, and Early Age Cracking Behavior of Material.

TABLE 11 shows the initial flow behavior and slump characteristics of the geopolymer cementitious compositions of some embodiments of the invention comparing fly ash, calcium sulfoaluminate cement, calcium sulfate dihydrate (fine-grained landplaster), and an alkali metal citrate investigated in Example 5. It can be clearly observed that all mixture compositions investigated had good self-leveling and flow behavior as indicated by the large patty diameter in the slump test. It is particularly noteworthy that such large slump values and self-leveling behavior was obtainable even at a water/cementitious materials ratio as low as about 0.25.

TABLE 11

Flow and Slump of Example 5

| | Flow | Slump (inches) |
|---|---|---|
| Mix 1 | 10 | 11 |
| Mix 2 | 9 | 9 |
| Mix 3 | 8 | 9 |
| Mix 4 | 10 | 9 |

Figure 5A:
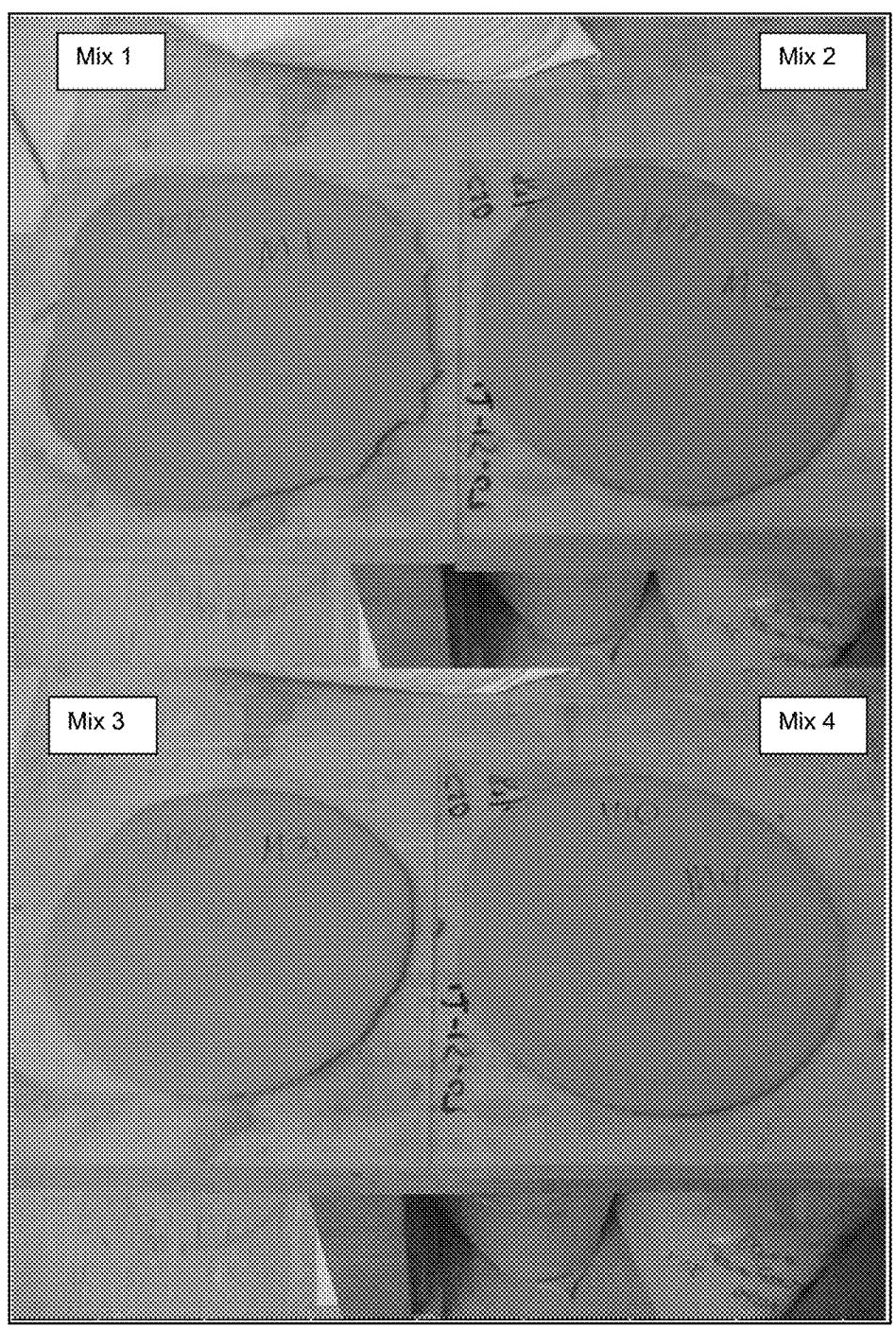
FIG. 5A is a photograph of slump patties of Mixes 1-2 (left to right) and 3-4 (left to right) of Example 5.

FIG. 5A shows photographs of slump patties for the geopolymer cementitious compositions of some embodiments of the invention investigated in Example 5. The slump patties of this Example did not develop any cracking upon drying as it happened for the cementitious mixtures of Comparative Example 4 containing no calcium sulfate dihydrate (landplaster). Thus, incorporating calcium sulfate dihydrate (fine-grained landplaster) to the cementitious mixture comprising fly ash, calcium sulfoaluminate cement, and alkali metal citrate provides dimensionally stable geopolymer cementitious compositions possessing superior resistance to cracking.

Shrinkage Behavior

Figure 5B:
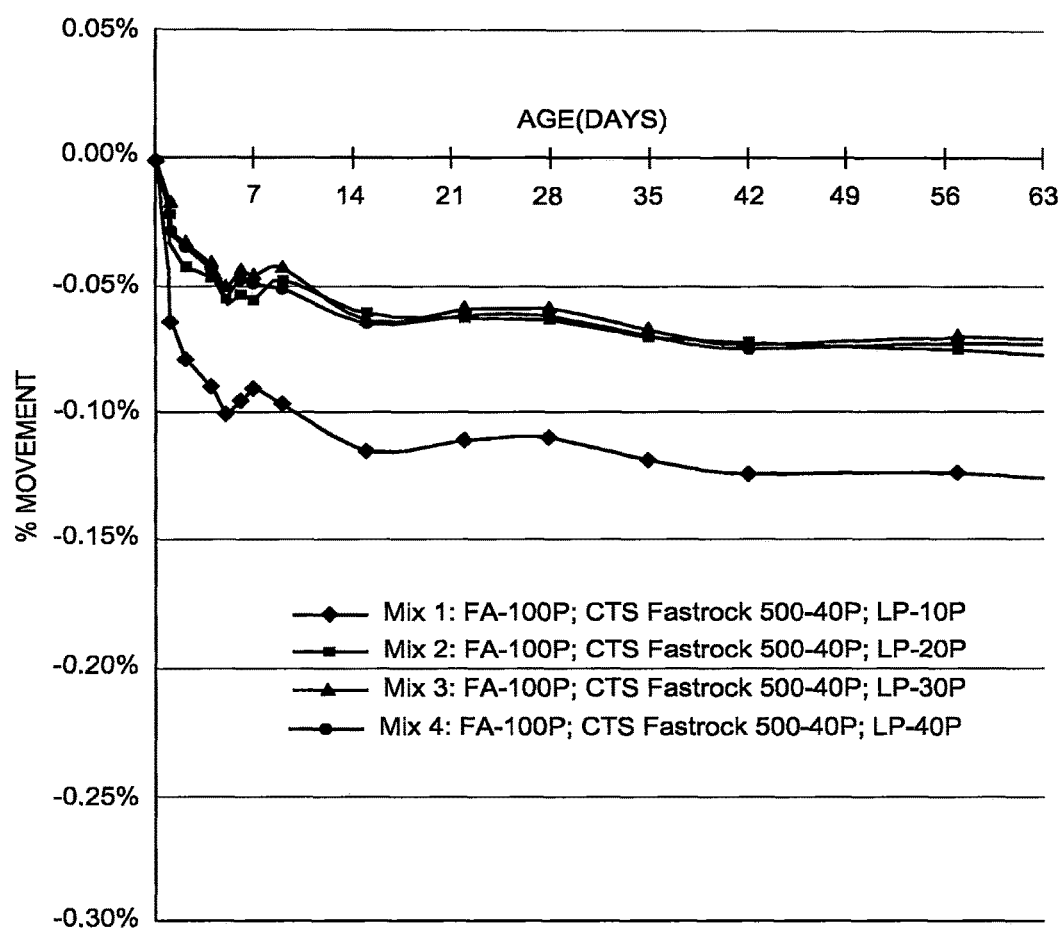
FIG. 5B is a bar graph of initial flow and slump results of Example 5.

FIG. 5B shows a graph of shrinkage behavior of geopolymer cementitious compositions of some embodiments of the invention investigated in Example 5. The main objective of this investigation was to study the influence of incorporation of calcium sulfoaluminate cement in combination with a calcium sulfate in the form of fine-grained calcium sulfate dihydrate on shrinkage behavior of the geopolymer cementitious compositions of some embodiments of the invention.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following conclusions can be drawn from this investigation and FIG. 5B:

Incorporation of calcium sulfate dihydrate (fine-grained landplaster) had a significant impact on improving cracking resistance and dimensional stability of the geopolymer cementitious compositions of some embodiments of the invention further comprising fly ash, calcium sulfoaluminate cement and alkali metal citrate. Contrary to the shrinkage bars of comparative Example 4 (with no calcium sulfate dihydrate) which cracked even before de-molding, the shrinkage bars of Example 5 comprising calcium sulfate dihydrate (fine-grained landplaster) were stable and did not evidence cracks indicating unacceptable dimensional stability or undesirable shrinkage in the bars either prior to or after de-molding.

The measured maximum shrinkage of the geopolymer cementitious compositions of some embodiments of the invention comprising fly ash, calcium sulfoaluminate cement, calcium sulfate dihydrate (fine-grained landplaster), and alkali metal citrate was significantly lower than that of the comparative cementitious compositions containing fly ash and alkali metal citrate only (Example 1). For example, the geopolymer cementitious compositions of some embodiments of the invention comprising fly ash, calcium sulfoaluminate cement, calcium sulfate dihydrate (fine-grained landplaster) and alkali metal citrate had maximum measured shrinkage ranging between about 0.07% to about 0.13% in comparison to the maximum shrinkage of about 0.75% for the comparative mixture containing fly ash and alkali metal citrate only (Example 1). Thus, it can be concluded that addition of calcium sulfate dihydrate in the form of fine-grained landplaster to cementitious compositions comprising fly ash, calcium sulfoaluminate cement, and alkali metal citrate helps to very significantly reduce the material shrinkage.

At a low calcium sulfate dihydrate (fine grained landplaster) amount of about 25 wt %, the measured maximum shrinkage was about 0.13% after 8-weeks of curing at 75° F./50% RH. Further increase in calcium sulfate (fine-grained landplaster) amount in the cementitious compositions of some embodiments of the invention decreased the material shrinkage very significantly. At a calcium sulfate (fine-grained landplaster) amount of about 50 wt %, the measured maximum material shrinkage was reduced to about 0.08%. Similarly, at a calcium sulfate (fine-grained landplaster) amount of about 75 wt % and about 100 wt %, the measured maximum material shrinkage was reduced even further to about 0.07%.

Heat Evolution and Slurry Temperature Rise Behavior

Figure 5C:
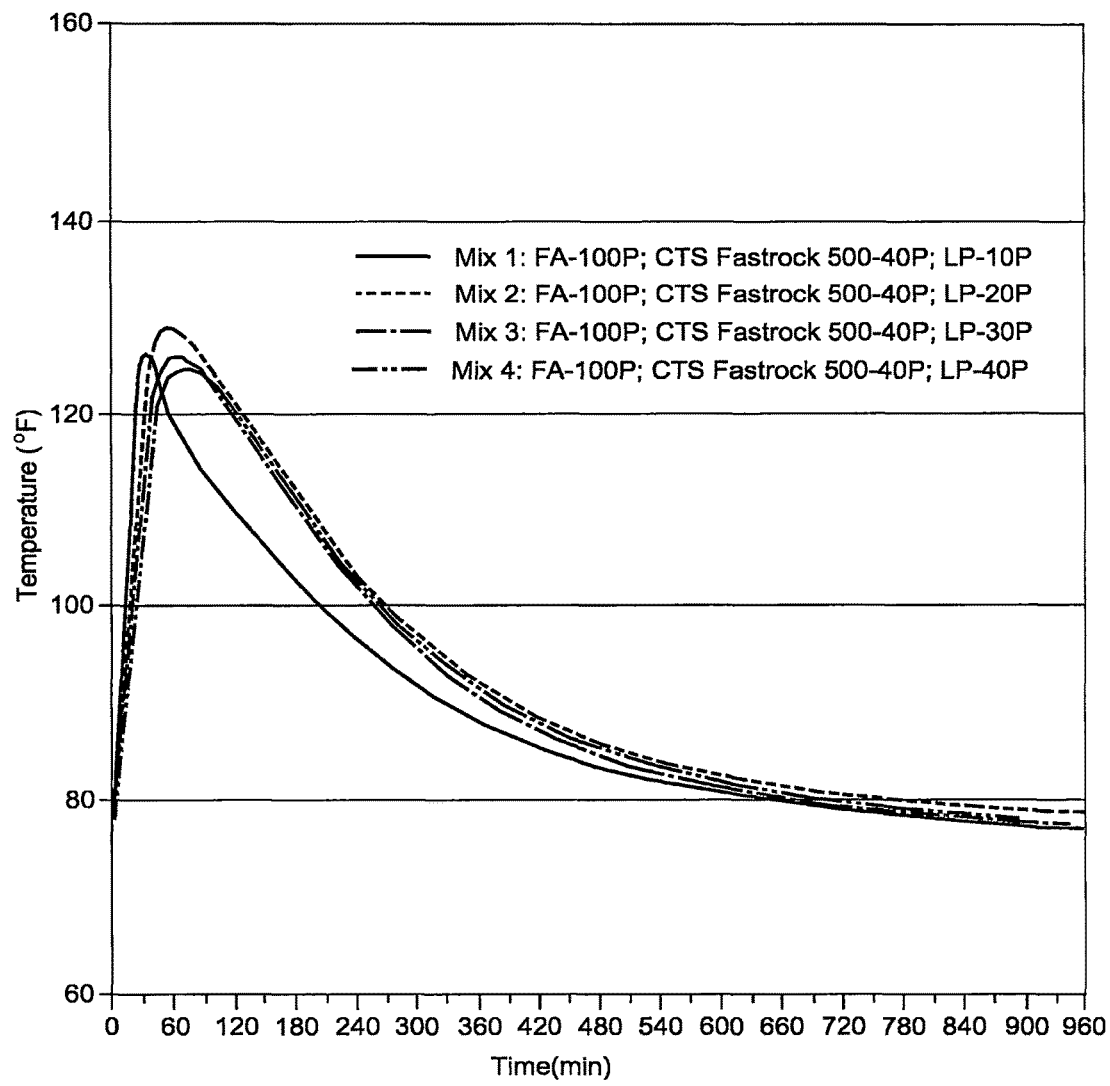
FIG. 5C is a graph of slurry temperature rise results of Example 5.

FIG. 5C shows a graph of the exothermic and slurry temperature rise behavior of geopolymer cementitious compositions of some embodiments of the invention investigated in Example 5. The cementitious compositions of Example 5 comprising fly ash, calcium sulfoaluminate cement, calcium sulfate dihydrate (fine-grained landplaster), and alkali metal citrate demonstrated a very moderate temperature rise behavior. A moderate heat evolution and low temperature rise within the material during the curing stage are effective to prevent excessive thermal expansion and consequent cracking and disruption of material. This aspect becomes even more beneficial when the material is utilized in a manner where large thicknesses of material pours are involved in the actual field applications. The geopolymer cementitious compositions of some embodiments of the invention investigated in this Example are disclosed to be highly beneficial in this particular aspect as they would lead to a lower thermal expansion and enhanced resistance to thermal cracking in actual field applications.

Time of Setting.

TABLE 11 shows a bar chart of the time of setting of geopolymer cementitious compositions of some embodiments of the invention investigated in Example 5.

TABLE 11

Setting Times of Example 5

|  | Initial Setting Time (hr:min) | Final Setting Time (hr:min) |
|---|---|---|
| Mix 1 | 00:18 | 00:23 |
| Mix 2 | 00:20 | 00:24 |
| Mix 3 | 00:24 | 00:31 |
| Mix 4 | 00:25 | 00:33 |

All cementitious compositions investigated in Example 5 had rapid setting behavior with final setting times of about 20 to about 40 minutes. The developed cementitious compositions of some embodiments of the invention comprising fly ash, calcium sulfoaluminate cement, calcium sulfate dihydrate (fine-grained landplaster), and alkali metal citrate had relatively longer setting times than the comparative cementitious compositions comprising only fly ash and alkali metal citrate as seen in Example 1. For the comparative cementitious composition comprising fly ash and alkali metal citrate of Example 1, the time of final setting was about 15 minutes. An extremely short setting time is problematic in some embodiments of the inventions for some applications since it provides a short working life (pot life) that causes significant difficulties with processing and placement of rapid setting material in the actual field applications.

In the embodiments of present invention shown in this example it was unexpectedly found that when the aluminosilicate mineral, alkali metal activator, calcium sulfoaluminate cement and calcium sulfate were mixed together, the resulting reaction was less exothermic than the two separate reactions and the time of gelation and hardening times were significantly extended.

It has also been found that there is a significant reduction in material shrinkage when the aluminosilicate mineral and alkali metal activator were reacted together with calcium sulfoaluminate cement and calcium sulfate as discussed above in paragraph of the description.

Compressive Strength

TABLE 12 shows the compressive strength behavior of the developed geopolymer cementitious compositions of some embodiments of the invention comprising fly ash, calcium sulfoaluminate cement, calcium sulfate dihydrate (fine-grained landplaster), and alkali metal citrate investigated in Example 5.

TABLE 12

Compressive Strength of Example 5 - (psi)

|  | 4 hour | 24 hour | 8 day | 28 day |
|---|---|---|---|---|
| Mix 1 | 1812 | 3732 | 5502 | 6262 |
| Mix 2 | 2418 | 4314 | 6241 | 5992 |
| Mix 3 | 3111 | 4659 | 5589 | 6502 |
| Mix 4 | 3469 | 4778 | 5519 | 5260 |

This example studied the influence of incorporation of calcium sulfoaluminate cement in combination with a calcium sulfate in the form of fine-grained landplaster on both the early age and ultimate compressive strength behavior of the developed geopolymer cementitious compositions of some embodiments of the invention. The data indicates the following:

The compressive strength of the geopolymer cementitious compositions of some embodiments of the invention continued to increase with time.

The early age (about 4-hour and about 24-hour) strength of the mixes increased with increase in calcium sulfate (landplaster) amount in the cementitious composition.

The early age 4-hour compressive strengths of the material were in excess of about 1500 psi with the use of calcium sulfate dihydrate in the form of fine-grained landplaster as a component of the geopolymer cementitious compositions of some embodiments of the invention. Moreover, the 4-hour compressive strengths of Mix 3 and Mix 4 containing calcium sulfate dihydrate in the form of fine-grained landplaster at higher amounts were above about 3000 psi.

The early age i.e. 24-hour compressive strengths of the material were in excess of about 3500 psi with the use of calcium sulfate in the form of fine-grained landplaster as a component of the investigated geopolymer cementitious compositions of some embodiments of the invention. Moreover, the 24-hour compressive strengths of Mix 3 and Mix 4 containing calcium sulfate (fine-grained landplaster) at higher amounts were above about 4500 psi.

The 28-day compressive strengths of all geopolymer cementitious compositions of some embodiments of the invention were very high and in excess of 5000 psi. The 28-day compressive strengths of Mixes 1 through 3 containing were about 6000 psi or greater.

Example 6

An objective of this investigation was to study the influence of incorporation of calcium sulfate dihydrate (fine-grained landplaster) at varying amounts in the geopolymer binder compositions of some embodiments of the invention.

TABLE 14 shows the raw material compositions of the geopolymer cementitious mixtures investigated in this Example. The amount of calcium sulfoaluminate cement used in the mixture compositions of this Example was equal to 40 wt % of the weight of fly ash. Calcium sulfate dihydrate (finely-grained landplaster) was added at different amount levels 125 wt %, 150 wt %, 175 wt %, and 200 wt % of the weight of calcium sulfoaluminate cement and 50, 60, 70 and 80 wt. % of the fly ash, in the various mixture compositions investigated. The water/cementitious materials ratio utilized in this example was kept constant at 0.25. QUIKRETE Commercial Grade Fine Sand No. 1961 and BASF CASTAMENT FS20 superplasticizer were also added.

TABLE 14

Compositions investigated in Example 6

| Raw Material | Mix 1 | Mix 2 | Mix 3 | Mix 4 |
|---|---|---|---|---|
| Fly Ash Class C (grams) | 1579 | 1500 | 1429 | 1364 |
| Calcium Sulfate Dihydrate (grams) | 790 | 900 | 1000 | 1091 |
| Calcium Sulfoaluminate Cement (grams) | 632 | 600 | 571 | 546 |
| Total Cementitious Materials (grams) | 3000 | 2250 | 3000 | 3000 |
| Sand (grams) | 2250 | 3150 | 2250.0 | 2250 |
| Potassium Citrate (grams) | 120 | 60 | 120 | 120 |
| Superplasticizer (grams) | 18 | 18 | 18 | 18 |
| Water (grams) | 750 | 750 | 750 | 750 |
| Water/Cementitious Materials Ratio | 0.25 | 0.25 | 0.25 | 0.25 |
| Sand/Cementitious Materials Ratio | 0.75 | 0.75 | 0.75 | 0.75 |
| Superplasticizer/Cementitious Materials, wt % | 0.6% | 0.6% | 0.6% | 0.6% |
| Potassium Citrate/Cementitious Materials, wt % | 4% | 4% | 4% | 4% |
| Calcium Sulfoaluminate Cement/Fly ash, wt % | 40% | 40% | 40% | 40% |
| Calcium Sulfate/Calcium Sulfoaluminate Cement, wt % | 125% | 150% | 175% | 200% |

Initial Flow Behavior, Slump, and Early Age Cracking Behavior of Material

TABLE 15 shows the initial flow behavior and slump characteristics of the geopolymer cementitious compositions of some embodiments of the invention comprising fly ash, calcium sulfoaluminate cement, calcium sulfate (fine-grained landplaster), and alkali metal citrate investigated in Example 6.

TABLE 15

Flow and Slump of Example 6

|  | Flow | Slump (inches) |
|---|---|---|
| Mix 1 | 8 | 8.75 |
| Mix 2 | 8 | 8.5 |
| Mix 3 | 8 | 9 |
| Mix 4 | 8 | 7 |

All mixture compositions investigated had good self-leveling, flow behavior and large patty diameter as observed in the slump test. The large slump and self-leveling behavior was obtainable even at a water/cementitious materials ratio as low as about 0.25.

The slump patties of this Example did not develop any cracking upon drying in contrast to the cementitious mixtures of comparative Example 4 containing no calcium sulfate dihydrate (landplaster). Thus, it can be concluded incorporation of calcium sulfate dihydrate (fine-grained landplaster) to the cementitious mixture comprising fly ash, calcium sulfoaluminate cement, and alkali metal citrate provides dimensionally stable geopolymer cementitious compositions possessing superior resistance to cracking upon drying.

Shrinkage Behavior

Figure 6A:
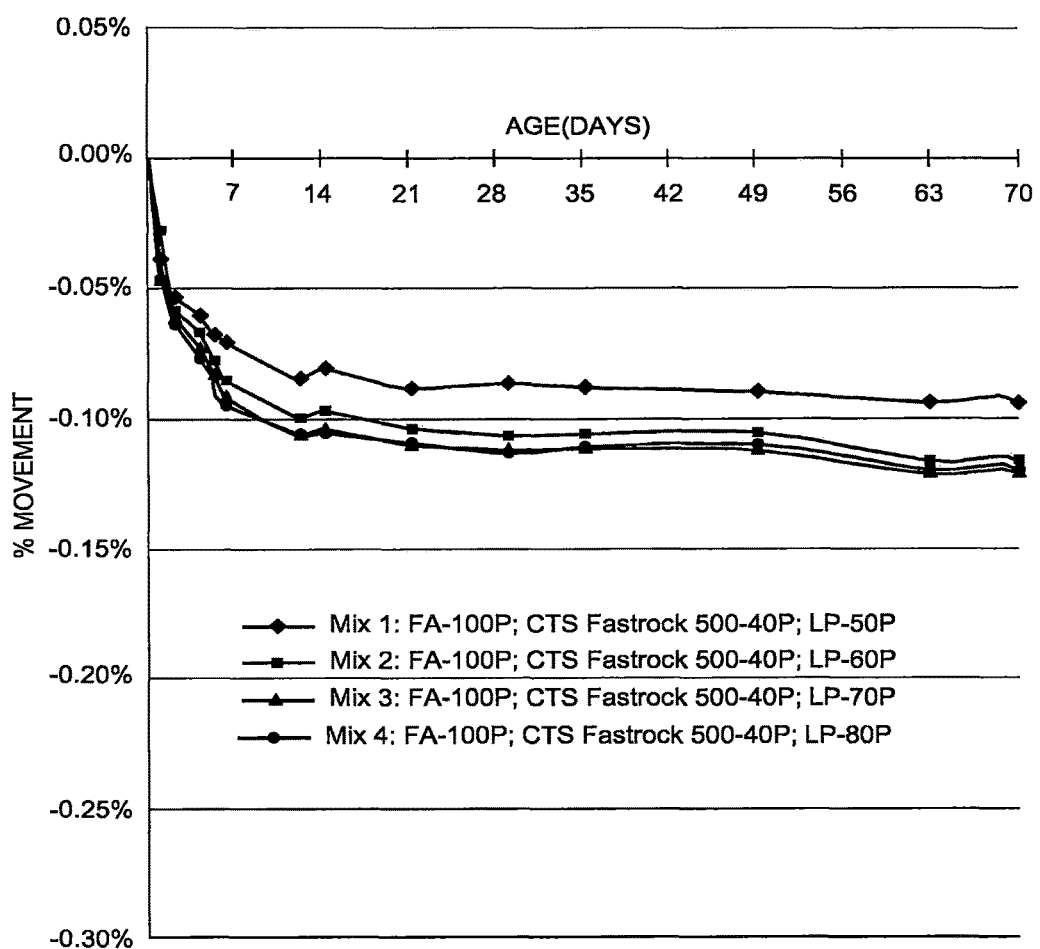
FIG. 6A is a graph of time of shrinkage of Example 6.

FIG. 6A shows shrinkage behavior of geopolymer cementitious compositions of some embodiments of the invention investigated in Example 6. The results from this Example show the synergetic influence of incorporation of calcium sulfoaluminate cement in combination with a fine-grained calcium sulfate dihydrate and an alkali metal citrate on shrinkage behavior of the developed geopolymer cementitious compositions of some embodiments of the invention.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following important conclusions can be drawn from this investigation and FIG. 6A:

The incorporation of calcium sulfate dihydrate in the form of fine-grained landplaster had a significant impact on improving the cracking resistance and dimensional stability of geopolymer cementitious compositions of some embodiments of the invention comprising fly ash, calcium sulfoaluminate cement and alkali metal citrate. Contrary to the shrinkage bars of comparative Example 4 (with no calcium sulfate) which cracked even before de-molding, the shrinkage bars of Example 6 comprising calcium sulfate dihydrate (fine-grained landplaster) were completely stable and did not result in any cracks either prior to or after de-molding.

The measured maximum shrinkage of the geopolymer cementitious compositions of some embodiments of the invention comprising fly ash, calcium sulfoaluminate cement, calcium sulfate dihydrate (fine-grained landplaster), and alkali metal citrate was significantly lower than that of the cementitious compositions comprising fly ash and alkali metal citrate only (Example 1). For example, the geopolymer cementitious compositions of some embodiments of the invention comprising fly ash, calcium sulfoaluminate cement, calcium sulfate dihydrate (fine-grained landplaster), and alkali metal citrate had a maximum shrinkage of about 0.09% to about 0.12% in comparison to a maximum shrinkage of about 0.75% for the mixture comprising fly ash and alkali metal citrate only (Example 1). Thus, addition of calcium sulfate dihydrate (fine-grained landplaster) to cementitious compositions comprising fly ash, calcium sulfoaluminate cement, and alkali metal citrate helps to significantly reduce the material shrinkage.

Increase in landplaster amount at levels used in this Example resulted in a slight increase in the maximum shrinkage of the material. It can be observed that at a landplaster amount of about 125 wt %, the material shrinkage was about 0.09%. Increase in landplaster amount to about 200 wt % resulted in increase in the material shrinkage to about 0.12%.

Heat Evolution and Slurry Temperature Rise Behavior

Figure 6B:
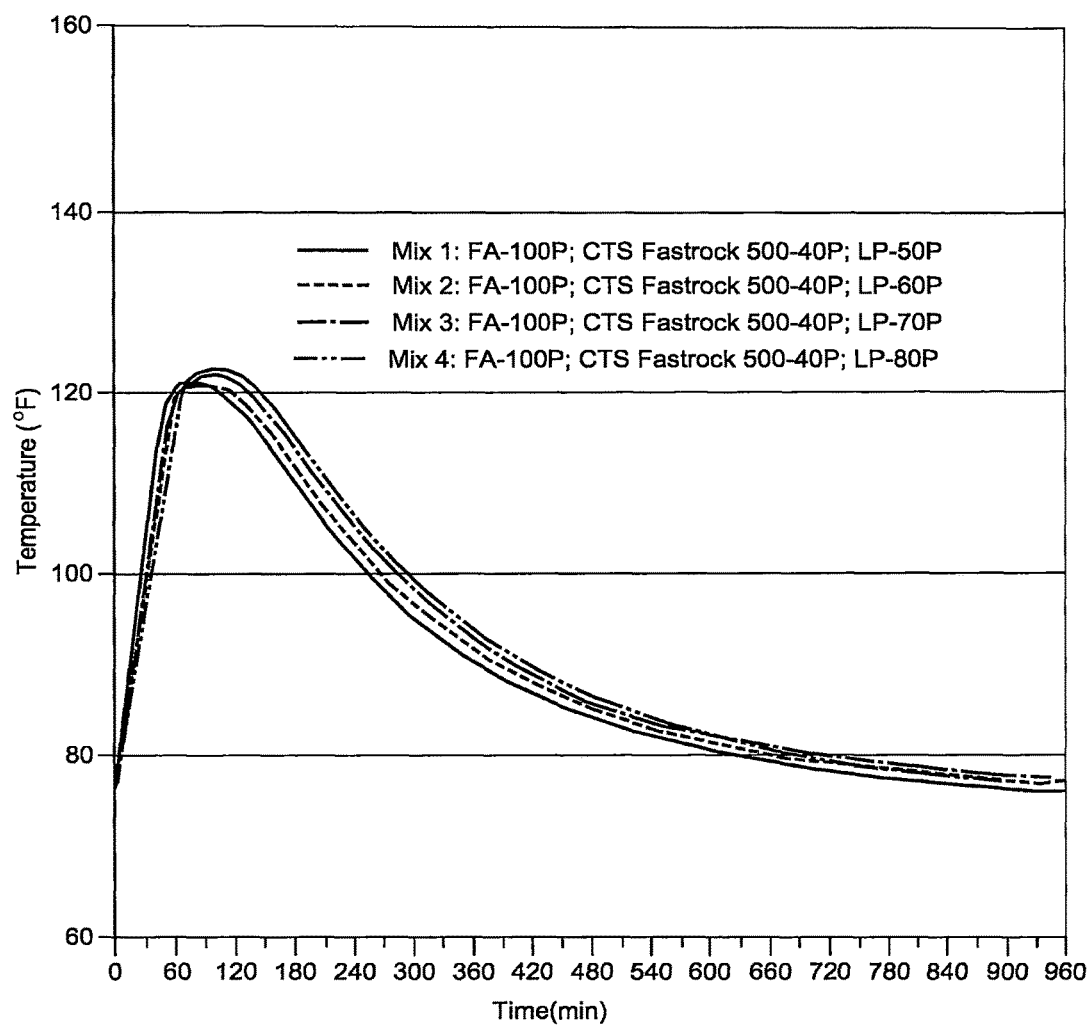
FIG. 6B is a graph of slurry temperature rise of composition of the invention in Example 6.

FIG. 6B shows the exothermic and slurry temperature rise behavior of geopolymer cementitious compositions of some embodiments of the invention investigated in Example 6. It can be observed that the cementitious compositions of Example 6 comprising fly ash, calcium sulfoaluminate cement, calcium sulfate dihydrate (fine-grained landplaster), and alkali metal citrate demonstrated only a very moderate temperature rise behavior.

A moderate heat evolution and low temperature rise within the material during the curing stage are effective to prevent excessive thermal expansion and consequent cracking and disruption of material. This aspect becomes even more beneficial when the material is utilized in a manner where large thicknesses of material pours are involved in the actual field applications. The geopolymer cementitious compositions of some embodiments of the invention investigated in this Example are disclosed to be highly beneficial in this particular aspect as they would lead to a lower thermal expansion and enhanced resistance to thermal cracking in actual field applications.

Time of Setting

TABLE 16 shows the time of setting of geopolymer cementitious compositions of some embodiments of the invention investigated in Example 6 comprising fly ash, calcium sulfoaluminate cement, calcium sulfate dihydrate (fine-grained landplaster), and alkali metal citrate.

TABLE 16

Setting Times of Example 6

|  | Initial Setting Time (hr:min) | Final Setting Time (hr:min) |
|---|---|---|
| Mix 1 | 00:29 | 00:36 |
| Mix 2 | 00:31 | 00:38 |
| Mix 3 | 00:33 | 00:40 |
| Mix 4 | 00:30 | 00:40 |

All cementitious compositions investigated in this Example showed final setting times ranging of about 35 to about 45 minutes. In contrast, the comparative cementitious composition comprising fly ash and alkali metal citrate of Example 1 had a very rapid time of final setting of about 15 minutes.

Compressive Strength

TABLE 17 shows the early age and ultimate compressive strength behavior of the developed geopolymer cementitious compositions of some embodiments of the invention comprising fly ash, calcium sulfoaluminate cement, calcium sulfate dihydrate (fine-grained landplaster), and alkali metal citrate of Example 6.

TABLE 17

Compressive Strength of Example 6 - (psi)

|  | 4 hour | 24 hour | 7 day | 28 day |
|---|---|---|---|---|
| Mix 1 | 3149 | 4843 | 5691 | 6090 |
| Mix 2 | 3410 | 4667 | 5967 | 6546 |
| Mix 3 | 3324 | 4504 | 5610 | 6482 |
| Mix 4 | 2797 | 4280 | 5662 | 5108 |

The following observations can be drawn from this study:

The compressive strength of the geopolymer cementitious compositions of some embodiments of the invention investigated in this Example continued to increase with time.

The early age i.e. 4-hour compressive strengths of the material were in excess of about 2500 psi with the use of calcium sulfate in the form of fine-grained landplaster as a component of the investigated geopolymer cementitious compositions of some embodiments of the invention. Moreover, the 4-hour compressive strengths of Mixes 1 through 3 were above about 3000 psi.

The early age 24-hour compressive strengths of the material were in excess of 4000 psi with the use of calcium sulfate in the form of fine-grained landplaster as a component of the investigated geopolymer cementitious compositions of some embodiments of the invention.

The 28-day compressive strengths of the geopolymer cementitious compositions of some embodiments of the invention investigated in this Example were very high and in excess of 5000 psi. The 28-day compressive strengths of Mixes 1 through 3 containing calcium sulfate in the form of fine-grained landplaster were above 6000 psi.

Example 7

An objective of this investigation was to study the influence of incorporation of calcium sulfate dihydrate (fine-grained landplaster) at varying amounts in the geopolymer binder compositions of some embodiments of the invention.

This Example compares comparative Mix 1 without calcium sulfate dihydrate and Mixes 2, 3 and 4 comprising calcium sulfoaluminate cement and a fine-grained calcium sulfate dihydrate.

This Example compares comparative Mix 1 without calcium sulfate dihydrate and Mixes 2, 3 and 4 comprising calcium sulfoaluminate cement and a fine-grained calcium sulfate dihydrate.

TABLE 18 shows the raw material compositions of the geopolymer cementitious mixtures investigated in this Example. The amount of calcium sulfoaluminate cement used in the mixture compositions of this Example was equal to 80 wt % of the weight of fly ash. Calcium sulfate dihydrate (fine-grained landplaster) was added at the following amount levels in the mixture compositions investigated—0 wt %, 10 wt %, 20 wt % and 30 wt % of the weight of calcium sulfoaluminate cement, which is 0, 8, 16 and 24 wt. % of the fly ash. The water/cementitious materials ratio utilized in this example was kept constant at 0.30. QUIKRETE Commercial Grade Fine Sand No. 1961 and BASF CASTAMENT FS20 superplasticizer were also added.

TABLE 18

Example 7 Compositions

| Raw Material | Mix 1 Comparative | Mix 2 | Mix 3 | Mix 4 |
|---|---|---|---|---|
| Fly Ash Class C (grams) | 1667 | 1596 | 1532 | 1472 |
| Calcium Sulfate Dihydrate (grams) | 0.0 | 128 | 245 | 353 |
| Calcium Sulfoaluminate Cement (grams) | 1333 | 1277 | 1225 | 1177 |
| Total Cementitious Materials (grams) | 3000 | 3000 | 3000 | 3000 |
| Sand (grams) | 3150 | 3150 | 3150 | 3150 |
| Sodium Citrate Dihydrate (grams) | 60 | 60 | 60 | 60 |
| Superplasticizer (grams) | 15 | 15 | 15 | 15 |
| Water (grams) | 900 | 900 | 900 | 900 |
| Water/Cementitious Materials Ratio | 0.3 | 0.3 | 0.3 | 0.3 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2.0% | 2.0% | 2.0% | 2.0% |
| Calcium Sulfoaluminate cement/Fly ash, wt % | 80% | 80% | 80% | 80% |
| Calcium Sulfate/Calcium Sulfoaluminate Cement, wt % | 0% | 10% | 20% | 30% |

Initial Flow Behavior, Slump, and Early Age Cracking Behavior of Material

TABLE 19 shows the initial flow behavior and slump characteristics of the geopolymer cementitious compositions of some embodiments of the invention comprising fly ash, calcium sulfoaluminate cement, calcium sulfate dihydrate (fine-grained landplaster), and alkali metal citrate investigated in Example 7.

TABLE 19

Flow and Slump of Example 7

| Mix 1 | | Mix 2 | | Mix 3 | | Mix 4 | |
|---|---|---|---|---|---|---|---|
| Flow | Slump (inches) | Flow | Slump (inches) | Flow | Slump (in.) | Flow | Slump (in.) |
| 9 | 10 | 9 | 9 | 8 | 8.75 | 7 | 8 |

All mixture compositions investigated had good flow behavior and large patty diameter as observed in the slump test. The large slump and self-leveling behavior was obtainable even at a water/cementitious materials ratio as low as about 0.3.

Figure 7A:
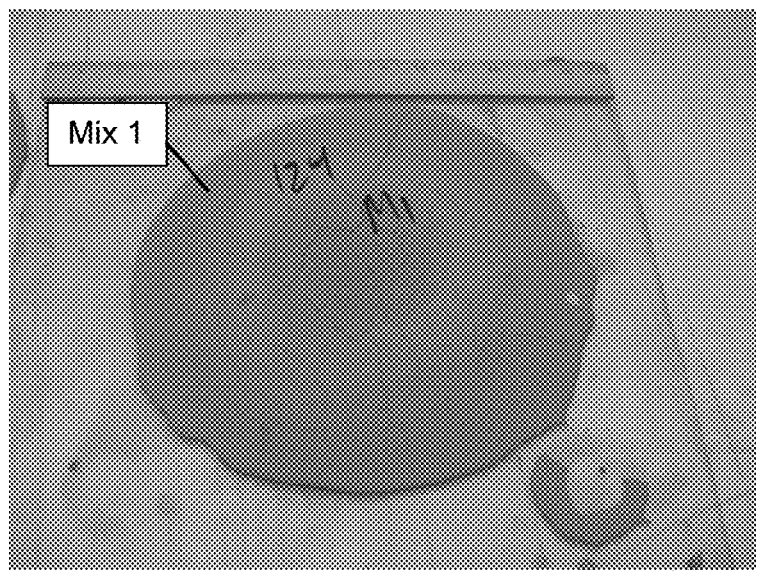
FIG. 7A is a photograph of slump patties of Mix 1 of the compositions of Example 7.
Figure 7B:
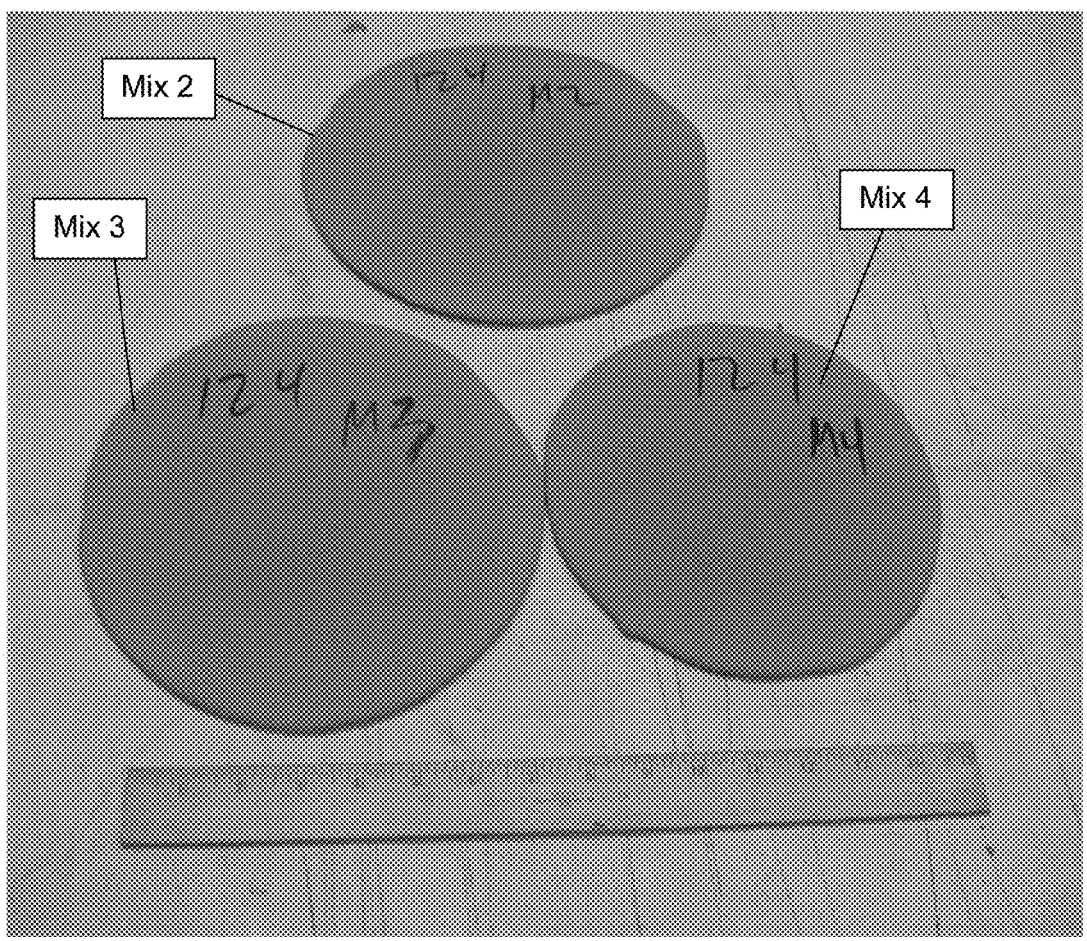
FIG. 7B is a photograph of slump patties of Mixes 2, 3 and 4 the compositions of Example 7.

FIG. 7A shows the slump patty of comparative Mix 1 of Example 7 which did not contain any calcium sulfate dihydrate (fine-grained landplaster) developed significant cracking upon drying. FIG. 7B shows slump patties of Mixes 2, 3 and 4 of the geopolymer cementitious compositions of some embodiments of the invention of Example 7 were in excellent condition and did not develop any cracking.

Shrinkage Behavior

Figure 7C:
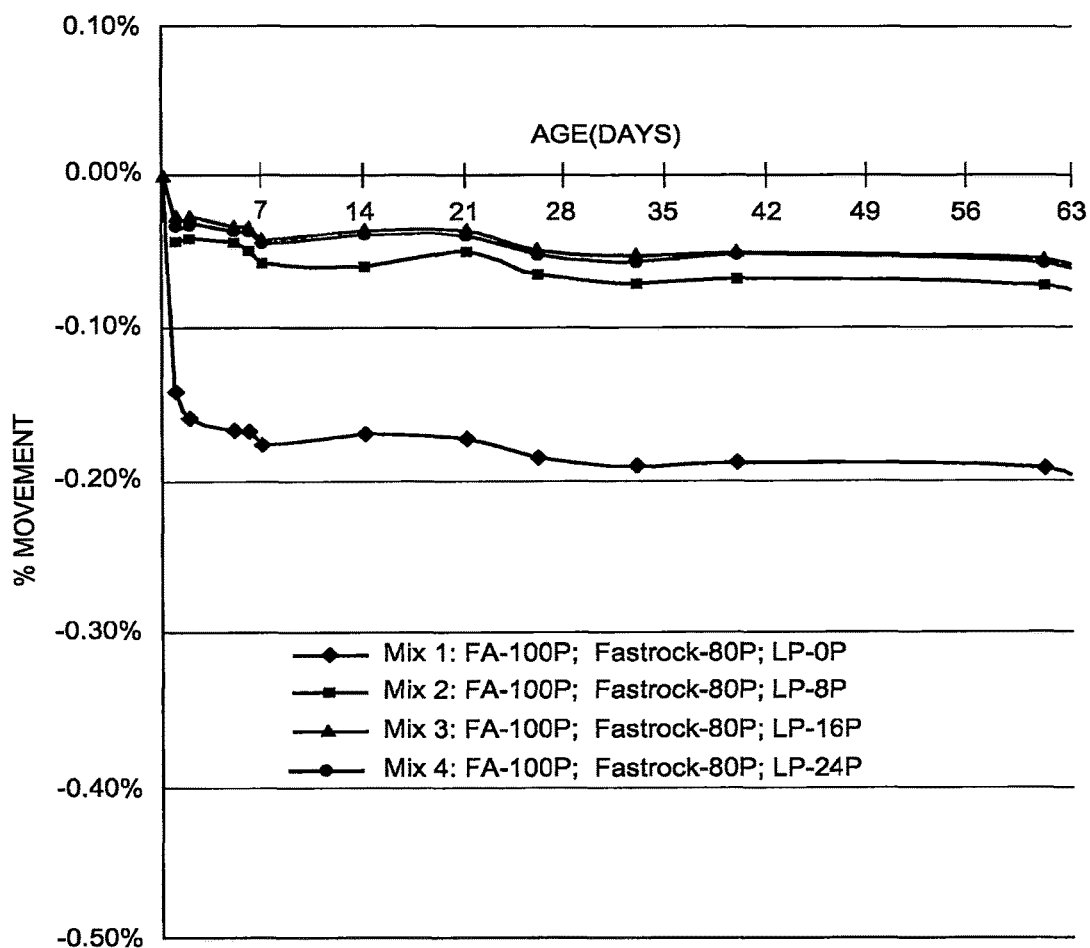
FIG. 7C is a graph of shrinkage of compositions of the invention in Example 7.

FIG. 7C shows data for shrinkage behavior of geopolymer cementitious compositions of some embodiments of the invention investigated in this Example.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

This investigation showed the following:

Contrary to the shrinkage bars of comparative Example 4 (with no calcium sulfate) which cracked even before de-molding, the shrinkage bars of Example 7 comprising calcium sulfate (fine-grained landplaster) were completely stable and did not result in any cracks prior to or after de-molding.

The geopolymer cementitious compositions of some embodiments of the invention comprising fly ash, calcium sulfoaluminate cement, calcium sulfate dihydrate (fine-grained landplaster), and alkali metal citrate had a maximum shrinkage was less than about 0.07% in comparison to a maximum shrinkage of about 0.75% for the comparative mixture composition containing fly ash and alkali metal citrate only (Example 1).

The measured maximum shrinkage of the geopolymer cementitious compositions of some embodiments of the invention comprising fly ash, calcium sulfoaluminate cement, calcium sulfate dihydrate (fine-grained landplaster), and alkali metal citrate (Mixes 2, 3 and 4) had a maximum shrinkage of less than about 0.07% as compared to the measured maximum shrinkage of about 0.19% of the comparative composition comprising fly ash, calcium sulfoaluminate cement and alkali metal citrate only (Mix 1).

Heat Evolution and Slurry Temperature Rise Behavior

Figure 7D:
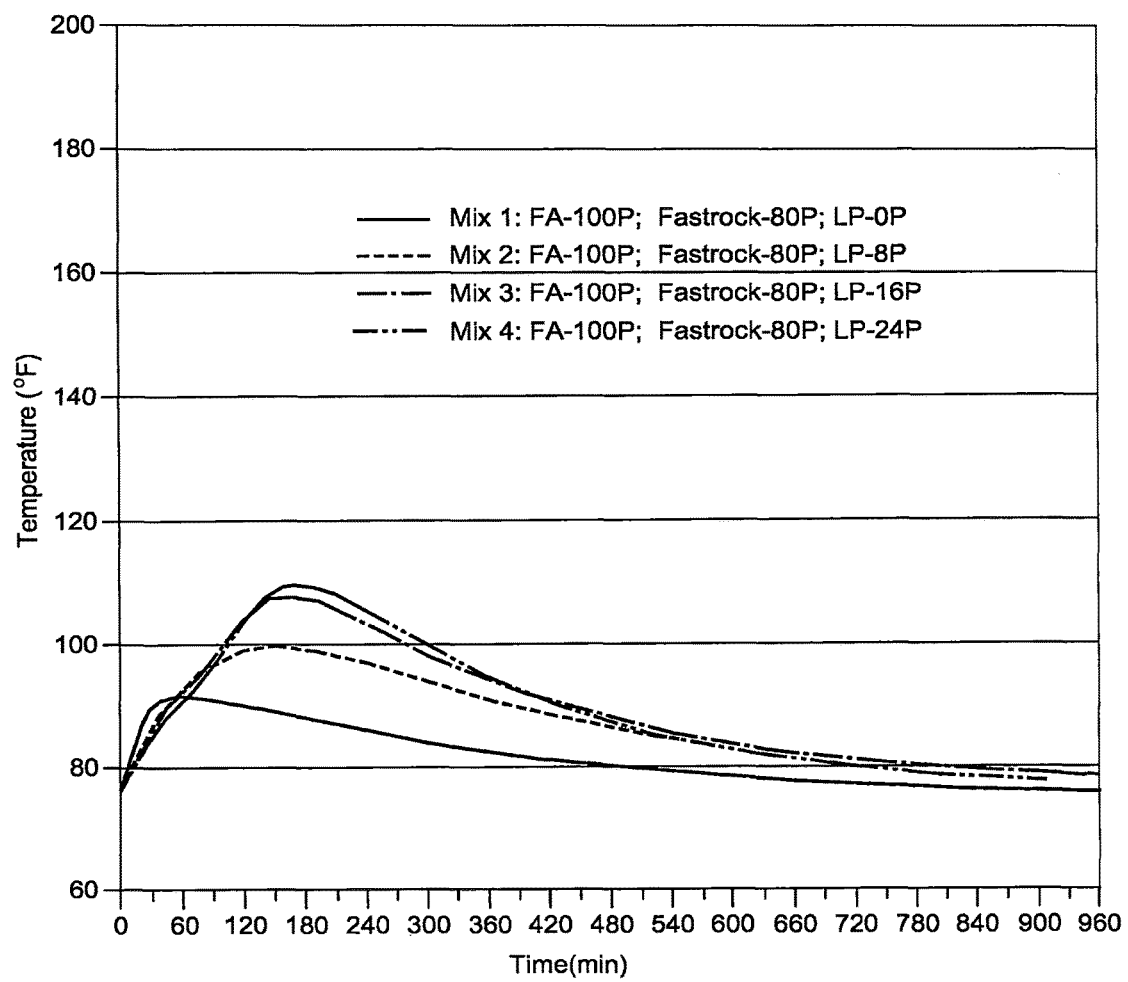
FIG. 7D is a graph of slurry temperature rise of compositions of the invention of Example 7.

FIG. 7D shows the exothermic and slurry temperature rise behavior of geopolymer cementitious compositions of some embodiments of the invention investigated in Example 7. The cementitious compositions of this Example comprising fly ash, calcium sulfoaluminate cement, calcium sulfate dihydrate (fine-grained landplaster), and alkali metal citrate demonstrated a moderate temperature rise behavior. A moderate heat evolution and low temperature rise within the material during the curing stage are effective to prevent excessive thermal expansion and consequent cracking and disruption of material. This aspect becomes even more beneficial when the material is utilized in a manner where large thicknesses of material pours are involved in the actual field applications. The geopolymer cementitious compositions of some embodiments of the invention investigated in this Example are disclosed to be highly beneficial in this particular aspect as they would lead to a lower thermal expansion and enhanced resistance to thermal cracking in actual field applications.

Time of Setting

TABLE 20 shows the time of setting of geopolymer cementitious compositions comparative Mix 1 and inventive Mixes 2, 3 and 4 of Example 7.

TABLE 20

Setting Times of Example 7

| | Initial Setting Time (hr:min) | Final Setting Time (hr:min) |
|---|---|---|
| Mix 1 | 00:25 | 1:05 |
| Mix 2 | 00:26 | 1:06 |
| Mix 3 | 00:43 | 1:15 |
| Mix 4 | 00:46 | 1:20 |

All the cementitious compositions demonstrated very rapid setting behavior. However, Mixes 2, 3 and 4 of the present invention comprising fly ash, calcium sulfoaluminate cement, calcium sulfate dihydrate (fine-grained landplaster), and alkali metal citrate had a relatively longer setting time than the comparative cementitious compositions comprising fly ash and alkali metal citrate only (Example 1). The final setting times of the geopolymer cementitious composition Mixes 2, 3 and 4 of some embodiments of the invention comprising fly ash, calcium sulfoaluminate cement, landplaster, and sodium citrate were about 60 to about 90 minutes compared to an extremely rapid final setting time of about 15 minutes for the comparative mixture composition containing fly ash and sodium citrate only (Example 1).

Compressive Strength

TABLE 21 show the compressive strength behavior of the developed geopolymer cementitious compositions of some embodiments of the invention comprising fly ash, calcium sulfoaluminate cement, calcium sulfate dihydrate (fine-grained landplaster), and alkali metal citrate investigated in Example 7.

TABLE 21

Compressive Strength of Example 7 - (psi)

| | 4 hour | 24 hour | 7 day | 28 day |
|---|---|---|---|---|
| Mix 1 | 217 | 489 | 1461 | 4300 |
| Mix 2 | 597 | 1848 | 3408 | 5976 |
| Mix 3 | 1194 | 2570 | 4481 | 5498 |
| Mix 4 | 1546 | 2961 | 4044 | 6504 |

The following observations can be drawn:

The compressive strength of the geopolymer cementitious compositions of some embodiments of the invention investigated in this Example continued to increase with time.

Both the early age compressive strength and the ultimate compressive strength of the comparative mixture composition without calcium sulfate (Mix 1) were lower in comparison to those for the cementitious compositions of some embodiments of the invention comprising landplaster (Mixes 2 through 4).

The early age (4-hour and 24-hour) compressive strength of the geopolymer cementitious compositions of some embodiments of the invention increased with increase in the amount of calcium sulfate dihydrate (fine-grained landplaster) in the material.

The early age 24-hour compressive strength of the material was in excess of about 1500 psi with the use of calcium sulfate dihydrate (fine-grained landplaster) as a component of the geopolymer cementitious compositions of some embodiments of the invention. The 24-hour compressive strengths of the Mixes 3 and 4 were in excess of about 2500 psi.

The 28-day compressive strength of all geopolymer cementitious compositions of some embodiments of the invention comprising fly ash, calcium sulfoaluminate, landplaster and sodium citrate was very high and in excess of about 5000 psi. The 28-day compressive strength of Mix 4 comprising landplaster at an amount of about 30 wt % (of the weight of calcium sulfoaluminate cement) was in excess of about 6000 psi.

Example 8

An objective of this investigation was to study the influence of incorporation of calcium sulfate dihydrate (fine-grained landplaster) at varying amounts in the geopolymer binder compositions of some embodiments of the invention.

This Example depicts physical properties of the developed geopolymer cementitious compositions of some embodiments of the invention comprising fly ash, calcium sulfoaluminate cement, fine-grained calcium sulfate dihydrate (i.e., gypsum or landplaster) and alkali metal citrate. TABLES 22 shows the raw material compositions of the geopolymer cementitious mixtures investigated in this example. The amount of calcium sulfoaluminate cement used in the mixture compositions of this Example was equal to about 80 wt % of the weight of fly ash. Landplaster was added at the following amounts in the mixture compositions investigated—40 wt %, 50 wt %, 60 wt % and 80 wt % of the weight of calcium sulfoaluminate cement, which is 32, 40, 48 and 64 wt % of the fly ash. The water/cementitious materials ratio utilized in this example was kept constant at 0.30. QUIKRETE Commercial Grade Fine Sand No. 1961 and BASF CASTAMENT FS20 superplasticizer were added.

TABLE 22

| Geopolymer compositions of Example 8 | | | | |
|---|---|---|---|---|
| Raw Material | Mix 1 | Mix 2 | Mix 3 | Mix 4 |
| Fly Ash Class C (grams) | 1415 | 1364 | 1316 | 1230 |
| Calcium Sulfate Dihydrate (grams) | 453 | 546 | 632 | 787 |
| Calcium Sulfoaluminate Cement (grams) | 1132 | 1091 | 1053 | 984 |
| Total Cementitious Materials (grams) | 3000 | 3000 | 3000 | 3000 |
| Sand (grams) | 3150 | 3150 | 3150 | 3150 |
| Sodium Citrate Dihydrate (grams) | 60 | 60 | 60 | 60 |
| Superplasticizer (grams) | 15 | 15 | 15 | 15 |
| Water (grams) | 900 | 900 | 900 | 900 |
| Water/Cementitious Materials Ratio | 0.3 | 0.3 | 0.3 | 0.3 |
| Sand/Cementitious Materials Ratio | 1.05 | 1.05 | 1.05 | 1.05 |

TABLE 22-continued

| Geopolymer compositions of Example 8 | | | | |
|---|---|---|---|---|
| Raw Material | Mix 1 | Mix 2 | Mix 3 | Mix 4 |
| Superplasticizer/Cementitious Materials, wt % | 0.5% | 0.5% | 0.5% | 0.5% |
| Sodium Citrate/Cementitious Materials, wt % | 2.0% | 2.0% | 2.0% | 2.0% |
| Calcium Sulfoaluminate cement/Fly ash, wt % | 80% | 80% | 80% | 80% |
| Calcium Sulfate/Calcium Sulfoaluminate Cement, wt % | 40% | 50% | 60% | 80% |

Initial Flow Behavior, Slump, and Early Age Cracking Behavior of Material

TABLE 23 shows the initial flow behavior and slump characteristics of the geopolymer cementitious compositions of some embodiments of the invention comprising fly ash, calcium sulfoaluminate cement, calcium sulfate dihydrate (fine-grained landplaster), and alkali metal citrate investigated in Example 8.

TABLE 23

| Flow and Slump of Example 8 | | |
|---|---|---|
| | Flow | Slump (inches) |
| Mix 1 | 8 | 8.5 |
| Mix 2 | 8 | 8.5 |
| Mix 3 | 8 | 8 |
| Mix 4 | 8 | 8 |

All mixture compositions investigated had good self-leveling, flow behavior and large patty diameter as observed in the slump test. It is particularly noteworthy that such large slump and self-leveling behavior was obtainable even at a water/cementitious materials ratio as low as about 0.3.

The slump patties for all four mixes comprising calcium sulfate dihydrate (fine-grained landplaster) were in excellent condition and developed no cracking.

Shrinkage Behavior

Figure 8A:
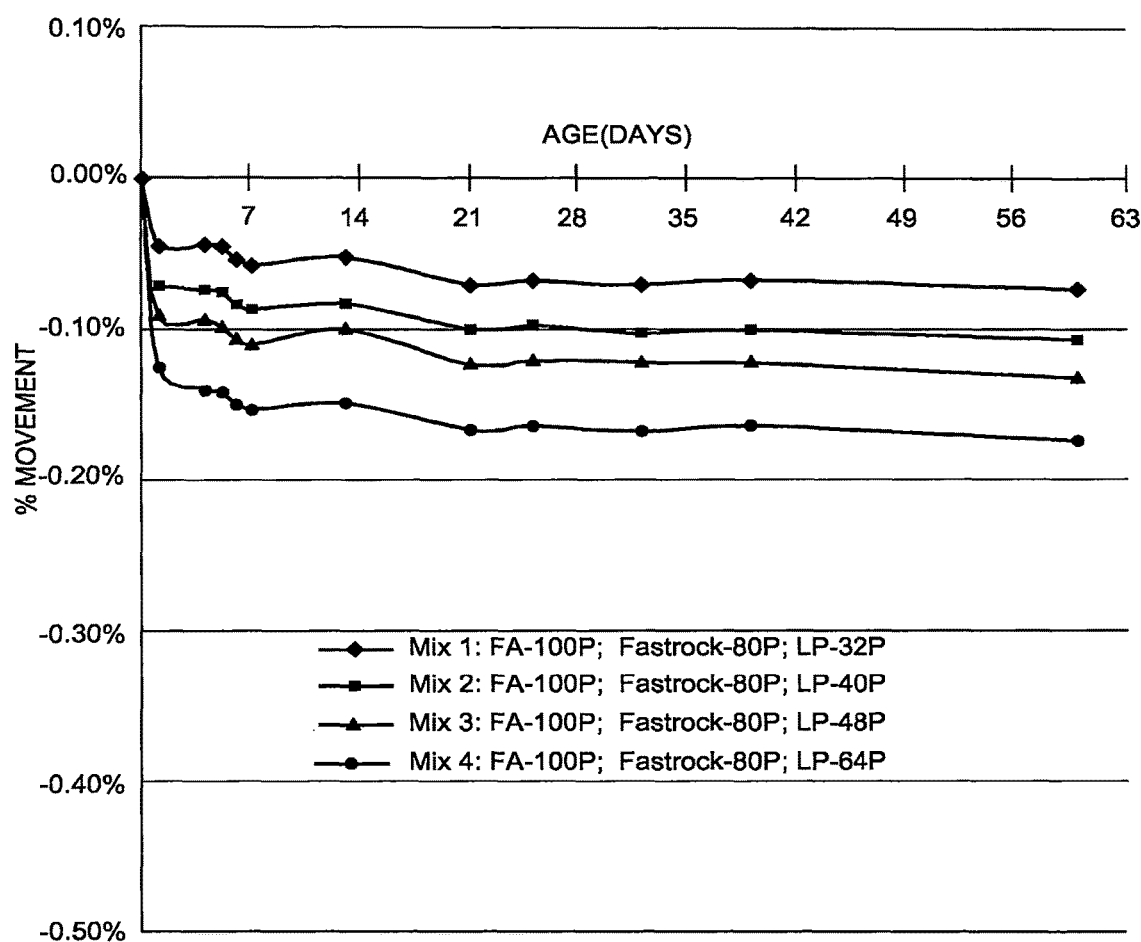
FIG. 8A is a graph of shrinkage of compositions of the invention in Example 8.

FIG. 8A shows shrinkage behavior of the geopolymer cementitious compositions of some embodiments of the invention investigated in Example 8. The shrinkage measurements were initiated at an age of about 4-hours from the time the raw materials were mixed together to form an aqueous slurry. The material shrinkage was measured for a total duration of about 8-weeks while curing the material at about 75° F./50% Relative Humidity (RH).

The following important conclusions can be drawn from this investigation and FIG. 8A:

Contrary to the shrinkage bars of comparative Example 4 (with no calcium sulfate) which cracked even before de-molding, the shrinkage bars of Example 8 comprising calcium sulfate dihydrate (fine-grained landplaster) were completely stable and did not result in any cracks either prior to or after de-molding.

The geopolymer cementitious compositions of some embodiments of the invention comprising fly ash, calcium sulfoaluminate cement, calcium sulfate dihydrate (fine-grained landplaster), and alkali metal citrate had a maximum shrinkage of about 0.07% to about 0.18% in comparison to a maximum shrinkage of about 0.75% for the comparative mixture composition containing fly ash and alkali metal citrate only (Example 1).

Increase in calcium sulfate dihydrate (fine-grained landplaster) amount beyond a certain level had an effect of increasing the material shrinkage. For instance, at a landplaster amount of about 40 wt % (Mix 1), the total shrinkage was about 0.07%, at a landplaster amount of about 60 wt % (Mix 3), the total shrinkage had increased to a value of about 0.13%, and at a landplaster amount of about 80 wt % (Mix 4), the total shrinkage had increased further to a value of about 0.18%.

Comparing the shrinkage testing results from Example 7 and Example 8, there is a preferred calcium sulfate dihydrate (fine-grained landplaster) amount range that provides minimal material shrinkage. This amount range of calcium sulfate dihydrate (fine-grained landplaster) appears to be about 10 to about 50 wt. % of the weight of calcium sulfoaluminate cement for the investigated cementitious compositions in these examples.

Heat Evolution and Slurry Temperature Rise Behavior

Figure 8B:
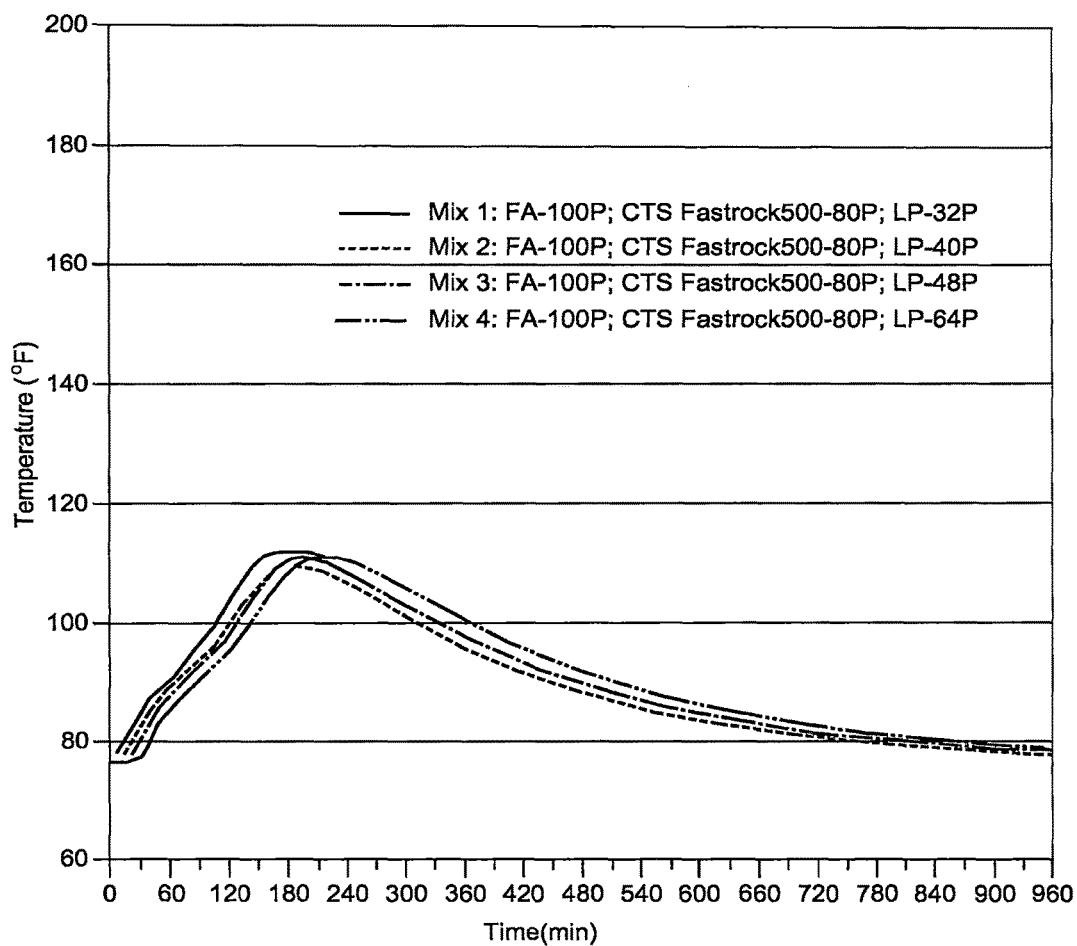
FIG. 8B is a graph of slurry temperature rise of compositions of the invention of Example 8.

FIG. 8B shows the exothermic and slurry temperature rise behavior of geopolymer cementitious compositions of some embodiments of the invention investigated in Example 8. The cementitious compositions of this Example comprising fly ash, calcium sulfoaluminate cement, calcium sulfate dihydrate (fine-grained landplaster), and alkali metal citrate demonstrated only a very moderate temperature rise behavior. This prevents excessive thermal expansion and consequent cracking and disruption of material. This aspect becomes even more beneficial when the material is utilized in a manner where large thicknesses of material pours are involved in the actual field applications. The geopolymer cementitious compositions of some embodiments of the invention investigated in this Example are disclosed to be highly beneficial in this particular aspect as they would lead to a lower thermal expansion and enhanced resistance to thermal cracking in actual field applications.

Time of Setting

TABLE 24 shows the time of setting of geopolymer cementitious compositions of some embodiments of the invention investigated in Example 8.

TABLE 24

Setting Times of Example 7

| | Initial Setting Time (hr:min) | Final Setting Time (hr:min) |
| --- | --- | --- |
| Mix 1 | 00:44 | 1:18 |
| Mix 2 | 00:45 | 1:22 |
| Mix 3 | 00:52 | 1:22 |
| Mix 4 | 1:02 | 1:34 |

All cementitious compositions investigated in this Example demonstrated very rapid setting behavior. Also, the final setting times of the geopolymer cementitious compositions of some embodiments of the invention of this Example comprising fly ash, calcium sulfoaluminate cement, calcium sulfate dihydrate (landplaster), and sodium citrate were about 60 to about 90 minutes compared to an extremely rapid final setting time of about 15 minutes for the comparative mixture composition containing fly ash and sodium citrate only (Example 1).

Compressive Strength

TABLE 25 shows the compressive strength behavior of the developed geopolymer cementitious compositions of some embodiments of the invention comprising fly ash, calcium sulfoaluminate cement, calcium sulfate dihydrate (fine-grained landplaster), and alkali metal citrate investigated in Example 8.

TABLE 25

Compressve Strength of Example 8 (psi)

| | 4 hour | 24 hour | 7 day | 28 day |
| --- | --- | --- | --- | --- |
| Mix 1 | 1619 | 4118 | 4561 | 6892 |
| Mix 2 | 1776 | 4336 | 4603 | 6148 |
| Mix 3 | 1752 | 4417 | 5132 | 7099 |
| Mix 4 | 1458 | 3277 | 3714 | 4678 |

The example studied the influence of incorporation of calcium sulfoaluminate cement in combination with calcium sulfate (fine-grained landplaster) and an alkali metal citrate on both the early age and ultimate compressive strength behavior of the developed geopolymer cementitious compositions of some embodiments of the invention. The following observations can be drawn from this study:

The compressive strength of the geopolymer cementitious compositions of some embodiments of the invention investigated in this Example continued to increase with time.

Both the early age compressive strength and the ultimate compressive strength of the mixture composition without calcium sulfate (Mix 1 of Example 7) were lower in comparison to those for the cementitious compositions of some embodiments of the invention comprising calcium sulfate (fine-grained landplaster) (Mixes 1 through 4).

Comparing the testing results for Example 7 and Example 8, it can be observed that the early age (4-hour and 24-hour) compressive strength of the geopolymer cementitious compositions of some embodiments of the invention increased with increase in the amount of calcium sulfate (fine-grained landplaster) in the material.

The early age (4-hour and 24-hour) compressive strengths of geopolymer cementitious compositions of some embodiments of the invention at high amounts of calcium sulfate (fine-grained landplaster) were very high. The mixture compositions comprising calcium sulfate (fine-grained landplaster) at amount levels equal to about 40 wt %, about 50 wt % and about 60 wt %, had respective about 4-hour compressive strengths in excess of about 1500 psi and the respective about 24-hour compressive strength were in excess of about 4000 psi.

The early age 4-hour and 24-hour compressive strength show some embodiments of the invention are capable of developing significantly greater early age compressive strengths when compared to the 4 hour and 24 hour compressive strength of about 500 psi and 2000 psi shown in comparative examples 2 and 3.

The 28-day compressive strengths of all geopolymer cementitious compositions of some embodiments of the invention comprising fly ash, calcium sulfoaluminate, calcium sulfate dihydrate (landplaster) and sodium citrate were very high and in excess of about 4500 psi. The cementitious compositions of some embodiments of the invention comprising calcium sulfate dihydrate (fine-grained landplaster) at amount levels equal to about 40 wt %, about 50 wt % and about 60 wt %, had respective 28-day compressive strength in excess of about 6000 psi.

Example 9

An objective of this investigation was to study the influence of incorporation of calcium sulfate dihydrate (fine-grained landplaster) at varying amounts in the geopolymer binder compositions of some embodiments of the invention.

TABLE 26 shows the raw material compositions of the geopolymer cementitious mixtures investigated in this example.

The amount of calcium sulfoaluminate cement used in the mixture compositions of this Example was equal to 80 wt % of the weight of fly ash. Calcium sulfate dihydrate in the form of fine-grained landplaster was added at the following amount levels in the mixture compositions investigated—0 wt %, 10 wt %, 20 wt % and 30 wt % of the weight of calcium sulfoaluminate cement, which is 0, 8, 16 and 24 wt. % of the fly ash. The water to cementitious materials ratio utilized in this example was kept constant at 0.25.

TABLE 26

Compositions investigated in Example 9

| Raw Material | Comparative Mix #1 | Mix 2 | Mix 3 | Mix 4 |
|---|---|---|---|---|
| Fly Ash Class C (grams) | 1667 | 1596 | 1531 | 1471 |
| Calcium Sulfate Dihydrate (grams) | 0 | 128 | 245 | 353 |
| Calcium Sulfoaluminate Cement (grams) | 1333 | 1277 | 1225 | 1177 |
| Total Cementitious Materials (grams) | 3000 | 3000 | 3000 | 3000 |
| Sand (grams) | 3150 | 3150 | 3150 | 3150 |
| Sodium Citrate Dihydrate | 60 | 60 | 60 | 60 |
| Superplasticizer (grams) | 15 | 15 | 15 | 15 |
| Water (grams) | 750 | 750 | 750 | 750 |
| Water/Cementitious Materials Ratio | 0.25 | 0.25 | 0.25 | 0.25 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2% | 2% | 2% | 2% |
| Calcium Sulfoaluminate cement/Fly ash, wt % | 80% | 80% | 80% | 80% |
| Calcium Sulfate/Calcium Sulfoaluminate Cement, wt % | 0% | 10% | 20% | 30% |

Slump and Early Age Cracking Behavior of Material

TABLE 27 shows the initial flow behavior and slump characteristics of the geopolymer cementitious compositions of some embodiments of the invention comprising fly ash, calcium sulfoaluminate cement, calcium sulfate dihydrate (fine-grained landplaster), and alkali metal citrate investigated in Example 9.

TABLE 27

Flow and Slump of Example 9

| | Flow | Slump (inches) |
|---|---|---|
| Mix 1 | 7 | 9 |
| Mix 2 | 6 | 7 |
| Mix 3 | 5 | 6.5 |
| Mix 4 | 5 | 6 |

All mixture compositions investigated had good rheology and slump behavior as observed in the slump test. It is particularly noteworthy that such good rheology and slump behavior was obtainable even at a water/cementitious materials ratio as low as about 0.25.

All mixes containing calcium sulfate dihydrate (fine-grained landplaster) were in excellent condition and did not develop any cracking.

Shrinkage Behavior

Figure 9A:
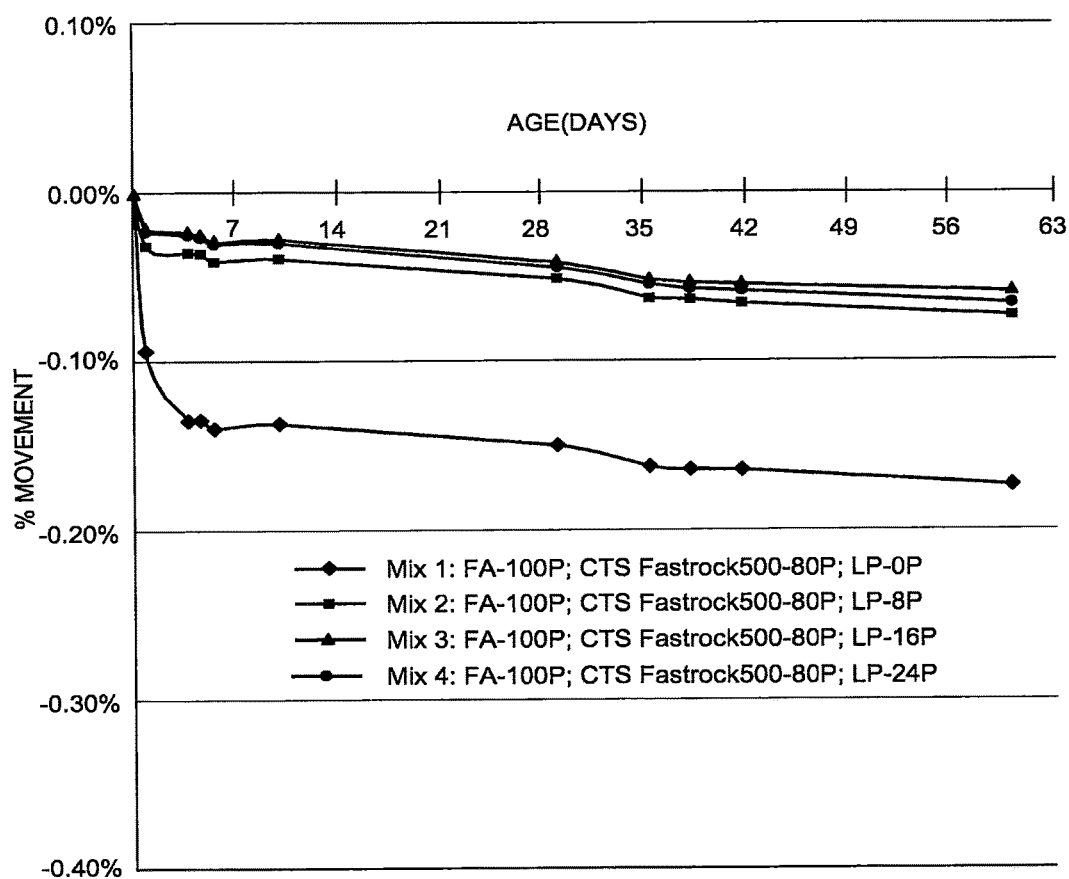
FIG. 9A is a graph of shrinkage of compositions of the invention in Example 9.

FIG. 9A shows shrinkage behavior of geopolymer cementitious compositions of some embodiments of the invention investigated in Example 9. The main objective of this investigation was to study the influence of incorporation of calcium sulfoaluminate cement in combination with a fine-grained calcium sulfate dihydrate (landplaster) and an alkali metal citrate on shrinkage behavior of the developed geopolymer cementitious compositions of some embodiments of the invention.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following conclusions can be drawn from this investigation and FIG. 9A:

Contrary to the shrinkage bars of comparative Example 4 (with no calcium sulfate) which cracked before de-molding, the shrinkage bars of Example 9 comprising calcium sulfate dihydrate (fine-grained landplaster) were stable and did not crack, either prior to or after de-molding.

The geopolymer cementitious compositions of some embodiments of the invention (Example 9) comprising fly ash, calcium sulfoaluminate cement, calcium sulfate dihydrate (fine-grained landplaster), and alkali metal citrate had a maximum shrinkage less than about 0.07% in comparison to a maximum shrinkage of about 0.75% for the comparative mixture composition containing fly ash and alkali metal citrate only (Example 1).

The mixture compositions comprising fly ash, calcium sulfoaluminate cement, calcium sulfate (fine-grained landplaster), and alkali metal citrate (Mixes 2, 3 and 4) had a maximum shrinkage of less than about 0.07%, while the maximum shrinkage of comparative Mix 1 comprising fly ash, calcium sulfoaluminate cement, alkali metal citrate but no calcium sulfate (landplaster) was very high at about 0.17%.

Heat Evolution and Slurry Temperature Rise Behavior

Figure 9B:
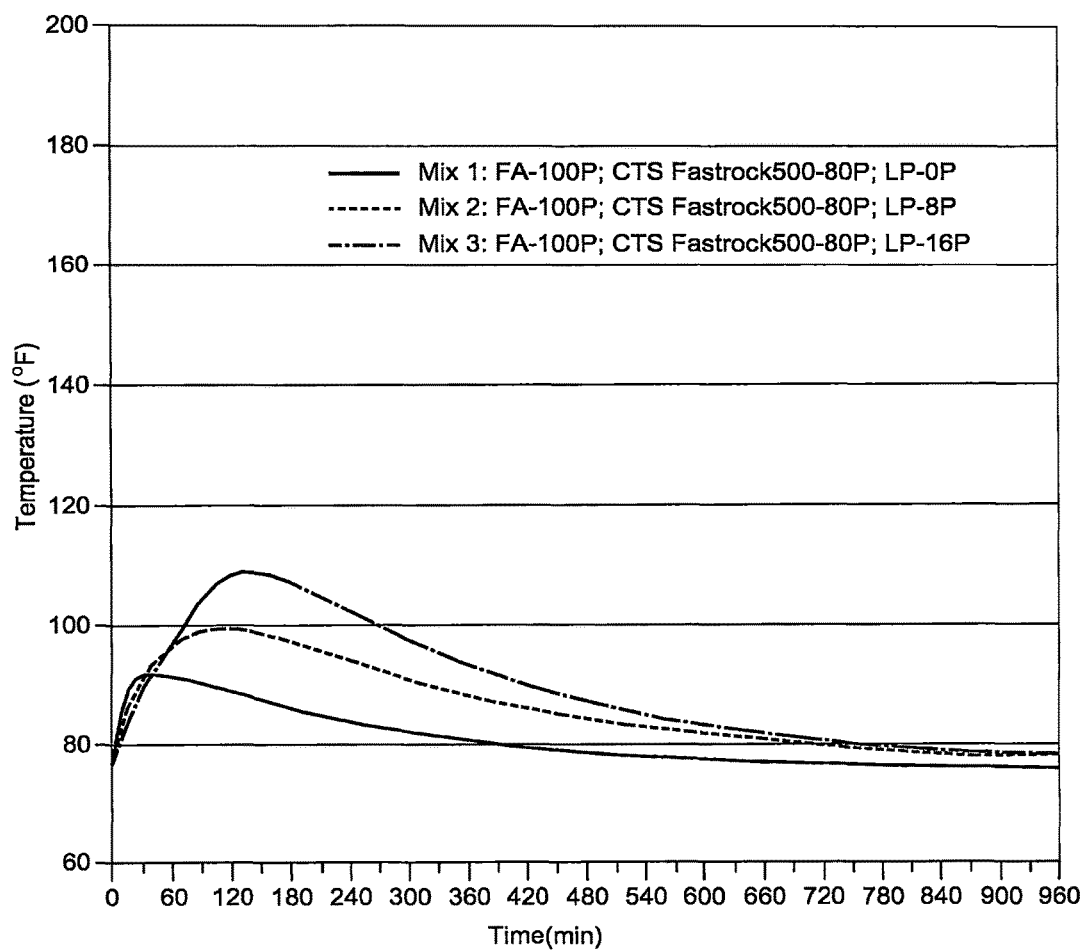
FIG. 9B is a graph of slurry temperature rise of compositions of the invention results of Example 9.

FIG. 9B shows the exothermic and slurry temperature rise behavior of geopolymer cementitious compositions of some embodiments of the invention investigated in Example 9. The cementitious compositions of this Example comprising fly ash, calcium sulfoaluminate cement, calcium sulfate dihydrate (fine-grained landplaster), and alkali metal citrate demonstrated only a very moderate temperature rise behavior. Also, decreasing the water to cementitious materials ratio from about 0.30 to about 0.25 (comparing results from Examples 7 and 9), did not change the temperature rise behavior to any significant degree.

A moderate heat evolution and low temperature rise within the material during the curing stage are significant in assisting to prevent excessive thermal expansion and consequent cracking and disruption of material. This aspect becomes even more helpful when the material is utilized in a manner where large thicknesses of material pours are involved in the actual field applications. The geopolymer cementitious compositions of some embodiments of the invention investigated in this Example are disclosed to be highly beneficial in this particular aspect as they would lead to a lower thermal expansion and enhanced resistance to thermal cracking in actual field applications.

Time of Setting

TABLE 28 shows the time of setting of geopolymer cementitious compositions of some embodiments of the invention investigated in Example 9.

TABLE 28

Setting Times of Example 9

|  | Initial Setting Time (hr:min) | Final Setting Time (hr:min) |
|---|---|---|
| Mix 1 | 00:19 | 00:30 |
| Mix 2 | 00:20 | 00:45 |
| Mix 3 | 00:25 | 00:48 |
| Mix 4 | 00:25 | 00:50 |

All cementitious compositions investigated in this Example had rapid setting behavior. The final setting times of the geopolymer cementitious compositions of some embodiments of the invention of this Example comprising fly ash, calcium sulfoaluminate cement, calcium sulfate dihydrate (fine-grained landplaster), and sodium citrate were over about 45 minutes compared to an extremely rapid final setting time of about 15 minutes for the comparative mixture composition containing fly ash and sodium citrate only (Example 1). Comparative Mix #1 without calcium sulfate (landplaster) had significantly shorter setting time compared to the Mixes 2 through 4 of some embodiments of the invention containing calcium sulfate dihydrate (landplaster). An extremely short setting time is problematic for some embodiments of the invention.

Compressive Strength

TABLE 29 shows the compressive strength behavior of the developed geopolymer cementitious compositions of some embodiments of the invention comprising fly ash, calcium sulfoaluminate cement, calcium sulfate dihydrate (fine-grained landplaster), and alkali metal citrate investigated in Example 9.

TABLE 29

Compressive Strength of Example 9 (psi)

|  | 4 hour | 24 hour | 7 day | 28 day |
|---|---|---|---|---|
| Mix 1 | 378 | 953 | 2404 | 4694 |
| Mix 2 | 1063 | 2773 | 5493 | 6678 |
| Mix 3 | 1758 | 3698 | 5346 | 7437 |
| Mix 4 | 2241 | 4221 | 5895 | 7697 |

The following observations can be drawn from this study:

The compressive strength of the geopolymer cementitious compositions of some embodiments of the invention in this Example continued to increase with time.

Both the early age compressive strength and the ultimate compressive strength of the mixture composition without landplaster (Mix 1) were lower in comparison to those for the cementitious compositions of some embodiments of the invention comprising landplaster (Mixes 2 through 4).

The early age (4-hour and 24-hour) compressive strength of the geopolymer cementitious compositions of some embodiments of the invention increased with increase in the amount of calcium sulfate (fine-grained landplaster) in the material.

The 4-hour compressive strengths of material were in excess of about 1000 psi with the use of calcium sulfate (fine-grained landplaster) in the geopolymer cementitious compositions of some embodiments of the invention investigated in this example. Moreover, the 4-hour compressive strengths of Mix 3 and Mix 4 comprising calcium sulfate (fine-grained landplaster) were in excess of about 1500 psi and about 2000 psi, respectively. In contrast, in absence of calcium sulfate dihydrate (landplaster), the about 4-hour compressive strength of the material was relatively very low being less than about 400 psi (Mix 1).

The 24-hour compressive strengths of material were in excess of about 2500 psi with the use of calcium sulfate dihydrate (fine-grained landplaster) in the geopolymer cementitious compositions of some embodiments of the invention investigated in this example. Moreover, the about 24-hour compressive strengths of Mix 3 and Mix 4 comprising calcium sulfate dihydrate (fine-grained landplaster) were in excess of about 3500 psi. In contrast, in absence of landplaster, the about 24-hour compressive strength of the material was less than about 1000 psi (Mix 1).

The early age 4-hour and 24-hour compressive strength show some embodiments of the invention are capable of developing significantly greater early age compressive strengths when compared to the 4 hour and 24 hour compressive strength of about 500 psi and 2000 psi shown in comparative examples 2 and 3.

The 28-day compressive strength of all geopolymer cementitious compositions of some embodiments of the invention comprising fly ash, calcium sulfoaluminate, calcium sulfate dihydrate (landplaster) and sodium citrate was very high and in excess of about 6000 psi.

Example 10

An objective of this investigation was to study the influence of incorporation of calcium sulfate dihydrate (fine-grained landplaster) at varying amounts in the geopolymer binder compositions of some embodiments of the invention.

TABLE 30 shows the raw material compositions of the geopolymer cementitious mixtures investigated in this example. The amount of calcium sulfoaluminate cement used in the mixture compositions of this Example was equal to 80 wt % of the weight of fly ash. Calcium sulfate dihydrate in the form of fine-grained landplaster was added at the following amount levels in the mixture compositions investigated—40 wt %, 50 wt %, 60 wt % and 80 wt % of the weight of calcium sulfoaluminate cement. The calcium sulfate dihydrate is 32, 40, 48 and 64 wt. % of the fly ash. The water to cementitious materials ratio utilized in this example was kept constant at 0.25. The sand used is QUIKRETE Commercial Grade Fine Sand No. 1961 and the Superplasticizer is BASF CASTAMENT FS20.

TABLE 30

Compositions of Example 10

| Raw Material | Mix 1 | Mix 2 | Mix 3 | Mix 4 |
|---|---|---|---|---|
| Fly Ash Class C (grams) | 1415 | 1364 | 1316 | 1230 |
| Calcium Sulfate Dihydrate (grams) | 453 | 546 | 632 | 787 |
| Calcium Sulfoaluminate Cement (grams) | 1132 | 1091 | 1053 | 984 |
| Total Cementitious Materials (grams) | 3000 | 3000 | 3000 | 3000 |
| Sand (grams) | 3150 | 3150 | 3150 | 3150 |
| Sodium Citrate Dihydrate (grams) | 60 | 60 | 60 | 60 |

TABLE 30-continued

Compositions of Example 10

| Raw Material | Mix 1 | Mix 2 | Mix 3 | Mix 4 |
|---|---|---|---|---|
| Superplasticizer (grams) | 15 | 15 | 15 | 15 |
| Water (grams) | 750 | 750 | 750 | 750 |
| Water/Cementitious Materials Ratio | 0.25 | 0.25 | 0.25 | 0.25 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2.0% | 2.0% | 2.0% | 2.0% |
| Calcium Sulfoaluminate cement/Fly ash, wt % | 80% | 80% | 80% | 80% |
| Calcium Sulfate/Calcium Sulfoaluminate Cement, wt % | 40% | 50% | 60% | 80% |

Slump and Early Age Cracking Behavior of Material

TABLE 31 shows the initial flow behavior and slump characteristics of the geopolymer cementitious compositions of some embodiments of the invention comprising fly ash, calcium sulfoaluminate cement, calcium sulfate (fine-grained landplaster), and alkali metal citrate investigated in Example 10.

TABLE 31

Flow and Slump of Example 10

|  | Flow | Slump (inches) |
|---|---|---|
| Mix 1 | 6 | 6.25 |
| Mix 2 | 5 | 6 |
| Mix 3 | 5 | 6 |
| Mix 4 | 5 | 6 |

All mixture compositions investigated had good rheology and slump behavior as observed in the slump test. It is particularly noteworthy that such good rheology and slump behavior was obtainable even at a water/cementitious materials ratio as low as about 0.25.

All mixes containing calcium sulfate dihydrate (fine-grained landplaster) were in excellent condition and did not develop any cracking.

Shrinkage Behavior

Figure 10A:
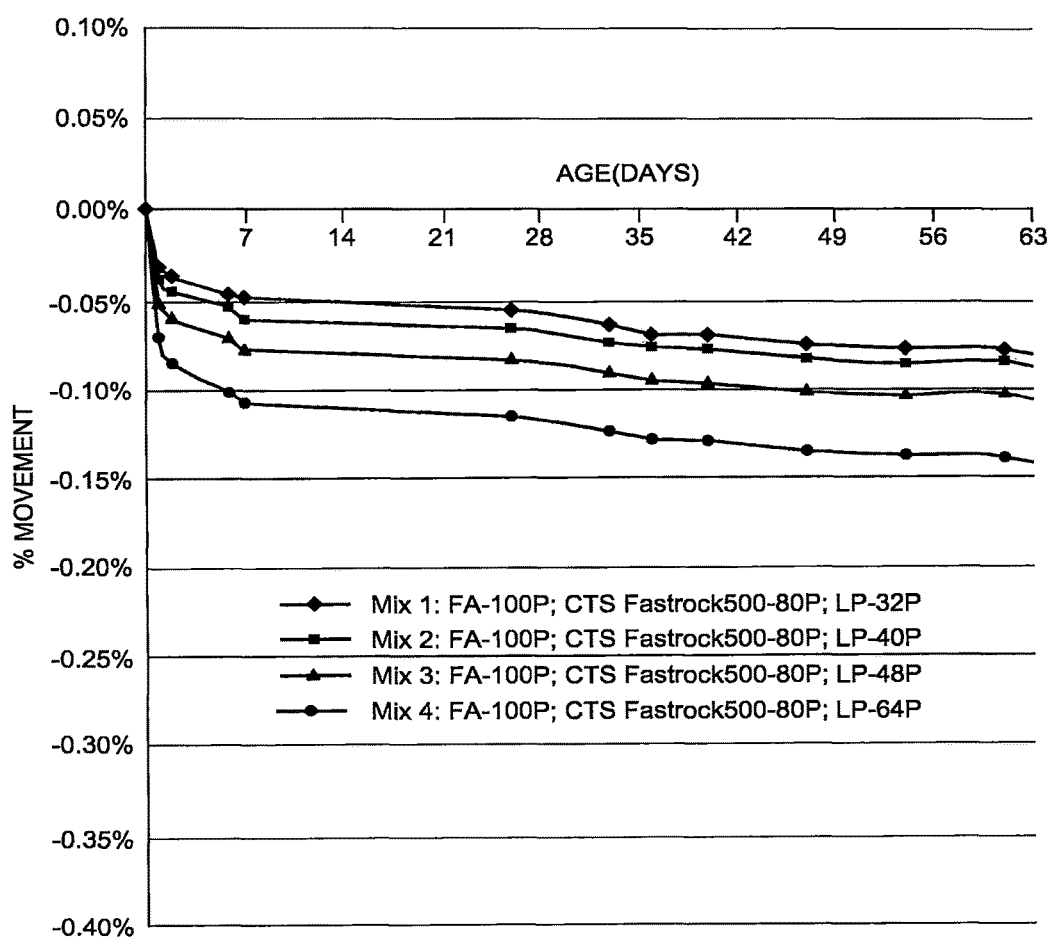
FIG. 10A is a graph of shrinkage of compositions of the invention in Example 10.

FIG. 10A shows shrinkage behavior of geopolymer cementitious compositions of some embodiments of the invention investigated in Example 10.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following important conclusions can be drawn from this investigation and FIG. 10A:

Contrary to the shrinkage bars of comparative Example 4 (with no calcium sulfate) which cracked even before de-molding, the shrinkage bars of Example 10 comprising calcium sulfate dihydrate (fine-grained landplaster) were completely stable and did not result in any cracks either prior to or after de-molding.

The geopolymer cementitious compositions of some embodiments of the invention comprising fly ash, calcium sulfoaluminate cement, calcium sulfate dihydrate (fine-grained landplaster), and alkali metal citrate had a maximum shrinkage between about 0.08% to about 0.14% in comparison to a maximum shrinkage of about 0.75% for the comparative mixture composition containing fly ash and alkali metal citrate only (Example 1).

The mixture compositions comprising fly ash, calcium sulfoaluminate cement, calcium sulfate dihydrate (fine-grained landplaster), and alkali metal citrate had a maximum shrinkage between about 0.08% and about 0.14%. In contrast, the maximum shrinkage of Comparative Mix 1 of Example 9 comprising fly ash, calcium sulfoaluminate cement, alkali metal citrate but no calcium sulfate dihydrate (landplaster) was about 0.17%.

Heat Evolution and Slurry Temperature Rise Behavior

Figure 10B:
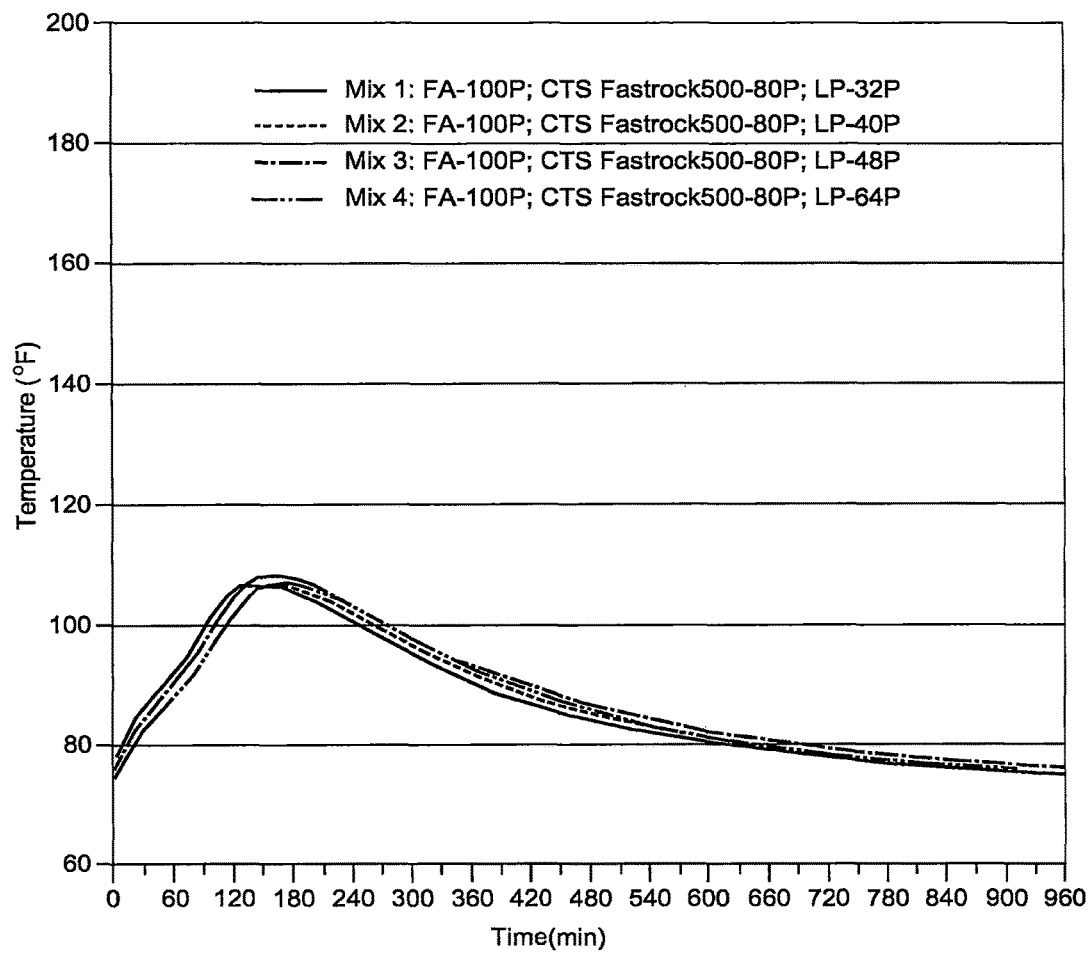
FIG. 10B is a graph of slurry temperature rise of compositions of the invention results of Example 10.

FIG. 10B shows the exothermic and slurry temperature rise behavior of geopolymer cementitious compositions of some embodiments of the invention investigated in Example 10. The cementitious compositions of this Example comprising fly ash, calcium sulfoaluminate cement, calcium sulfate dihydrate (fine-grained landplaster), and alkali metal citrate demonstrated only a very moderate temperature rise behavior. Also, decreasing the water to cementitious materials ratio from about 0.30 to about 0.25 (comparing results from Examples 8 and 10), did not change the temperature rise behavior to any significant degree.

A moderate heat evolution and low temperature rise within the material during the curing stage assists in preventing excessive thermal expansion and consequent cracking and disruption of material. This aspect becomes even more helpful when the material is utilized in a manner where large thicknesses of material pours are involved in the actual field applications. The geopolymer cementitious compositions of some embodiments of the invention investigated in this Example are disclosed to be highly beneficial in this particular aspect as they would lead to a lower thermal expansion and enhanced resistance to thermal cracking in actual field applications.

Time of Setting

TABLE 32 shows the time of setting of geopolymer cementitious compositions of some embodiments of the invention investigated in Example 10.

TABLE 32

Setting Times of Example 10

|  | Initial Setting Time (hr:min) | Final Setting Time (hr:min) |
|---|---|---|
| Mix 1 | 00:31 | 00:51 |
| Mix 2 | 00:33 | 00:56 |
| Mix 3 | 00:34 | 00:57 |
| Mix 4 | 00:35 | 1:02 |

All cementitious compositions investigated in this Example had rapid setting behavior. The final setting times of the geopolymer cementitious compositions of some embodiments of the invention of this Example comprising fly ash, calcium sulfoaluminate cement, landplaster, and sodium citrate were over about 50 minutes compared to an extremely rapid final setting time of about 15 minutes for the comparative mixture composition containing fly ash and sodium citrate only (Example 1). Also, the Comparative Mix 1 of Example 9 without landplaster had significantly shorter set compared to the Mixes 1 through 4 of Example 10 containing landplaster.

Compressive Strength

TABLE 33 shows the compressive strength behavior of the developed geopolymer cementitious compositions of some embodiments of the invention comprising fly ash, calcium sulfoaluminate cement, calcium sulfate dihydrate (fine-grained landplaster), and alkali metal citrate investigated in Example 10.

TABLE 33

| Compressive Strength of Example 10 - (psi) | | | | |
|---|---|---|---|---|
| | 4 hour | 24 hour | 7 day | 28 day |
| Mix 1 | 2528 | 4894 | 6232 | 6985 |
| Mix 2 | 2381 | 4405 | 5742 | 7167 |
| Mix 3 | 2340 | 4367 | 5741 | 7117 |
| Mix 4 | 2075 | 4840 | 5602 | 7812 |

The following important observations can be drawn from this study:

The compressive strength of the geopolymer cementitious compositions of some embodiments of the invention investigated in this Example continued to increase with time.

The early age (4-hour and 24-hour) compressive strength of the geopolymer cementitious compositions of some embodiments of the invention increased with increase in the amount of calcium sulfate (fine-grained landplaster) in the material.

The 4-hour compressive strengths of material were in excess of about 2000 psi with the use of calcium sulfate dihydrate (fine-grained landplaster) in all four geopolymer cementitious compositions of some embodiments of the invention investigated in this example. In fact, the about 4-hour compressive strengths of the Mixes #1 through #3 comprising calcium sulfate dihydrate (fine-grained landplaster) were in excess of about 2500 psi. On the other hand, in absence of landplaster, the about 4-hour compressive strength of the material was relatively very low being less than about 400 psi (Comparative Mix #1 of Example 9).

The 24-hour compressive strengths of material were in excess of about 4000 psi with the use of calcium sulfate dihydrate (fine-grained landplaster) in all four geopolymer cementitious compositions of some embodiments of the invention investigated in this example. On the other hand, in absence of calcium sulfate dihydrate (landplaster), the about 24-hour compressive strength of the material was relatively very low being less than about 1000 psi (Comparative Mix #1 of Example 9).

The 28-day compressive strength of all geopolymer cementitious compositions of some embodiments of the invention comprising fly ash, calcium sulfoaluminate, calcium sulfate (landplaster) and sodium citrate was again very high and in excess of about 7000 psi.

Example 11

An objective of this investigation was to study the influence of incorporation of alkali metal citrate at varying amounts in the geopolymer binder compositions of this embodiment.

TABLE 34 shows the raw material compositions of the geopolymer cementitious mixtures investigated in the Example 11.

The amount of calcium sulfoaluminate cement used in the mixture compositions of this Example was equal to 80 wt % of the weight of fly ash. Calcium sulfate dihydrate in the form of fine-grained landplaster was added at an amount equal to 30 wt % of the weight of calcium sulfoaluminate cement. Calcium sulfate dihydrate is used at 24 wt % of the fly ash. Alkali metal citrate in the form of sodium citrate was added at the following amount levels in the cementitious compositions investigated—2.00 wt %, 1.25 wt %, 0.50 wt % and 0.00 wt % of the weight of the total cementitious materials. The water to cementitious materials ratio utilized in this investigation was kept constant at 0.275. The sand QUIKRETE Commercial Grade Fine Sand No. 1961 and the plasticizer is BASF CASTAMENT FS20.

TABLE 34

| Compositions of Example 11 | | | | |
|---|---|---|---|---|
| Raw Material | Mix 1 | Mix 2 | Mix 3 | Mix 4 |
| Fly Ash Class C (grams) | 1593 | 1593 | 1593 | 1593 |
| Calcium Sulfate Dihydrate (grams) | 382 | 382 | 382 | 382 |
| Calcium Sulfoaluminate Cement (grams) | 1275 | 1275 | 1275 | 1275 |
| Total Cementitious Materials (grams) | 3250 | 3250 | 3250 | 3250 |
| Sand (grams) | 3413 | 3413 | 3413 | 3413 |
| Sodium Citrate Dihydrate (grams) | 65 | 40.63 | 16.25 | 0 |
| Superplasticizer (grams) | 16.25 | 16.25 | 16.25 | 16.25 |
| Water (grams) | 894 | 894 | 894 | 894 |
| Water/Cementitious Materials Ratio | 0.275 | 0.275 | 0.275 | 0.275 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2% | 1.25% | 0.5% | 0% |
| Calcium Sulfoaluminate cement/Fly ash, wt % | 80% | 80% | 80% | 80% |
| Calcium Sulfate/Calcium Sulfoaluminate Cement, wt % | 30% | 30% | 30% | 30% |

Initial Flow Behavior, Slump, and Early Age Cracking Behavior of Material

TABLE 35 shows the initial flow behavior and slump characteristics of the geopolymer cementitious compositions of this embodiment comprising fly ash, calcium sulfaluminate cement, calcium sulfate (fine-grained landplaster), and different amounts of alkali metal citrate investigated in Example 11.

TABLE 35

Flow and Slump of Example 11

|  | Flow | Slump (inches) |
|---|---|---|
| Mix 1 | 9 | 8.75 |
| Mix 2 | 9 | 9.5 |
| Mix 3 | 9 | 9.0 |
| Mix 4 | 10 | 10.5 |

All mixture compositions investigated had good flow behavior and large patty diameter as observed in the slump test. It is noteworthy that such large slump and self-leveling behavior was obtained even when the water/cementitious materials ratio was as low as about 0.275.

Figure 11A:
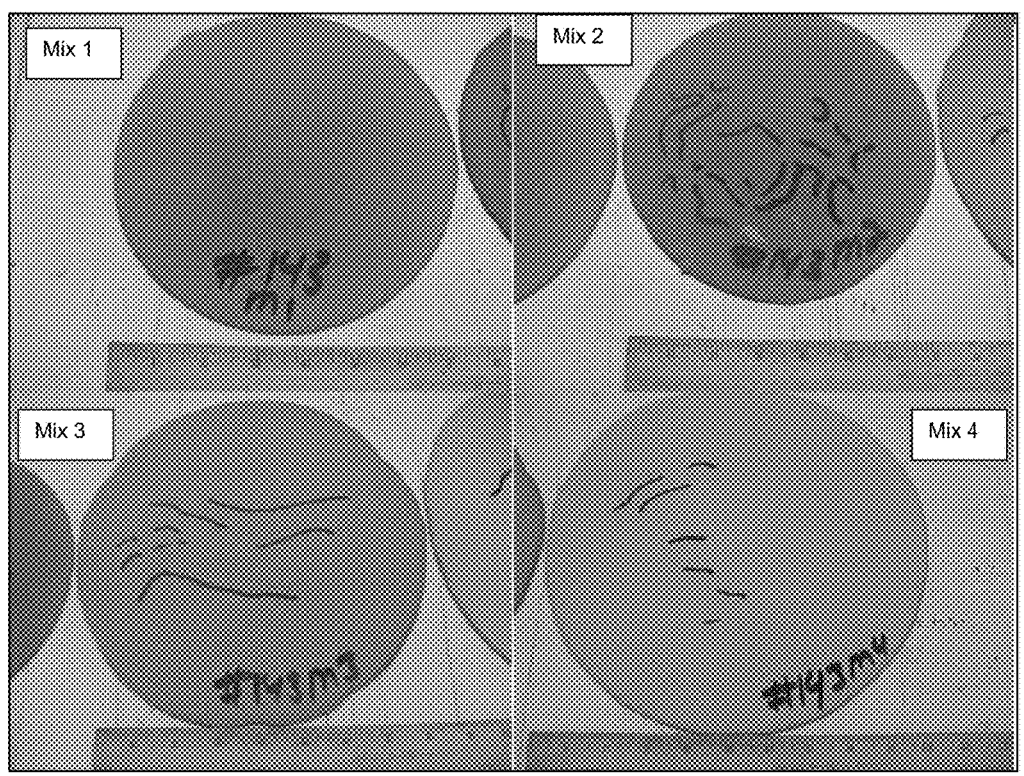
FIG. 11A shows photographs of slump patties of compositions of Example 11.

FIG. 11A shows photographs of slump patties for the cementitious mixture compositions investigated in Example 11. The slump patty for Mix 1 at about 2% sodium citrate was free of cracks that would indicate dimensional instability or unacceptable shrinkage. On the other hand, the slump patties for Mixes 2, 3, and 4 containing about 1.25%, 0.5% and 0% sodium citrate, respectively, developed several microcracks upon drying. Thus, this experiment shows decreasing the amount of alkali metal citrate in the composition below a certain amount can increase the cracking potential of the geopolymer cementitious compositions comprising fly ash, calcium sulfoaluminate and landplaster.

Shrinkage Behavior

Figure 11B:
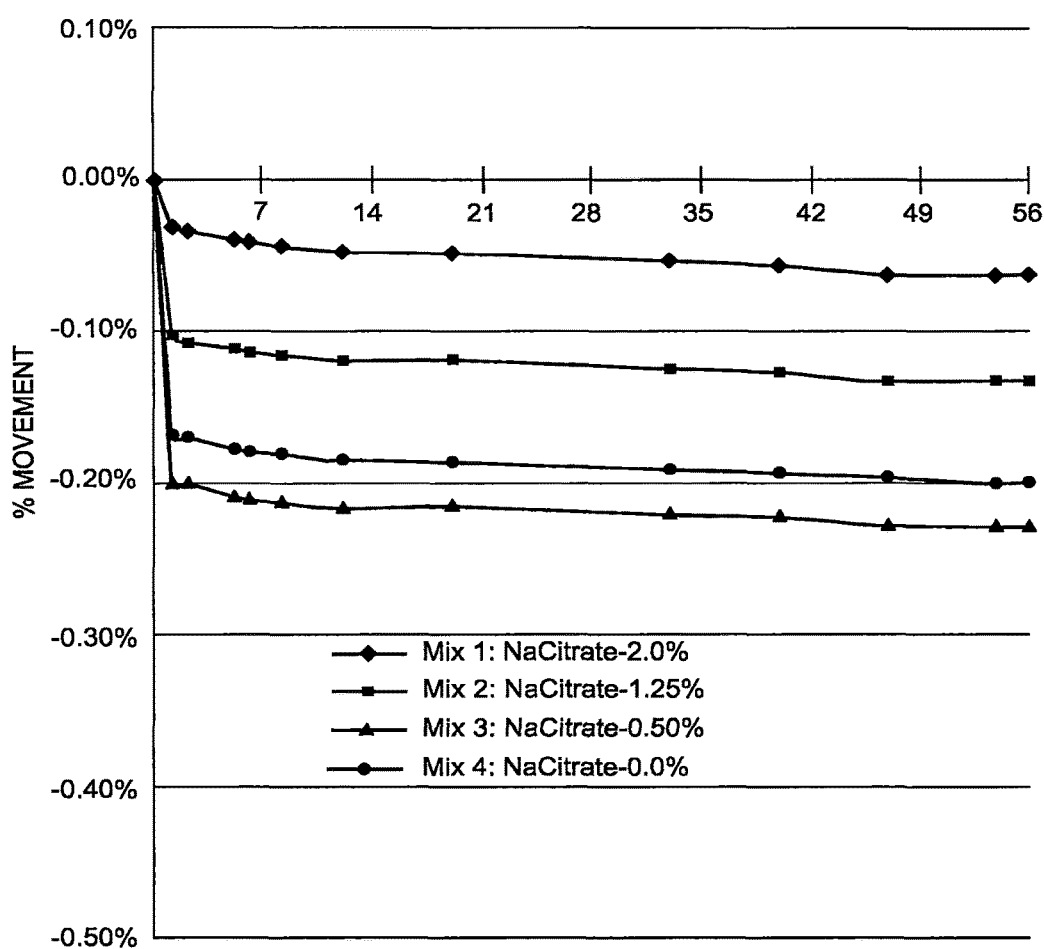
FIG. 11B is a graph of shrinkage of compositions of the invention in Example 11.

FIG. 11B shows shrinkage behavior of geopolymer cementitious compositions of the embodiment investigated in Example 11. The main objective of this investigation was to study the influence of varying amounts of alkali metal citrate on shrinkage behavior of the developed geopolymer cementitious compositions of this embodiment.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following important conclusions can be drawn from this investigation and FIG. 11B. The measured maximum shrinkage was lowest, about 0.06%, at a sodium citrate amount of about 2.0%. Decreasing the sodium citrate amount increased the maximum shrinkage of the material. For example, at a sodium citrate amount of about 1.25%, the measured maximum shrinkage was about 0.14%, while at a sodium citrate amount of about 0.5%, the measured maximum shrinkage increased to about 0.23%.

The geopolymer cementitious compositions of this embodiment comprising fly ash, calcium sulfoaluminate cement, calcium sulfate dihydrate (fine-grained landplaster), and alkali metal citrate had a maximum shrinkage of about 0.06% to about 0.24% in comparison to a maximum shrinkage of about 0.75% for the comparative mixture composition containing fly ash and alkali metal citrate only (Example 1).

Heat Evolution and Slurry Temperature Rise Behavior

Figure 11C:
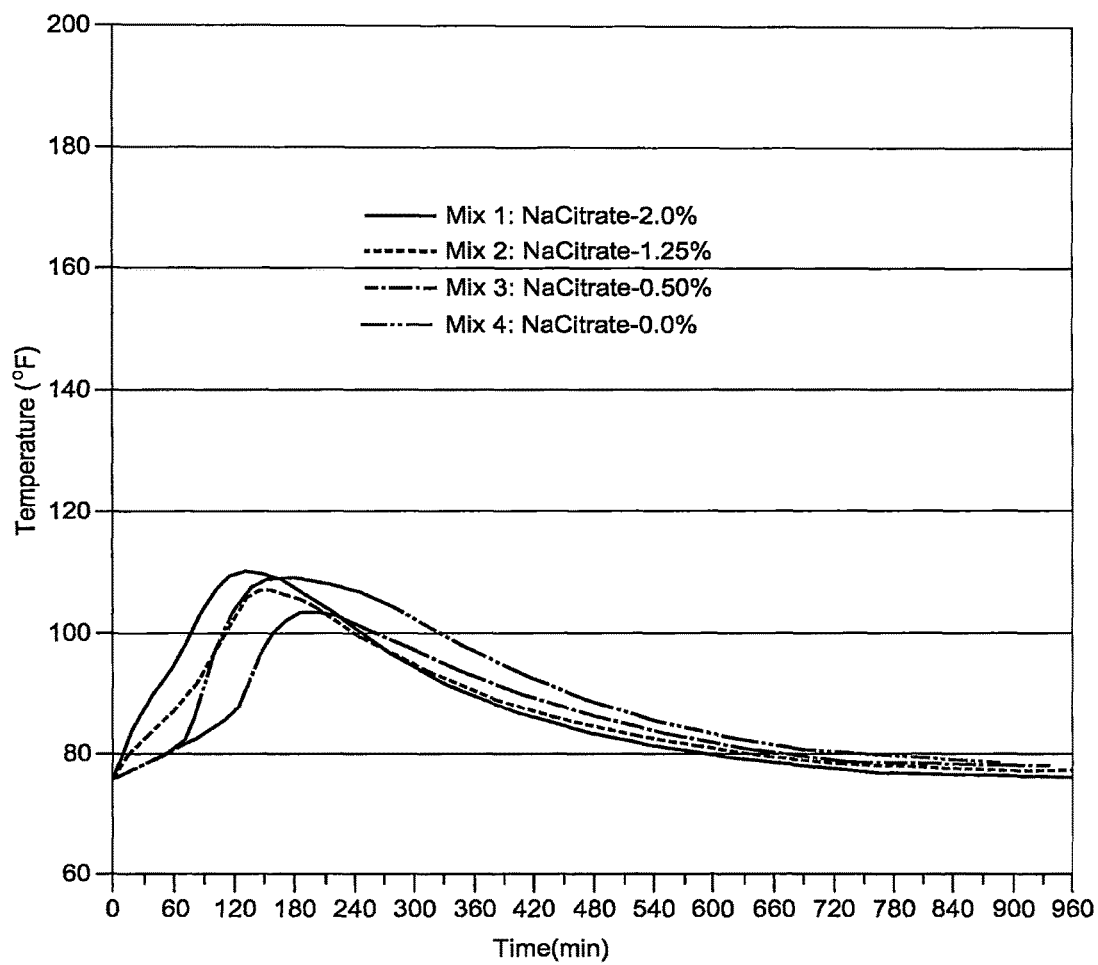
FIG. 11C is a graph of slurry temperature rise of compositions of the invention of Example 11.

FIG. 11C shows the exothermic and slurry temperature rise behavior of geopolymer cementitious compositions of this embodiment investigated in Example 11. The cementitious compositions of this Example comprising fly ash, calcium sulfoaluminate cement, calcium sulfate dihydrate (fine-grained landplaster), and alkali metal citrate demonstrated only a very moderate temperature rise behavior. A moderate heat evolution and low temperature rise within the material during the curing stage is significant in preventing excessive thermal expansion and consequent cracking and disruption of material. This aspect becomes even more helpful when the material is utilized in a manner where large thicknesses of material pours are involved in the actual field applications. The geopolymer cementitious compositions of the embodiment investigated in this Example are disclosed to be highly beneficial in this particular aspect as they would lead to a lower thermal expansion and enhanced resistance to thermal cracking in actual field applications.

Time of Setting

TABLE 36 shows the time of setting of geopolymer cementitious compositions of the embodiment of Example 11.

TABLE 36

Setting Times of Example 11

|  | Initial Setting Time (hr:min) | Final Setting Time (hr:min) |
|---|---|---|
| Mix 1 | 00:38 | 1:09 |
| Mix 2 | 00:59 | 1:30 |
| Mix 3 | 1:15 | 2:20 |
| Mix 4 | 1:20 | 2:25 |

All cementitious compositions in this Example demonstrated very rapid setting behavior. The time of final setting reduced with increase in the amount of sodium citrate. For instance, the mixture compositions containing about 0% and about 0.5% sodium citrate (Mix 4 and Mix 3) had a final setting time of about 2 hours, while the mixture composition containing about 2.0% sodium citrate achieved a final setting time of about 1 hour only.

Example 12

An objective of this investigation was to study the influence of incorporation of alkali metal citrate at various amounts in the geopolymer binder compositions of this embodiment.

TABLE 37 shows the raw material compositions of the geopolymer cementitious mixtures investigated in this example.

The amount of calcium sulfoaluminate cement used in the mixture compositions of this Example was equal to 80 wt % of the weight of fly ash. Calcium sulfate dihydrate in the form of fine-grained landplaster was added at an amount equal to 30 wt % of the weight of calcium sulfoaluminate cement and 24 wt % of the fly ash. Sodium citrate was added at the following amounts in the cementitious compositions investigated—2.00 wt %, 3.00 wt %, 4.00 wt % and 5.00 wt % of the weight of the total cementitious materials. The sand is QUIKRETE Commercial Grade Fine Sand No. 1961 and the superplasticizer is BASF CASTAMENT FS20

TABLE 37

Geopolymer cementitious compositions of Example 12

| Raw Material | Mix 1 | Mix 2 | Mix 3 | Mix 4 |
|---|---|---|---|---|
| Fly Ash Class C (grams) | 1593 | 1593 | 1593 | 1593 |
| Calcium Sulfate Dihydrate (grams) | 382 | 382 | 382 | 382 |
| Calcium Sulfoaluminate Cement (grams) | 1275 | 1275 | 1275 | 1275 |
| Total Cementitious Materials (grams) | 3250 | 3250 | 3250 | 3250 |
| Sand (grams) | 3413 | 3413 | 3413 | 3413 |
| Sodium Citrate Dihydrate (grams) | 65 | 98 | 130 | 163 |
| Superplasticizer (grams) | 16.25 | 16.25 | 16.25 | 16.25 |
| Water (grams) | 893 | 893 | 893 | 893 |
| Water/Cementitious Materials Ratio | 0.275 | 0.275 | 0.275 | 0.275 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2% | 3% | 4% | 5% |
| Calcium Sulfoaluminate cement/Fly ash, wt % | 80% | 80% | 80% | 80% |
| Calcium Sulfate/Calcium Sulfoaluminate Cement, wt % | 30% | 30% | 30% | 30% |

Initial Flow Behavior, Slump, and Early Age Cracking Behavior of Material

TABLE 38 shows the initial flow behavior and slump characteristics of the geopolymer cementitious compositions of this embodiment comprising fly ash, calcium sulfoaluminate cement, calcium sulfate dihydrate (fine-grained landplaster), and different amounts of alkali metal citrate investigated in Example 12.

TABLE 38

Flow and Slump of Example 12

| | Flow | Slump (inches) |
|---|---|---|
| Mix 1 | 9 | 8.75 |
| Mix 2 | 9 | 9 |
| Mix 3 | 10 | 10 |
| Mix 4 | 10 | 10 |

All mixture compositions investigated had good self-leveling, flow behavior and large patty diameter as observed in the slump test even when the water/cementitious materials ratio was as low as about 0.275.

All the slump patties for the mixes investigated in Example 12 led to good flow behavior. Further, all four mixture compositions containing different amounts of sodium citrate led to slump patties that were free of cracks. This is in contrast to some of the slump patties of Example 11 that developed cracking at lower amounts of sodium citrate.

Shrinkage Behavior

Figure 12A:
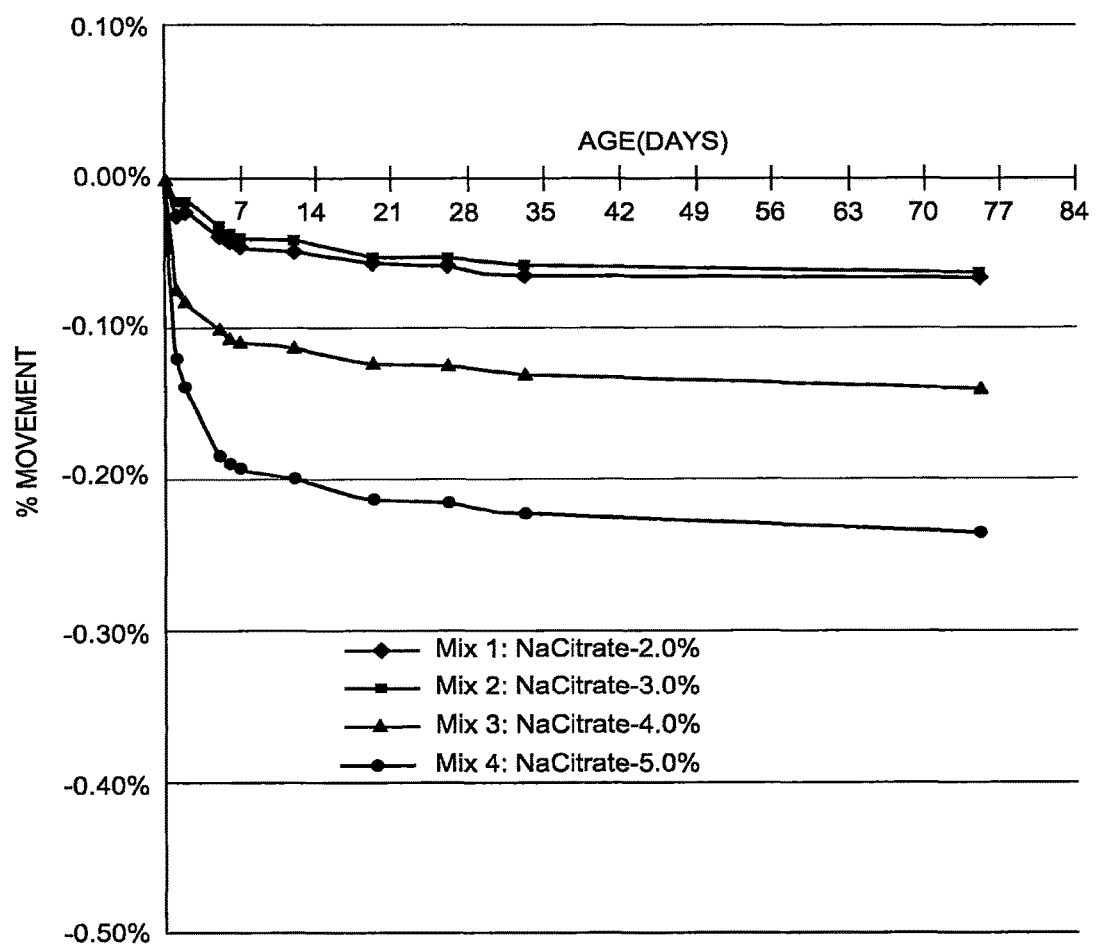
FIG. 12A is a graph of shrinkage of compositions of the invention in Example 12.
Figure 12B:
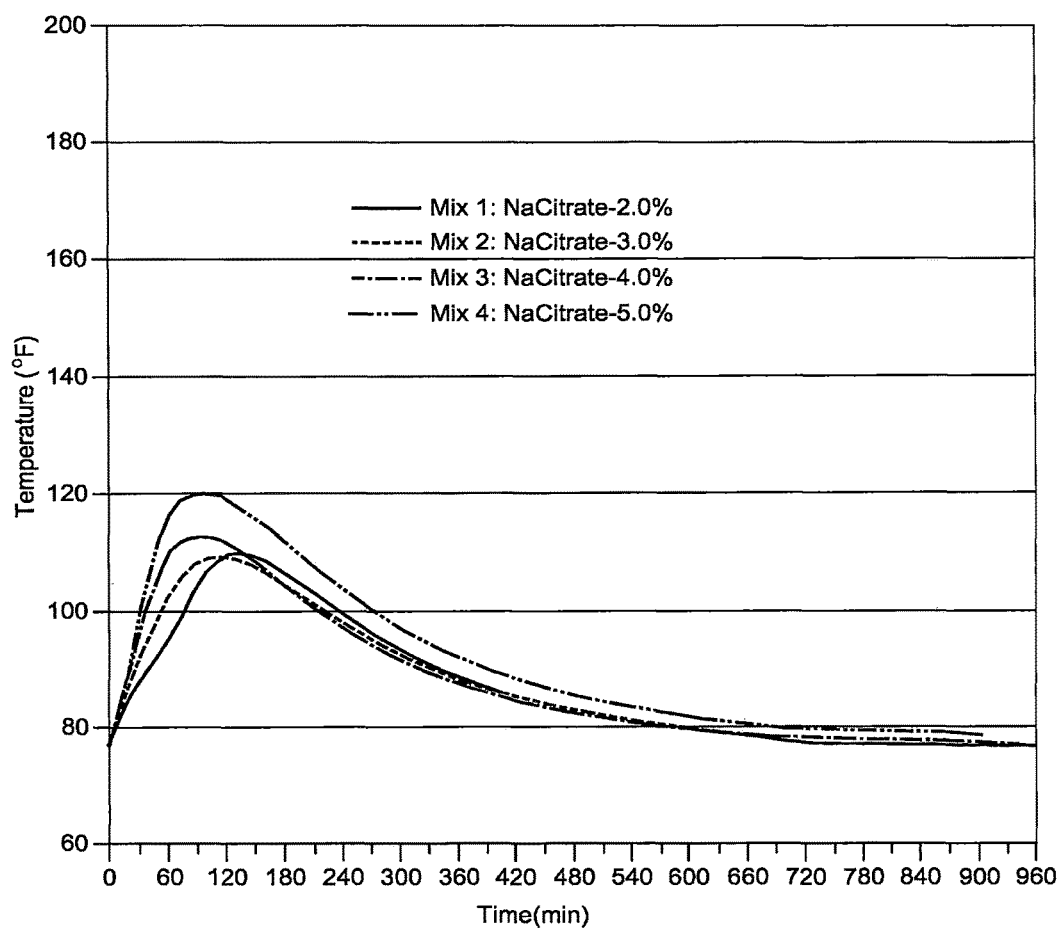
FIG. 12B is a graph of slurry temperature rise of compositions of the invention results of Example 12.

FIG. 12A shows shrinkage behavior of geopolymer cementitious compositions of the embodiment investigated in Example 12.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following conclusions can be drawn from this Example and FIG. 12A: The measured total shrinkage was lowest, about 0.06%, at a sodium citrate amount of about 2% and about 3%. Increasing the sodium citrate amount increased the maximum shrinkage of the material. For example, at a sodium citrate amount of about 3%, the measured maximum shrinkage was about 0.14%, while at a sodium citrate amount of about 4%, the measured maximum shrinkage increased to about 0.23%.

Comparison of the shrinkage testing results for Example 11 and Example 12 shows there exists, in one embodiment, a preferred amount range of alkali metal citrate at which the material shrinkage of the geopolymer cementitious compositions of this embodiment comprising fly ash, calcium sulfoaluminate and calcium sulfate is minimal. This preferred amount of alkali metal citrate in this embodiment is from about 1% to about 4%, and more preferably from about 2% to about 3%.

Heat Evolution and Slurry Temperature Rise Behavior

FIG. 12A shows the exothermic and slurry temperature rise behavior of geopolymer cementitious compositions of the embodiment investigated in Example 12. The cementitious compositions of this Example comprising fly ash, calcium sulfoaluminate cement, calcium sulfate dihydrate (fine-grained landplaster), and alkali metal citrate demonstrated very moderate temperature rise behavior. Increase in the amount of sodium citrate increased the maximum temperature rise but overall increase was very small and not significant. In this embodiment, a moderate heat evolution and low temperature rise within the material during the curing stage significantly assists in preventing excessive thermal expansion and consequent cracking and disruption of material. This aspect is particularly useful when the material is utilized in a manner where large thicknesses of material pours are involved in the actual field applications. The geopolymer cementitious compositions of the embodiment investigated in this Example are disclosed to be highly beneficial in this particular aspect as they would lead to a lower thermal expansion and enhanced resistance to thermal cracking in actual field applications.

Time of Setting

TABLE 39 shows the time of setting of geopolymer cementitious compositions of the embodiment investigated in Example 12.

TABLE 39

Setting Times of Example 12

|  | Initial Setting Time (hr:min) | Final Setting Time (hr:min) |
| --- | --- | --- |
| Mix 1 | 00:40 | 1:10 |
| Mix 2 | 00:30 | 1:12 |
| Mix 3 | 00:36 | 1:05 |
| Mix 4 | 00:35 | 0:58 |

Increasing the amount of sodium citrate from about 2% to about 5% did not modify the time of final setting of the investigated mixture compositions to significant degree. The time of final setting for the four geopolymer cementitious compositions of the embodiment investigated in this Example ranged between about 60 minutes to about 110 minutes.

Compressive Strength

TABLE 40 shows the compressive strength behavior of the developed geopolymer cementitious compositions of the embodiment comprising fly ash, calcium sulfoaluminate cement, calcium sulfate dihydrate (fine-grained landplaster), and varying levels of alkali metal citrate investigated in Example 12.

TABLE 40

Compressive Strength of Example 12 - (psi)

|  | 4 hour | 24 hour | 7 day | 28 day |
| --- | --- | --- | --- | --- |
| Mix 1 | 2182 | 4038 | 4829 | 6799 |
| Mix 2 | 2082 | 4216 | 5551 | 8008 |
| Mix 3 | 2361 | 3954 | 4859 | 7460 |
| Mix 4 | 2474 | 3790 | 5740 | 6920 |

The following important observations can be drawn from the study of this embodiment:

The compressive strength of the geopolymer cementitious compositions of the embodiment investigated in this Example continued to increase with time.

The early age (4-hour and 24-hour) compressive strengths of the various geopolymer cementitious compositions of this embodiment were substantially similar at the different amounts of sodium citrate investigated in this example.

The early age 4-hour material compressive strengths for the various geopolymer cementitious compositions of the embodiment investigated in this example containing different amounts of sodium citrate were found to be in excess of about 2000 psi.

The early age 24-hour material compressive strengths for the various geopolymer cementitious compositions of the embodiment investigated in this example containing different amounts of sodium citrate were found to be about 4000 psi.

The 28-day material compressive strengths for the various geopolymer cementitious compositions of the embodiment investigated in this example containing different amounts of sodium citrate were found to be in excess of about 6000 psi.

Example 13

An objective of this investigation was to study the influence of incorporation of anhydrous calcium sulfate (anhydrite) in the geopolymer binder compositions of this embodiment.

TABLE 41 shows the raw material compositions of the geopolymer cementitious mixtures in this example.

The amount of FASTROCK 500 calcium sulfoaluminate cement used in the mixture compositions of this Example was equal to 80 wt % of the weight of fly ash. Anhydrite used in this investigation was procured from the United States Gypsum Company with the trade name USG SNOW WHITE brand filler. Anhydrite was added at the following amount levels in the mixture compositions investigated—0 wt %, 10 wt %, 20 wt % and 30 wt % of the weight of calcium sulfoaluminate cement. Anhydrite was added in levels of 0, 8, 16 and 24 wt. %, based upon the weight of Class C fly ash. Sodium citrate (an alkali metal citrate) added to the cementitious compositions of the invention acted as a chemical activator. The water to cementitious materials ratio was kept constant at 0.30.

TABLE 41

Geopolymer cementitious compositions of Example 13

| Raw Material | Comparative Mix 1 | Mix 2 | Mix 3 | Mix 4 |
| --- | --- | --- | --- | --- |
| Fly Ash Class C (grams) | 1666 | 1595 | 1530 | 1470 |
| Anhydrous Calcium Sulfate (Anhydrite) (grams) | 0 | 128 | 245 | 353 |
| Calcium Sulfoaluminate Cement (grams) | 1333 | 1277 | 1224.5 | 1176.5 |
| Total Cementitious Materials (grams) | 3000 | 3000 | 3000 | 3000 |
| Sand (grams) | 3150 | 3150 | 3150 | 3150 |
| Sodium Citrate Dihydrate (grams) | 60 | 60 | 60 | 60 |
| Superplasticizer (grams) | 15 | 15 | 15 | 15 |
| Water (grams) | 900 | 900 | 900 | 900 |
| Water/Cementitious Materials Ratio | 0.30 | 0.30 | 0.30 | 0.30 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2.0% | 2.0% | 2.0% | 2.0% |
| Calcium Sulfoaluminate cement/Fly ash, wt % | 80% | 80% | 80% | 80% |
| Calcium Sulfate/Calcium Sulfoaluminate Cement, wt % | 0% | 10% | 20% | 30% |

Initial Flow Behavior, Slump, and Early Age Cracking Behavior of Material

TABLE 42 shows the initial flow behavior and slump characteristics of the geopolymer cementitious compositions of the embodiment comprising fly ash, calcium sulfoaluminate cement, anhydrite, and alkali metal citrate investigated in Example 13.

TABLE 42

Flow and Slump of Example 13

|  | Flow | Slump (inches) |
| --- | --- | --- |
| Mix 1 | 10 | 10.5 |
| Mix 2 | 10 | 11 |
| Mix 3 | 10 | 10.25 |
| Mix 4 | 10 | 10 |

All mixture compositions investigated had good self-leveling, flow behavior and large patty diameter as observed in the slump test.

Figure 13A:
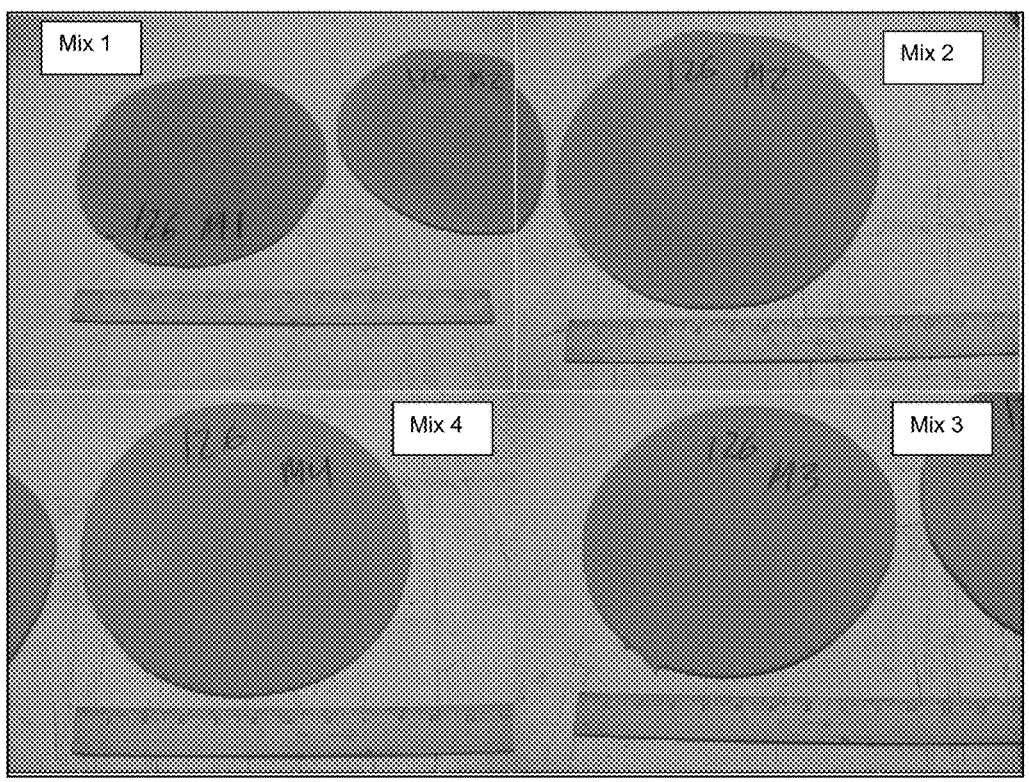
FIG. 13A is a photograph of slump patties of compositions of the invention of Example 13.

FIG. 13A shows photographs of slump patties for the mixes investigated in Example 13. It can be observed that all four mixture compositions investigated led to a good flow behavior. It can also be observed that for Mix #1 with no anhydrite, the slump patty developed significant cracking upon drying. However, for the geopolymer cementitious compositions of this embodiment containing anhydrite (Mixes 2, 3 and 4), the slump patties were in excellent condition and did not develop any cracking. Thus, it can be concluded addition of anhydrite to the geopolymer cementitious compositions of this embodiment provide dimensionally stable binders possessing superior resistance to cracking upon drying.

Shrinkage Behavior

Figure 13B:
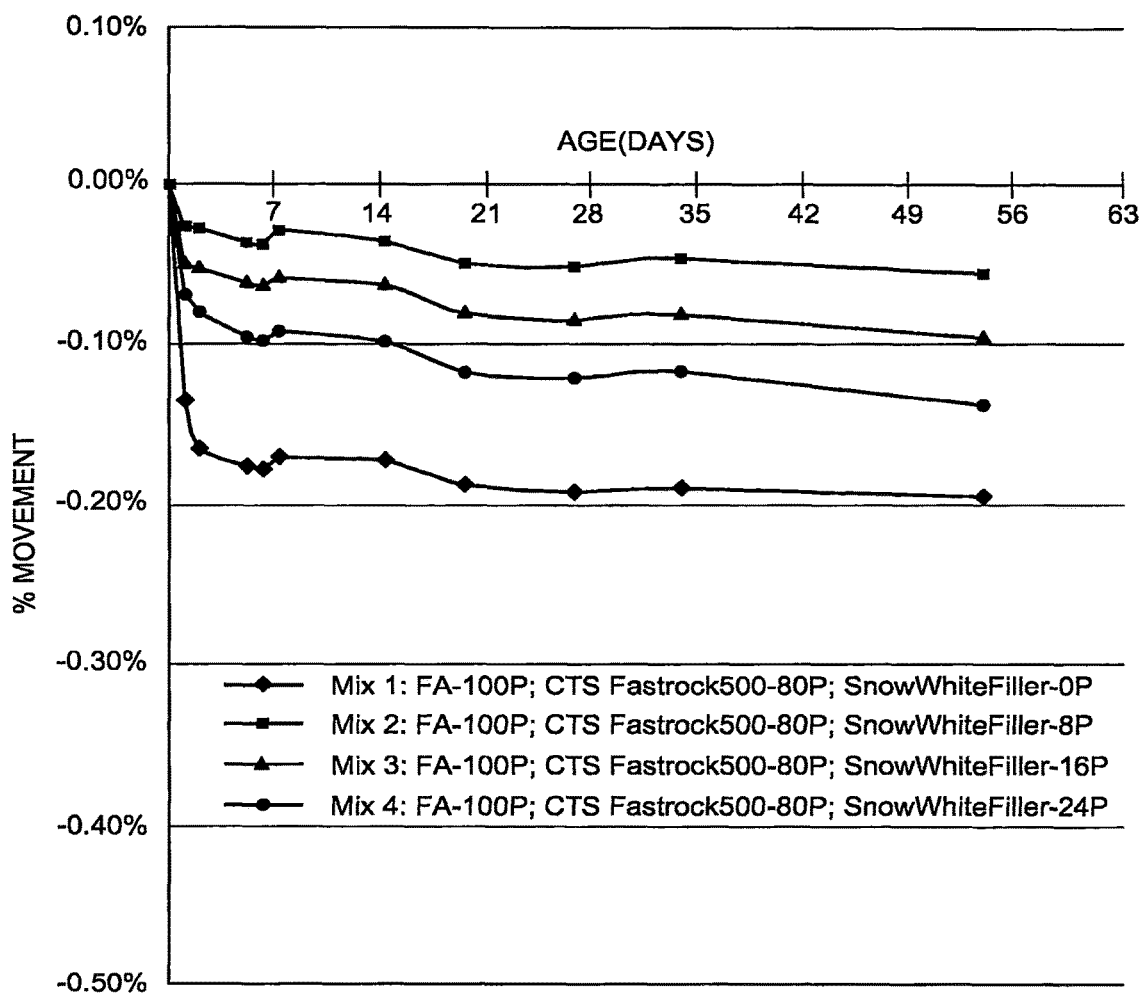
FIG. 13B is a graph of shrinkage of compositions of the invention in Example 13.

FIG. 13B shows shrinkage behavior of geopolymer cementitious compositions of the embodiment investigated in Example 13.

The following important conclusions can be drawn from this investigation and FIG. 13B:

Incorporation of anhydrite had a significant impact on improving the cracking resistance and dimensional stability of the geopolymer cementitious compositions of this embodiment comprising fly ash, calcium sulfoaluminate cement and alkali metal citrate. Contrary to the shrinkage bars of Comparative Example 4 (with no calcium sulfate) which cracked even before de-molding, the shrinkage bars of Example 13 comprising anhydrous calcium sulfate (anhydrite) were stable and did not result in any cracks either prior to or after de-molding.

The geopolymer cementitious compositions of this embodiment comprising fly ash, calcium sulfoaluminate cement, anhydrite, and alkali metal citrate had a maximum shrinkage of about 0.05% to about 0.2% in comparison to a maximum shrinkage of about 0.75% for the comparative mixture composition containing fly ash and alkali metal citrate only (Example 1). Thus, it can be concluded addition of anhydrous calcium sulfate (anhydrite) to cementitious compositions comprising fly ash, calcium sulfoaluminate cement, and alkali metal citrate can help to very significantly reduce the material shrinkage.

The measured maximum shrinkage of the fly ash mixture composition containing anhydrite at an amount of about 10 wt % of calcium sulfoaluminate cement was about 0.05%; in contrast, the total shrinkage of Mix 1 with fly ash and calcium sulfoaluminate cement but no anhydrous calcium sulfate (anhydrite) was about 0.2%. This result demonstrates that incorporation of anhydrous calcium sulfate (anhydrite) in the geopolymer cementitious compositions of this embodiment contributes to significantly reducing the material shrinkage.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

Heat Evolution and Slurry Temperature Rise Behavior

Figure 13C:
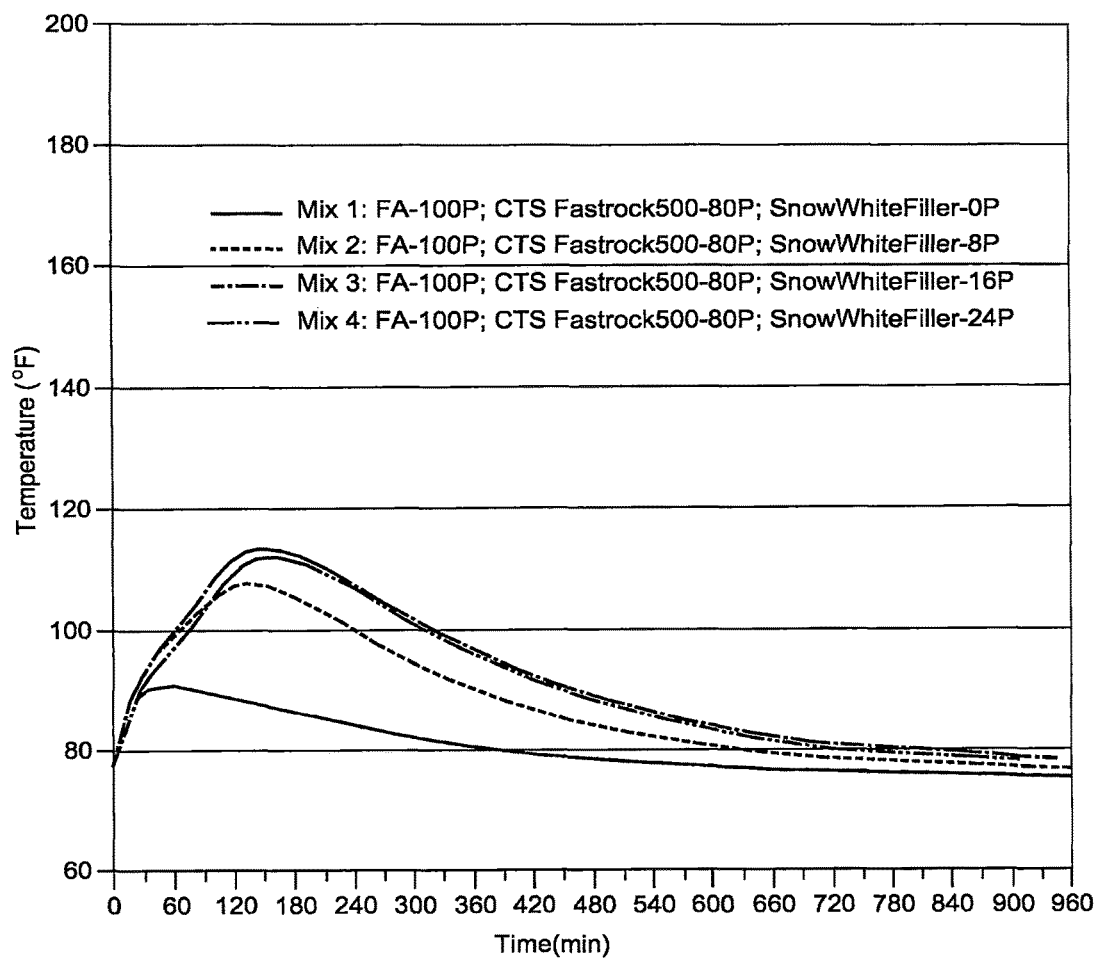
FIG. 13C is a graph of slurry temperature rise of compositions of the invention of Example 13.

FIG. 13C shows the exothermic and slurry temperature rise behavior of geopolymer cementitious compositions of the embodiment investigated in Example 13. The cementitious compositions of this Example comprising fly ash, calcium sulfoaluminate cement, anhydrite, and alkali metal citrate demonstrated only a moderate temperature rise behavior. A moderate heat evolution and low temperature rise within the material during the curing stage significantly contributes to preventing excessive thermal expansion and consequent cracking and disruption of material. This aspect is particularly helpful when the material is utilized in a manner where large thicknesses of material pours are involved in the actual field applications. The geopolymer cementitious compositions of this embodiment investigated in this Example are disclosed to be highly beneficial in this particular aspect as they would lead to a lower thermal expansion and enhanced resistance to thermal cracking in actual field applications.

Time of Setting

TABLE 43 shows the time of setting of geopolymer cementitious compositions of the embodiment investigated in Example 1

TABLE 43

Setting Times of Example 13

| | Initial Setting Time (hr:min) | Final Setting Time (hr:min) |
|---|---|---|
| Mix 1 | 00:28 | 00:43 |
| Mix 2 | 00:21 | 00:41 |
| Mix 3 | 00:24 | 00:45 |
| Mix 4 | 00:25 | 00:46 |

The final setting times of the geopolymer cementitious compositions of the embodiment of this Example comprising fly ash, calcium sulfoaluminate cement, anhydrite, and sodium citrate were over 40 minutes compared to an extremely rapid final setting time of about 15 minutes for the comparative mixture composition containing fly ash and sodium citrate only (Example 1). Thus, it can be concluded that addition of a mixture of calcium sulfoaluminate cement and anhydrite to a mixture of fly ash and alkali metal citrate is helpful in extending the material setting and hardening behavior and making the material more user friendly.

Compressive Strength

TABLE 44 shows the compressive strength behavior of the developed geopolymer cementitious compositions of the embodiment comprising fly ash, calcium sulfoaluminate cement, anhydrite, and alkali metal citrate investigated in Example 13.

TABLE 44

Compressive Strength of Example 13 - (psi)

| | 4 hour | 24 hour | 7 day | 28 day |
|---|---|---|---|---|
| Mix 1 | 214 | 562 | 1202 | 4414 |
| Mix 2 | 1992 | 3484 | 4213 | 6945 |
| Mix 3 | 3273 | 4477 | 6165 | 7560 |
| Mix 4 | 2971 | 5018 | 6739 | 9020 |

The following observations can be drawn from this study:

The compressive strength of the geopolymer cementitious compositions of the embodiment investigated in this Example continued to increase with time.

Both the early age compressive strength and the ultimate compressive strength of the mixture composition without anhydrite (Mix 1) were lower in comparison to those for the cementitious compositions of this embodiment comprising anhydrite (Mixes 2 through 4).

The early age (4-hour and 24-hour) compressive strength of the geopolymer cementitious compositions of this embodiment increased with increase in the amount of anhydrite in the material.

The 4-hour material compressive strengths were in excess of about 2000 psi with the use of anhydrite in the geopolymer cementitious compositions of this embodiment. Moreover, the 4-hour compressive strength of Mix 3 and Mix 4 containing anhydrite were around about 3000 psi. In contrast, in absence of anhydrite in the mixture composition, the 4-hour compressive strength of the material was less than about 300 psi for Mix 1.

The use of anhydrite provides a higher 4-hour compressive strength than landplaster in the geopolymer cementitious compositions of this embodiment. This conclusion is substantiated by comparing the compressive strength testing results for the Example 13 and Example 7.

The early age 24-hour material compressive strengths were in excess of about 3000 psi with the use of anhydrite in the geopolymer cementitious compositions of this embodiment. Moreover, the about 24-hour compressive strength of Mix 3 and Mix 4 containing anhydrite were in excess of about 4000 psi and about 5000 psi, respectively. On the other hand, in absence of anhydrite in the mixture composition, the about 24-hour compressive strength of the material was relatively low being less than about 600 psi for Mix 1.

The 28-day compressive strengths of all geopolymer cementitious compositions of this embodiment comprising fly ash, calcium sulfoaluminate, anhydrite and sodium citrate were again very high and in excess of about 6000 psi. At higher amounts of anhydrite in the compositions (Mix 3 and Mix 4) of this embodiment, the 28-day compressive strengths exceeded about 7000 psi. In comparison, the about 28-day compressive strength of the material without anhydrite (Mix 1) was only about 4500 psi.

Thus it has been very surprisingly found that the use of insoluble anhydrous calcium sulfate (anhydrite or dead burnt anhydrite) provided a faster set, a superior rate of compressive strength development, and a higher ultimate compressive strength than those obtained with the use of a relatively higher soluble calcium sulfate dihydrate (see Example 7).

Another unexpected feature of embodiments of this invention is the dependence of setting behavior and compressive strength on the type of calcium sulfate used in the compositions of the invention, as shown in this Example 13 through 18.

Example 14: Anhydrous Calcium Sulfate (Anhydrite)

An objective of this investigation was to study the influence of incorporation of anhydrous calcium sulfate (anhydrite) in the geopolymer binder compositions of this embodiment.

TABLE 45 shows the raw material compositions of the geopolymer cementitious mixtures investigated in this Example. The amount of calcium sulfoaluminate cement used in the mixture compositions of this Example was equal to 80 wt % of the weight of fly ash. Anhydrous calcium sulfate (anhydrite) was added at the following amount levels in the mixture compositions investigated—40 wt %, 50 wt %, 60 wt % and 80 wt % of the weight of calcium sulfoaluminate cement. The anhydrite was used at levels of 32, 40, 48 and 64 wt. % of the Class C fly ash. The water to cementitious materials ratio utilized in this investigation was kept constant at 0.3.

TABLE 45

Geopolymer cementitious compositions of Example 14

| Raw Material | Mix 1 | Mix 2 | Mix 3 | Mix 4 |
|---|---|---|---|---|
| Fly Ash Class C (grams) | 1415 | 1364 | 1316 | 1229.5 |
| Anhydrous calcium sulfate (Anhydrite) (grams) | 453 | 545.5 | 632 | 787 |
| Calcium Sulfoaluminate Cement (grams) | 1133 | 1091 | 1053 | 984 |
| Total Cementitious Materials (grams) | 3000 | 3000 | 3000 | 3000 |
| Sand (grams) | 3150 | 3150 | 3150 | 3150 |

TABLE 45-continued

Geopolymer cementitious compositions of Example 14

| Raw Material | Mix 1 | Mix 2 | Mix 3 | Mix 4 |
|---|---|---|---|---|
| Sodium Citrate Dihydrate (grams) | 60 | 60 | 60 | 60 |
| Superplasticizer (grams) | 15 | 15 | 15 | 15 |
| Water (grams) | 900 | 900 | 900 | 900 |
| Water/Cementitious Materials Ratio | 0.30 | 0.30 | 0.30 | 0.30 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2.0% | 2.0% | 2.0% | 2.0% |
| Calcium Sulfoaluminate Cement/Fly ash, wt % | 80% | 80% | 80% | 80% |
| Calcium Sulfate/Calcium Sulfoaluminate Cement, wt % | 40% | 50% | 60% | 80% |

Initial Flow Behavior, Slump, and Early Age Cracking Behavior of Material

TABLE 46 shows the initial flow behavior and slump characteristics of the geopolymer cementitious compositions of the embodiment comprising fly ash, calcium sulfoaluminate cement, anhydrite, and alkali metal citrate investigated in Example 14.

TABLE 46

Flow and Slump of Example 14, approx. amounts

| | Flow | Slump (inches) |
|---|---|---|
| Mix 1 | 9 | 9.75 |
| Mix 2 | 8 | 9.75 |
| Mix 3 | 8 | 9.5 |
| Mix 4 | 6 | 7.25 |

All mixture compositions investigated had good self-leveling, flow behavior and large patty diameter as observed in the slump test.

All four mixture compositions investigated in Example 14 led to a good flow behavior. For the mixes containing anhydrite the slump patties were in excellent condition and did not develop any cracking. Thus, addition of anhydrite to the geopolymer cementitious compositions of this embodiment led to dimensionally stable compositions possessing superior resistance to cracking upon drying.

Shrinkage Behavior

Figure 14:
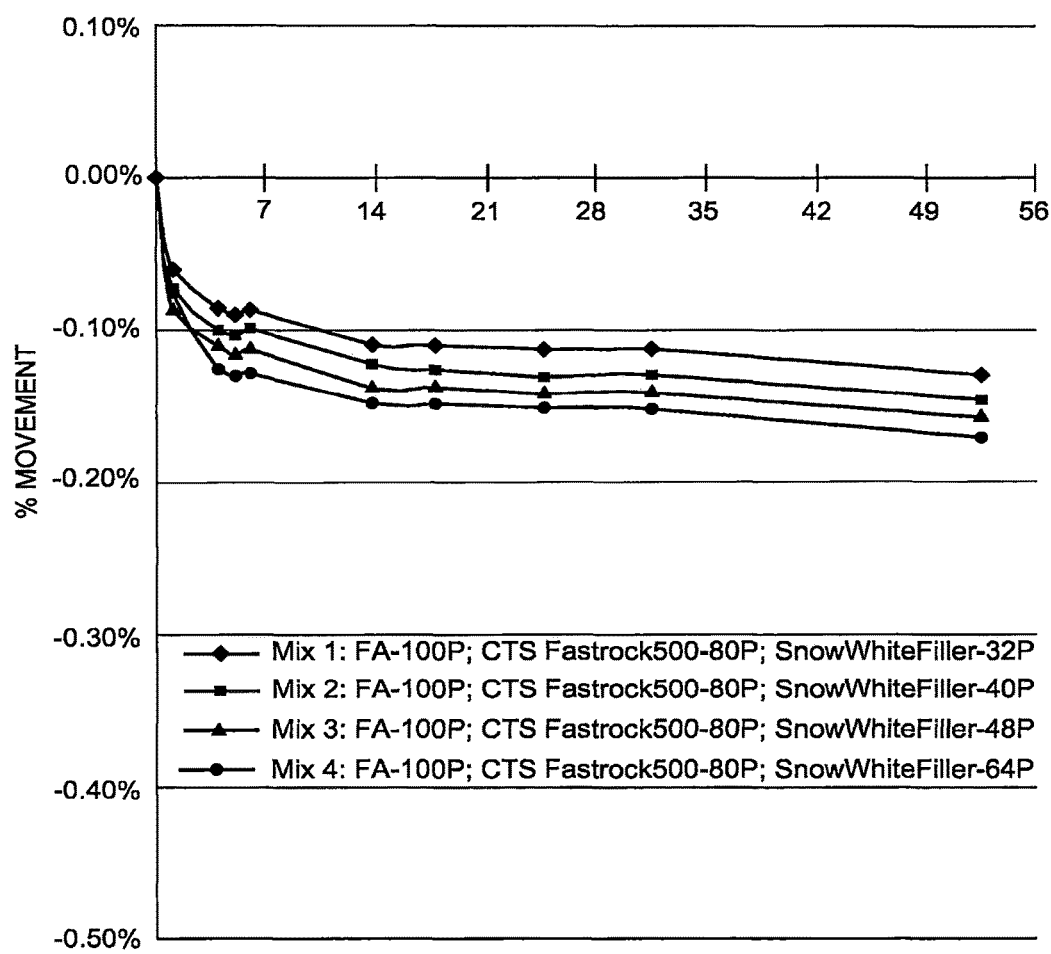
FIG. 14 is a graph of shrinkage of compositions of the invention in Example 14.

FIG. 14 shows shrinkage behavior of geopolymer cementitious compositions of the embodiment investigated in Example 14.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following important conclusions can be drawn from this investigation and FIG. 14:

Contrary to the shrinkage bars of comparative Example 4 (with no calcium sulfate) which cracked even before de-molding, the shrinkage bars of Example 14 comprising anhydrite were stable and did not result in any cracks either prior to or after de-molding.

The geopolymer cementitious compositions of this embodiment comprising fly ash, calcium sulfoaluminate cement, anhydrite, and alkali metal citrate had a maximum shrinkage less than about 0.17% in comparison to a maximum shrinkage of about 0.75% for the comparative mixture composition containing fly ash and alkali metal citrate only (Example 1).

The measured maximum shrinkage of the fly ash mixture composition containing anhydrite at an amount of about 40 wt % of calcium sulfoaluminate cement was about 0.2%. In contrast, the total shrinkage of comparative Mix 1 of Example 13 with fly ash and calcium sulfoaluminate cement but no anhydrite was about 0.2%. This shows incorporation of anhydrite in the geopolymer cementitious compositions of this embodiment is instrumental in reducing the material shrinkage significantly.

Increase in anhydrite amount beyond a certain level had an effect of increasing the shrinkage of the material. For instance, at an anhydrite amount of about 10 wt % (Mix 2 of Example 13), the measured maximum shrinkage was about 0.05%, while at an anhydrite amount of about 80 wt % (Mix 4 of Example 14), the measured maximum shrinkage increased to a value of about 0.17%.

Comparing the shrinkage testing results from Example 13 and Example 14, there is a preferred anhydrite amount range at which the material shrinkage is minimal. This preferred range of anhydrite falls above 0 but less than or equal to about 40 wt. % of the weight of calcium sulfoaluminate cement.

Time of Setting

TABLE 47 shows the time of setting of geopolymer cementitious compositions of the embodiment in Example 14.

TABLE 47

Setting Times of Example 14

| | Initial Setting Time (hr:min) | Final Setting Time (hr:min) |
|---|---|---|
| Mix 1 | 00:24 | 00:46 |
| Mix 2 | 00:24 | 00:46 |
| Mix 3 | 00:23 | 00:46 |
| Mix 4 | 00:24 | 00:47 |

Advantageously the final setting times of the geopolymer cementitious compositions of the embodiment of this Example comprising fly ash, calcium sulfoaluminate cement, anhydrite, and sodium citrate were over about 40 minutes compared to an extremely rapid final setting time of about 15 minutes for the comparative mixture composition containing fly ash and sodium citrate only (Example 1).

Compressive Strength

TABLE 48 shows the compressive strength behavior of the developed geopolymer cementitious compositions of the embodiment comprising fly ash, calcium sulfoaluminate cement, anhydrite, and alkali metal citrate investigated in Example 14.

TABLE 48

Compressive Strength of Example 14 - (psi)

| | 4 hour | 24 hour | 6 day | 28 day |
|---|---|---|---|---|
| Mix 1 | 3205 | 4677 | 5853 | 8848 |
| Mix 2 | 2489 | 5066 | 5637 | 8121 |
| Mix 3 | 2603 | 4322 | 5520 | 7222 |
| Mix 4 | 2317 | 4478 | 6267 | 8254 |

The following important observations can be drawn from this study: The compressive strength of the geopolymer cementitious compositions of the embodiment investigated in this Example continued to increase with time.

Both the early age compressive strength and the ultimate compressive strength of the comparative mixture composition without anhydrite (Comparative Mix 1 of Example 13) were lower in comparison to those for the mixes containing anhydrite (Mixes 1 through 4 of Example 14).

The 4-hour material compressive strengths were in excess of about 2000 psi with the use of anhydrite in the geopolymer cementitious compositions of this embodiment. Moreover, the 4-hour compressive strength of Mix 1 containing anhydrite at an amount of about 40% was in excess of about 3000 psi. In contrast, in absence of anhydrite in the comparative mixture composition, the 4-hour compressive strength of the material was relatively very low being less than about 300 psi, as seen for the comparative Mix 1 of Example 13.

The use of anhydrite provides a higher 4-hour compressive strength than landplaster in the geopolymer cementitious compositions of this embodiment. This conclusion is substantiated by a comparison of the compressive strength testing results for the Example 14 and Example 8.

The early age 24-hour material compressive strength was in excess of about 4000 psi with the use of anhydrite in the geopolymer cementitious compositions of this embodiment. On the other hand, in absence of anhydrite in the mixture composition, the 24-hour compressive strength of the material was relatively very low being less than about 600 psi, as seen for the comparative Mix 1 of Example 13.

The 28-day compressive strength of all geopolymer cementitious compositions of this embodiment comprising fly ash, calcium sulfoaluminate cement, anhydrite and sodium citrate was again very high and in excess of about 7000 psi. In comparison, the 28-day compressive strength of the material without anhydrite was only about 4500 psi for the comparative Mix #1 of Example 13.

As discussed above in the description, testing of the compositions of this example demonstrates that anhydrite reacted with aluminosilicate mineral, calcium sulfoaluminate cement, and alkali metal activator gives a more rapid set, a faster rate of material compressive strength development, and higher ultimate compressive strength in comparison to those obtained with calcium sulfate dihydrate in other Examples.

Example 15: Calcium Sulfate Hemihydrate

An objective of this investigation was to study the influence of incorporation of calcium sulfate hemihydrate at varying amounts in the geopolymer binder compositions of this embodiment.

TABLE 49 shows the raw material compositions of the geopolymer cementitious mixtures investigated in this example.

The amount of calcium sulfoaluminate cement used in the mixture compositions of this Example was equal to 80 wt % of the weight of fly ash. Calcium sulfate hemihydrate used in this investigation was procured from the United States Gypsum Company with trade name HYDROCAL C-Base. HYDROCAL C-Base is alpha morphological form of calcium sulfate hemihydrate. Calcium sulfate hemihydrate was added at the following amount levels in the mixture compositions investigated—0 wt %, 10 wt %, 20 wt % and 30 wt % of the weight of calcium sulfoaluminate cement. The calcium sulfate hemihydrate levels are 0, 8, 16 and 24 wt. % of the fly ash. Sodium citrate (an alkali metal citrate) added to the cementitious compositions of the invention acted as a chemical activator, rheology modifier, and set control agent. The water to cementitious materials ratio utilized in this investigation was kept constant at 0.30. The sand used is QUIKRETE Commercial Grade Fine Sand No. 1961 and the Superplasticizer is BASF CASTAMENT FS20.

TABLE 49

Geopolymer cementitious compositions of Example 15

| Raw Material | Comparative Mix 1 Weight (grams) | Mix 2 Weight (grams) | Mix 3 Weight (grams) | Mix 4 Weight (grams) |
| --- | --- | --- | --- | --- |
| Fly Ash Class C (grams) | 1668 | 1596 | 1531 | 1471 |
| Calcium Sulfate Hemihydrate (grams) | 0 | 128 | 245 | 353 |
| Calcium Sulfoaluminate Cement (grams) | 1333 | 1277 | 1224.5 | 1176.5 |
| Total Cementitious Materials (grams) | 3000 | 3000 | 3000 | 3000 |
| Sand (grams) | 3150 | 3150 | 3150 | 3150 |
| Sodium Citrate Dihydrate (grams) | 60 | 60 | 60 | 60 |
| Superplasticizer (grams) | 15 | 15 | 15 | 15 |
| Water (grams) | 900 | 900 | 900 | 900 |
| Water/Cementitious Materials Ratio | 0.30 | 0.30 | 0.30 | 0.30 |
| Sand/Cementitious Materials Ratio | 1.05 | 1.05 | 1.05 | 1.05 |
| Superplasticizer/Cementitious Materials, wt % | 0.50% | 0.50% | 0.50% | 0.50% |
| Sodium Citrate/Cementitious Materials, wt % | 2% | 2% | 2% | 2% |
| Calcium Sulfoaluminate Cement/Fly ash, wt % | 80% | 80% | 80% | 80% |
| Calcium Sulfate Hemihydrate/Calcium Sulfoaluminate Cement, wt % | 0% | 10% | 20% | 30% |

Initial Flow Behavior, Slump, and Early Age Cracking Behavior of Material.

TABLE 50 shows the initial flow behavior and slump characteristics of the geopolymer cementitious compositions of the embodiment comprising fly ash, calcium sulfoaluminate cement, calcium sulfate hemihydrate, and alkali metal citrate in Example 15.

TABLE 50

Flow and Slump of Example 15

| | Flow | Slump (inches) |
| --- | --- | --- |
| Mix 1 | 11 | 10.5 |
| Mix 2 | 10 | 9 |
| Mix 3 | 8 | 8 |
| Mix 4 | 8 | 8 |

All mixture compositions investigated had good self-leveling, flow behavior and large patty diameter as observed in the slump test.

All mixes had good flow characteristics and self-leveling behavior. The slump patties of mixes containing calcium sulfate hemihydrate were in excellent condition and did not develop any cracking. Thus, addition of calcium sulfate hemihydrate to the geopolymer cementitious compositions of this embodiment comprising calcium sulfoaluminate cement, fly ash, and alkali metal citrate provides dimensionally stable compositions possessing superior resistance to cracking upon drying.

Shrinkage Behavior

Figure 15A:
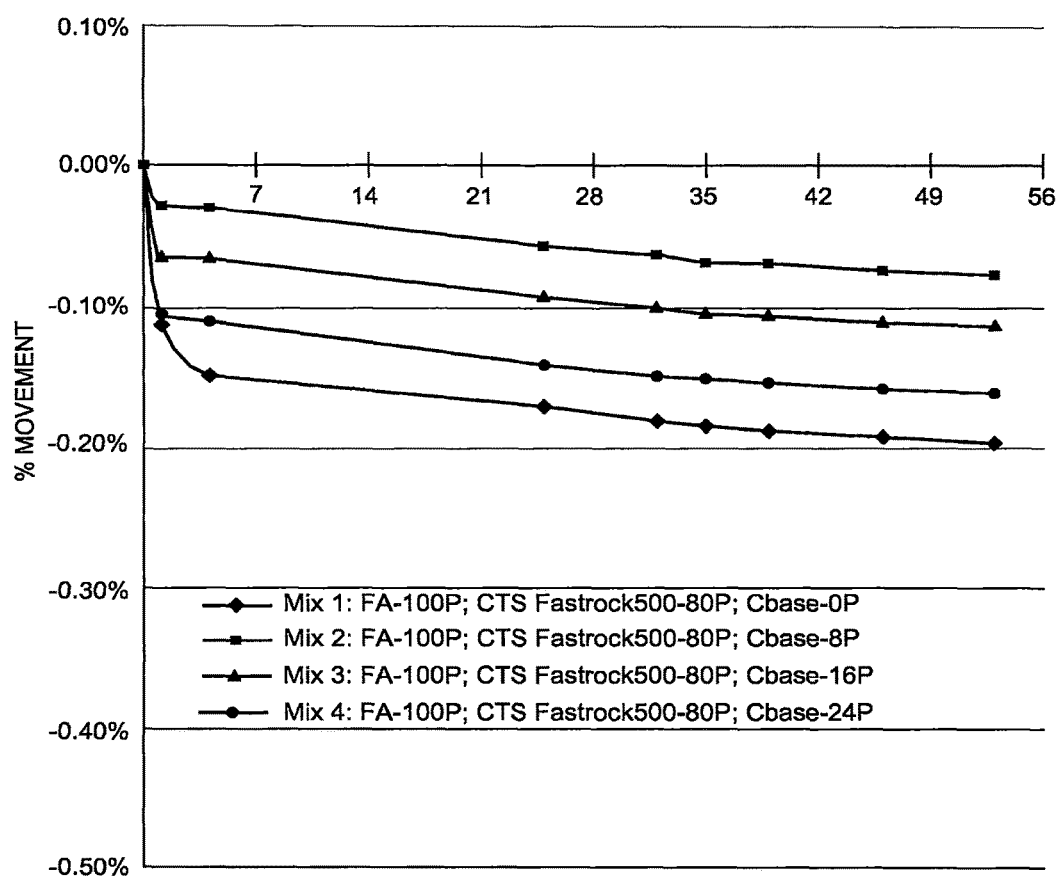
FIG. 15A is a graph of shrinkage of compositions of the invention in Example 15.

FIG. 15A shows shrinkage behavior of geopolymer cementitious compositions of the embodiment investigated in Example 15.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following important conclusions can be drawn from this investigation and FIG. 15A:

Contrary to the shrinkage bars of comparative Example 4 (with no calcium sulfate) which cracked even before de-molding, the shrinkage bars of Example 15 comprising calcium sulfate hemihydrate were stable and did not result in any cracks either prior to or after de-molding.

The geopolymer cementitious compositions of this embodiment comprising fly ash, calcium sulfoaluminate cement, calcium sulfate hemihydrate, and alkali metal citrate had a measured maximum shrinkage ranging of about 0.08% to about 0.16% in comparison to a measured maximum shrinkage of about 0.75% for the comparative mixture composition containing fly ash and alkali metal citrate only (Example 1).

The measured maximum shrinkage of the fly ash mixture composition containing calcium sulfate hemihydrate at an amount of about 10 wt % of calcium sulfoaluminate cement was about 0.08%. In contrast, the total shrinkage of comparative Mix 1 with fly ash and calcium sulfoaluminate cement but no calcium sulfate hemihydrate was about 0.2%. This shows incorporation of calcium sulfate hemihydrate in the geopolymer cementitious compositions of this embodiment reduces material shrinkage significantly.

Heat Evolution and Slurry Temperature Rise Behavior

Figure 15B:
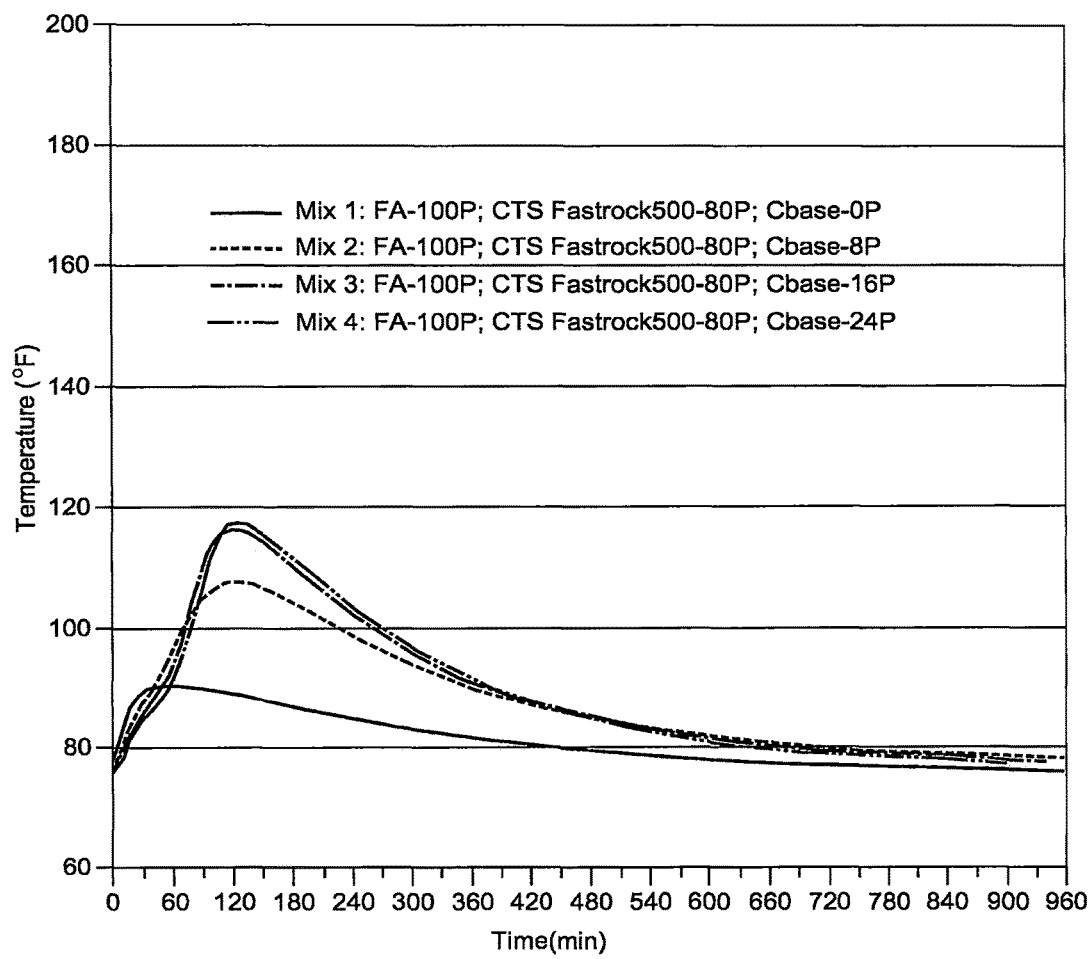
FIG. 15B is a graph of slurry temperature rise of compositions of the invention of Example 15.

FIG. 15B shows the exothermic and slurry temperature rise behavior of geopolymer cementitious compositions of this embodiment in Example 15. The cementitious compositions of this Example comprising fly ash, calcium sulfoaluminate cement, calcium sulfate hemihydrate, and alkali metal citrate demonstrated only a very moderate temperature rise behavior. A moderate heat evolution and low temperature rise within the material during the curing stage contribute to preventing excessive thermal expansion and consequent cracking and disruption of material. This aspect becomes even more helpful when the material is utilized in a manner where large thicknesses of material pours are involved in the actual field applications. The geopolymer cementitious compositions of this embodiment investigated in this Example are disclosed to be highly beneficial in this particular aspect as they would lead to a lower thermal expansion and enhanced resistance to thermal cracking in actual field applications.

Time of Setting

TABLE 51 shows the time of setting of geopolymer cementitious compositions of the embodiment in Example 15.

TABLE 51

Setting Times of Example 15

| | Initial Setting Time (hr:min) | Final Setting Time (hr:min) |
| --- | --- | --- |
| Comparative Mix 1 | 00:25 | 00:40 |
| Mix 2 | 00:39 | 1:29 |
| Mix 3 | 1:01 | 1:38 |
| Mix 4 | 1:12 | 1:46 |

The final setting times of the geopolymer cementitious compositions of the embodiment of this Example comprising fly ash, calcium sulfoaluminate cement, calcium sulfate hemihydrate, and sodium citrate were over about 90 minutes compared to an extremely rapid final setting time of about 15 minutes for the comparative mixture composition containing fly ash and sodium citrate only (Example 1).

As discussed above in the description, a comparison of the test results of this Example with the setting times in Example 13 and Example 7, shows that calcium sulfate hemihydrate is unexpectedly more potent than both anhydrite and landplaster in extending the setting times of the compositions containing fly ash, calcium sulfoaluminate cement and alkali metal citrate.

Compressive Strength

TABLE 52 shows the compressive strength behavior of the developed geopolymer cementitious compositions of the embodiment in Example 15.

TABLE 52

Approx. Compressive Strength of Example 15 - (psi)

|  | 4 hour | 24 hour | 7 day | 28 day |
|---|---|---|---|---|
| Comparative Mix 1 | 238 | 532 | 1708 | 3879 |
| Mix 2 | 1396 | 3482 | 4416 | 5571 |
| Mix 3 | 3096 | 4517 | 6570 | 7181 |
| Mix 4 | 3418 | 4931 | 6913 | 7267 |

The following observations can be drawn from this study:

The compressive strength of the geopolymer cementitious compositions of this embodiment continued to increase as a function of time.

Both the early age compressive strength and the ultimate compressive strength of the mixture composition without calcium sulfate hemihydrate (Mix 1) were lower in comparison to those for the cementitious compositions of this embodiment comprising calcium sulfate hemihydrate (Mixes 2 through 4).

The early age (about 4-hour and about 24-hour) compressive strength of the geopolymer cementitious compositions of this embodiment increased with increase in the quantity of calcium sulfate hemihydrate in the material.

The 4-hour material compressive strength was in excess of about 1000 psi with the use of calcium sulfate hemihydrate in the geopolymer cementitious compositions of this embodiment. Moreover, the 4-hour compressive strengths of Mix 3 and Mix 4 containing calcium sulfate hemihydrate were in excess of about 3000 psi. On the other hand, the mixture composition containing no calcium sulfate hemihydrate, the 4-hour compressive strength of the material was very low being i.e. less than about 300 psi for Mix 1.

The use of calcium sulfate hemihydrate provides a higher 4-hour compressive strength than landplaster in the geopolymer cementitious compositions of this embodiment. This conclusion is substantiated by making a comparison of the compressive strength testing results for the Example 15 with those of the Example 7.

The about 24-hour material compressive strength was in excess of about 3000 psi with the use of calcium sulfate hemihydrate in the geopolymer cementitious compositions of this embodiment. Moreover, the about 24-hour compressive strength of Mix 3 and Mix #4 geopolymer cementitious compositions of this embodiment comprising fly ash, calcium sulfoaluminate, anhydrite and sodium citrate containing calcium sulfate hemihydrate was in excess of about 4000 psi. In contrast, for the comparative mixture composition containing no calcium sulfate hemihydrate, the about 24-hour compressive strength of the material was relatively very low being less than about 600 psi for Mix 1.

The about 28-day compressive strength of all geopolymer cementitious compositions of this embodiment comprising fly ash, calcium sulfoaluminate, anhydrite and sodium citrate was again very high and in excess of about 5000 psi. At higher amounts of calcium sulfate hemihydrate in the compositions (Mix 3 and Mix 4) of this embodiment, the 28-day compressive strength exceeded about 7000 psi. In comparison, the 28-day compressive strength of the comparative material without calcium sulfate hemihydrate (Mix 1) was found to be less than about 4000 psi.

Example 16

An objective of this investigation was to study the influence of incorporation of calcium sulfate hemihydrate at varying amounts in the geopolymer binder compositions of this embodiment.

TABLE 53 shows the raw material compositions of the geopolymer cementitious mixtures investigated in this example. FASTROCK 500 brand calcium sulfoaluminate cement, available from CTS Cement Company was again utilized as a component of cementitious reactive powder. The amount of calcium sulfoaluminate cement used in the mixture compositions of this Example was 80 wt % of the weight of Class C fly ash. Calcium sulfate hemihydrate, USG HYDROCAL C-Base, was added at the following amount levels in the mixture compositions investigated—40 wt %, 50 wt %, 60 wt % and 80 wt % of the weight of calcium sulfoaluminate cement. The calcium sulfate hemihydrate was used in levels of 32, 40 48 and 64 wt. % of the fly ash. The water to cementitious materials ratio utilized in this investigation was kept constant at 0.30. The sand is QUIKRETE Commercial Grade Fine Sand No. 1961 and the superplasticizer is BASF CASTAMENT FS20.

TABLE 53

Geopolymer cementitious compositions of Example 16

| Raw Material | Mix 1 | Mix 2 | Mix 3 | Mix 4 |
|---|---|---|---|---|
| Fly Ash Class C (grams) | 1415 | 1364 | 1316 | 1230 |
| Calcium Sulfate Hemihydrate (grams) | 453 | 546 | 633 | 787 |
| Calcium Sulfoaluminate Cement (grams) | 1132 | 1091 | 1053 | 984 |
| Total Cementitious Materials (grams) | 3000 | 3000 | 3000 | 3000 |
| Sand (grams) | 3150 | 3150 | 3150 | 3150 |
| Sodium Citrate Dihydrate (grams) | 60 | 60 | 60 | 60 |
| Superplasticizer (grams) | 15 | 15 | 15 | 15 |
| Water (grams) | 900 | 900 | 900 | 900 |
| Water/Cementitious Materials Ratio | 0.30 | 0.30 | 0.30 | 0.30 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2% | 2% | 2% | 2% |
| Calcium Sulfoaluminate cement/Fly ash, wt % | 32% | 80% | 80% | 80% |
| Calcium Sulfate/Calcium Sulfoaluminate Cement, wt % | 40% | 50% | 60% | 80% |

Initial Flow Behavior, Slump, and Early Age Cracking Behavior of Material

TABLE 54 shows the initial flow behavior and slump characteristics of the geopolymer cementitious compositions of this embodiment comprising fly ash, calcium sulfoaluminate cement, calcium sulfate hemihydrate, and alkali metal citrate investigated in Example 16.

TABLE 54

Flow and Slump of Example 16, in approx. amounts

| | Flow | Slump (inches) |
|---|---|---|
| Mix 1 | 9 | 8.25 |
| Mix 2 | 9 | 8.25 |
| Mix 3 | 9 | 8 |
| Mix 4 | 8 | 7.75 |

All mixture compositions investigated had good self-leveling, flow behavior and large patty diameter as observed in the slump test.

Figure 16A:
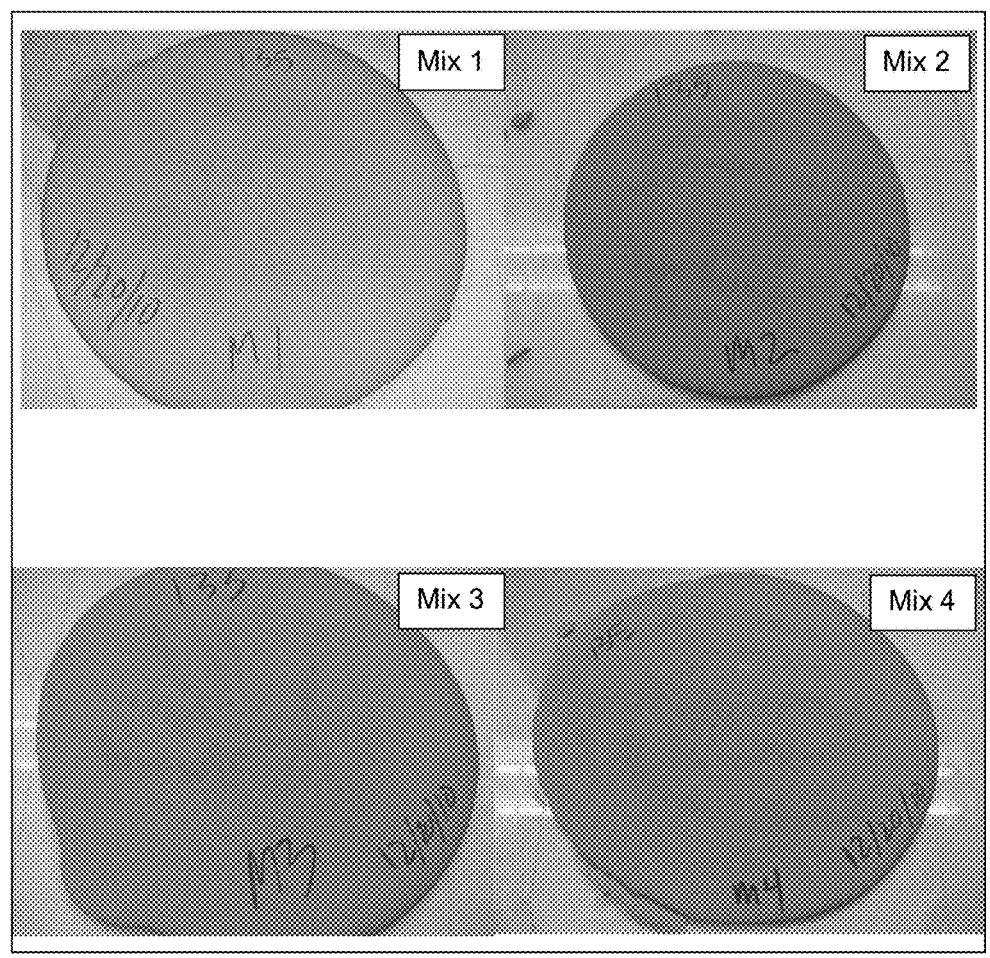
FIG. 16A contains photographs of slump patties of compositions of the invention of Example 16.

FIG. 16A shows photographs of slump patties for the mixes investigated in Example 16. All mixes had good flow characteristics and self-leveling behavior. It can also be observed that for the Mixes 2, 3 and 4 containing calcium sulfate hemihydrate, the slump patties developed some microcracking. Thus, it can be concluded that addition of calcium sulfate hemihydrate at high amount levels to mixtures containing calcium sulfoaluminate cement, fly ash and alkali metal citrate provides cementitious compositions possessing relatively inferior resistance to microcracking upon drying.

Shrinkage Behavior.

Figure 16B:
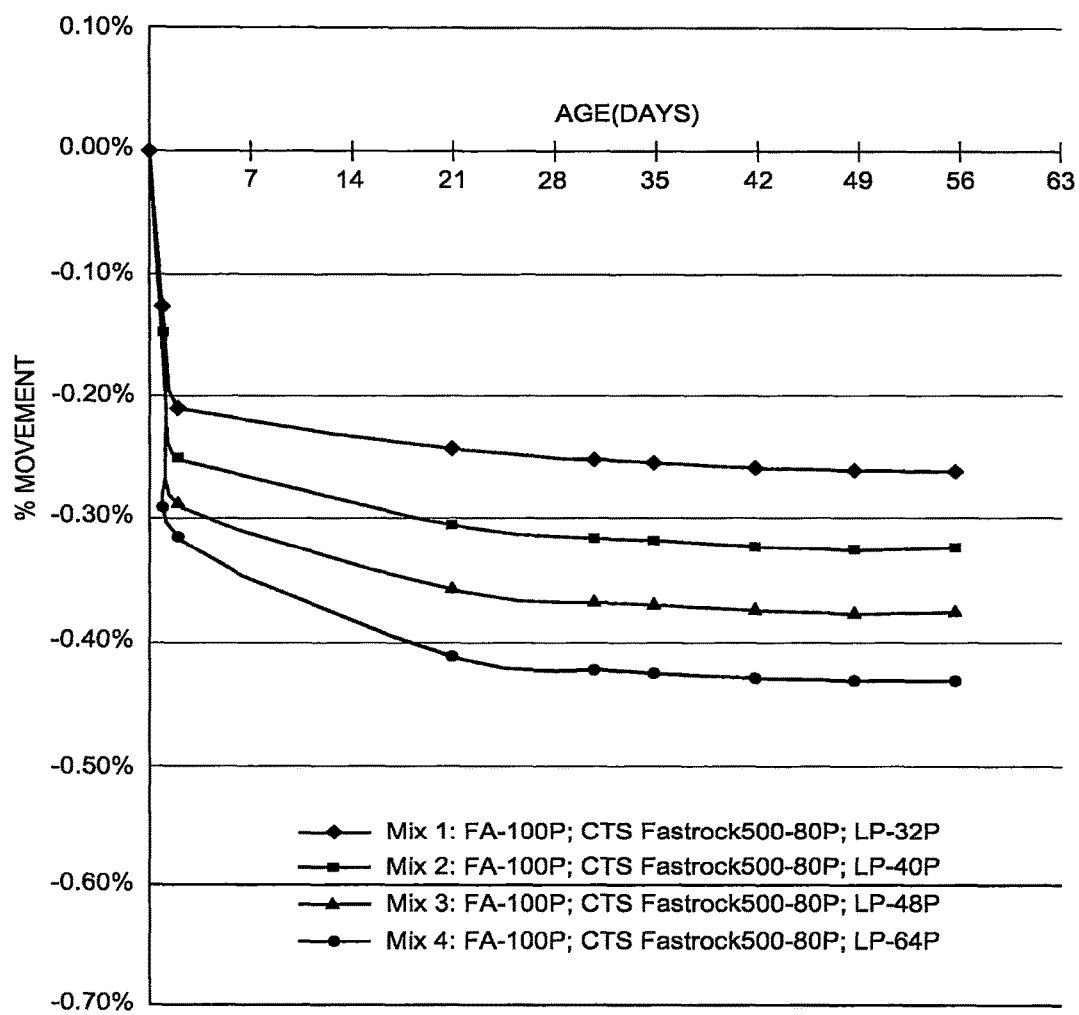
FIG. 16B is a graph of shrinkage of compositions of the invention in Example 16.

FIG. 16B shows shrinkage behavior of geopolymer cementitious compositions of this embodiment investigated in Example 16 incorporating calcium sulfoaluminate cement in combination with calcium sulfate hemihydrate and an alkali metal citrate.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following conclusions can be drawn from this investigation and FIG. 16c:

The geopolymer cementitious compositions of this embodiment comprising fly ash, calcium sulfoaluminate cement, calcium sulfate hemihydrate, and alkali metal citrate had a measured maximum shrinkage of less than about 0.44% in comparison to a measured maximum shrinkage of about 0.75% for the comparative mixture composition containing fly ash and alkali metal citrate only (Example 1).

Increase in calcium sulfate hemihydrate amounts increased the shrinkage of the material. For instance, at a calcium sulfate hemihydrate amount of about 10 wt % (Mix 1 of Example 15), the total shrinkage was about 0.08%. At a calcium sulfate hemihydrate amount of about 80 wt % (Mix 4 of Example 16), the total shrinkage of the material increased very significantly to a value of about 0.44%.

Comparing the shrinkage testing results from Example 15 and Example 16, it can be concluded there exists a preferred calcium sulfate hemihydrate amount range at which the material shrinkage is minimal. This preferred range of calcium sulfate hemihydrate falls in a range from above about 0% to less than or equal to about 40 wt % of the weight of calcium sulfoaluminate cement.

Time of Setting

TABLE 55 shows the time of setting of geopolymer cementitious compositions of this embodiment in Example 16.

TABLE 55

Approx. Setting Times of Example 16

| | Initial Setting Time (hr:min) | Final Setting Time (hr:min) |
|---|---|---|
| Mix 1 | 1:12 | 2:11 |
| Mix 2 | 1:14 | 2:13 |
| Mix 3 | 1:20 | 2:12 |
| Mix 4 | 1:18 | 2:13 |

All cementitious compositions investigated in this Example demonstrated rapid setting behavior. The final setting times of the geopolymer cementitious compositions of the embodiment of this Example comprising fly ash, calcium sulfoaluminate cement, calcium sulfate hemihydrate, and sodium citrate were around 120 minutes compared to an extremely rapid final setting time of about 15 minutes for the comparative mixture composition containing fly ash and sodium citrate only (Example 1).

Comparing the testing results of this Example with those of Example 15 and Example 8, indicates calcium sulfate hemihydrate is more potent than both anhydrite and landplaster in extending the setting times of the mixture compositions containing fly ash, calcium sulfoaluminate cement and alkali metal citrate.

The use of calcium sulfate hemihydrate as the form of calcium sulfate provided a much longer set time in comparison to the set time obtained with the use of calcium sulfate dihydrate (see Example 7). As discussed above in the description, this result was unexpected because it is well known in the art that calcium sulfate hemihydrate is an extremely rapid setting material. Addition of calcium sulfate hemihydrate in some embodiments of the compositions of invention provided extended setting times in comparison to embodiments with calcium sulfate dihydrate and anhydrous calcium sulfate Compressive Strength TABLE 56 shows the compressive strength behavior of the developed geopolymer cementitious compositions of this embodiment comprising fly ash, calcium sulfoaluminate cement, calcium sulfate hemihydrate, and alkali metal citrate in Example 16.

TABLE 56

Compressive Strength of Example 16 - (psi)

| | 4 hour | 24 hour | 7 day | 28 day |
|---|---|---|---|---|
| Mix 1 | 2714 | 5374 | 6971 | 8142 |
| Mix 2 | 2299 | 5385 | 6722 | 8061 |
| Mix 3 | 1940 | 4921 | 6820 | 7684 |
| Mix 4 | 1536 | 4420 | 6721 | 8911 |

The following important observations can be drawn from this study:

The compressive strength of the geopolymer cementitious compositions of the embodiment investigated in this Example continued to increase with time.

Both the early age compressive strength and the ultimate compressive strength of the mixture composition without calcium sulfate hemihydrate (Mix 1 of Example 15) were lower in comparison to those for the cementitious compositions of this embodiment comprising calcium sulfate hemihydrate (Mixes 1 through 4 of Example 16).

The 4-hour material compressive strength was in excess of about 1500 psi with the use of calcium sulfate hemihydrate in the geopolymer cementitious compositions of this embodiment. Moreover, the 4-hour compressive strength of Mix 1 containing calcium sulfate hemihydrate at an amount of about 40% was in excess of about 2500 psi. In contrast, for the comparative mixture composition containing no calcium sulfate hemihydrate (Mix 1 of Example 15), the 4-hour compressive strength of the material was relatively very low being less than about 300 psi.

The use of calcium sulfate hemihydrate provides a higher 4-hour compressive strength than landplaster in the geopolymer cementitious compositions of this embodiment. This is shown by a comparison of the compressive strength testing results for Example 16 with those of Example 8.

The about 24-hour material compressive strength was in excess of about 4000 psi with the use of calcium sulfate hemihydrate in the geopolymer cementitious compositions of this embodiment. On the other hand, for the comparative mixture composition comprising no calcium sulfate hemihydrate (Mix 1 of Example 15), the about 24-hour compressive strength of the material was relatively low at less than about 600 psi.

The 28-day compressive strength of all geopolymer cementitious compositions of this embodiment comprising fly ash, calcium sulfoaluminate cement, calcium sulfate hemihydrate and sodium citrate was very high i.e. in excess of about 7000 psi. In comparison, the 28-day compressive strength of the comparative material without calcium sulfate hemihydrate (Mix 1 of Example 15) was less than about 4000 psi.

Example 17: Coarse-Grained Calcium Sulfate Dihydrate

An objective of this investigation was to study the influence of incorporation of coarse-grained calcium sulfate dihydrate in the geopolymer binder compositions of this embodiment.

TABLE 57 shows the raw material compositions of the geopolymer cementitious mixtures investigated in this example. The amount of calcium sulfoaluminate cement used in the mixture compositions of this example was 80 wt % of the weight of Class C fly ash. Coarse-grained calcium sulfate dihydrate, otherwise identified here as coarse landplaster, was procured from the United States Gypsum Company and is available with the trade name USG Ben Franklin AG Coarse Gypsum. Coarse landplaster was added at different amount levels 0 wt %, 10 wt %, 20 wt %, and 30 wt % of the weight of FASTROCK 500 calcium sulfoaluminate cement in the various mixture compositions investigated. The landplaster was added at levels of 0, 8, 16 and 24 wt. % based upon the weight of fly ash. The sand used is QUIKRETE Commercial Grade Fine Sand No. 1961 and the Superplasticizer is BASF CASTAMENT.

TABLE 57

Geopolymer cementitious compositions of Example 17

| Raw Material | Comparative Mix 1 | Mix 2 | Mix 3 | Mix 4 |
|---|---|---|---|---|
| Fly Ash Class C (grams) | 1668 | 1596 | 1531 | 1471 |
| Calcium Sulfate Dihydrate (grams) | 0 | 128 | 245 | 353 |
| Calcium Sulfoaluminate Cement (grams) | 1333 | 1277 | 1225 | 1177 |
| Total Cementitious Materials (grams) | 3000 | 3000 | 3000 | 3000 |
| Sand (grams) | 3150 | 3150 | 3150 | 3150 |

TABLE 57-continued

Geopolymer cementitious compositions of Example 17

| Raw Material | Comparative Mix 1 | Mix 2 | Mix 3 | Mix 4 |
|---|---|---|---|---|
| Sodium Citrate Dihydrate (grams) | 60 | 60 | 60 | 60 |
| Superplasticizer (grams) | 15 | 15 | 15 | 15 |
| Water(grams) | 900 | 900 | 900 | 900 |
| Water/Cementitious Materials Ratio | 0.30 | 0.30 | 0.30 | 0.30 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2% | 2% | 2% | 2% |
| Calcium Sulfoaluminate cement/Fly ash, wt % | 80% | 80% | 80% | 80% |
| Calcium Sulfate/Calcium Sulfoaluminate Cement, wt % | 0% | 10% | 20% | 30% |

Initial Flow Behavior, Slump, and Early Age Cracking Behavior of Material

TABLE 58 shows the initial flow behavior and slump characteristics of the geopolymer cementitious compositions of this embodiment comprising fly ash, calcium sulfoaluminate cement, coarse-grained landplaster, and alkali metal citrate in Example 17.

TABLE 58

Flow and Slump of Example 17

| | Flow | Slump (inches) |
|---|---|---|
| Mix 1 | 10 | 11 |
| Mix 2 | 10 | 9.75 |
| Mix 3 | 10 | 10.25 |
| Mix 4 | 10 | 10.5 |

All mixture compositions investigated had good flow behavior and large patty diameter as observed in the slump test.

Figure 17A:
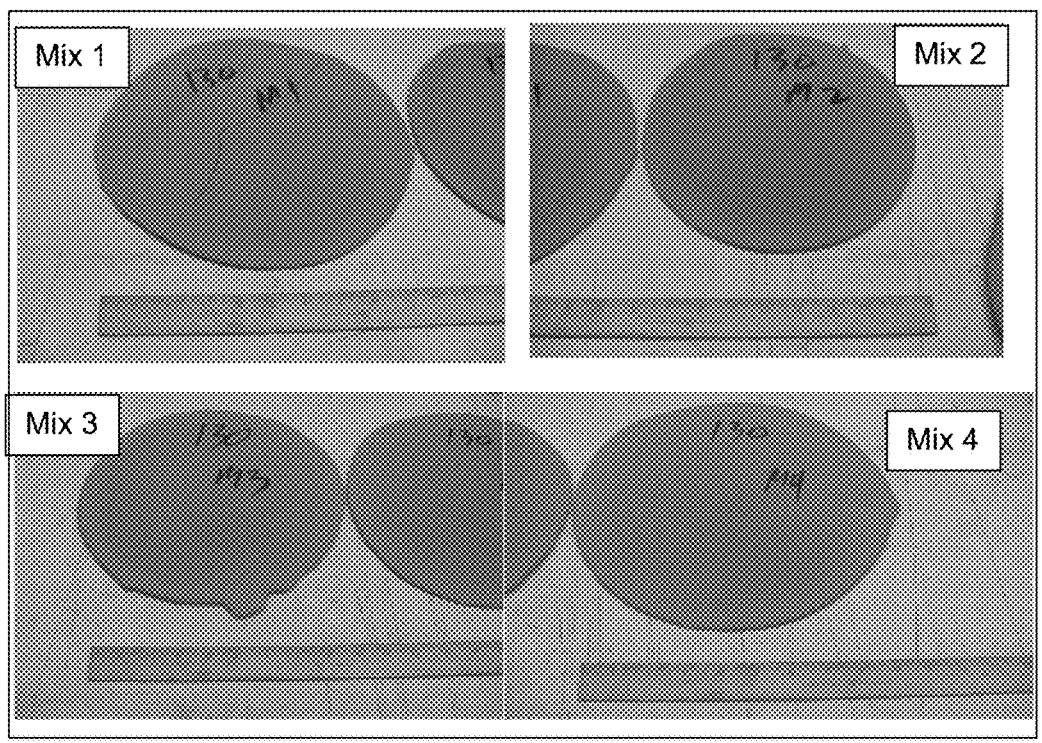
FIG. 17A contains photographs of slump patties of compositions of the invention of Example 17.

FIG. 17A shows photographs of slump patties for the geopolymer cementitious compositions of the embodiment investigated in Example 17. Comparative Mix 1 that did not contain any calcium sulfate (coarse-grained landplaster) and its slump patty developed significant cracking upon drying. However, for mixes containing coarse-grained landplaster, the slump patties were in excellent condition and did not develop any cracking. Thus, it can seen addition of coarse-grained landplaster to the cementitious mixtures comprising calcium sulfoaluminate cement, fly ash, and alkali metal citrate provides dimensionally stable geopolymer cementitious compositions with moderate heat evolution and low temperature rise within the material during the curing stage to prevent excessive thermal expansion and consequent cracking and disruption of material upon drying.

Shrinkage Behavior

Figure 17B:
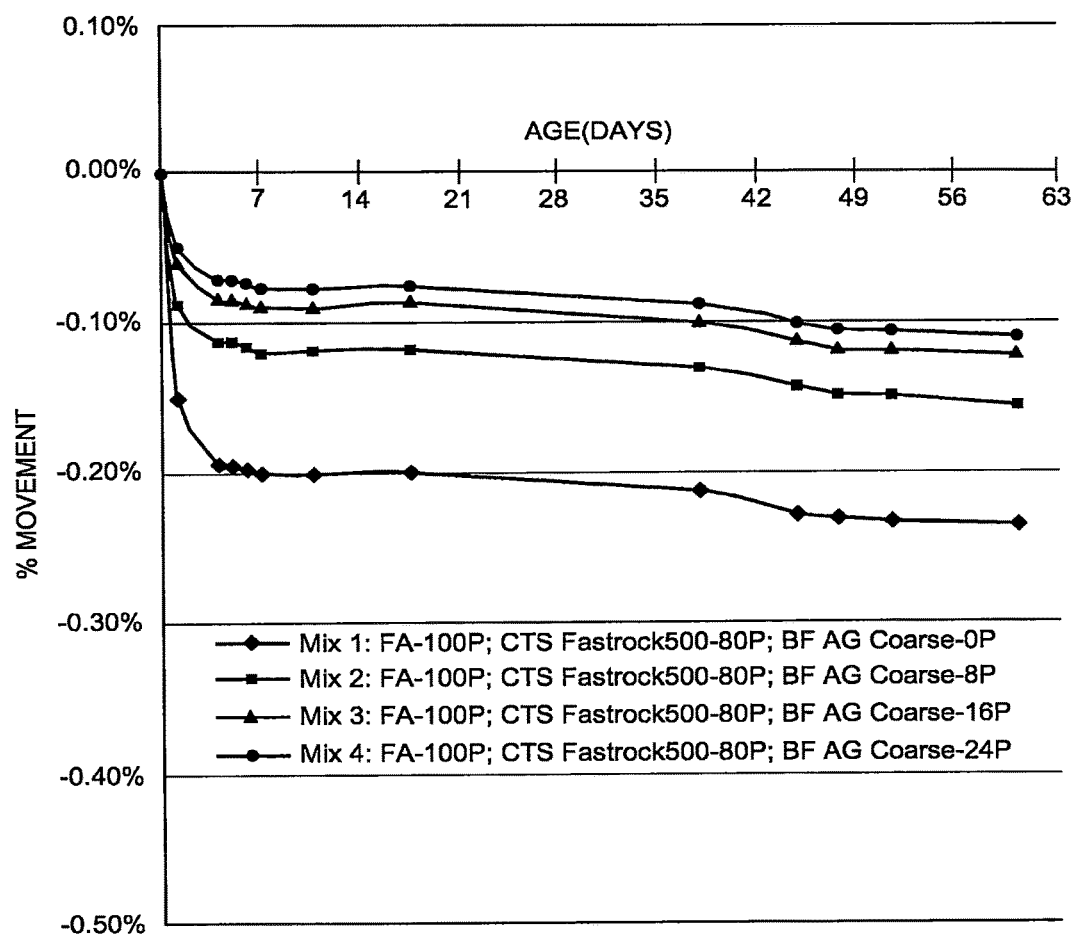
FIG. 17B is a graph of shrinkage of compositions of the invention in Example 17.

FIG. 17B shows shrinkage behavior of geopolymer cementitious compositions of the embodiment investigated in Example 17.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following important conclusions can be drawn from the results of this investigation and FIG. 17B:

Contrary to the shrinkage bars of comparative Example 4 (with no calcium sulfate) which cracked even before de-molding, the shrinkage bars of Example 17 comprising coarse-grained landplaster (Mix 2, 3 and 4) were stable and did not result in any cracks prior to or after de-molding.

The geopolymer cementitious compositions of this embodiment comprising fly ash, calcium sulfoaluminate cement, coarse-grained landplaster, and alkali metal citrate had a maximum shrinkage ranging of about 0.11% to about 0.16% in comparison to a maximum shrinkage of about 0.75% for the comparative mixture composition containing fly ash and alkali metal citrate only (Example 1).

The mixture compositions Mixes 2, 3 and 4 comprising fly ash, calcium sulfoaluminate cement, calcium sulfate (coarse-grained landplaster), and alkali metal citrate had a maximum shrinkage ranging of about 0.11% to about 0.16%, while the maximum shrinkage of the comparative Mix 1 comprising fly ash, calcium sulfoaluminate cement, and alkali metal citrate but no calcium sulfate (landplaster) was about 0.24%.

Increase in the coarse-grained landplaster amount in the range investigated in this Example resulted in an overall decrease in the material shrinkage. For example, at a coarse-grained landplaster amount of about 10 wt %, the measured maximum shrinkage was about 0.16%, while at a coarse-grained landplaster amount of about 30 wt % the measured maximum shrinkage reduced to about 0.11%.

Comparing the shrinkage testing results from Example 7 and Example 17, indicates the use of a landplaster with finer particle size provides a lower shrinkage. For example, with the use of coarse-grained landplaster of Example 17 at an amount of about 30 wt %, the maximum shrinkage was about 0.11%; on the other hand, with the use of fine-grained landplaster of Example 7, the maximum shrinkage was only about 0.06% at the same landplaster amount of about 30 wt %.

Heat Development and Slurry Temperature Rise Behavior

Figure 17C:
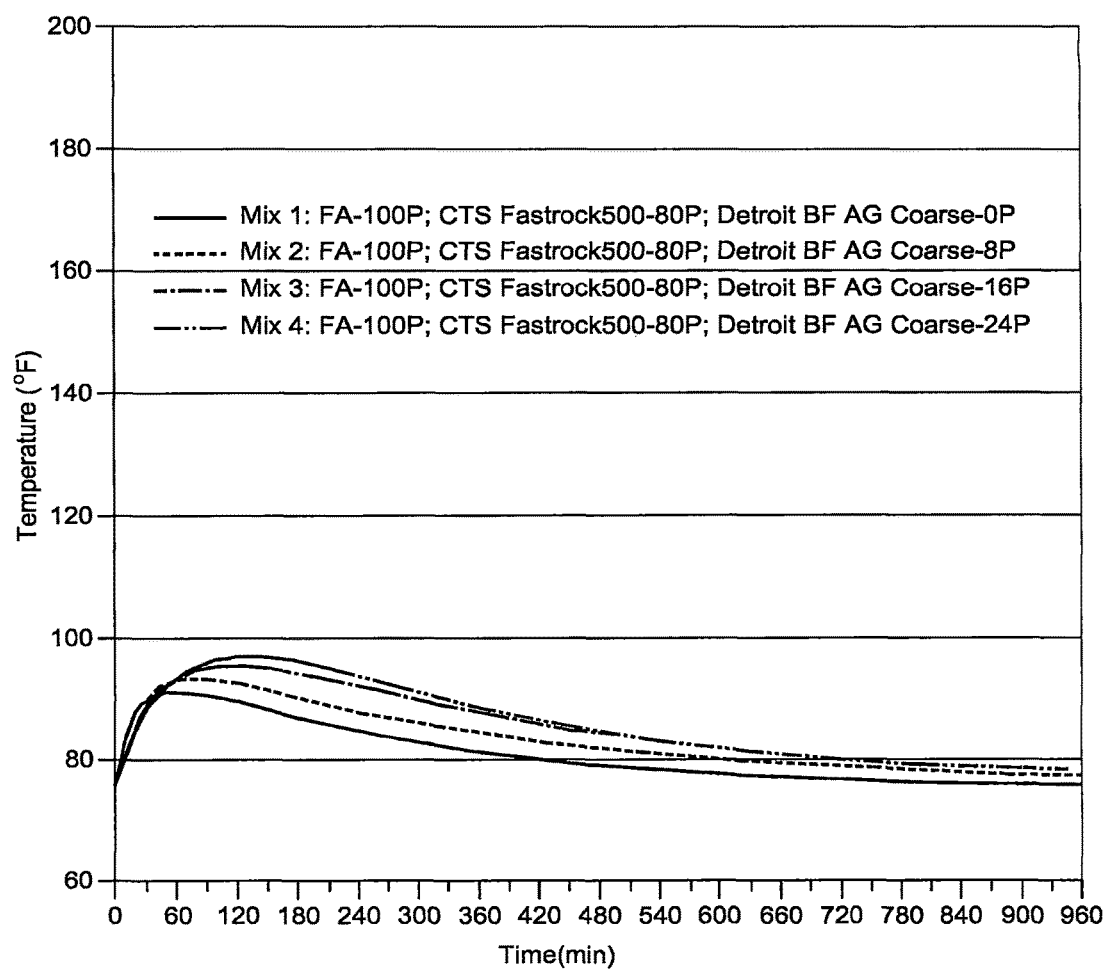
FIG. 17C is a graph of slurry temperature rise of compositions of the invention of Example 17.

FIG. 17C shows the exothermic and slurry temperature rise behavior of geopolymer cementitious compositions of the embodiment investigated in Example 17. The cementitious compositions of Example 17 comprising fly ash, calcium sulfoaluminate cement, coarse-grained landplaster, and alkali metal citrate demonstrated only a very moderate temperature rise behavior. Furthermore, comparing the temperature rise testing results for Example 17 and Example 7, indicates the use of coarse landplaster provides a relatively lower temperature rise than that obtained with the use of fine-grained landplaster. A moderate heat evolution and low temperature rise within the material during the curing stage significantly contributes to preventing excessive thermal expansion and consequent cracking and disruption of material. This aspect becomes even more helpful when the material is utilized in a manner where large thicknesses of material pours are involved in the actual field applications. The geopolymer cementitious compositions of the embodiment investigated in this Example are disclosed to be highly beneficial in this particular aspect as they would lead to a lower thermal expansion and enhanced resistance to thermal cracking in actual field applications.

Time of Setting

TABLE 59 shows the time of setting of geopolymer cementitious compositions of the embodiment in Example 17.

TABLE 59

Setting Times of Example 17

|  | Initial Setting Time (hr:min) | Final Setting Time (hr:min) |
| --- | --- | --- |
| Comparative Mix 1 | 00:23 | 00:45: |
| Mix 2 | 00:27 | 00:57 |
| Mix 3 | 00:32 | 00:59 |
| Mix 4 | 00:30 | 00:59 |

All cementitious compositions investigated in this Example demonstrated rapid setting behavior. The final setting times of the geopolymer cementitious compositions of the embodiment of this Example comprising fly ash, calcium sulfoaluminate cement, coarse-grained landplaster, and sodium citrate were about 60 minutes compared to an extremely rapid final setting time of about 15 minutes for the comparative mixture composition containing fly ash and sodium citrate only (Example 1).

Compressive Strength

TABLE 60 shows the compressive strength behavior of the developed geopolymer cementitious compositions of this embodiment comprising fly ash, calcium sulfoaluminate cement, coarse-grained landplaster, and alkali metal citrate investigated in Example 17.

TABLE 60

Approx. Compressive Strength of Example 17 - (psi)

|  | 4 hour | 24 hour | 7 day | 28 day |
| --- | --- | --- | --- | --- |
| Comparative Mix 1 | 206 | 568 | 1445 | 3965 |
| Mix 2 | 266 | 1037 | 2489 | 4321 |
| Mix 3 | 346 | 1683 | 3242 | 5708 |
| Mix 4 | 400 | 1833 | 3727 | 5523 |

The following observations can be drawn from this study:

The compressive strength of the geopolymer cementitious compositions of the embodiment investigated in this Example continued to increase with time.

Both the early age compressive strength and the ultimate compressive strength of the mixture composition without landplaster (Mix 1) were lower compared to those for the cementitious compositions of this embodiment comprising coarse-grained landplaster (Mixes 2 through 4).

The early age (about 4-hour and about 24-hour) compressive strength of the geopolymer cementitious compositions of this embodiment increased with increase in the amount of coarse-grained landplaster in the material. However, the increase in 4-hour compressive strength obtained with an increase in coarse-grained landplaster content was only nominal and not very significant.

The early age 24-hour compressive strength of the material was in excess of about 1000 psi with the use of coarse-grained landplaster in the geopolymer cementitious compositions of this embodiment.

The 28-day compressive strength of all geopolymer cementitious compositions of this embodiment comprising fly ash, calcium sulfoaluminate, coarse-grained landplaster and sodium citrate was relatively high, i.e., in excess of about 4000 psi. Moreover, the 28-day compressive strength of the mixture compositions containing coarse landplaster at an amount of about 20 wt % and about 30 wt % (Mixes #3 and #4) were particularly very high, in excess of about 5000 psi.

Comparing the testing results for Example 17 and Example 7, it can be seen that the use of finer landplaster provides a more rapid increase in the 4-hour and 24-hour material compressive strengths, and a relatively higher 28-day material compressive strength.

Example 18

An objective of this investigation was to study the influence of incorporation of coarse-grained calcium sulfate dihydrate in the geopolymer binder compositions of the invention.

TABLE 61 shows the raw material compositions of the geopolymer cementitious mixtures investigated in this example. The amount of calcium sulfoaluminate cement used in the mixture compositions of this Example was equal to 80 wt % of the weight of fly ash. Coarse landplaster was added at different amount levels (40 wt %, 50 wt %, 60 wt %, and 80 wt % of the weight of calcium sulfoaluminate cement) in the various mixture compositions investigated. The landplaster was added at levels of 32, 40, 48 and 64 wt. % of the Class C fly ash. The sand used is QUIKRETE Commercial Grade Fine Sand No. 1961 and the Superplasticizer is BASF CASTAMENT.

TABLE 61

Geopolymer cementitious mixture compositions of Example 18

| Raw Material | Mix 1 | Mix 2 | Mix 3 | Mix 4 |
|---|---|---|---|---|
| Fly Ash Class C (grams) | 1415 | 1364 | 1316 | 1230 |
| Calcium Sulfate Dihydrate (grams) | 453 | 546 | 632 | 787 |
| Calcium Sulfoaluminate Cement (grams) | 1133 | 1091 | 1053 | 984 |
| Total Cementitious Materials (grams) | 3000 | 3000 | 3000 | 3000 |
| Sand (grams) | 3150 | 3150 | 3150 | 3150 |
| Sodium Citrate Dihydrate (grams) | 60 | 60 | 60 | 60 |
| Superplasticizer (grams) | 15 | 15 | 15 | 15 |
| Water (grams) | 900 | 900 | 900 | 900 |
| Water/Cementitious Materials Ratio | 0.30 | 0.30 | 0.30 | 0.30 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2% | 2% | 2% | 2% |
| Calcium Sulfoaluminate cement/Fly ash, wt % | 80% | 80% | 80% | 80% |
| Calcium Sulfate/Calcium Sulfoaluminate Cement, wt % | 40% | 50% | 60% | 80% |

Initial Flow Behavior, Slump, and Early Age Cracking Behavior of Material

TABLE 62 shows the initial flow behavior and slump characteristics of the geopolymer cementitious compositions of the embodiment comprising fly ash, calcium sulfoaluminate cement, coarse-grained landplaster, and alkali metal citrate in Example 18.

TABLE 62

Flow and Slump of Example 18

| | Flow | Slump (inches) |
|---|---|---|
| Mix 1 | 10 | 10 |
| Mix 2 | 10 | 10 |
| Mix 3 | 10 | 10 |
| Mix 4 | 10 | 9.75 |

All mixture compositions investigated had good flow behavior and large patty diameter as observed in the slump test.

The slump patties of all four mixture compositions of this Example comprising coarse-grained landplaster were in excellent condition and did not develop any cracking. In contrast, the mixture composition containing no calcium sulfate (landplaster) (Comparative Mix 1 of Example 17) developed very significant cracking upon drying. Thus, incorporation of coarse-grained landplaster to the cementitious mixtures comprising calcium sulfoaluminate cement, fly ash, and alkali metal citrate provides dimensionally stable geopolymer cementitious compositions possessing superior resistance to cracking upon drying.

Shrinkage Behavior

Figure 18A:
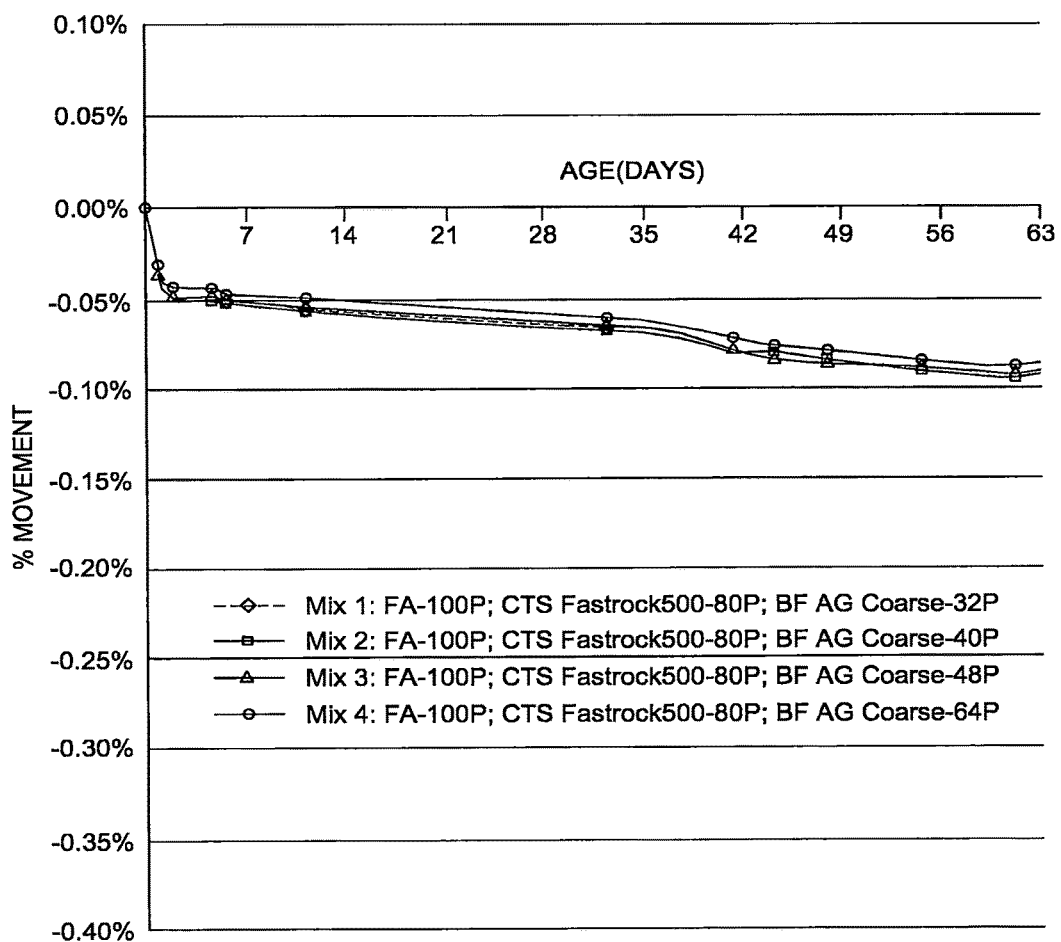
FIG. 18A is a graph of shrinkage of compositions of the invention in Example 18.

FIG. 18A shows shrinkage behavior of geopolymer cementitious compositions of the embodiment investigated in Example 18.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following important conclusions can be drawn from this investigation and FIG. 18A:

Contrary to the shrinkage bars of comparative Example 4 (with no calcium sulfate) which cracked even before de-molding, the shrinkage bars of Example 18 comprising calcium sulfate (fine-grained landplaster) were stable and did not result in cracks that indicated unacceptable dimensional stability or undesired shrinkage either prior to or after de-molding.

The geopolymer cementitious compositions of this embodiment comprising fly ash, calcium sulfoaluminate cement, coarse-grained landplaster, and alkali metal citrate had a maximum shrinkage of about 0.09% in comparison to a maximum shrinkage of about 0.75% for the comparative mixture composition containing fly ash and alkali metal citrate only (Example 1). Thus, it can be concluded that addition of coarse-grained landplaster to cementitious compositions comprising fly ash, calcium sulfoaluminate cement, and alkali metal citrate helps to very significantly reduce the material shrinkage.

It can be observed that the geopolymer cementitious compositions of this embodiment comprising fly ash, calcium sulfoaluminate cement, coarse-grained landplaster, and alkali metal citrate investigated in this Example had a maximum shrinkage of about 0.09%. In contrast, the maximum shrinkage of comparative Mix 1 of Example 17 with fly ash and calcium sulfoaluminate cement but no coarse landplaster was about 0.24%.

Increase in the coarse landplaster amount in the range investigated in this Example did not result in any major change in the material shrinkage behavior. For instance, at a coarse-grained landplaster amount range of about 40 wt % to about 80 wt %, the measured maximum shrinkage for different mixture compositions remained constant at about 0.09%.

Comparing the shrinkage testing results from Example 8 and Example 18, indicates when higher amount levels of calcium sulfate (>50 wt. %) are used in the mixture compositions, coarse-grained landplaster is more effective in reducing the overall material shrinkage.

Heat Evolution and Slurry Temperature Rise Behavior

Figure 18B:
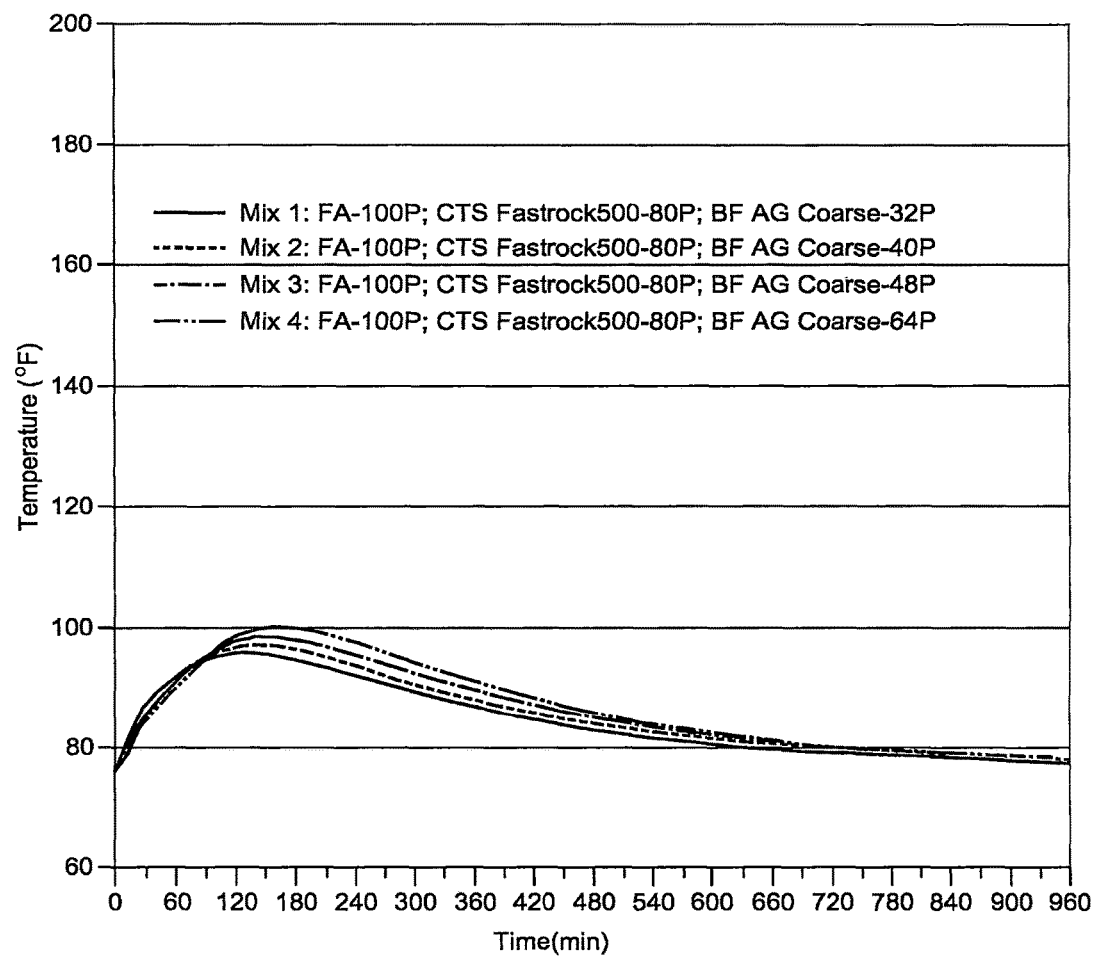
FIG. 18B is a graph of slurry temperature rise of compositions of the invention of Example 18.

FIG. 18B shows the exothermic and slurry temperature rise behavior of geopolymer cementitious compositions of the embodiment investigated in Example 18. Comparing the temperature rise testing results for Example 18 and Example 8, indicates the use of coarse-grained landplaster provides a lower temperature rise than that obtained with the use of fine-grained landplaster. A moderate heat evolution and low temperature rise within the material during the curing stage significantly contributes to preventing excessive thermal expansion and consequent cracking and disruption of material. This aspect also is helpful when the material is utilized in a manner where large thicknesses of material pours are involved in the actual field applications. The geopolymer cementitious compositions of the embodiments investigated in this Example are disclosed to be highly beneficial in this particular aspect as they would lead to a lower thermal expansion and enhanced resistance to thermal cracking in actual field applications.

Time of Setting

TABLE 63 shows the time of setting of geopolymer cementitious compositions of the embodiment in Example 18.

TABLE 63

Setting Times of Example 18

|  | Initial Setting Time (hr:min) | Final Setting Time (hr:min) |
| --- | --- | --- |
| Mix 1 | 00:40 | 1:20 |
| Mix 2 | 00:36 | 1:15 |
| Mix 3 | 00:40 | 1:10 |
| Mix 4 | 00:46 | 1:15 |

The final setting times of the geopolymer cementitious compositions of the embodiment of this Example comprising fly ash, calcium sulfoaluminate cement, coarse-grained landplaster, and sodium citrate were about 70 minutes compared to an extremely rapid final setting time of about 15 minutes for the comparative mixture composition containing fly ash and sodium citrate only (Example 1).

Compressive Strength

TABLE 64 shows the compressive strength behavior of the developed geopolymer cementitious compositions of the embodiment comprising fly ash, calcium sulfoaluminate cement, coarse-grained landplaster, and alkali metal citrate in Example 18.

TABLE 64

Compressive Strength of Example 18 - (psi)

|  | 4 hour | 24 hour | 7 day | 28 day |
| --- | --- | --- | --- | --- |
| Mix 1 | 498 | 2090 | 4128 | 4172 |
| Mix 2 | 539 | 2094 | 3602 | 4387 |
| Mix 3 | 561 | 2408 | 3456 | 4622 |
| Mix 4 | 542 | 2285 | 3270 | 4143 |

The following important observations can be drawn from this study:

The compressive strength of the geopolymer cementitious compositions of the embodiment investigated in this Example continued to increase with time.

Both the early age and the ultimate compressive strength of the comparative mixture composition without landplaster (Mix 1) were lower in comparison to those for the cementitious compositions of this embodiment comprising coarse-grained landplaster (Mixes 2 through 4).

Comparing the testing results for Example 18 and Example 8, indicates use of finer landplaster provides a more rapid increase in 4-hour material compressive strength. For instance, it can be observed that with the use of fine-grained landplaster in the mixture compositions of Example 8, the 4-hour material compressive strength achieved were in excess of about 1500 psi (Mixes #1 through #4 of Example 8).

The early age 24-hour compressive strength of the material was in excess of about 2000 psi with the use of coarse-grained landplaster as a component of the geopolymer cementitious compositions of this embodiment. Comparing the testing results for Example 18 and Example 8, it can be concluded that use of finer landplaster provides a more rapid increase in the 24-hour material compressive strength. For instance, it can be observed that with the use of fine-grained landplaster in the mixture compositions of Example 8, the 24-hour material compressive strength achieved was in excess of about 4000 psi (Mixes 1, 2, and 3 of Example 8).

The 28-day compressive strength of all geopolymer cementitious compositions of the embodiment comprising fly ash, calcium sulfoaluminate, coarse-grained landplaster and sodium citrate in this Example was less than about 5000 psi. Comparing the testing results for Example 18 and Example 8, it can be seen that use of calcium sulfate (fine-grained landplaster) provides a relatively higher 28-day material compressive strength. For instance, the use of calcium sulfate (fine-grained landplaster) in the mixture compositions of Example 8, the 28-day material compressive strengths achieved were in excess of about 6000 psi (Mixes 1 through 3 of Example 8).

Example 19

An objective of this investigation was to study the influence of incorporation of high purity, fine-grained calcium sulfate dihydrate at varying amounts, in the geopolymer compositions of embodiments of the invention.

TABLE 65 shows the raw material compositions of the geopolymer cementitious mixtures investigated in this example.

The amount of calcium sulfoaluminate cement used in the mixture compositions of this Example was equal to 80 wt % of the weight of fly ash. The fine-grained calcium sulfate dihydrate used in this investigation was from USG Company with the trade name USG TERRA ALBA F&P. Calcium sulfate dihydrate was added at the following amount levels in the mixture compositions investigated—0 wt %, 10 wt %, 20 wt % and 30 wt % of the weight of calcium sulfoaluminate cement. The calcium sulfate dihydrate was added at levels of 0, 8, 16 and 24 wt. % of the Class C fly ash. The water to cementitious materials ratio utilized in this investigation was kept constant at 0.30. The sand used is QUIKRETE Commercial Grade Fine Sand No. 1961 and the Superplasticizer is BASF CASTAMENT.

TABLE 65

Geopolymer cementitious mixture compositions of Example 19

| Raw Material | Comparative Mix 1 | Mix 2 | Mix 3 | Mix 4 |
|---|---|---|---|---|
| Fly Ash Class C (grams) | 16677 | 1596 | 1531 | 1471 |
| Calcium Sulfate Dihydrate (grams) | 0 | 128 | 245 | 353 |
| Calcium Sulfoaluminate Cement (grams) | 1333 | 1277 | 1224.5 | 1176 |
| Total Cementitious Materials (grams) | 3000 | 3000 | 3000 | 3000 |
| Sand (grams) | 3150 | 3150 | 3150 | 3150 |
| Sodium Citrate Dihydrate (grams) | 60 | 60 | 60 | 60 |
| Superplasticizer (grams) | 15 | 15 | 15 | 15 |
| Water (grams) | 900 | 900 | 900 | 900 |
| Water/Cementitious Materials Ratio | 0.30 | 0.30 | 0.30 | 0.30 |
| Sand/Cementitious Materials Ratio | 1.05 | 1.05 | 1.05 | 1.05 |
| Superplasticizer/ Cementitious Materials, wt % | 0.5% | 0.5% | 0.5% | 0.5% |
| Sodium Citrate/ Cementitious Materials, wt % | 2% | 2% | 2% | 2% |
| Calcium Sulfoaluminate cement/Fly ash, wt % | 80% | 80% | 80% | 80% |
| Calcium Sulfate/ Calcium Sulfoaluminate Cement, wt % | 0% | 10% | 20% | 30% |

Initial Flow Behavior, Slump, and Early Age Cracking Behavior of Material

TABLE 66 shows the initial flow behavior and slump characteristics of the geopolymer cementitious compositions of this embodiment comprising fly ash, calcium sulfoaluminate cement, fine-grained calcium sulfate dihydrate, and alkali metal citrate in Example 19.

TABLE 66

Flow and Slump of Example 19

| | Flow | Slump (inches) |
|---|---|---|
| Mix 1 | 10 | 11.25 |
| Mix 2 | 10 | 10.25 |
| Mix 3 | 10 | 10.5 |
| Mix 4 | 10 | 10.5 |

All mixture compositions investigated had good flow behavior and large patty diameter as observed in the slump test.

The slump patty of comparative Mix #1 with no calcium sulfate developed significant cracking upon drying. However, for the mixes comprising fine-grained calcium sulfate dihydrate, the slump patties were in excellent condition and did not develop any cracking. Thus, addition of fine-grained calcium sulfate dihydrate to the cementitious mixtures comprising calcium sulfoaluminate cement, fly ash, and alkali metal citrate provides dimensionally stable compositions possessing superior resistance to cracking upon drying.

Shrinkage Behavior.

Figure 19A:
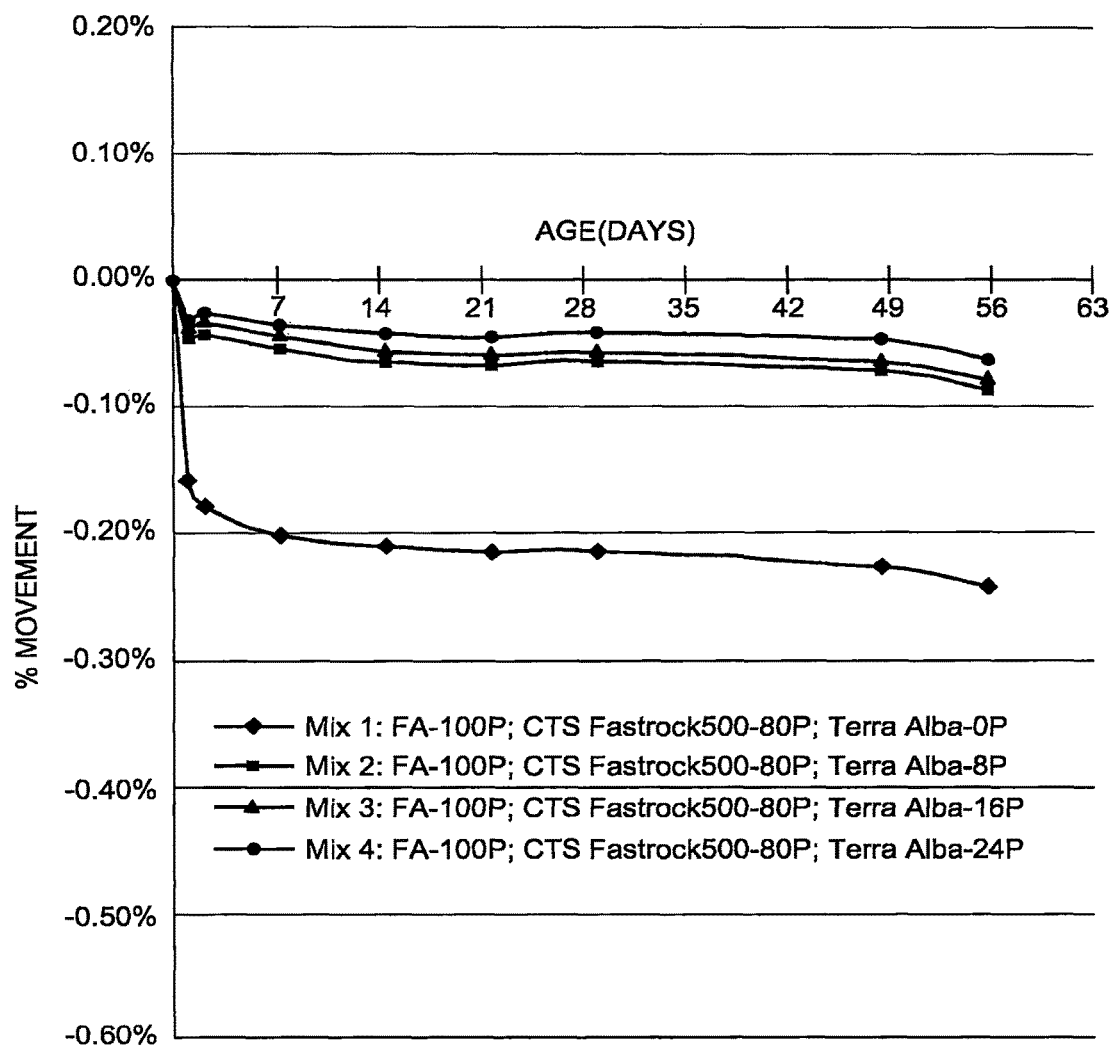
FIG. 19A is a graph of shrinkage of compositions of the invention in Example 13.

FIG. 19A shows shrinkage behavior of geopolymer cementitious compositions of the embodiment investigated in Example 19.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following important conclusions can be drawn from this investigation and FIG. 19c:

Contrary to the shrinkage bars of comparative Example 4 (with no calcium sulfate dihydrate) which cracked even before de-molding, the shrinkage bars of Example 19 comprising fine-grained calcium sulfate dihydrate were completely stable and did not result in any cracks either prior to or after de-molding.

The geopolymer cementitious compositions of the embodiment comprising calcium sulfoaluminate cement and fine-grained calcium sulfate dihydrate investigated in this Example had a maximum shrinkage ranging of about 0.06% to about 0.08% in comparison to a maximum shrinkage of about 0.75% for the comparative mixture containing fly ash and alkali metal citrate only (Example 1).

The geopolymer cementitious compositions (Mixes 2, 3 and 4) of this embodiment comprising calcium sulfoaluminate cement and fine-grained calcium sulfate dihydrate had a maximum shrinkage of about 0.06% to about 0.08%; on the other hand, the maximum shrinkage for the comparative Mix 1 with fly ash and calcium sulfoaluminate cement but no fine-grained calcium sulfate was relatively very high at about 0.24%.

Increase in the fine-grained calcium sulfate dihydrate amount in the range investigated in this Example resulted in decrease in the overall material shrinkage. For example, a fine-grained calcium sulfate dihydrate amount of about 10 wt % the measured maximum shrinkage was about 0.08%, while at a fine-grained calcium sulfate dihydrate amount of about 30 wt %, the measured maximum shrinkage reduced to about 0.06%.

Comparison of the shrinkage testing results from Example 7, Example 17 and Example 19, indicates the use of fine-grained calcium sulfate dihydrate (fine-grained calcium sulfate dihydrate) provides lower overall shrinkage. For example, with the use of coarse-grained calcium sulfate dihydrate of Example 17, the maximum shrinkage was equal to about 0.11% at a calcium sulfate dihydrate amount of about 30 wt %, on the other hand, with the use of fine-grained calcium sulfate dihydrate of Example 19, the maximum shrinkage was only about 0.06% at a calcium sulfate dihydrate amount of about 30 wt %.

Heat Evolution and Slurry Temperature Rise Behavior

Figure 19B:
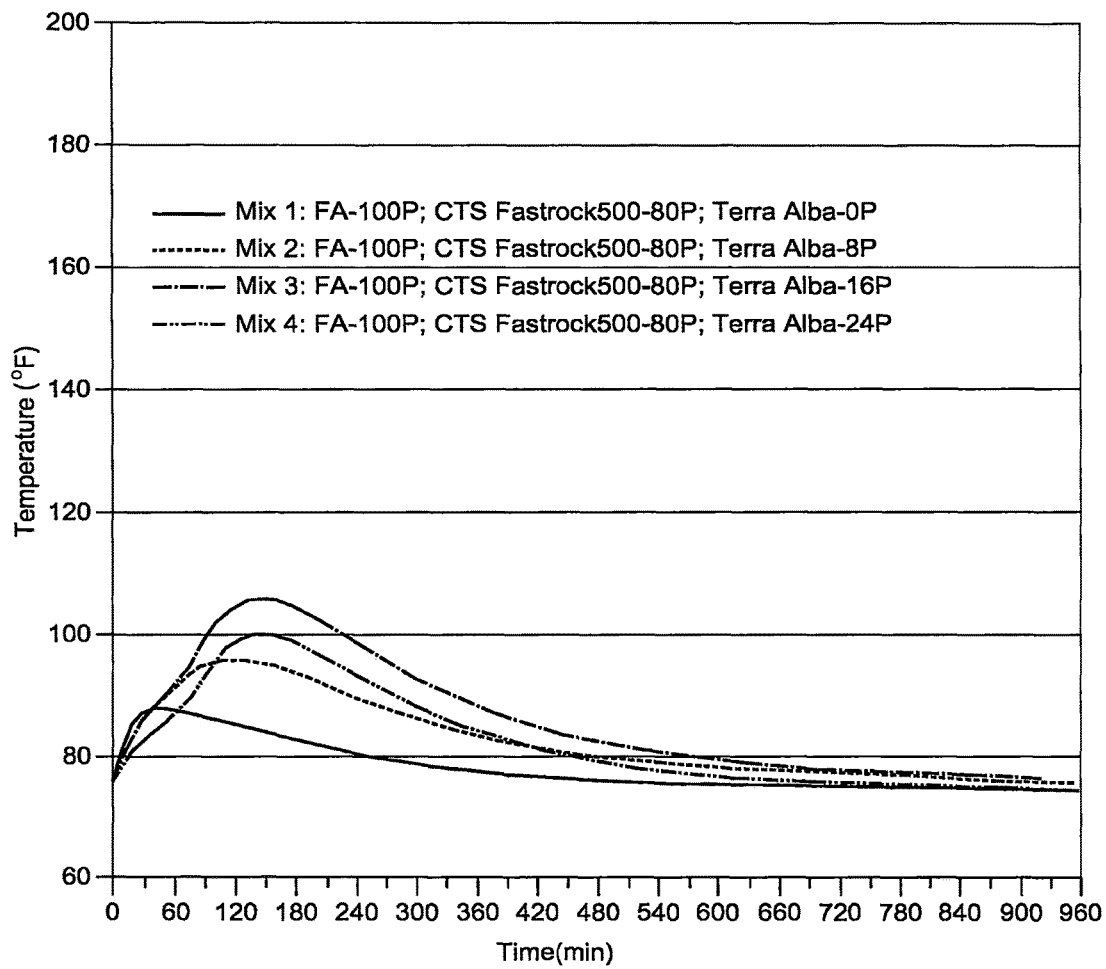
FIG. 19B is a graph of slurry temperature rise of compositions of the invention of Example 19.

FIG. 19B shows the exothermic and slurry temperature rise behavior of geopolymer cementitious compositions of the embodiment investigated in Example 19. The cementitious compositions of Example 19 comprising fly ash, calcium sulfoaluminate cement, fine-grained calcium sulfate dihydrate, and alkali metal citrate demonstrated only a very moderate temperature rise behavior. A moderate heat evolution and low temperature rise within the material during the curing stage significantly contributes to preventing excessive thermal expansion and consequent cracking and disruption of material. This aspect is of particular assistance when the material is utilized in a manner where large thicknesses of material pours are involved in the actual field applications. The geopolymer cementitious compositions of this embodiment investigated in this Example are disclosed to be highly beneficial in this particular aspect as they would lead to a lower thermal expansion and enhanced resistance to thermal cracking in actual field applications.

Time of Setting

TABLE 67 shows the time of setting of geopolymer cementitious compositions of the embodiment in Example 19.

TABLE 67

Setting Times of Example 19

|  | Initial Setting Time (hr:min) | Final Setting Time (hr:min) |
|---|---|---|
| Mix 1 | 00:35 | 1:24 |
| Mix 2 | 00:49 | 1:12 |
| Mix 3 | 00:41 | 1:21 |
| Mix 4 | 00:29 | 1:00 |

All cementitious compositions investigated in this Example demonstrated rapid setting behavior. The final setting times of the geopolymer cementitious compositions of this embodiment were about 60 to about 90 minutes compared to an extremely rapid final setting time of about 15 minutes for the comparative mixture composition containing fly ash and sodium citrate only (Example 1).

Compressive Strength

TABLE 68 shows the compressive strength behavior of the developed geopolymer cementitious compositions of the embodiment comprising fly ash, calcium sulfoaluminate cement, fine-grained calcium sulfate dihydrate, and alkali metal citrate investigated in Example 19.

TABLE 68

Compressive Strength of Example 19 - (psi)

|  | 4 hour | 24 hour | 7 day | 28 day |
|---|---|---|---|---|
| Mix 1 | 225 | 555 | 1586 | 3707 |
| Mix 2 | 752 | 2510 | 4677 | 4646 |
| Mix 3 | 1427 | 2892 | 5128 | 5191 |
| Mix 4 | 1862 | 3737 | 4886 | 6084 |

The following important observations can be drawn from this study:

The compressive strength of the mixture compositions continued to increase as a function of time.

Both the early age compressive strength and the ultimate compressive strength of the cementitious compositions with no fine-grained calcium sulfate dihydrate (Mix 1) were lower in comparison to those for the geopolymer cementitious compositions of this embodiment comprising fine-grained calcium sulfate dihydrate (Mixes 2 through 4).

The early age (about 4-hour and about 24-hour) compressive strength of the geopolymer cementitious compositions of this embodiment increased substantially with increase in the amount of fine-grained calcium sulfate dihydrate in the composition. Comparing the testing results for Example 19, Example 17, and Example 7, it can be concluded that use of fine-grained calcium sulfate dihydrate provides a more rapid increase in 4-hour material compressive strength.

The 24-hour compressive strength of material was in excess of about 2500 psi with the use of fine-grained calcium sulfate dihydrate in the geopolymer cementitious compositions of this embodiment. Comparing the testing results for Example 19, Example 17, and Example 7, it can be concluded that use of fine-grained calcium sulfate dihydrate provides a more rapid increase in the early age material compressive strength.

The 28-day compressive strength of all geopolymer cementitious compositions of this embodiment comprising fly ash, calcium sulfoaluminate, fine-grained calcium sulfate dihydrate and sodium citrate was relatively high and in excess of about 4500 psi. Moreover, the 28-day compressive strength of the geopolymer mixture compositions of this embodiment comprising fine-grained calcium sulfate dihydrate at an amount of about 20 wt % and about 30 wt % (Mixes 3 and 4) were again very high and in excess of about 5000 psi.

Example 20

An objective of this investigation was to study the influence of incorporation of high purity, fine-grained calcium sulfate dihydrate at varying amounts, in the geopolymer binder compositions of the invention.

TABLE 69 shows the raw material compositions of the geopolymer cementitious mixtures investigated in this example. The amount of calcium sulfoaluminate cement used in the mixture compositions of this Example was equal to 80 wt % of the weight of fly ash. The fine-grained calcium sulfate dihydrate used in this investigation was from USG Company with the trade name USG Terra Alba F&P. Calcium sulfate dihydrate was added at the following amount levels in the mixture compositions investigated 40 wt %, 50 wt %, 60 wt % and 80 wt % of the weight of calcium sulfoaluminate cement. The calcium sulfate dihydrate was added at levels of 32, 40, 48, and 64 wt. % of the Class C fly ash. Sodium citrate added to the cementitious compositions of the invention acted as a chemical activator. The water to cementitious materials ratio utilized in this investigation was kept constant at 0.30. The sand used is QUIKRETE Commercial Grade Fine Sand No. 1961 and the Superplasticizer is BASF CASTAMENT.

TABLE 69

Geopolymer cementitious compositions of Example 20

| Raw Material | Mix 1 | Mix 2 | Mix 3 | Mix 4 |
|---|---|---|---|---|
| Fly Ash Class C (grams) | 1415 | 1364 | 1316 | 1230 |
| Calcium Sulfate Dihydrate (grams) | 453 | 545.5 | 632 | 787 |
| Calcium Sulfoaluminate Cement (grams) | 1132 | 1091 | 1053 | 984 |
| Total Cementitious Materials (grams) | 3000 | 3000 | 3000 | 3000 |
| Sand (grams) | 3150 | 3150 | 3150 | 3150 |
| Sodium Citrate Dihydrate (grams) | 60 | 60 | 60 | 60 |
| Superplasticizer (grams) | 15 | 50 | 15 | 15 |
| Water (grams) | 900 | 900 | 900 | 900 |
| Water/Cementitious Materials Ratio | 0.30 | 0.30 | 0.30 | 0.30 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2.0% | 2.0% | 2.0% | 2.0% |
| Calcium Sulfoaluminate Cement/Fly ash, wt % | 80% | 80% | 80% | 80% |
| Calcium Sulfate/Calcium Sulfoaluminate Cement, wt % | 40% | 50% | 60% | 80% |

Initial Flow Behavior, Slump, and Early Age Cracking Behavior of Material

TABLE 70 shows the initial flow behavior and slump characteristics of the geopolymer cementitious compositions of the embodiment comprising fly ash, calcium sulfoaluminate cement, fine-grained calcium sulfate dihydrate, and alkali metal citrate in Example 20.

TABLE 70

Flow and Slump of Example 20

|  | Flow | Slump (inches) |
| --- | --- | --- |
| Mix 1 | 10 | 10.75 |
| Mix 2 | 10 | 9.75 |
| Mix 3 | 10 | 9.5 |
| Mix 4 | 10 | 10 |

All mixture compositions investigated had good flow behavior and large patty diameter as observed in the slump test. It is particularly noteworthy that such large slump and self-leveling behavior was obtainable even at a water/cementitious materials ratio as low as about 0.3.

The slump patties made from Mixes 1-4 were in excellent condition after drying and did not develop any cracking. Thus, addition of fine-grained calcium sulfate dihydrate to the cementitious mixtures comprising calcium sulfoaluminate cement, fly ash, and alkali metal citrate provides dimensionally stable compositions possessing superior resistance to cracking upon drying.

Shrinkage Behavior

Figure 20A:
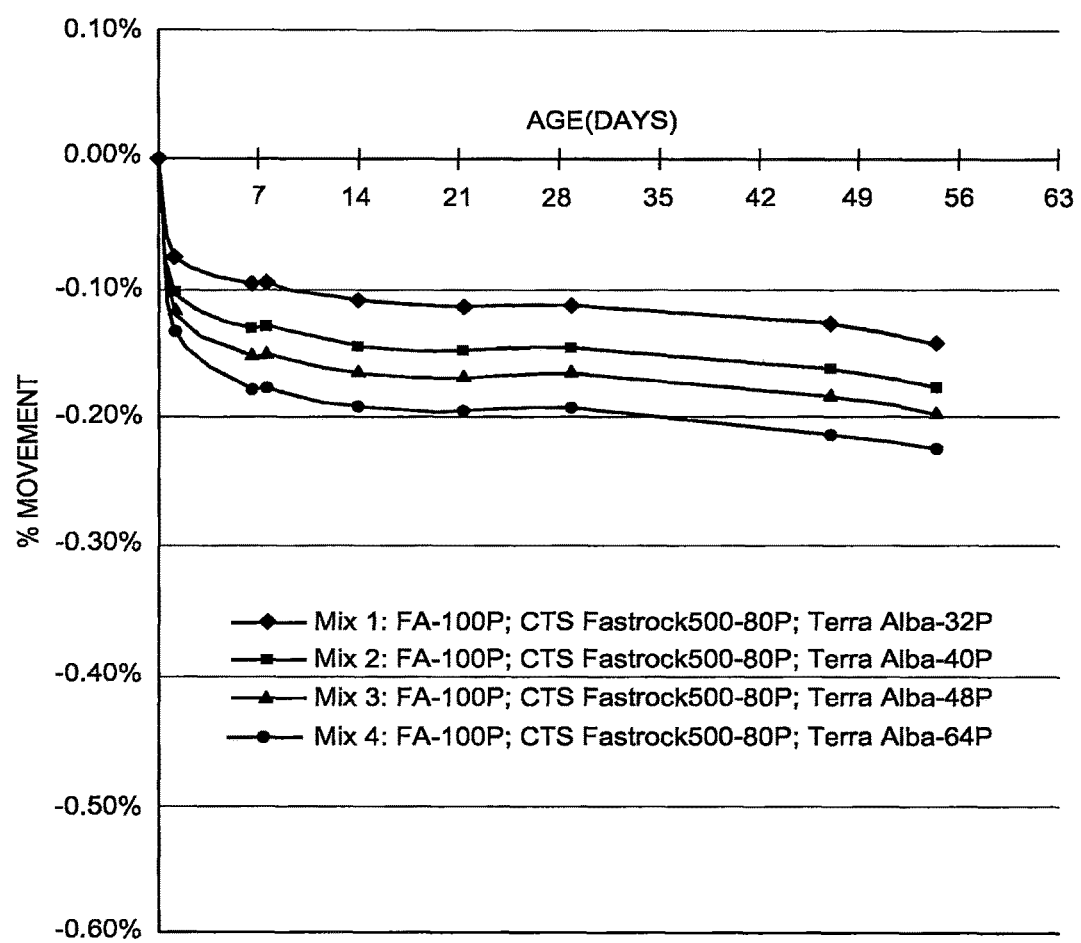
FIG. 20A is a graph of shrinkage of compositions of the invention in Example 20.

FIG. 20A shows shrinkage behavior of geopolymer cementitious compositions of the embodiment in Example 20.

The shrinkage measurements were initiated at an age of about 4-hours from the time the raw materials were mixed together to form an aqueous slurry. The material shrinkage was measured for a total duration of about 8-weeks while curing the material at about 75° F./50% RH. The following important conclusions can be drawn from this investigation and FIG. 20c:

Contrary to the shrinkage bars of comparative Example 4 (with no calcium sulfate dihydrate) which cracked even before de-molding, the shrinkage bars of Example 20 comprising fine-grained calcium sulfate dihydrate were stable and did not result in any cracks either prior to or after de-molding.

The geopolymer cementitious compositions of the embodiment comprising calcium sulfoaluminate cement and fine-grained calcium sulfate dihydrate investigated in this Example had a measured maximum shrinkage of about 0.14% to about 0.23% in comparison to a measured maximum shrinkage of about 0.75% for the comparative mixture containing fly ash and alkali metal citrate only (Example 1).

Increase in the fine-grained calcium sulfate dihydrate amount in the range investigated in this Example resulted in an increase in the material shrinkage behavior. For instance, at a fine-grained calcium sulfate dihydrate amount of about 40 wt %, the, measured maximum material shrinkage was about 0.14%. The measured maximum shrinkage increased to about 0.23% at a fine-grained calcium sulfate dihydrate amount of about 80 wt %.

Heat Evolution and Slurry Temperature Rise Behavior

Figure 20B:
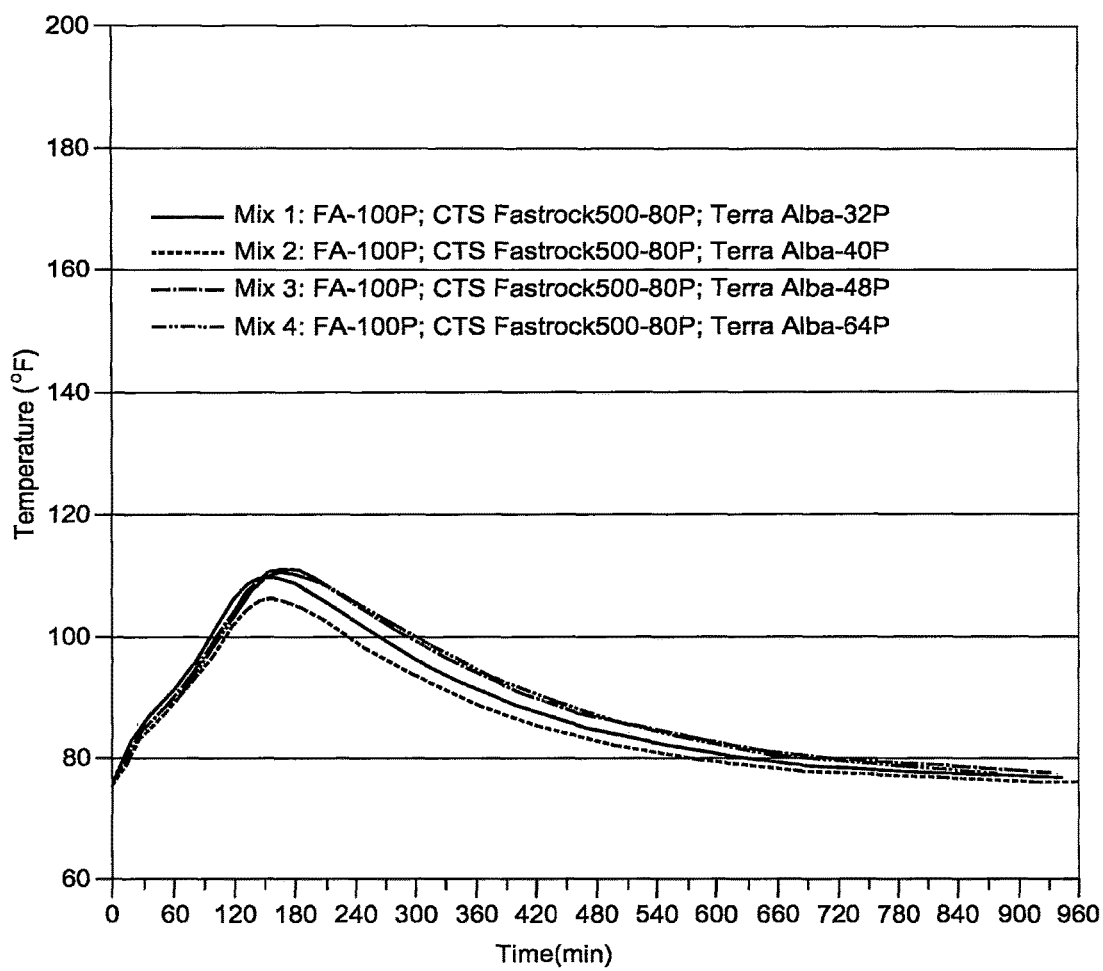
FIG. 20B is a graph of slurry temperature rise of compositions of the invention of Example 20.

FIG. 20B shows the exothermic and slurry temperature rise behavior of geopolymer cementitious compositions of the embodiment investigated in Example 20. It can be noticed that the cementitious compositions of Example 20 comprising fly ash, calcium sulfoaluminate cement, fine-grained calcium sulfate dihydrate, and alkali metal citrate demonstrated only a very moderate temperature rise behavior. A moderate heat evolution and low temperature rise within the material during the curing stage are significantly contributes to preventing excessive thermal expansion and consequent cracking and disruption of material. This aspect is of assistance when the material is utilized in a manner where large thicknesses of material pours are involved in the actual field applications. The geopolymer cementitious compositions of the embodiment investigated in this Example are disclosed to be highly beneficial in this particular aspect as they would lead to a lower thermal expansion and enhanced resistance to thermal cracking in actual field applications.

Time of Setting

TABLE 71 shows the time of setting of geopolymer cementitious compositions of the embodiment in Example 20.

TABLE 71

Setting Times of Example 20

|  | Initial Setting Time (hr:min) | Final Setting Time (hr:min) |
| --- | --- | --- |
| Mix 1 | 00:49 | 1:38 |
| Mix 2 | 1:08 | 1:32 |
| Mix 3 | 1:04 | 1:30 |
| Mix 4 | 1:11 | 1:58 |

All cementitious compositions investigated in this Example demonstrated rapid setting behavior. Also, the final setting times of the geopolymer cementitious compositions of this embodiment were about 90 to about 120 minutes compared to an extremely rapid final setting time of about 15 minutes for the comparative mixture composition containing fly ash and sodium citrate only (Example 1).

Compressive Strength

TABLE 72 shows the compressive strength behavior of the developed geopolymer cementitious compositions of the embodiment comprising fly ash, calcium sulfoaluminate cement, fine-grained calcium sulfate dihydrate, and alkali metal citrate investigated in Example 20.

TABLE 72

Compressive Strength of Example 20 - (psi)

|  | 4 hour | 24 hour | 7 day | 28 day |
| --- | --- | --- | --- | --- |
| Mix 1 | 2351 | 4077 | 5317 | 7221 |
| Mix 2 | 2440 | 4020 | 5626 | 7255 |
| Mix 3 | 2213 | 3804 | 6187 | 6140 |
| Mix 4 | 1661 | 3933 | 4911 | 5669 |

The following important observations can be drawn from this study:

The compressive strength of the mixture compositions investigated continued to increase as a function of time.

The early age (about 4-hours and about 24-hours after mixing) compressive strengths of the geopolymer cementitious compositions of this embodiment comprising fine-grained calcium sulfate dihydrate investigated in this Example (Mixes 1 through 4) are significantly greater than those for the comparative mixture composition containing no fine-grained calcium sulfate dehydrate (Mix 1 of Example 19).

The early age/early stage (4-hour and 24-hour after mixing) compressive strength of the geopolymer cementitious compositions of this embodiment were very high and remained fairly constant with increase in the amount of fine-grained calcium sulfate dihydrate amount in the composition.

Comparing the testing results for Example 20 and Example 18, it is clear that use of fine-grained calcium sulfate dihydrate provides a more rapid increase in 4-hour material compressive strength. For example, it can be observed that with the use of fine-grained calcium sulfate dihydrate in the mixture compositions of this example, the 4-hour material compressive strengths achieved were in excess of about 2000 psi (Mixes 1 through 3 of Example 20). In contrast, the 4-hour compressive strengths of mixture compositions comprising the same amount levels of coarse-grained landplaster were less than about 600 psi as seen for Mixes 1 through 3 of Example 18.

The 24-hour compressive strengths of the geopolymer cementitious compositions of this embodiment investigated in this Example were in excess of about 3500 psi with the use of a fine-grained calcium sulfate dihydrate. The use of fine-grained calcium sulfate dihydrate in the mixture compositions of Example 20 provided the 24-hour material compressive strengths in excess of about 3500 psi (Mixes 1 through 4 of Example 20); while the mixture compositions containing the same amount levels of coarse-grained landplaster provided 24-hour compressive strengths of less than about 2500 psi for Mixes #1 through 4 of Example 18.

The 28-day compressive strengths of the geopolymer cementitious compositions of the embodiment comprising fly ash, calcium sulfoaluminate, fine-grained calcium sulfate dihydrate and sodium citrate investigated in this Example were greater than about 5000 psi. Moreover, for Mixes #1 through 3 of Example 20, the about 28-day compressive strengths of the material were in excess of about 6000 psi. Comparison of the testing results for Example 20 and Example 18 shows that the use of fine-grained calcium sulfate dihydrate provides a relatively higher about 28-day material compressive strength. For instance, the use of fine-grained calcium sulfate dihydrate in the mixture compositions of Example 20, the about 28-day material compressive strengths of over about 7,000 psi were achieved.

Example 21

This example studies the influence of incorporation of calcium sulfoaluminate cement at low amounts (about 20 parts by weight of fly ash) in combination with calcium sulfate and an alkali metal citrate.

TABLE 73 shows the raw material compositions of the geopolymer cementitious mixtures investigated in this example. FASTROCK 500 brand calcium sulfoaluminate cement, available from CTS Cement Company was utilized as a component of cementitious reactive powder in this investigation. The amount of calcium sulfoaluminate cement used in the mixture compositions of this Example was equal to 0, 5, 10, 15 and 20 wt. % of the Class C fly ash. Fine-grained calcium sulfate dihydrate, termed here as landplaster, used in this investigation was procured from the United States Gypsum Company. Landplaster was added at an amount of 50% of the weight of calcium sulfoaluminate cement in the various mixture compositions investigated. The landplaster was added in levels of 0, 2.5, 5, 7.5 and 10 wt. % of the fly ash. The sand used is QUIKRETE Commercial Grade Fine Sand No. 1961 and the superplasticizer is BASF CASTAMENT. SURFYNOL 500S surfactant available from Air Products, Inc. was also used as a defoamer and wetting agent.

TABLE 73

Mixture compositions of Example 21

| Raw Material | Mix 1 | Mix 2 | Mix 3 | Mix 4 | Mix 5 |
| --- | --- | --- | --- | --- | --- |
| Fly Ash Class C (grams) | 5250 | 4884 | 5000 | 4286 | 4423 |
| Calcium Sulfate Dihydrate (grams) | 0 | 122 | 250 | 321 | 442 |
| Calcium Sulfoaluminate Cement (grams) | 0 | 244 | 500 | 643 | 885 |
| Total Cementitious Materials (grams) | 5250 | 5250 | 5750 | 5250 | 5750 |
| Sand (grams) | 5513 | 5513 | 6038 | 5513 | 6038 |
| Sodium Citrate Dihydrate (grams) | 105 | 105 | 115 | 105 | 115 |
| Superplasticizer (grams) | 0 | 26.25 | 28.75 | 26.25 | 28.75 |
| Defoamer & Wetting Agent (grams) | 10.5 | 10.5 | 10.5 | 10.5 | 11.5 |
| Water (grams) | 1444 | 1444 | 1581 | 1444 | 1581 |
| Water/Cementitious Materials Ratio | 0.275 | 0.275 | 0.275 | 0.275 | 0.275 |
| Sand/Cementitious Materials Ratio | 1.05 | 1.05 | 1.05 | 1.05 | 1.05 |
| Superplasticizer/Cementitious Materials, wt % | 0 | 0.5% | 0.5% | 0.5% | 0.5% |
| Sodium Citrate/Cementitious Materials, wt % | 2% | 2% | 2% | 2% | 2% |
| Calcium Sulfoaluminate cement/Fly ash, wt % | 0% | 5% | 10% | 15% | 20% |
| Calcium Sulfate/Calcium Sulfoaluminate Cement, wt % | 0% | 50% | 50% | 50% | 50% |

Initial Flow Behavior, Slump, and Early Age Cracking of Material

TABLE 74 shows the initial flow behavior and slump characteristics of the geopolymer cementitious compositions of the embodiment comprising fly ash, calcium sulfoaluminate cement, calcium sulfate (fine-grained landplaster), and alkali metal citrate investigated in Example 21.

TABLE 74

Flow and Slump of Example 21

| | Flow | Slump (inches) |
|---|---|---|
| Mix 1 | 8 | 8.5 |
| Mix 2 | 10 | 12 |
| Mix 3 | 10 | 12 |
| Mix 4 | 10 | 11.5 |
| Mix 5 | 10 | 12 |

All mixture compositions of this embodiment (Mix 2 through 5) had good self-leveling, flow behavior and large patty diameter as observed in the slump test. It is particularly noteworthy that such large slump and self-leveling behavior was obtainable even at an extremely low water/cementitious materials ratio of about 0.275. For standard Portland cement based or gypsum based materials, such flow properties and self leveling behavior are only obtainable when the water/cementitious materials ratio is in excess of about 0.45.

The slump patties for the mixture compositions of this embodiment (Mix 2 through Mix 5) of this Example did not develop any cracking upon drying. Thus, it can be concluded that incorporation of calcium sulfoaluminate cement and calcium sulfate dihydrate (fine-grained landplaster) even at low amounts (about 20 wt % of fly ash weight) to the cementitious mixture comprising fly ash and alkali metal citrate provides dimensionally stable geopolymer cementitious compositions possessing superior resistance to cracking upon drying.

Shrinkage Behavior

Figure 21A:
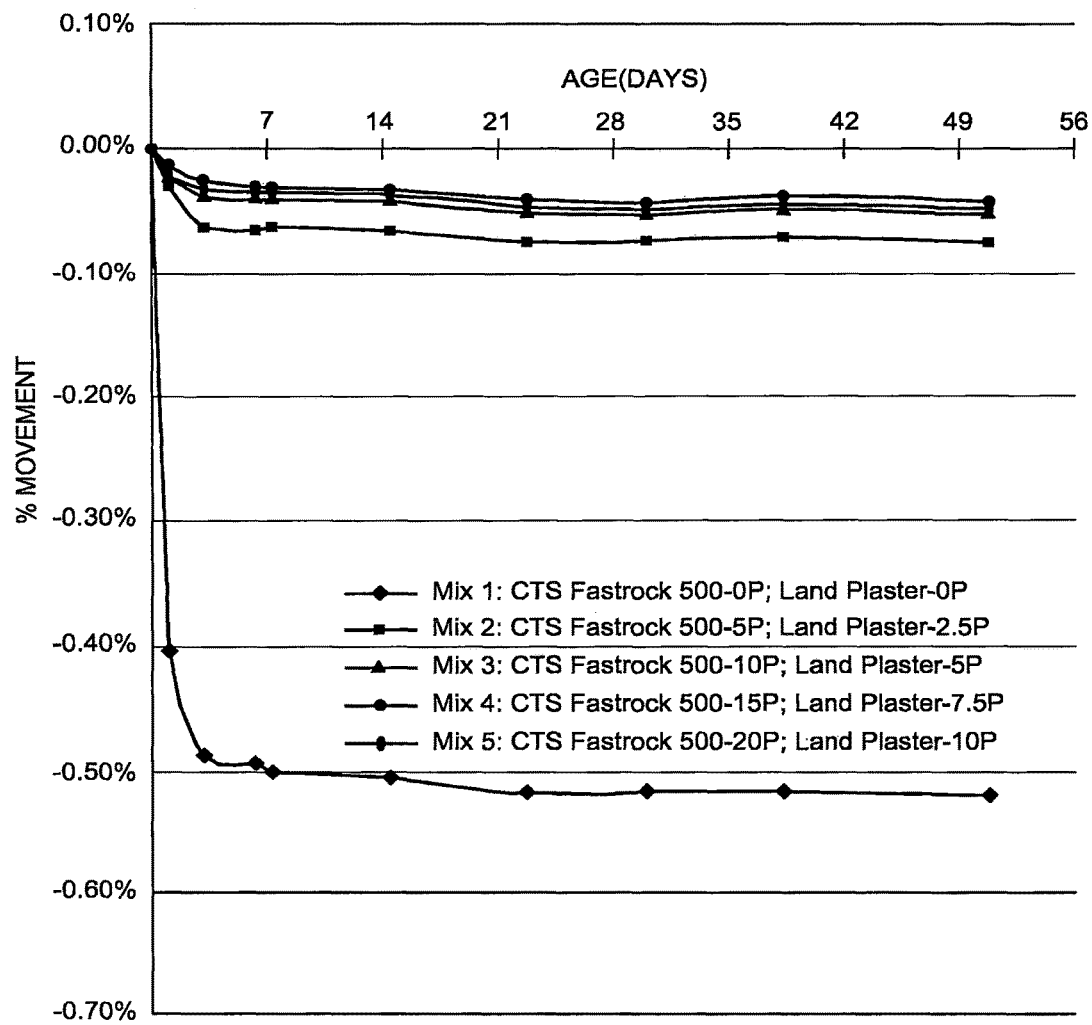
FIG. 21A is a graph of shrinkage of compositions of the invention in Example 21.
Figure 21B:
FIG. 21B is a photograph of 4-hour shrinkage bars for Mix 1 of Example 21.
Figure 21C:
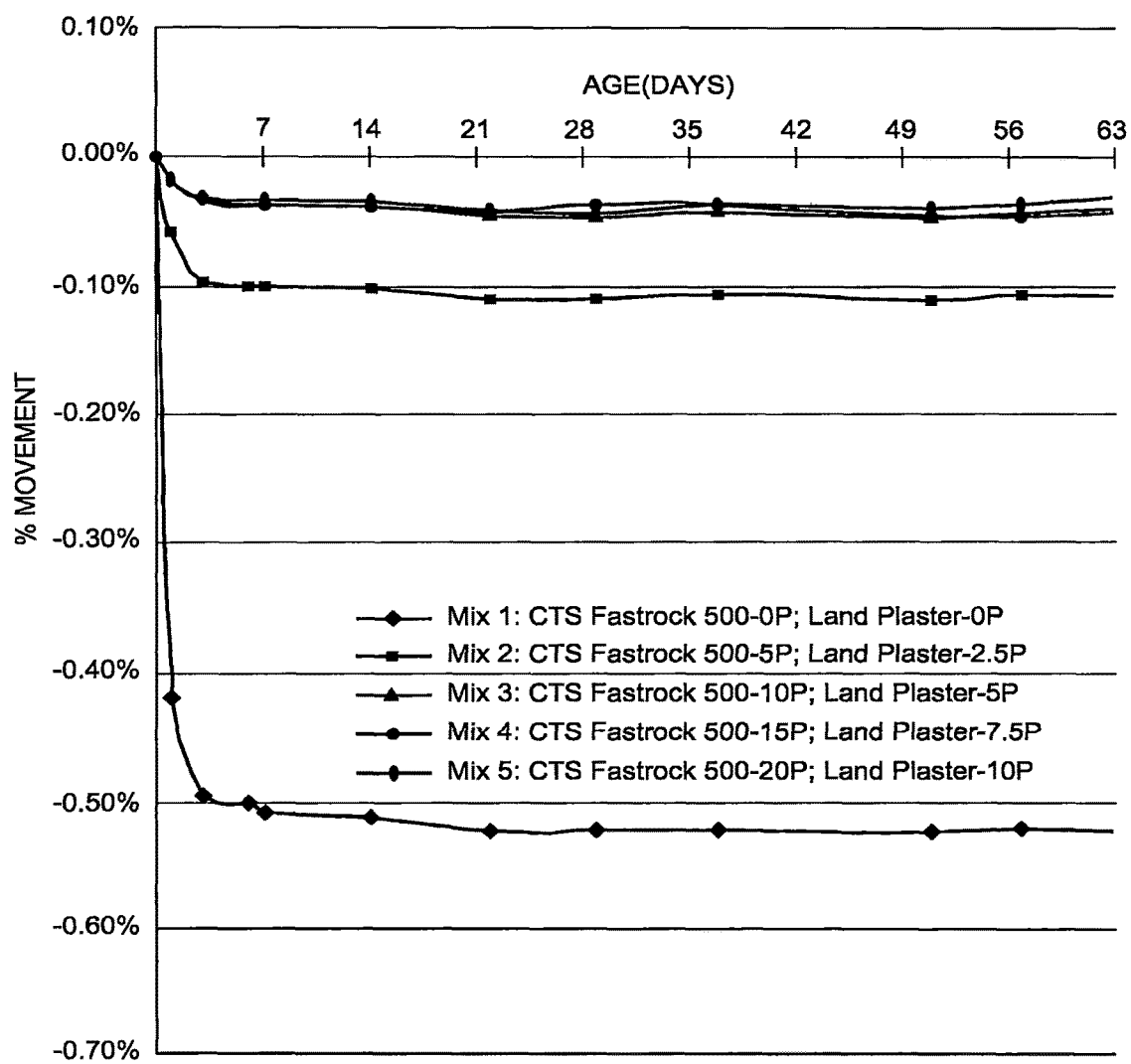
FIG. 21C is a graph of the very early age material shrinkage of compositions of the invention of Example 21 (Shrinkage testing initiated at the age of 1-hour).

FIG. 21A shows shrinkage behavior of geopolymer cementitious compositions of the embodiment investigated in Example 21. The shrinkage measurements were initiated at an age of about 4-hours for Mix 2 through Mix 5 from the time the raw materials were mixed together to form an aqueous slurry. For the comparative Mix 1, the 4-hour shrinkage bars broke in the molds due to excessive material shrinkage as seen in FIG. 21B. The shrinkage data presented in FIG. 21A for the comparative Mix 1 represents the very early age material shrinkage behavior for the bars demolded at an age of about 1 hours with shrinkage measurements initiated at the same age. FIG. 21C shows the very early age material shrinkage for all five mixes demolded at the age of 1-hour with shrinkage measurements initiated at the same time. The material shrinkage was measured for a total duration of about 8-weeks while curing the material at about 75° F./50% RH.

The following important conclusions can be drawn from this investigation and FIGS. 21A and 21B:

The incorporation of calcium sulfoaluminate cement even at very small amounts (about 20 wt % of fly ash weight) had a significant impact on improving the dimensional stability and consequent cracking resistance of geopolymer cementitious compositions of this embodiment comprising fly ash, calcium sulfate dihydrate, and alkali metal citrate. Contrary to the 4-hour shrinkage bars of the comparative Mix 1 containing no calcium sulfoaluminate cement and fine-grained calcium sulfate dihydrate (landplaster) which cracked even before de-molding, the shrinkage bars for Mix 2 through Mix 5 comprising calcium sulfoaluminate cement and fine-grained calcium sulfate dihydrate (landplaster) were stable and did not crack either prior to or after de-molding.

The geopolymer cementitious compositions of this embodiment comprising fly ash, calcium sulfoaluminate cement, fine-grained calcium sulfate dihydrate (landplaster), and alkali metal citrate had a maximum shrinkage of less than about 0.10% in comparison to a maximum shrinkage in excess of about 0.5% for the mixture comprising fly ash and alkali metal citrate only for the comparative Mix 1 of the Example 21. It is noteworthy that the maximum recorded shrinkage for Mix 2 comprising calcium sulfoaluminate cement at 5 parts was only about 0.07%, while the same for Mix 3 comprising calcium sulfoaluminate cement at about 10 parts was only about 0.05%. Thus, addition of even small amounts of calcium sulfoaluminate cement and fine-grained calcium sulfate dihydrate (landplaster) to the cementitious compositions comprising fly ash and alkali metal citrate helps to very significantly reduce the material shrinkage.

Heat Evolution and Slurry Temperature Rise Behavior

Figure 21D:
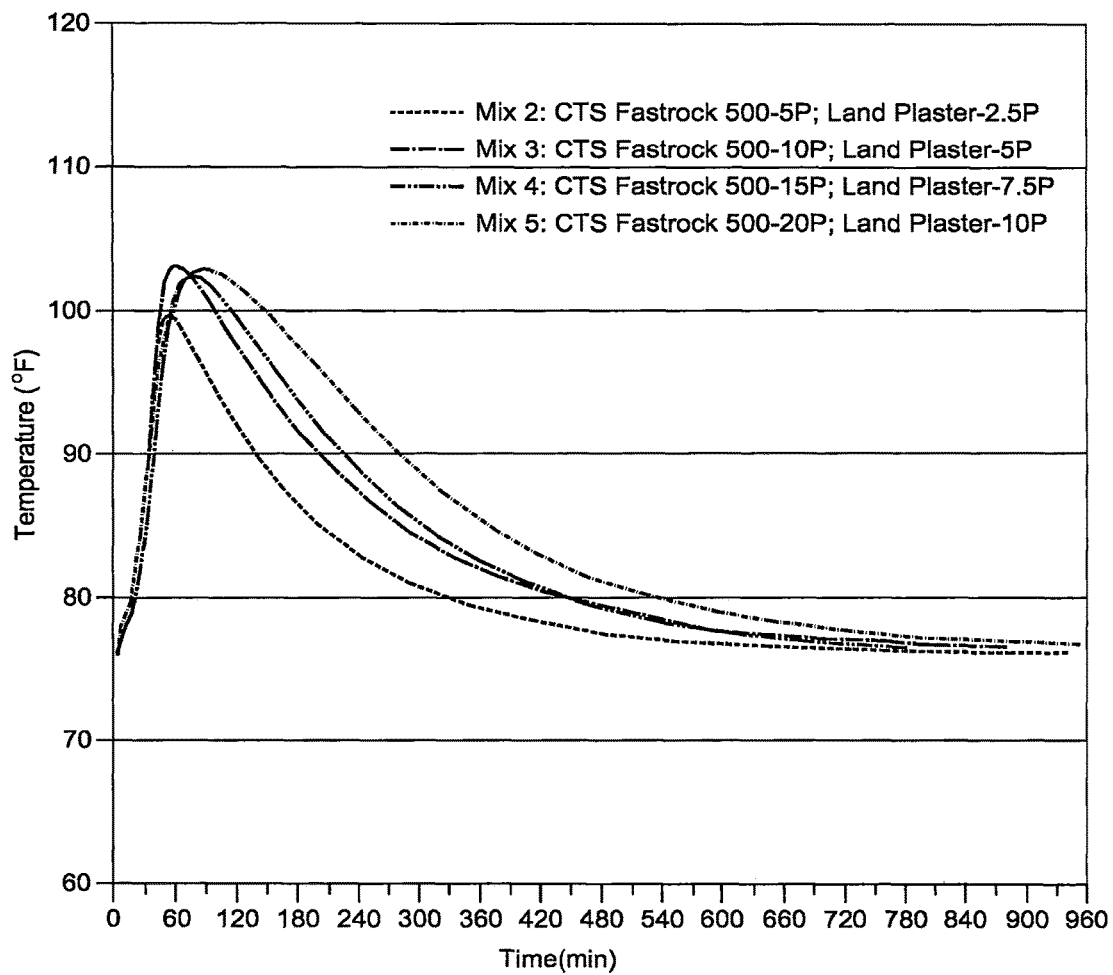
FIG. 21D is a graph of slurry temperature rise of compositions of invention of Example 21.

FIG. 21D shows the exothermic and slurry temperature rise behavior of geopolymer cementitious compositions of the embodiment investigated in Example 21. The cementitious compositions of Example 21 comprising fly ash, calcium sulfoaluminate cement, fine-grained calcium sulfate dihydrate (landplaster), and alkali metal citrate demonstrated only a very moderate temperature rise behavior. A moderate heat evolution and low temperature rise within the material during the curing stage significantly contributes to preventing excessive thermal expansion and consequent cracking and disruption of material. This aspect is helpful when the material is utilized in a manner where large thicknesses of material pours are involved in the actual field applications. The geopolymer cementitious compositions of the embodiment investigated in this Example are highly beneficial in this particular aspect as they would lead to a lower thermal expansion and enhanced resistance to thermal cracking in actual field applications.

Time of Setting

TABLE 75 shows the time of setting of geopolymer cementitious compositions of the embodiment in Example 21.

TABLE 75

Setting Times of Example 21

| | Initial Setting Time (hr:min:sec) | Final Setting Time (hr:min:sec) |
|---|---|---|
| Mix 1 | 00:13 | 00:30 |
| Mix 2 | 00:35 | 00:47 |
| Mix 3 | 00:43 | 00:50 |
| Mix 4 | 00:38 | 00:53 |
| Mix 5 | 00:33 | 1:00 |

All cementitious compositions investigated in this example demonstrated very rapid setting behavior with final setting times of about 45 to about 60 minutes. It can also be observed that the developed cementitious compositions of this embodiment comprising fly ash, calcium sulfoaluminate cement, fine-grained calcium sulfate dihydrate (landplaster), and alkali metal citrate had relatively longer setting times (both initial and final) than the comparative cementitious composition comprising fly ash and alkali metal citrate only (Mix 1 of Example 21).

Compressive Strength

TABLE 76 shows the compressive strength behavior of the developed geopolymer cementitious compositions of the embodiment comprising fly ash, calcium sulfoaluminate cement, fine-grained calcium sulfate dihydrate (landplaster), and alkali metal citrate in Example 21.

TABLE 76

| Compressive Strength of Example 21 - (psi) | | | | |
|---|---|---|---|---|
| | 4 hour | 24 hour | 7 day | 28 day |
| Mix 1 | 589 | 1522 | 4775 | 7095 |
| Mix 2 | 561 | 1065 | 2781 | 4134 |
| Mix 3 | 800 | 1384 | 2284 | 5919 |
| Mix 4 | 1050 | 1692 | 2782 | 4676 |
| Mix 5 | 1222 | 2116 | 3829 | 4875 |

The following observations can be drawn from this study:

The compressive strength of the geopolymer cementitious compositions of the embodiment investigated in this Example continued to increase with time.

The early age 4-hour compressive strengths of the material were in excess of about 1000 psi with the use of calcium sulfoaluminate cement and fine-grained calcium sulfate dihydrate (landplaster) as a component of the geopolymer cementitious compositions of this embodiment.

The early age 24-hour compressive strengths of the material were in excess of about 2000 psi with the use of calcium sulfoaluminate cement and fine-grained calcium sulfate dihydrate (landplaster) as a component of the investigated geopolymer cementitious compositions of this embodiment.

The about 28-day compressive strengths of all geopolymer cementitious compositions of this embodiment investigated in this Example were in excess of about 4000 psi.

Example 22

This example studies the physical properties of the developed geopolymer cementitious compositions of this embodiment comprising fly ash, calcium sulfoaluminate cement, fine-grained calcium sulfate activated with either an alkali metal hydroxide (sodium hydroxide) or a mixture of an alkali metal hydroxide (sodium hydroxide) and an alkali metal acid (citric acid).

TABLE 77 shows the raw material compositions of the geopolymer cementitious mixtures investigated in this example. The amount of calcium sulfoaluminate cement used in the mixture compositions of this Example was equal to 20 wt % of the weight of fly ash. Landplaster was added at an amount of 50% of the weight of calcium sulfoaluminate cement and 10 wt. % of the Class C fly ash, in the various mixture compositions investigated. A mixture of sodium hydroxide and citric acid was added to the cementitious compositions of the invention to act as a chemical activator. Two of the mixes (Mix 2 and Mix 3) investigated contained only sodium hydroxide as the chemical activator and no citric acid. Similarly, one of the mixes (Mix 1) contained only citric acid for chemical activation and no sodium hydroxide. SURFYNOL 500S surfactant available from Air Products, Inc. used as a defoamer and wetting agent. The sand is QUIKRETE Commercial Grade Fine Sand No. 1961 and the superplasticizer is BASF CASTAMENT FS20.

TABLE 77

| Mixture compositions of Example 22 | | | | | |
|---|---|---|---|---|---|
| Raw Material | Mix 1 | Mix 2 | Mix 3 | Mix 4 | Mix 5 |
| Fly Ash Class C (grams) | 4039 | 4039 | 4039 | 4039 | 4039 |
| Calcium Sulfate Dihydrate (grams) | 404 | 404 | 404 | 404 | 404 |
| Calcium Sulfoaluminate Cement (grams) | 808 | 808 | 808 | 808 | 808 |
| Total Cementitious Materials (grams) | 5250 | 5250 | 5250 | 5250 | 5250 |
| Sand (grams) | 5513 | 5513 | 5513 | 5513 | 5513 |
| Citric Acid Monohydrate (grams) | 105 | 0 | 0 | 105 | 105 |
| Sodium Hydroxide (grams) | 0 | 52.5 | 157.5 | 52.5 | 157.5 |
| Superplasticizer (grams) | 26.25 | 26.25 | 26.25 | 26.25 | 26.25 |
| Defoamer & Wetting Agent (grams) | 10.50 | 10.50 | 10.50 | 10.50 | 10.50 |
| Water (grams) | 1444 | 1444 | 1444 | 1444 | 1444 |
| Water/Cementitious Materials Ratio | 0.275 | 0.275 | 0.275 | 0.275 | 0.275 |
| Sand/Cementitious Materials Ratio | 1.05 | 1.05 | 1.05 | 1.05 | 1.05 |
| Superplasticizer/Cementitious Materials, wt % | 0.5% | 0.5% | 0.5% | 0.5% | 0.5% |
| Calcium Sulfoaluminate cement/Fly ash, wt % | 20% | 20% | 20% | 20% | 20% |
| Calcium Sulfate/Calcium Sulfoaluminate Cement, wt % | 10% | 10% | 10% | 10% | 10% |

Initial Flow Behavior and Slump

TABLE 78 shows the initial flow behavior and slump characteristics of the geopolymer cementitious compositions of the embodiment investigated in Example 22.

TABLE 78

| Flow and Slump of Example 22 | | |
|---|---|---|
| | Flow | Slump (inches) |
| Mix 1 | 1 | 2 |
| Mix 2 | 10 | 10.5 |
| Mix 3 | 7 | 7.25 |
| Mix 4 | 11 | 11.75 |
| Mix 5 | 8 | 8.25 |

For Mix 1 containing citric acid but no sodium hydroxide, it was noted that the mixed material was extremely stiff and completely unworkable upon mixing. On the other hand, mixture compositions containing sodium hydroxide (Mix 2 and Mix 3) or a blend of sodium hydroxide and citric acid (Mix 4 and Mix 5), were easily workable as also indicated by their relatively large patty diameter in the slump test. It is particularly noteworthy that such good workability was obtainable even at an extremely low water/cementitious materials ratio of about 0.275. For standard Portland cement based or gypsum based materials, such flow properties and self leveling behavior are only obtainable when the water/cementitious materials ratio is in excess of about 0.45.

Shrinkage Behavior

Figure 22A:
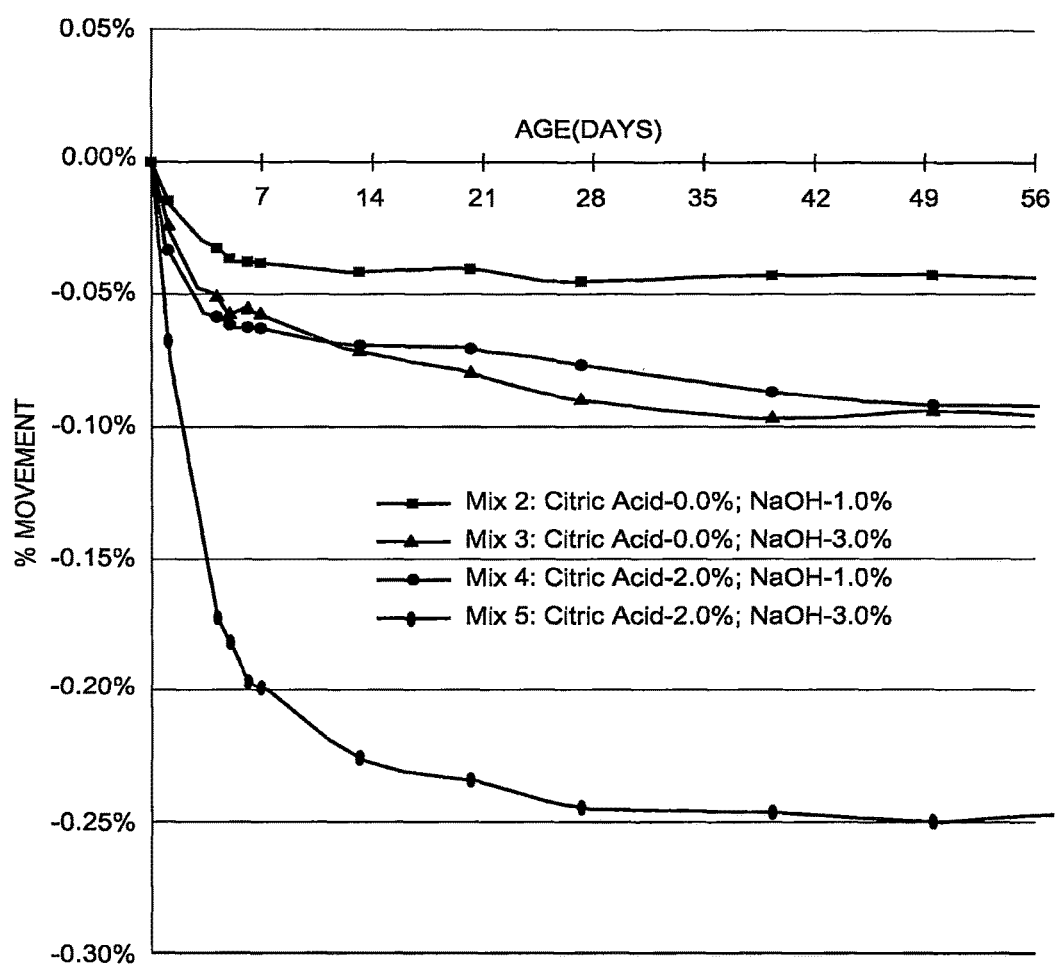
FIG. 22A is a graph of shrinkage of compositions of the invention in Example 22.

FIG. 22A shows shrinkage behavior of geopolymer cementitious compositions in Example 22.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following important conclusions can be drawn from this investigation and FIG. 22A:

The mixture compositions comprising sodium hydroxide only as a chemical activator (Mix 2 and Mix 3) demonstrated a very low shrinkage of about less than about 0.1%. It is noteworthy that the maximum shrinkage of Mix 2 containing only 1% sodium hydroxide was less than about 0.05%. The maximum shrinkage increased to about 0.09% for Mix 3 containing sodium hydroxide at an amount of about 3%.

The cementitious compositions of this embodiment comprising a mixture of sodium hydroxide and citric acid as a chemical activator (Mix 4 and Mix 5) also demonstrated very low shrinkage. The maximum shrinkage of Mix 3 containing citric acid and sodium hydroxide at an amount of about 1% was only about 0.05%. The maximum shrinkage increased to about 0.25% for Mix 5 containing citric acid and sodium hydroxide at an amount of about 3%.

Heat Evolution and Slurry Temperature Rise Behavior

Figure 22B:
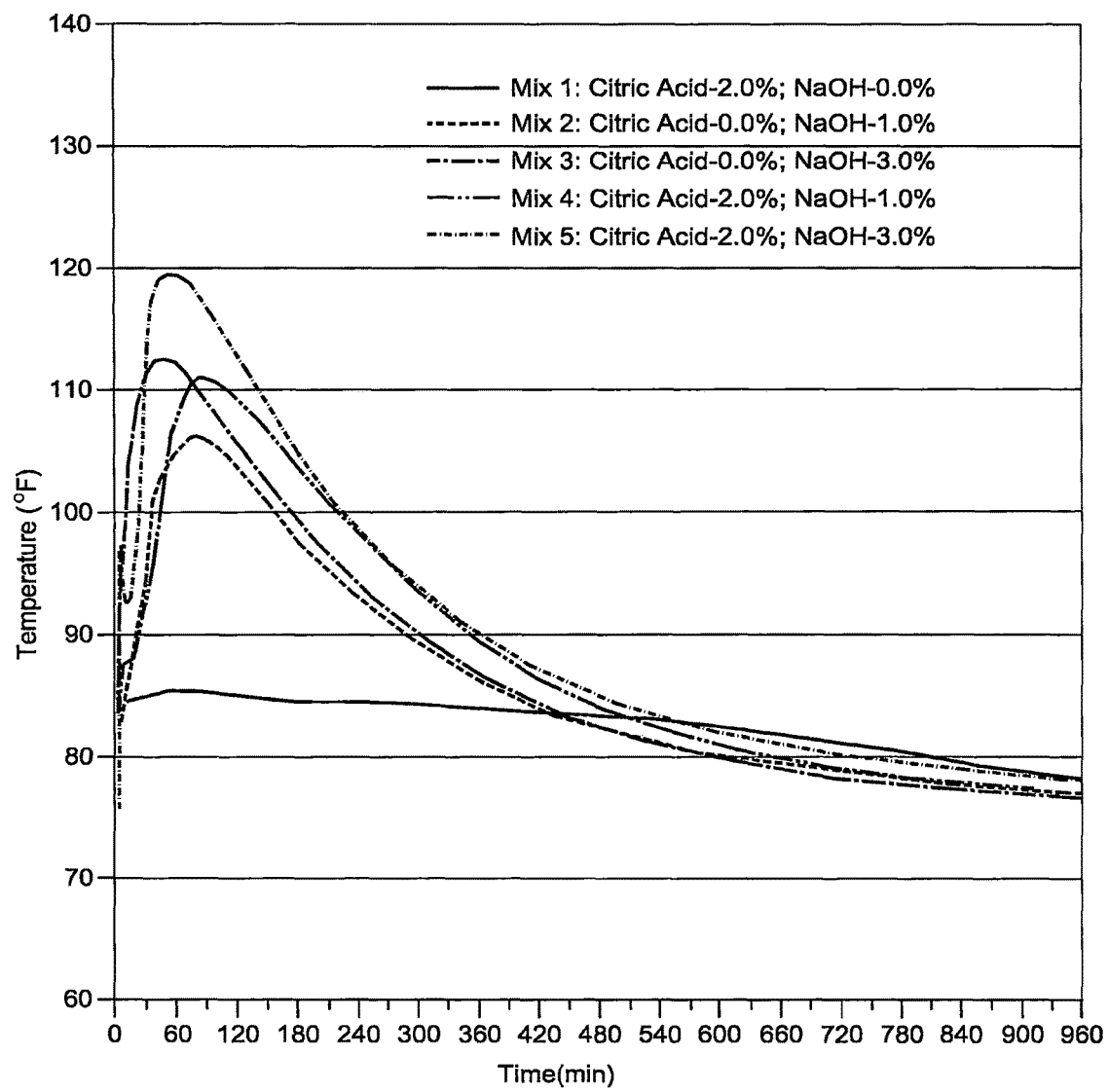
FIG. 22B is a graph of slurry temperature rise of compositions of the invention of Example 22.

FIG. 22B shows the exothermic and slurry temperature rise behavior of geopolymer cementitious compositions in Example 22. The cementitious compositions in this Example (Mix 2 through Mix 5) demonstrated very low increase in temperature. Mix 1 with only citric acid (and no sodium hydroxide) stiffened up upon mixing and demonstrated extremely poor reactivity as indicated by the very low temperature rise. A moderate heat evolution and low temperature rise within the material during the curing stage significantly contribute to preventing excessive thermal expansion and consequent cracking and disruption of material. This aspect is of assistance when the material is utilized in a manner where large thicknesses of material pours are involved in the actual field applications. The geopolymer cementitious compositions of the embodiment investigated in this Example are disclosed to be highly beneficial in this particular aspect as they would lead to a lower thermal expansion and enhanced resistance to thermal cracking in actual field applications.

Time of Setting

TABLE 79 shows the time of setting of geopolymer cementitious compositions in Example 22.

TABLE 79

Setting Times of Example 22

|  | Initial Setting Time (hr:min) | Final Setting Time (hr:min) |
|---|---|---|
| Mix 1 | Soft | >3 hrs |
| Mix 2 | 00:31 | 00:42 |

TABLE 79-continued

Setting Times of Example 22

|  | Initial Setting Time (hr:min) | Final Setting Time (hr:min) |
|---|---|---|
| Mix 3 | 00:10 | 00:16 |
| Mix 4 | 00:47 | 00:57 |
| Mix 5 | 00:38 | 00:43 |

All cementitious compositions of this embodiment investigated in this example (Mix 2 through Mix 5) demonstrated very rapid setting behavior with final setting times of about 15 to about 60 minutes. The mixture compositions comprising sodium hydroxide at an amount level of about 1% (Mix 2 and Mix 4) had relatively longer setting time (and open time) in comparison to mixture compositions comprising sodium hydroxide at an amount of about 3% (i.e., Mix 3 and Mix 4). An extremely short setting time is problematic for some applications as a short material working life (pot life) causes significant difficulties with processing of rapid setting material in the actual field applications.

Compressive Strength

TABLE 80 shows the compressive strength behavior of the developed geopolymer cementitious compositions of the embodiment comprising fly ash, calcium sulfoaluminate cement, and calcium sulfate (fine-grained landplaster), and alkali metal chemical activators in Example 22.

TABLE 80

Compressive Strength of Example 22 - (psi)

|  | 4 hour | 24 hour | 7 day | 28 day |
|---|---|---|---|---|
| Mix 1 | — | — | — | — |
| Mix 2 | 1936 | 2820 | 4346 | 6207 |
| Mix 3 | 1310 | 1635 | 4326 | 6330 |
| Mix 4 | 1343 | 2143 | 3971 | 5516 |
| Mix 5 | 1593 | 4270 | 6887 | 9513 |

The following important observations can be drawn from this study:

The compressive strength of the geopolymer cementitious compositions of the embodiment investigated in this Example continued to increase with time.

The early age 4-hour compressive strengths of the material were in excess of about 1000 psi with the use of calcium sulfoaluminate cement and landplaster as a component of the geopolymer cementitious compositions of this embodiment. This was true when sodium hydroxide was used as a chemical activator by itself (Mix 2 and Mix 3) or when a mixture of sodium hydroxide and citric acid was used as a chemical activator (Mix 4 and Mix 5).

The early age 24-hour compressive strengths of the material were in excess of about 2000 psi with the use of calcium sulfoaluminate cement and landplaster as a component of the investigated geopolymer cementitious compositions of this embodiment. This was true when sodium hydroxide was used as a chemical activator by itself (Mix 2 and Mix 3) or when a mixture of sodium hydroxide and citric acid was used as a chemical activator (Mix 4 and Mix 5).

The 28-day compressive strength of all geopolymer cementitious compositions of this embodiment investigated in this Example was in excess of about 5000 psi. This again was true when sodium hydroxide was used as a chemical activator by itself (Mix 2 and Mix 3) or when a mixture of sodium hydroxide and citric acid was used as a chemical activator (Mix 4 and Mix 5).

Example 23

This Example shows the influence of incorporating calcium sulfoaluminate cement at different amounts (20 parts, 40 parts, 60 parts and 80 parts by weight of fly ash) in combination with calcium sulfate dihydrate, which is added at levels of 6, 12, 18 and 24 wt. % of the fly ash, on the very early age shrinkage behavior of the geopolymer cementitious compositions of the invention. The compositions tested are listed in TABLE 81 The sand is QUIKRETE Commercial Grade Fine Sand No. 1961 and the superplasticizer is BASF CASTAMENT FS20.

TABLE 81

Mixture compositions of the geopolymer cementitious reactive powder compositions of Example 23

| Raw Material | Mix 1 | Mix 2 | Mix 3 | Mix 4 |
|---|---|---|---|---|
| Fly Ash Class C (grams) | 3175 | 2632 | 2247 | 1961 |
| Calcium Sulfate Dihydrate (grams) | 191 | 312 | 404.5 | 471 |
| Calcium Sulfoaluminate Cement (grams) | 635 | 1053 | 1348 | 1569 |
| Total Cementitious Materials (grams) | 4000 | 4000 | 4000 | 4000 |
| Sand (grams) | 4200 | 4200 | 4200 | 4200 |
| Sodium Citrate Dihydrate (grams) | 80 | 80 | 80 | 80 |
| Superplasticizer (grams) | 20 | 20 | 20 | 20 |
| Defoamer & Wetting Agent (grams) | 0 | 0 | 0 | 0 |
| Water (grams) | 1200 | 1200 | 1200 | 1200 |
| Water/Cementitious Materials Ratio | 0.30 | 0.30 | 0.30 | 0.30 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2% | 2% | 2% | 2% |
| Calcium Sulfoaluminate Cement/Fly ash, wt % | 20% | 40% | 60% | 80% |
| Calcium Sulfate/Calcium Sulfoaluminate Cement, wt % | 30% | 30% | 30% | 30% |

Very Early Age Shrinkage Behavior

Figure 23:
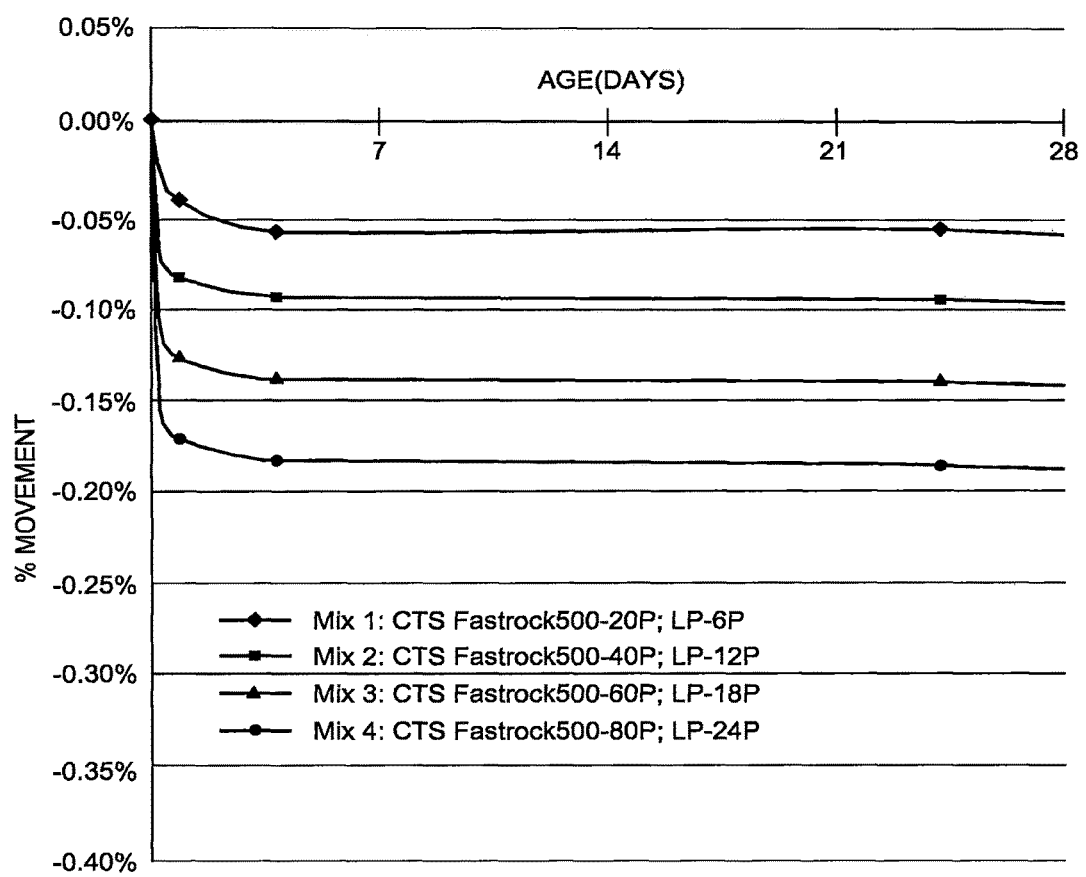
FIG. 23 is a graph of very early age shrinkage of compositions of the invention of Example 23 (Shrinkage testing initiated at the age of 1-hour).

FIG. 23A shows the very early age shrinkage behavior of geopolymer cementitious compositions of the embodiment investigated in Example 23.

The very early age shrinkage testing was conducted as described in examples above but the initial measurement was initiated at about 1-hour from the time the raw materials were mixed together to form an aqueous slurry. The main objective of this investigation was to study the influence of incorporation of different amounts of calcium sulfoaluminate cement (about 20 to about 80 parts by weight of fly ash) and fine-grained calcium sulfate dihydrate on the very early shrinkage behavior of the geopolymer cementitious compositions of this embodiment.

From FIG. 23A and Table 82 it can be observed that the magnitude of very early age shrinkage increased with increase in the amount of calcium sulfoaluminate cement in the compositions of this embodiment. This was a highly unexpected result.

TABLE 82 summarizes the percentage of shrinkage for bars made using the mixes in Example 23, as shown in FIG. 23A.

TABLE 82

| parts of calcium sulfoaluminate cement in Mix | Very Early Age Shrinkage of Example 23 (percentage) | | |
|---|---|---|---|
| | 4 hour final measurement | 8 hour final measurement | 24 hour final measurement |
| Mix 1 | 20 | 0.02 | 0.03 | 0.05 |
| Mix 2 | 40 | 0.06 | 0.08 | 0.09 |
| Mix 3 | 60 | 0.09 | 0.12 | 0.13 |
| Mix 4 | 80 | 0.13 | 0.16 | 0.17 |

The aforementioned results represent an extremely important aspect of the present invention. These results are highly unexpected and depict the very early age shrinkage of the cementitious compositions of this embodiment which increases with increasing amount of calcium sulfoaluminate cement in the composition. These results suggest it is beneficial to keep the amount of calcium sulfoaluminate cement in the compositions of this and related embodiments relatively low (preferably about 20 parts or lower) if the primary objective of the application is to minimize the magnitude of very early age shrinkage and total shrinkage of the material. Although the reasons for the very early shrinkage of the material observed here are not completely understood, it is believed that the early shrinkage is attributable to the chemical and autogenous shrinkage resulting from the self-desiccation and volumetric changes of the reactant materials.

Another major benefit of keeping the amounts of calcium sulfoaluminate cement and calcium sulfate low in the compositions of this embodiment and related embodiments is significantly reduced potential for efflorescence. It should be noted that a high degree of efflorescence in the material not only presents an aesthetic problem but it can also lead to material disruption and damage at later ages due to expansive reactions that can occur due to the chemical and hydration reactions of the salts present in the hardened material.

Another major benefit of keeping the amounts of calcium sulfoaluminate cement and calcium sulfate low in the compositions of this embodiment is that it significantly reduces the cost of raw materials.

Example 24

This example depicts tensile bond strength performance of fly ash, calcium sulfoaluminate cement, fine-grained calcium sulfate dihydrate (i.e., gypsum or landplaster) and an alkali metal salt. In total, four mixture compositions were investigated.

In TABLE 83, Mix 1 represents a geopolymer cementitious composition of the invention containing no film-forming redispersible polymer powder. On the other hand, Mix 2 through Mix 4 represent geopolymer cementitious compositions of the invention containing film-forming redispersible polymer powder added at different amount levels. Film-forming redispersible polymer powder with commercial trade name VINNAPAS 5025L (Vinyl Acetate/Ethylene Copolymer) produced by WACKER Polymers was used in the last three mixture compositions. Quikrete Commercial Grade Fine Sand No. 1961 was used along with BASF CASTAMENT FS20 superplasticizer and SURFYNOL 500S defoamer available from Air Products Inc.

TABLE 83

Mixture compositions of Example 24

| Raw Material | Mix 1 | Mix 2 | Mix 3 | Mix 4 |
|---|---|---|---|---|
| Fly Ash Class C (grams) | 4039 | 4039 | 4423 | 4039 |
| Calcium Sulfate Dihydrate (grams) | 404 | 404 | 442 | 404 |
| Calcium Sulfoaluminate Cement (grams) | 808 | 808 | 885 | 808 |
| Total Cementitious Materials (grams) | 5250 | 5250 | 5750 | 5250 |
| Sand (grams) | 5513 | 5513 | 6033 | 5513 |
| Sodium Citrate Dihydrate (grams) | 105 | 105 | 115 | 105 |
| Superplasticizer (grams) | 26.25 | 26.25 | 28.75 | 26.25 |
| Defoamer & Wetting Agent | 10.5 | 10.5 | 11.5 | 10.5 |
| Redispersible Polymer Powder (grams) | 0.0 | 26.25 | 57.5 | 78.75 |
| Water (grams) | 1444 | 1444 | 1581 | 1444 |
| Water/Cementitious Materials Ratio | 0.275 | 0.275 | 0.275 | 0.275 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2% | 2% | 2% | 2% |
| Calcium Sulfoaluminate cement/Fly ash, wt % | 20% | 20% | 20% | 20% |
| Calcium Sulfate/Calcium Sulfoaluminate Cement, wt % | 30% | 30% | 30% | 30% |

Tensile Bond Strength

Tensile bond strength between Portland cement based mortar substrate and geopolymer cementitious compositions as mentioned in Table 102 was investigated. Approx. 2 in.×2 in.×2 in. cube molds were first filled to half the thickness (1") with Portland cement based mortar. The material was allowed to cure and harden in sealed plastic bags for at least about 28-days after the cast. After the completion of about 28-day curing, the top surface of the Portland cement mortar was then primed with an acrylic primer. Subsequently, geopolymer cementitious compositions of this embodiment per Table 84 were poured in the molds up to the top surface. The top surface of the freshly placed material was screeded to create a flat surface. The specimens were then allowed to cure until the time of testing. After the completion of curing, the test specimen were demolded and approx. 2 in.×2 in. steel anchor blocks were epoxy bonded to both the top and bottom surfaces of the specimen. The specimens were then pulled in tension in a suitable testing frame (MTS Testing Machine) and the ultimate failure load was recorded. The failure stress was calculated by dividing the failure load by the bonded surface area between the Portland cement mortar substrate and the geopolymer cementitious material. For each mix investigated in this Example, five samples were tested to failure.

TABLE 84 shows the average tensile bond strength of the four geopolymer mixture compositions investigated in this Example. All specimens were cured for 8 days and tested for tensile bond strength. It can be observed that all four mixture compositions investigated had extremely high tensile bond strength. It is particularly noteworthy that the tensile bond strength exceeded about 200 psi for all four geopolymer cementitious compositions of this invention investigated in this Example.

TABLE 84

Tensile bond strength of geopolymer cementitious compositions of this embodiment

| Mix Identification | Average Tensile Bond Strength (psi) |
|---|---|
| Mix #1 | 298 |
| Mix #2 | 239 |
| Mix #3 | 233 |
| Mix #4 | 277 |

The tensile bond strength of the geopolymer cementitious composition without any redispersible polymer powder (Mix 1) was extremely high—about 298 psi. This was a highly unexpected result as such high tensile bond strengths are not typically achievable with other commercially available Portland cement based materials and products in absence of polymers. It is notable that addition of redispersible polymer powder (Mixes 2 through 4) to the geopolymer cementitious compositions of this embodiment did not result in any substantial change or increase in the tensile bond strength. This result demonstrates a very important aspect of the compositions of the present invention that redispersible polymer powders are not necessarily required in the geopolymer cementitious compositions of this embodiment for increasing their tensile bond strength to other substrates. Tensile bond strength is an extremely useful property when the material is used in repair applications to bond to other substrates. The quality of bond ultimately determines how durable and lasting the repair work will be both in the short-term and long-term. Poor bond with substrate can result in delamination, cracking, and other modes of failure.

The aforementioned results represent an extremely important aspect of the present invention as they depict that to achieve satisfactory bond strength performance, expensive polymers can be optionally eliminated from the geopolymer compositions of this embodiment. This makes the geopolymer cementitious compositions of this embodiment unique and extremely cost competitive to the other commercially available cementitious repair products based on other inorganic binder technologies.

Additional tensile bond strength tests were conducted using geopolymer compositions of this embodiment containing other types of redispersible polymer powders such as acrylic, styrene acrylate copolymer, styrene-butadiene copolymer, and other. The tensile bond strength results for these compositions were extremely high and similar to the results as reported in this Example above.

Example 25

This example depicts physical properties of the developed geopolymer cementitious compositions of this embodiment comprising fly ash, calcium sulfoaluminate cement, fine-grained anhydrite and alkali metal citrate. One main objective of this investigation was to study the influence of incorporation of calcium sulfoaluminate cement at low amounts ≤ about 40 parts by weight of fly ash) in combination with fine grained anhydrite on compressive strength behavior of geopolymer compositions of this embodiment.

The amount of calcium sulfoaluminate cement used in the mixture compositions of this example was equal to 5, 10, 20, 30 and 40 wt % of the weight of fly ash. USG SNOW WHITE filler, a fine-grained anhydrous calcium sulfate (anhydrite) was used in this investigation. SNOW WHITE filler was added at an amount of 50% of the weight of calcium sulfoaluminate cement in the various mixture compositions investigated. The anhydrite was added at levels of 2.5, 5, 10, 15 and 20 wt % of the Class C fly ash. QUIKRETE Commercial Grade Fine Sand No. 1961, BASF CASTAMENT FS20 superplasticizer, SURFYNOL 500S defoamer and wetting agent from Air Products, Inc. and AXILAT RH 200 XP succinoglycan hydrocolloid available from Momentive Specialty Chemicals. TABLE 85 shows the compositions tested in this example.

TABLE 85

Geopolymer cementitious reactive powder compositions of Example 25 in parts by weight

| Raw Material | Mix 1 | Mix 1 | Mix 3 | Mix 4 | Mix 5 |
|---|---|---|---|---|---|
| Fly Ash Class C | 4419 | 4130 | 3846 | 3276 | 2969 |
| Anhydrite | 111 | 207 | 385 | 491 | 594 |
| Calcium Sulfoaluminate Cement | 221 | 413 | 769 | 983 | 1188 |
| Total Cementitious Materials | 4750 | 4750 | 5000 | 4750 | 4750 |
| (grams) | | | | | |
| Sand | 5938 | 5938 | 6250 | 5938 | 5938 |
| Sodium Citrate Dihydrate | 95 | 95 | 100 | 95 | 95 |
| Citric Acid Monohydrate | 35.6 | 35.6 | 37.5 | 35.6 | 35.6 |
| Superplasticizer | 11.9 | 11.9 | 12.5 | 11.9 | 11.9 |
| Defoamer & Wetting Agent[6] | 9.5 | 9.5 | 10 | 9.5 | 9.5 |
| Rheology Modifier | 0.36 | 0.36 | 0.38 | 0.36 | 0.36 |
| Water | 1188 | 1188 | 1250 | 1188 | 1188 |
| Water/Cementitious Materials Ratio | 0.25 | 0.25 | 0.25 | 0.25 | 0.25 |
| Sand/Cementitious Materials Ratio | 1.25 | 1.25 | 1.25 | 1.25 | 1.25 |
| Superplasticizer/Cementitious Materials, wt % | 0.25% | 0.25% | 0.25% | 0.25% | 0.25% |
| Sodium Citrate/Cementitious Materials, wt % | 2% | 2% | 2% | 2% | 2% |
| Calcium Sulfoaluminate cement/Fly ash, wt % | 5% | 10% | 20% | 30% | 40% |
| Calcium Sulfate/Calcium Sulfoaluminate Cement, wt % | 50% | 50% | 50% | 50% | 50% |

Compressive Strength and Time of Setting

TABLE 86 shows the compressive strength behavior of the developed geopolymer cementitious compositions of the embodiment comprising fly ash, calcium sulfoaluminate cement, fine-grained anhydrite, and alkali metal citrate investigated in Example 25.

TABLE 86

Compressive Strength of Example 25 - (psi)

| | 4 hour | 24 hour | 7 day | 28 day | 28 days + 7 days saturated |
|---|---|---|---|---|---|
| Mix 1 | 1532 | 2173 | 5343 | 7002 | 6457 |
| Mix 2 | 2251 | 2891 | 5622 | 8293 | 5097 |
| Mix 3 | 3043 | 5043 | 5752 | 8499 | 7794 |
| Mix 4 | 3748 | 6208 | 6965 | 7239 | 6880 |
| Mix 5 | 4386 | 6563 | 8826 | 9273 | 9299 |

The compressive strengths of the geopolymer cementitious compositions of the embodiment comprising anhydrite as obtained in this Example are significantly greater in comparison to similar compositions (as highlighted in previous examples) containing calcium sulfate dihydrate. This demonstrates the unexpected benefits of using insoluble anhydrous calcium sulfate (anhydrite or dead burnt anhydrite) compared to calcium sulfate dihydrate discussed in the description of the invention.

The early age 4-hour compressive strengths of the material were in excess of about 1500 psi for Mix #1 and Mix #2 containing calcium sulfoaluminate cement and anhydrite at lower amounts; and in excess of about 3000 psi for Mixes 3 through 5 containing calcium sulfoaluminate cement and anhydrite at higher amounts.

The early age 24-hour compressive strengths of the material were in excess of about 2000 psi for Mix 1 and Mix 2 containing calcium sulfoaluminate cement and anhydrite at lower amounts; and in excess of about 5000 psi for Mixes 3 through 5 containing calcium sulfoaluminate cement and anhydrite at higher amounts.

The 28-day compressive strength of all geopolymer cementitious compositions of this embodiment containing calcium sulfoaluminate cement and anhydrite investigated in this example exceeded about 7000 psi.

It was further noted that the geopolymer cementitious compositions of this embodiment comprising anhydrite produced relatively faster set in comparison to similar compositions (as highlighted in previous examples) containing calcium sulfate dihydrate. The final set times for the five mixture compositions investigated in this Example ranged between about 25 to about 35 minutes.

The geopolymer cementitious compositions of this invention containing anhydrite as highlighted in the present example are particularly useful in applications where rapid set and rapid strength development are an essential requirement.

Example 26

This example depicts a geopolymer cementitious composition of the present invention particularly useful for use as a self-leveling floor underlayment over a variety of substrates such as concrete, wood, etc. In particular, compositions similar to the one described in this Example are highly useful for smoothening and leveling existing concrete surfaces that are rough and non-planar.

TABLE 87 shows the material composition of this embodiment that was used over an existing concrete slab to create a smooth surface.

TABLE 87

Compositions of Example 26

| Raw Material | Parts | Weight (grams) |
|---|---|---|
| Fly Ash Class C[1] | 100 | 8367 |
| Calcium Sulfate Dihydrate[2] | 10 | 837 |
| Calcium Sulfoaluminate Cement[3] | 20 | 1673 |
| Total Cementitious Materials | 130 | 10877 |
| Sand[4] | | 11421 |
| Sodium Citrate Dihydrate | | 217.5 |
| Citric Acid Anhydrous | | 54 |
| Superplasticizer[5] | | 54 |
| Defoamer & Wetting Agent[6] | | 22 |
| Rheology Modifier[7] | | 0.87 |
| Smectite Clay[8] | | 16.3 |
| Water | | 2991 |
| Water/Cementitious Materials Ratio | | 0.275 |
| Sand/Cementitious Materials Ratio | | 1.0 |
| Superplasticizer/Cementitious Materials, wt % | | 0.5% |
| Sodium Citrate/Cementitious Materials, wt % | | 2% |
| Calcium Sulfoaluminate cement/Fly ash, wt % | | 20% |
| Calcium Sulfate/Calcium Sulfoaluminate Cement, wt % | | 50% |

[1]Class C Fly Ash, Campbell Power Plant, West Olive, MI
[2]USG Landplaster
[3]FASTROCK 500, CTS Company
[4]UNIMIN 5030 Sand
[5]BASF CASTAMENT FS20
[6]SURFYNOL 500S
[7]MOMENTIVE AXILAT RH 100 XP
[8]BENTONE CT HECTORITE clay The size of the concrete slab over which the geopolymer topping material was poured was about 22 ft.×about 11.5 ft. in area. The surface of the slab was first broomed to remove the dust and debris adhering to the slab surface. This was followed by priming the surface of the slab using an acrylic floor primer. The materials shown in Table 87 were mixed in a drum using a hand drill mixer. Two batches of the size mentioned in Table 26 were mixed at once in a mixing drum using a hand drill mixer. The water was first poured in the mixing drum following by addition of the dry powder blend. The material mixing time was about 2 to about 3 minutes to achieve lump free geopolymer slurry of this embodiment. The mixing drum was then transported to the pour area and the geopolymer slurry was poured over the concrete slab. The mixing process as described above was repeated 13 times to obtain enough slurry to cover the entire concrete slab pour area. The geopolymer slurry flowed and leveled extremely easily. A screed was used to further facilitate and move the material in the pour area.

The surface of the poured material was then troweled using a steel trowel to create a flat and smooth surface. The effective thickness of the poured material ranged from about 1 inch to featheredge (about 1/16 in.) depending upon the location on the slab. The effective thickness of the poured material on the slab was measured at the time the material was poured over the slab and then re-measured after about 2 hours. The thickness measurements remained essentially the same from the time of pouring and after about 2 hours. The total length of the feather edged material in the pour area was about 22 feet. It is noteworthy that the poured material featheredged extremely easily. The bond between the featheredged material and substrate was found to be exceptional within about 2-hours of the pour. It is noteworthy that no cracking or delamination occurred at the featheredge when the masking tape at the end of the featheredge area was pulled at the age of about 2-hours. The slab surface was dry and walkable within about 2-hours after the pour. The floor remained substantially crack and defect free until the time of last inspection that was made after several months after the pour.

The surface pH of the geopolymer binder floor topping surface was measured according to the ASTM F710-11 test method at various time intervals. The Extech PH150-C Exstick Concrete pH meter was used to conduct the surface pH measurements. Table 88 shows the measured pH values of the floor topping surface:

TABLE 88

Surface pH of geopolymer floor topping of Example 26 at different ages after the pour

| Floor Age | pH |
|---|---|
| 16 Hours | 10.4 |
| 48 Hours | 9.9 |
| 1 Week | 9.7 |
| 4 Weeks | 9.7 |

The dimensionally stable geopolymer binders of this embodiment owing to their relatively low pH are highly compatible with the most commercially available flooring-good adhesives such as acrylic and rubber adhesives. Due to the low pH environment provided by the dimensionally stable geopolymer binder of this embodiment, the flooring adhesives do not evidence significant chemical breakdowns and instability caused by adverse reactions with the geopolymer composition. As a result, the flooring materials such as sheet vinyl, vinyl composition tiles (VCTs) and carpet can be successfully installed over the dimensionally stable geopolymer binders of this embodiment to ensure a long lasting and durable performance.

The tensile bond strength of the applied geopolymer topping to the concrete substrate was measured according to the ASTM C1583 (2004) test method at the age of six weeks. The measured tensile strength values were in excess of about 300 psi demonstrating development of excellent bond of the geopolymer topping material to the concrete substrate.

When used as a repair or self-leveling topping material, the dimensionally stable geopolymer compositions of some embodiments of the invention require minimal substrate preparation for successful installation. Time consuming and expensive substrate preparation methods such as shot-blasting, scarifying, water jetting, scabbing or milling to make the surface ready for installation of the self-leveling geopolymer binder topping on an existing substrate can be minimized or avoided altogether, depending on the application. The geopolymer topping can either be poured directly over a substrate free of dust and debris, or alternatively, it can be poured over a substrate that has been appropriately primed using a suitable floor primer.

The cementitious composition can be spread on a surface of a substrate, wherein the cementitious binder is self-leveling and is poured to an effective thickness of about 0.02 to about 7.5 cm. When used as patching repair material or self-leveling topping material over an existing substrate, the dimensionally stable geopolymer compositions of some embodiments of the invention are capable of being easily applied to extremely small thicknesses from skim-coating to featheredging. Skim-coating and featheredging here refers to an applied material thickness of less than about ¼ inch (0.635 cm) and more preferably ranging between about ⅛ inch to about 1/128 inch (0.32 cm to 0.02 cm).

The dimensionally stable geopolymer compositions of some preferred embodiments of the invention are capable of developing exceptional tensile bond strength with the underlying substrate. The preferable tensile bond strength between the geopolymer material of the invention and concrete substrate preferably exceeds about 200 psi (1.4 MPa) and most preferably exceeds about 300 psi (2.1 MPa).

Important distinctive aspects of the geopolymer binder compositions of the present invention as highlighted from this Example are as follows:

Extremely low mixing energy requirement to achieve well mixed geopolymer binder material even with the use of low RPM drill mixers. It is particularly noteworthy that the geopolymer material of this embodiment is extremely easy to mix despite the use of extremely small amounts of water in the formulation. The commonly available cementitious formulations available in the industry use about twice the amount of water to facilitate mixing and produce a workable and self-leveling slurry mixture.

Minimal substrate preparation requirement to accomplish a successful pour using the geopolymer binder topping materials of this embodiment. There is no need to employ time consuming and expensive substrate preparation methods such as shot-blasting, scarifying, water jetting, scabbing or milling to make the surface ready for the pour. The geopolymer material can either be poured directly over a substrate that is free of dust and debris, or alternatively, it can be poured over a substrate that has been properly primed using a suitable floor primer.

Ability of the geopolymer binder material of this embodiment to be featheredged.

Exceptional bond between the geopolymer binder topping of this embodiment and the concrete substrate.

Geopolymer binder topping material of this embodiment is walkable within about 2 hours after the pour.

Extremely high resistance of the geopolymer binder topping of this embodiment to distress such as delamination and cracking.

Ability of the geopolymer binder material of this embodiment to be poured to different thicknesses.

Ability of the geopolymer binder material to accept different types of coatings on the surface.

Ability of the geopolymer binder topping material to be mixed with commercially available continuous mortar mixers and other types of concrete and mortar batch mixers.

Example 27

TABLE 89 shows the raw material compositions of the cementitious mixtures investigated in this example.

The amount of calcium sulfoaluminate cement used in the mixture compositions of this Example was equal to 25 wt % of the weight of fly ash. Fine-grained calcium sulfate dihydrate (fine-grained landplaster) used in this investigation was added at a level of 50 wt % of the weight of calcium sulfoaluminate cement, which is 12.5 wt % of the Class C fly ash. The Portland cement was added at levels of 25, 67, 150 and 400 wt % of the fly ash, which is approximate rates of 15 wt %, 33 wt %, 52 wt %, and 74 wt % of the total cementitious materials, respectively. The total cementitious materials include Class C fly ash, calcium sulfate dihydrate, calcium sulfoaluminate and the Portland cement. The water to total cementitious materials ratio was kept constant at about 0.3 for all mixes investigated. The St. Mary's Type III Portland Cement, Detroit, Mich. was added. QUIKRETE Commercial Grade Fine Sand No. 1961 and BASF CASTAMENT FS20 superplasticizer were also used.

TABLE 89

Geopolymer cementitious compositions of Example 27

| Raw Material | Mix 1 | Mix 2 | Mix 3 | Mix 4 |
|---|---|---|---|---|
| Fly Ash Class C (grams) | 2923 | 1959 | 1391 | 744 |
| Calcium Sulfate Dihydrate (grams) | 365 | 245 | 174 | 93 |
| Calcium Sulfoaluminate Cement (grams) | 731 | 490 | 348 | 186 |
| Portland Cement Type III (grams) | 731 | 1306 | 2087 | 2977 |
| Total Cementitious Materials (grams) | 4750 | 4000 | 4000 | 4000 |
| Sand (grams) | 4750 | 4000 | 4000 | 4000 |
| Sodium Citrate Dihydrate (grams) | 87.7 | 58.8 | 41.7 | 22.3 |
| Superplasticizer (grams) | 23.75 | 20 | 20 | 20 |
| Water (grams) | 1425 | 1200 | 1200 | 1200 |
| Water/Cementitious Materials Ratio | 0.30 | 0.30 | 0.30 | 0.30 |
| Sand/Cementitious Materials Ratio | 1.0 | 1.0 | 1.0 | 1.0 |
| Superplasticizer/Cementitious Materials, wt % | 0.5% | 0.5% | 0.5% | 0.5% |
| Sodium Citrate/Fly Ash, wt % | 3% | 3% | 3% | 3% |
| Calcium Sulfoaluminate cement/Fly ash, wt % | 25% | 25% | 25.% | 25.% |
| Calcium Sulfate/Calcium Sulfoaluminate Cement, wt % | 50% | 50% | 50% | 50% |
| Portland Cement/Cementitious Materials, wt % | 15% | 33% | 52% | 74% |

Initial Flow Behavior and Slump

TABLE 90 shows the initial flow behavior and slump characteristics of the cementitious compositions comprising fly ash, calcium sulfoaluminate cement, Landplaster, Portland cement, and alkali metal citrate investigated in Example 27:

TABLE 90

Flow and Slump of Example 27

| | Flow | Slump (inches) |
|---|---|---|
| Mix 1 | 7 | 7 |
| Mix 2 | 6 | 5.5 |
| Mix 3 | 5 | 5 |
| Mix 4 | 4 | 4.5 |

All mixture compositions investigated had poor flow behavior as indicated by the stiff slurry and small patty diameter observed in the slump test. The flow properties of the material diminished with increase in the Portland cement in the compositions.

The stiff and high viscous nature of the slump patties is also apparent from the slump values in TABLE 90. The slurry mixtures became more viscous with increase in the Portland cement in the compositions.

Shrinkage Behavior

Figure 24:
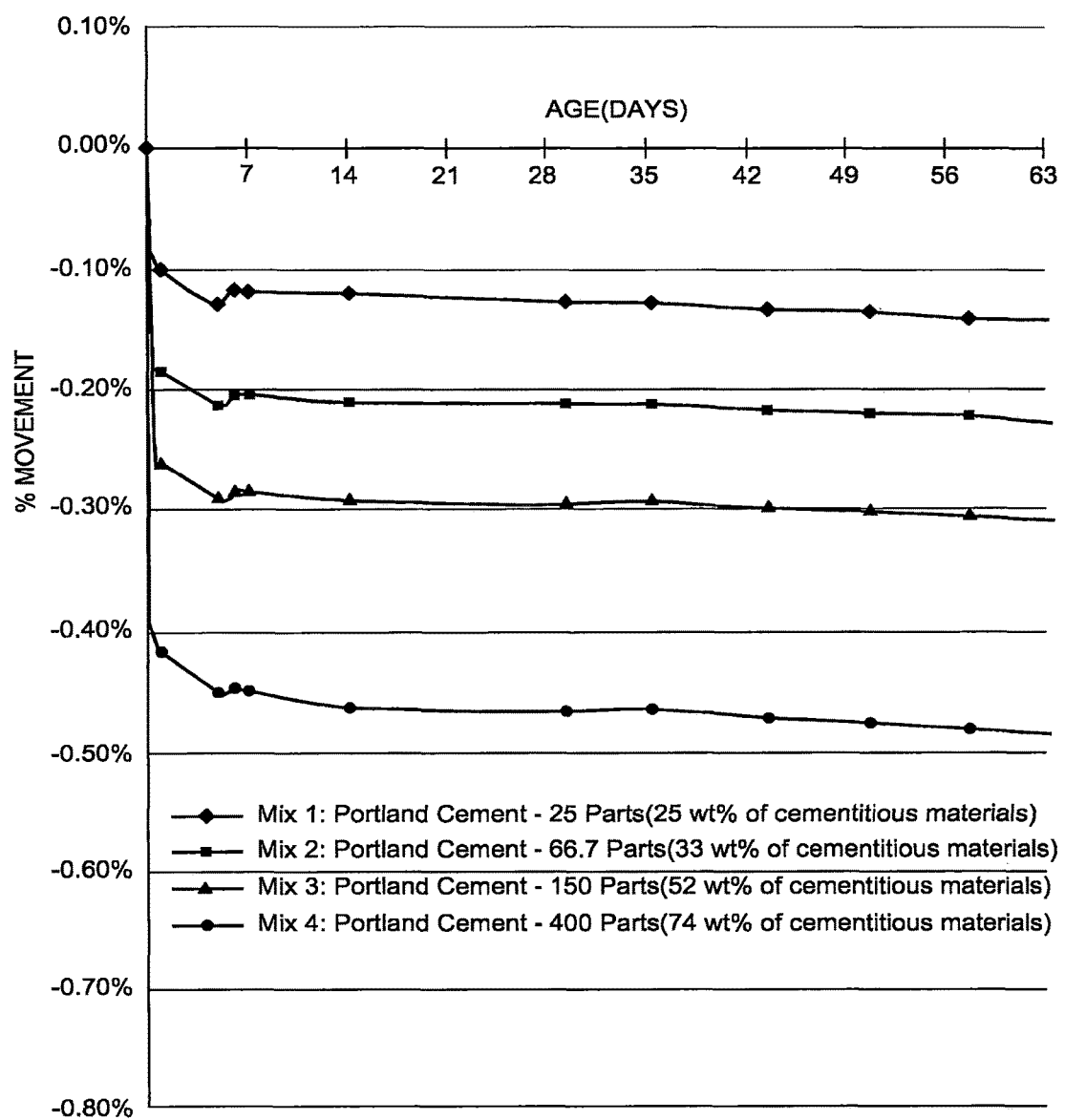
FIG. 24 is a graph of shrinkage of compositions of invention in Example 27.

FIG. 24 shows shrinkage behavior of geopolymer cementitious compositions of the embodiment investigated in Example 27. The shrinkage measurements were initiated at an age of about 2⅓ hours from the time the raw materials were mixed together to form an aqueous slurry. The material shrinkage was measured for a total duration of about 8-weeks while curing the material at about 75° F./50% RH.

The following important conclusions can be drawn from this investigation and FIG. 24:

Incorporation of Portland cement significantly increased the shrinkage of the cementitious compositions investigated. The ultimate shrinkage values for the various mixes investigated are tabulated in Table 91. It can be observed that the ultimate shrinkage for the Mix #1 containing about 15%

Portland cement was about 0.15%. The ultimate shrinkage increased to about 0.23% for the Mix #2 containing about 33% Portland cement. The ultimate shrinkage increased to about 0.3% for the Mix #3 containing about 50% Portland cement. Finally, for the Mix #4 with about 75% Portland cement, the measured shrinkage was the highest at about 0.5%.

TABLE 91

Ultimate shrinkage values for the mixture compositions investigated at the age of about 8 weeks

| Mix Identification | Ultimate shrinkage at the age of 8 weeks (%) |
|---|---|
| Mix 1 | 0.15% |
| Mix 2 | 0.23% |
| Mix 3 | 0.31% |
| Mix 4 | 0.48% |

As discussed in detail on the above description, this example shows the unexpected result obtained with addition of Portland cement to embodiments of the present invention were the Portland cement has a negative influence on the shrinkage behavior of the compositions. The magnitude of shrinkage is shown by this example to increase proportionately with increase in the amount of Portland cement in the compositions.

The addition of Portland cement to cementitious compositions to embodiments of the invention comprising fly ash, calcium sulfoaluminate cement, calcium sulfate and alkali metal citrate very significantly increasing the material shrinkage.

Based on the aforementioned findings, addition of Portland cement in the dimensionally stable geopolymer compositions of embodiments of the present invention is not recommended.

Example 28

TABLE 92 shows the raw material compositions of the cementitious mixtures in this example.

The amount of calcium sulfoaluminate cement used in the mixture compositions of this Example was equal to 20 wt % of the weight of fly ash. Fine-grained calcium sulfate dihydrate (fine-grained landplaster) used in this investigation was added at an amount level of 50 wt % of the weight of calcium sulfoaluminate cement and 10 wt % of the Class C fly ash. Mix 1 composition was free of borax, whereas Mixes 2 through 4 compositions contained borax as a set control chemical additive. QUIKRETE Commercial Grade Fine Sand No. 1961, BASF CASTAMENT FS20 superplasticizer, WACKER Vinnapas 5025L, (Wacker Polymers) and Surfynol 500S defoamer from Air Products.

TABLE 92

Geopolymer cementitious compositions of Example 28

| Raw Material | Mix 1 | Mix 2 | Mix 3 | Mix 4 |
|---|---|---|---|---|
| Fly Ash Class C (grams) | 4039 | 4039 | 4039 | 4039 |
| Calcium Sulfate Dihydrate (grams) | 404 | 404 | 404 | 404 |
| Calcium Sulfoaluminate Cement (grams) | 808 | 808 | 808 | 808 |
| Total Cementitious Materials (grams) | 5250 | 5250 | 5250 | 5250 |
| Sand (grams) | 5513 | 5513 | 5513 | 5513 |
| Sodium Citrate Dihydrate (grams) | 105 | 105 | 105 | 105 |

TABLE 92-continued

Geopolymer cementitious compositions of Example 28

| Raw Material | Mix 1 | Mix 2 | Mix 3 | Mix 4 |
|---|---|---|---|---|
| Superplasticizer (grams) | 26.25 | 26.25 | 26.25 | 26.25 |
| Borax (grams) | 0.0 | 39.4 | 39.4 | 52.5 |
| Film Forming Redispersible Polymer Powder[6] (grams) | 0.0 | 26.25 | 26.25 | 0.0 |
| Defoamer[7] (grams) | 5.25 | 5.25 | 5.25 | 5.25 |
| Water (grams) | 1575 | 1575 | 1575 | 1575 |
| Water/Cementitious Materials Ratio | 0.30 | 0.30 | 0.30 | 0.30 |
| Sand/Cementitious Materials Ratio | 1.05 | 1.05 | 1.05 | 1.05 |
| Superplasticizer/Cementitious Materials, wt % | 0.5% | 0.5% | 0.5% | 0.5% |
| Sodium Citrate/Cementitious Materials, wt % | 2% | 2% | 2% | 2% |
| Calcium Sulfoaluminate cement/Fly ash, wt % | 20% | 20% | 20% | 20% |
| Calcium Sulfate/Calcium Sulfoaluminate Cement, wt % | 50% | 50% | 50% | 50% |
| Borax/Cementitious Materials, wt % | 0% | 0.75% | 0.75% | 1.0% |
| Film-Forming Redispersible Polymer Powder/Cementitious Materials, wt % | 0% | 0.5% | 0.5% | 0% |
| Defoamer/Cementitious Materials, wt % | 0.1% | 0.1% | 0.1% | 0.1% |

Efflorescence Behavior

Figure 25:
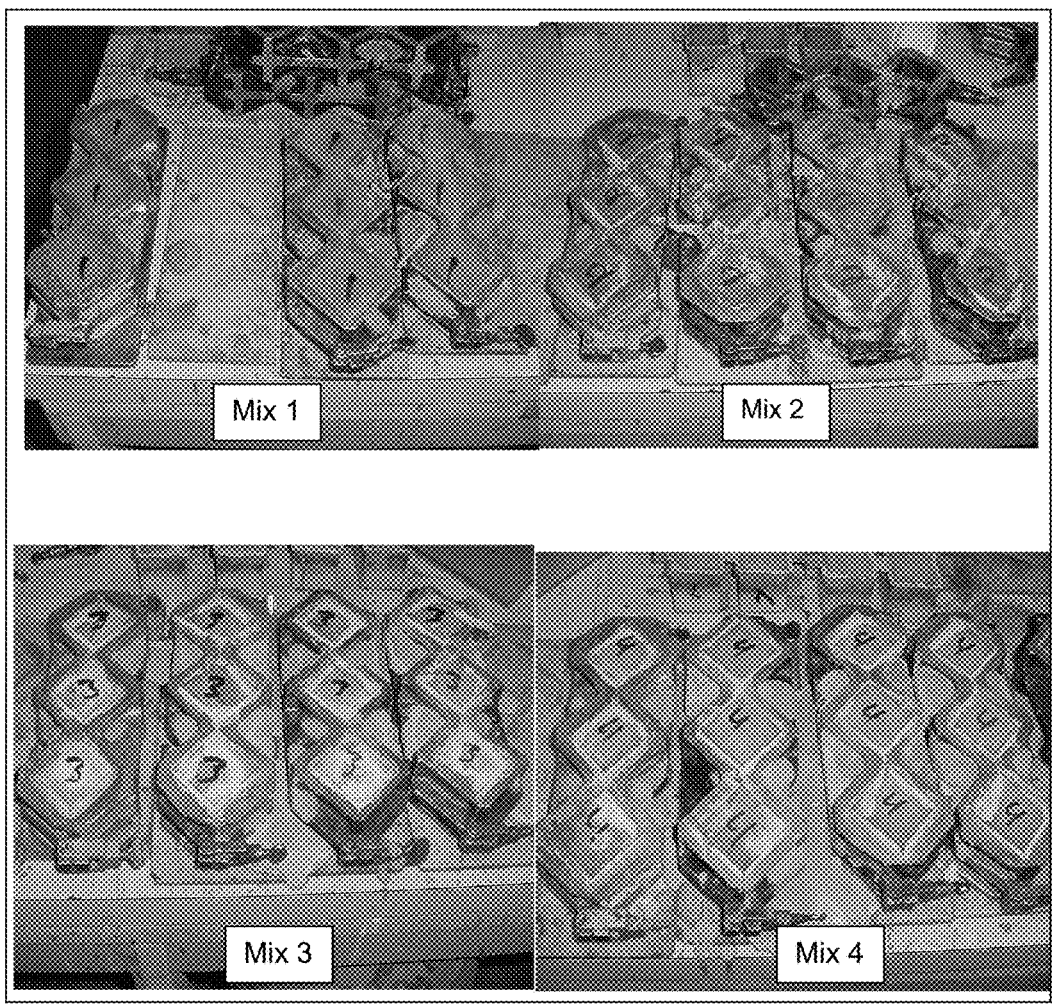
FIG. 25 comprises photographs of the cast cubes (in the brass cube molds) of compositions investigated in Example 28.

FIG. 25 shows the photographs of the cubes cast in the brass cube molds for the mixes investigated in this example. The top surface of the cast cubes is visible in the photographs shown in the figure. It can be observed that the mixes with borax (Mixes #2, #3 and #4) showed excessive efflorescence on the top surface of the cubes caused by leaching of the salts from within the material. Whereas, the cubes for Mix #1 with no borax were essentially free of efflorescence. Excessive efflorescence can led to poor aesthetics, material disruption and damage from expansive reactions occurring due to the hydration of salts, and reduction in bond strength with other substrates and surface coatings.

Bond Behavior

The dimensionally stable geopolymer binder compositions in accordance with this invention with borax, borate or boric acid added as an additional component have also been found to develop poor bond with other materials and substrates such as concrete. Thus, preferably the present composition does not include borax, borate or boric acid.

Example 29: Class C Fly Ash Plus Low Lime Calcium Aluminosilicate Mineral (Class F Fly Ash)

TABLE 93 shows the raw material compositions of the geopolymer cementitious mixtures investigated in this example.

This example investigated influence of incorporation of low lime calcium aluminosilicate mineral (Class F Fly Ash from Headwaters Resources) in combination with Class C Fly Ash on the physical properties of the geopolymer compositions of the invention. The Class C fly ash was added in 76, 38, 18 and 76 parts by weight while Fly Ash F was added at 38 and 58 parts by weight in Mixes 2 and 3 were Class C fly ash is added at levels of 38 and 18 parts by weight, respectively. The calcium sulfate dihydrate was added at 8 parts by weight and the calcium sulfoaluminate was added at a level of 16 parts by weight. QUIKRETE Commercial Grade Fine Sand No. 1961, BASF CASTAMENT FS20 superplasticizer and Surfynol 500S defoamer were also added.

TABLE 93 compositions investigated in Example 29

| Raw Material | Mix #1 | Mix 2 | Mix 3 | Mix 4 |
|---|---|---|---|---|
| Fly Ash Class C (grams) | 3420 | 1710 | 810 | 0 |
| Calcium Sulfate Dihydrate (grams) | 360 | 360 | 360 | 360 |
| Calcium Sulfoaluminate Cement (grams) | 720 | 720 | 720 | 720 |
| Fly Ash Class F (grams) | 0 | 1710 | 2610 | 3420 |
| Total Cementitious Materials (grams) | 4500 | 5000 | 4500 | 4500 |
| Sand (grams) | 4725 | 4725 | 4725 | 4725 |
| Sodium Citrate Dihydrate | 90 | 90 | 90 | 90 |
| Superplasticizer (grams) | 22.5 | 22.5 | 22.5 | 22.5 |
| Defoaming Agent (grams) | 9 | 9 | 9 | 9 |
| Water (grams) | 1080 | 1080 | 1080 | 1080 |
| Water/Cementitious Materials Ratio | 0.24 | 0.24 | 0.24 | 0.24 |
| Class F Fly Ash/Total Fly Ash, wt % | 0% | 50% | 76% | 100% |
| Superplasticizer/Cementitious Materials, wt % | 0.5% | 0.5% | 0.5% | 0.5% |
| Sodium Citrate/Cementitious Materials, wt % | 2% | 2% | 2% | 2% |
| Calcium Sulfoaluminate cement/Total Fly ash, wt % | 21% | 21% | 21% | 21% |
| Calcium Sulfate/Calcium Sulfoaluminate Cement, wt % | 50% | 50% | 50% | 50% |

Slump and Flow Behavior of Material

TABLE 94 shows the initial flow behavior and slump characteristics of the geopolymer cementitious compositions of the embodiment investigated in Example 29.

TABLE 94

Flow and Slump of Example 29

| | Flow | Slump (inches) |
|---|---|---|
| Mix 1 | 10 | 10.75 |
| Mix 2 | 10 | 10.25 |
| Mix 3 | 10 | 10 |
| Mix 4 | 10 | 10.50 |

All mixture compositions investigated had good rheology and slump behavior as observed in the slump test. It is particularly noteworthy that such good rheology and slump behavior was obtainable even at a water/cementitious materials ratio as low as about 0.24.

Shrinkage Behavior

Figure 26:
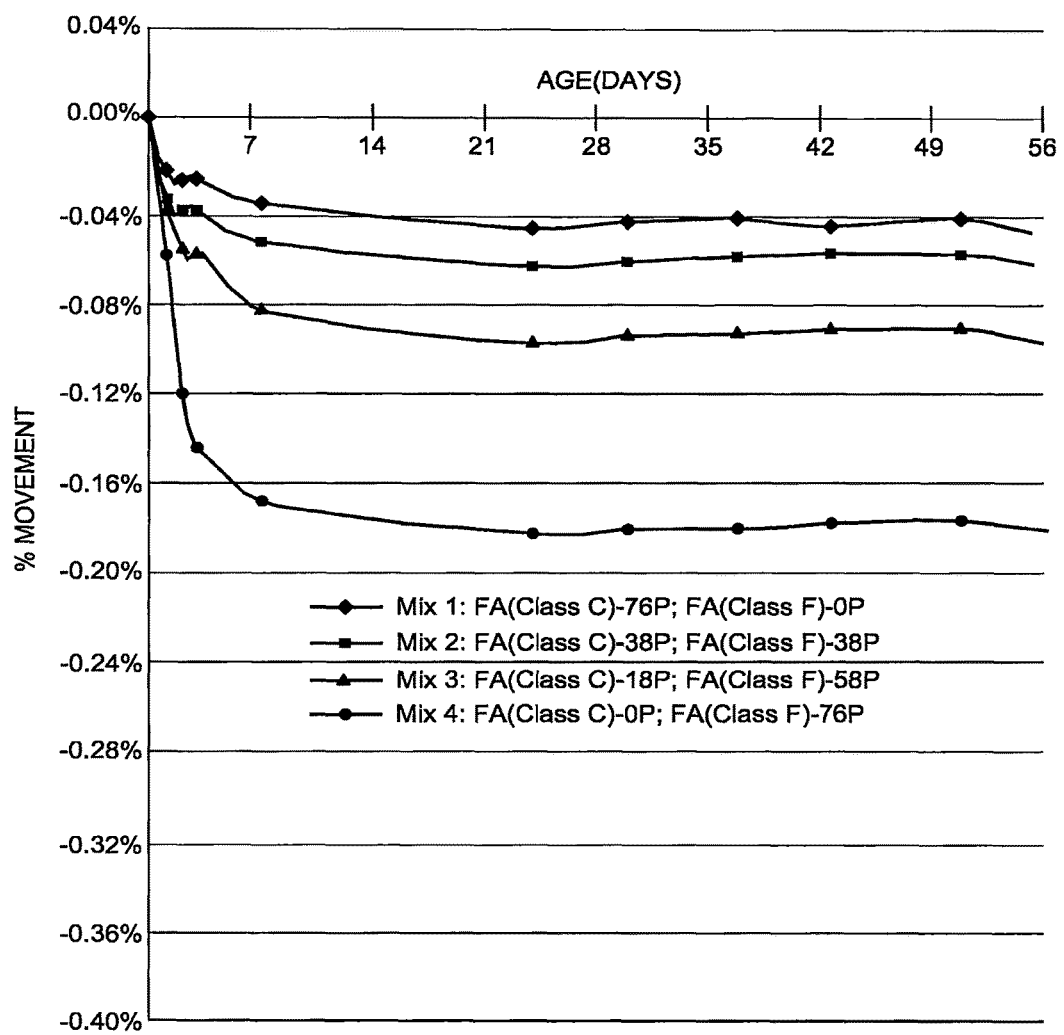
FIG. 26 is a graph of shrinkage of compositions of invention in Example 29.

FIG. 26 shows shrinkage behavior of geopolymer cementitious compositions of the embodiment investigated in Example 29. The main objective of this investigation was to study the influence of incorporation of thermally activated aluminosilicate mineral with low lime content (Class F Fly Ash) on shrinkage behavior of the developed geopolymer cementitious compositions of this embodiment.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following conclusions can be drawn from this investigation and FIG. 26:

The material shrinkage was lowest when the composition contain only the thermally activated aluminosilicate mineral with high lime content, i.e., Class C Fly Ash (Mix #1)

The material shrinkage increased with increase in the amount of low lime content thermally activated aluminosilicate mineral in the composition. The total shrinkage for Mix 1 in absence of low lime content thermally activated aluminosilicate mineral with was about 0.04%. It can be observed that the total shrinkage for Mix 2 with about 50% low lime content thermally activated aluminosilicate mineral in the composition increased to about 0.07%. The total material shrinkage for Mix 3 increased to about 0.1% with about 76% low lime content thermally activated aluminosilicate mineral in the composition. The total material shrinkage for Mix 4 with about 100% low lime content thermally activated aluminosilicate mineral in the composition was significantly higher at about 0.18%.

Time of Setting

TABLE 95 shows the time of setting of geopolymer cementitious compositions of the embodiment in Example 29.

TABLE 95

Approx. Setting Times of Example 29

| | Initial Setting Time (hr:min) | Final Setting Time (hr:min) |
|---|---|---|
| Mix 1 | 00:23 | 00:35 |
| Mix 2 | 00:38 | 00:52 |
| Mix 3 | 00:53 | 01:22 |
| Mix 4 | 01:23 | 02:11 |

It is observed that both initial and final setting times of the compositions investigated in this Example increased with increase in the amount of low lime content thermally activated aluminosilicate mineral in the formulation. It can be observed that the final setting time for Mix 4 containing about 100% low lime content thermally activated aluminosiilcate mineral increased significantly to more than about 2 hours.

Compressive Strength

TABLE 96 shows the compressive strength behavior of the developed geopolymer cementitious compositions of this embodiment in Example 29.

TABLE 96

Compressive Strength of Example 29 - (psi)

| | 4 hour | 24 hour | 7 day | 28 day |
|---|---|---|---|---|
| Mix 1 | 2148 | 3111 | 5004 | 7579 |
| Mix 2 | 1469 | 2784 | 3709 | 4418 |
| Mix 3 | 888 | 2123 | 2284 | 2394 |
| Mix 4 | 280 | 1628 | 1798 | 1843 |

The following observations can be drawn from this study:

The compressive strength of the geopolymer cementitious compositions comprising a mixture of both high and low lime content thermally activated aluminosilicate minerals continued to increase as a function of time.

Both the early age compressive strength and the ultimate compressive strength of the mixture compositions decreased with increase in the amount of low lime content aluminosilicate mineral in the composition.

Both the early age compressive strength and the ultimate compressive strength for Mix 2 containing about 50% low lime content aluminosilicate mineral in the composition were satisfactory with the 28 day compressive strength being in excess of about 4200 psi.

Both the early age and ultimate compressive strengths for Mix 4 containing about 100% low lime aluminosiilcate mineral in the composition were relatively low and not satisfactory for many of the applications contemplated as part of this invention.

Example 30

This example depicts a geopolymer cementitious composition of the present invention particularly useful for use as a self-leveling floor underlayment over a variety of substrates such as concrete, wood, etc. In particular, compositions similar to the one described in this example are particularly useful for smoothing and leveling existing concrete surfaces that are rough and non-planar.

TABLE 97 shows the material composition of this embodiment:

TABLE 97

Compositions of Example 30

| Raw Material | Weight (grams) |
|---|---|
| Fly Ash Class C[1] | 2115 |
| Calcium Sulfate Dihydrate[2] | 212 |
| Calcium Sulfoaluminate Cement[3] | 423 |
| Total Cementitious Materials | 2750 |
| Sand[4] | 3163 |
| Potassium Citrate Tribasic Monohydrate | 55.0 |
| Citric Acid Anhydrous | 13.8 |
| Sodium Gluconate | 7.44 |
| Superplasticizer[5] | 13.8 |
| Defoamer & Wetting Agent[6] | 5.5 |
| Rheology Modifier[7] | 0.11 |
| Smectite Clay[8] | 0.275 |
| Water | 825 |
| Water/Cementitious Materials Ratio | 0.30 |
| Sand/Cementitious Materials Ratio | 1.15 |
| Superplasticizer/Cementitious Materials, wt % | 0.5% |
| Potassium Citrate/Cementitious Materials, wt % | 2% |
| Calcium Sulfoaluminate Cement/Fly ash, wt % | 20% |
| Calcium Sulfate/Calcium Sulfoaluminate Cement, wt % | 50% |

[1]Class C Fly Ash, Campbell Power Plant, West Olive, MI
[2]USG Terra Alba Filler
[3]FASTROCK 500, CTS Company
[4]UNIMIN 5030 Sand
[5]BASF CASTAMENT FS20
[6]SURFYNOL 500S
[7]MOMENTIVE AXILAT RH 100 XP
[8]BENTONE CT HECTORITE clay The mixture compositions investigated in this example had good rheology and yielded a slump of 10¼" in the slump test. The slump patty for this mixture composition after drying remained in excellent condition and did not develop any cracking.

Shrinkage Behavior

Figure 27A:
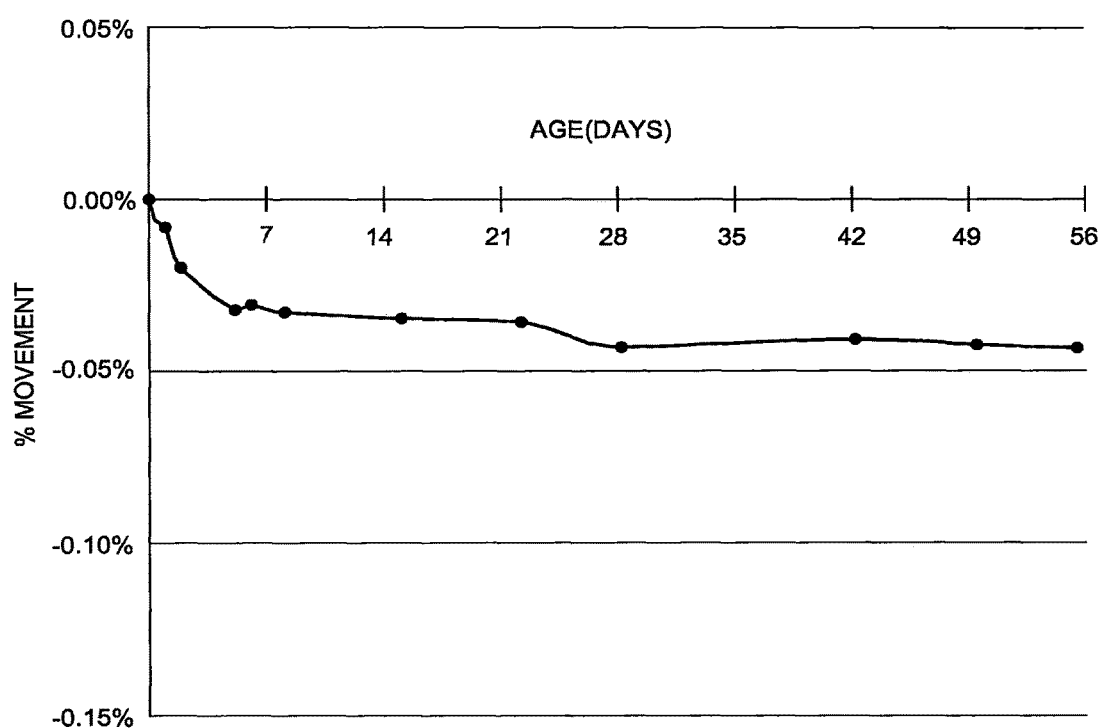
FIG. 27A is a graph of shrinkage of compositions of the invention in Example 30.

FIG. 27A shows shrinkage behavior of geopolymer cementitious composition of the embodiment of the invention investigated in Example 29.

The shrinkage measurements were initiated at an age of about 4-hours from the time the raw materials were mixed together to form an aqueous slurry. The material shrinkage was measured for a total duration of about 8-weeks while curing the material at about 75° F./50% RH.

The following important conclusions can be drawn from this investigation and FIG. 27A:

Contrary to the shrinkage bars of comparative Example 4 (with no calcium sulfate) which cracked even before de-molding, the shrinkage bars of Example 29 comprising calcium sulfate dihydrate were completely stable and did not result in any cracks either prior to or after de-molding.

The geopolymer cementitious composition of the embodiment of the invention comprising fly ash, calcium sulfoaluminate cement, calcium sulfate dihydrate, and alkali metal citrate investigated in this example had a maximum shrinkage of only about 0.04% in comparison to a maximum shrinkage of about 0.75% for the comparative mixture composition containing fly ash and alkali metal citrate only (Example 1).

Heat Evolution and Slurry Temperature Rise Behavior

Figure 27B:
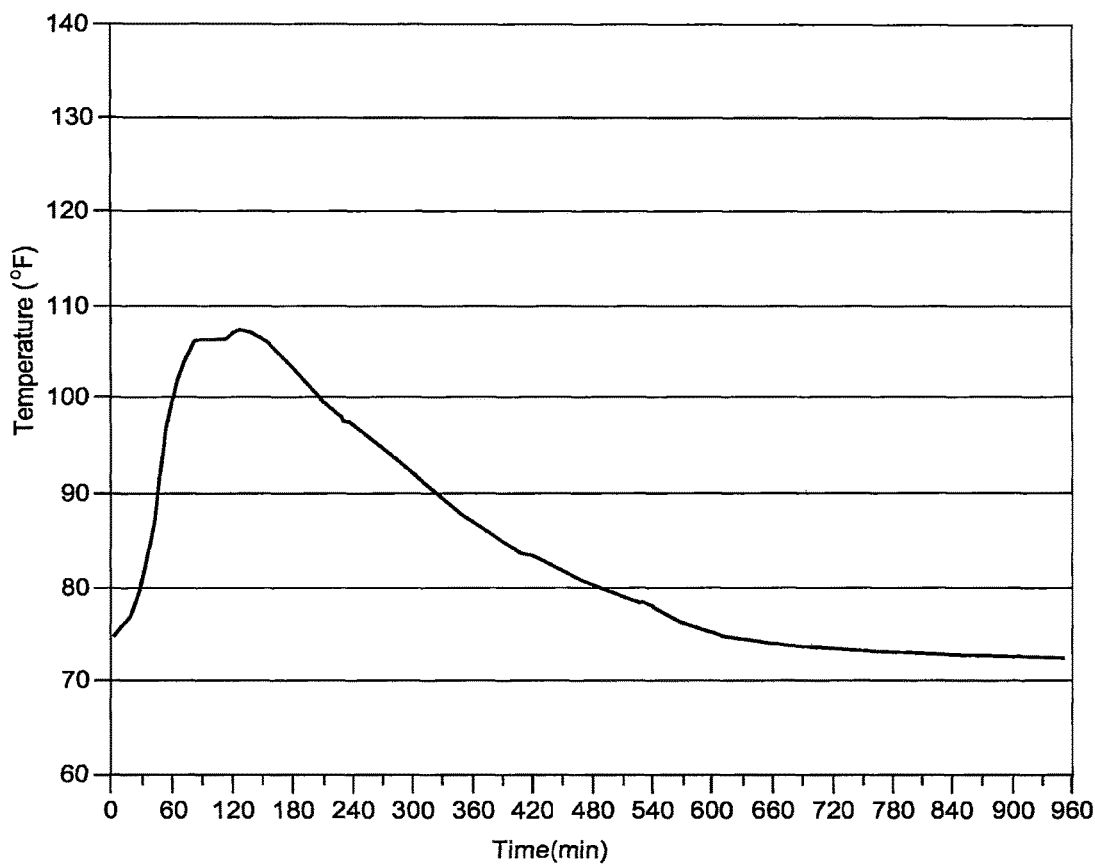
FIG. 27B is a graph of the exothermic and slurry temperature rise behavior of composition of the in Example 30.

FIG. 27B shows the exothermic and slurry temperature rise behavior of geopolymer cementitious composition of the embodiment of the invention investigated in Example 29. This cementitious composition demonstrated only a very moderate temperature rise behavior with the maximum slurry temperature reaching only 108° F.

A moderate heat evolution and low temperature rise within the material during the curing stage assists in preventing excessive thermal expansion and consequent cracking and disruption of material. This aspect becomes even more helpful when the material is utilized in a manner where large thicknesses of material pours are involved in the actual field applications. The geopolymer cementitious composition of this embodiment of the invention will be highly beneficial in this particular aspect as it would lead to a lower thermal expansion and enhanced resistance to thermal cracking in field applications.

Time of Setting

TABLE 98 shows the time of setting of geopolymer cementitious compositions of some embodiments of the invention investigated in Example 29. These results embodiments of the invention and yet particularly useful in self-leveling underlayment applications.

TABLE 98

Setting Times of Example 30

| Initial Setting Time (hr:min) | Final Setting Time (hr:min) |
|---|---|
| 1:02 | 1:18 |

Compressive Strength

TABLE 99 shows the compressive strength behavior of the developed geopolymer cementitious composition of the embodiment of the invention investigated in this example. These results demonstrate the suitability of the geopolymer compositions of this invention for use in the self-leveling underlayment applications.

TABLE 99

Compressive Strength of Example 30 (psi)

| | 4-hour | 24 hour | 7 day | 28 day |
|---|---|---|---|---|
| Mix 1 | 2231 | 3954 | 4173 | 4890 |

Example 31

This example demonstrates the unique behavior and mechanical performance of lightweight geopolymer binder compositions of some embodiments of the invention.

TABLE 100 shows the raw material compositions of the lightweight geopolymer cementitious mixtures investigated in this example.

TABLE 100

Compositions investigated in Example 31

| Raw Material | Mix #1 | Mix 2 | Mix 3 |
|---|---|---|---|
| Fly Ash Class C[1] (grams) | 4923 | 5577 | 6154 |
| Calcium Sulfate Dihydrate[2] (grams) | 492 | 558 | 615 |
| Calcium Sulfoaluminate Cement[3] (grams) | 985 | 1115 | 1231 |
| Total Cementitious Materials (grams) | 6400 | 7250 | 8000 |
| Lightweight Filler[4] (grams) | 2016 | 1740 | 1480 |
| Potassium Citrate Monohydrate | 128 | 145 | 160 |
| Superplasticizer[5] (grams) | 32.00 | 36.25 | 40.00 |
| Defoamer & Wetting Agent[6] | 12.8 | 18.1 | 16.0 |
| Rheology Modifier[7] | 0.38 | 0.44 | 0.48 |
| Lithium Carbonate | 16 | 18.1 | 20 |
| Colorant[8] | 4.8 | 5.44 | 6 |
| Water (grams) | 2045 | 750 | 2040 |
| Water/Cementitious Materials Ratio | 0.32 | 0.28 | 0.255 |
| Lightweight Filler/Cementitious Materials Ratio | 0.315 | 0.24 | 0.185 |
| Superplasticizer/Cementitious Materials, wt % | 0.5% | 0.5% | 0.5% |
| Potassium Citrate/Cementitious Materials, wt % | 2% | 2% | 2% |
| Calcium Sulfoaluminate cement/Fly ash, wt % | 80% | 80% | 80% |
| Calcium Sulfate/Calcium Sulfoaluminate Cement, wt % | 50% | 10% | 20% |

[1]Class C Fly Ash, Campbell Power Plant, West Olive, MI
[2]USG Terra Alba Filler
[3]FASTROCK 500, CTS Company
[4]Poraver Hollow Recycled Glass Microspheres 0.04-0.125 mm
[5]BASF CASTAMENT FS20
[6]SURFYNOL 500S
[7]MOMENTIVE AXILAT RH 100 XP
[8]Yipin Black S350M Iron Oxide Pigment The measured density of the lightweight geopolymer compositions investigated in this example was as follows:
Mix #1: 96 pcf
Mix #2: 101 pcf
Mix #3: 105 pcf Slump and Early Age Cracking Behavior of Material TABLE 101 shows the slump behavior of the lightweight geopolymer cementitious compositions of some embodiments of the invention investigated in this example.

TABLE 101

Flow and Slump of Example 31

| | Slump (inches) |
|---|---|
| Mix 1 | 9⅝" |
| Mix 2 | 8¾" |
| Mix 3 | 8" |

All mixture compositions investigated had good rheology and slump behavior as observed in the slump test. It is particularly noteworthy that such good rheology and slump behavior was obtainable even at a water/cementitious materials ratio as low as about 0.255.

All slump patties of the mixes investigate in the example were in excellent condition and did not develop any cracking.

Heat Evolution and Slurry Temperature Rise Behavior

Figure 28:
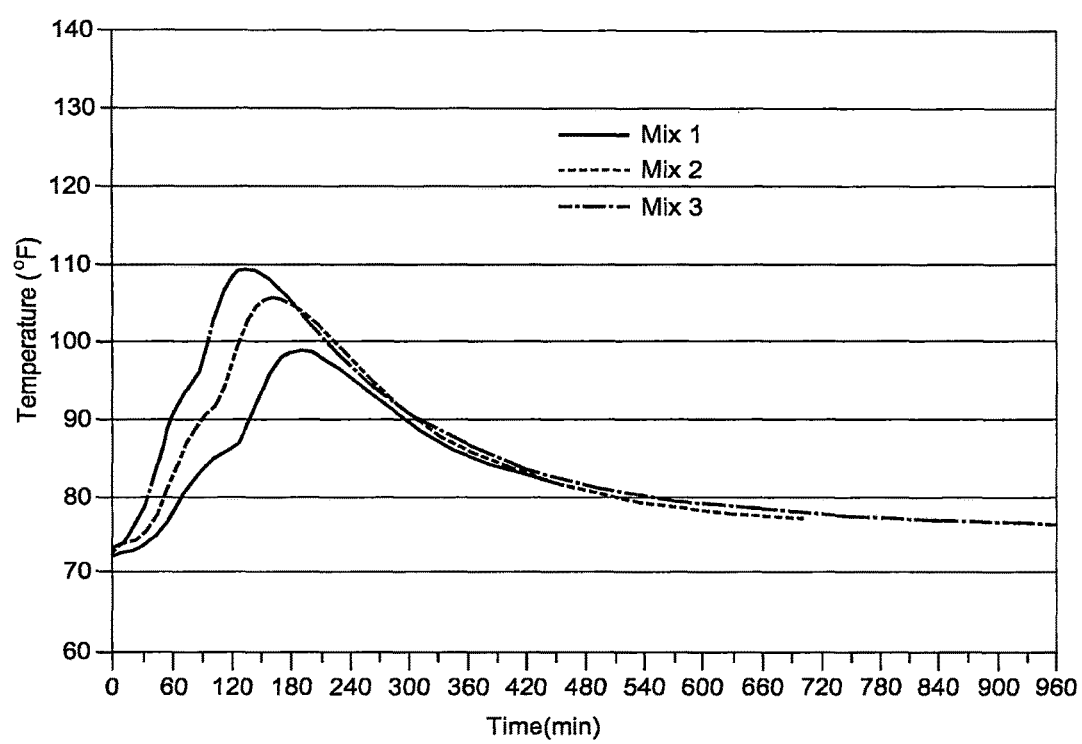
FIG. 28 is a graph of the exothermic and slurry temperature rise behavior of the lightweight compositions of some embodiments of the invention in Example 31.

FIG. 28 shows the exothermic and slurry temperature rise behavior of the lightweight geopolymer cementitious compositions of some embodiments of the invention investigated in Example 31. It can be observed that these compositions demonstrated very low temperature rise behavior. A moderate heat evolution and low temperature rise within the material during the curing stage are significant in assisting to prevent excessive thermal expansion and consequent cracking and disruption of material. This aspect becomes even more helpful when the material is utilized in a manner where large thicknesses of material pours are involved in the actual field applications. The geopolymer cementitious compositions of some embodiments of the invention investigated in this example are disclosed to be highly beneficial in this particular aspect as they would lead to a lower thermal expansion and enhanced resistance to thermal cracking in actual field applications.

Time of Setting

TABLE 102 shows the time of setting of the lightweight geopolymer cementitious compositions of the embodiments of the invention investigated in this example. It can be observed that all cementitious compositions investigated in this example demonstrated a rapid setting behavior with the final setting time ranging between 1 to 2 hours.

TABLE 102

Setting Times of Example 31

| | Initial Setting Time (hr:min) | Final Setting Time (hr:min) |
|---|---|---|
| Mix 1 | 1:22 | 1:55 |
| Mix 2 | 1:08 | 1:28 |
| Mix 3 | 1:03 | 1:11 |

Compressive Strength

TABLE 103 shows the compressive strength behavior of the lightweight geopolymer cementitious compositions of the embodiments of the invention investigated in Example 31.

TABLE 103

Compressive Strength of Example 31 (psi)

| | 4 hour | 24 hour | 7 day | 28 day |
|---|---|---|---|---|
| Mix 1 | 1110 | 2761 | 3466 | 4044 |
| Mix 2 | 1478 | 3232 | 4873 | 5653 |
| Mix 3 | 2250 | 4227 | 4432 | 5735 |

The following observations can be drawn from this study:

Both the early age compressive strength and the ultimate compressive strength of the lightweight geopolymer compositions of this invention are relatively very high and comparable to some of the full density compositions of the present invention (compare results from Example 30 with those of Example 31).

It is noteworthy that the 4-hour compressive strengths of lightweight geopolymer compositions of the invention investigated in this example are in excess of about 1000 psi.

It is also noteworthy that the 24-hour compressive strengths of the lightweight geopolymer compositions of this invention in excess of about 2500 psi.

It is again very noteworthy that the 28-day compressive strengths of the lightweight geopolymer cementitious compositions of the invention are very high i.e. in excess of about 4000 psi.

The geopolymer compositions of some preferred embodiments of the invention shown in the examples have application in a number of commercial products. In particular the compositions can be used for;

Road repair and road patch products, traffic bearing surfaces and pavements, as shown by some properties disclosed in examples 5, 24, 25, 30 and 31;

Bricks and synthetic stones, as shown by some properties disclosed in examples 5, 6, 9, 12 and 14;

Repair materials for wall, floors and ceiling and bonding mortars, plasters and panel surfacing materials, as shown by some properties disclosed in examples 5, 24 and 33;

Roofing materials, as shown by some properties disclosed in examples 5, 26, 30 and 31;

Shotcrete products which are sprayed cementitious products used for soil and rock stabilization and as lining materials, as shown by some properties disclosed in examples 5, 25 and 30;

Weight bearing structures, as shown by some properties disclosed in examples 25, 30, and 31;

Statuaries and architectural moldings, as shown by some properties disclosed in examples 5-22, 29, 30; and 31;

Self leveling underlayments, as shown by some properties disclosed in examples 5, 7, 9, 13, 15, 19, 21, 22, 24, 26, 30, and 31.

Although we have described the preferred embodiments for implementing our invention, it will be understood by those skilled in the art to which this disclosure is directed that modifications and additions may be made to our invention without departing from its scope.

What is claimed is:

1. An aluminosilicate geopolymer cementitious composition comprising a reaction product of:
    a cementitious reactive powder comprising:
        33 to 81.6% by weight a thermally activated aluminosilicate mineral comprising Class C fly ash;
        4.65 to 43% by weight calcium sulfoaluminate cement, wherein the calcium sulfoaluminate cement in an amount of 10-100 parts by weight per 100 parts by weight of thermally activated aluminosilicate mineral; and
        4.35 to 40% by weight calcium sulfate, wherein the calcium sulfate selected from the group consisting of calcium sulfate dihydrate, calcium sulfate hemihydrate, anhydrous calcium sulfate and mixtures thereof, the calcium sulfate in an amount of up to 100 parts by weight per 100 parts by weight of calcium sulfoaluminate cement; and
    a chemical activator selected from the group consisting of alkali metal salt, alkali metal base and mixtures thereof in an amount equal to about 1.0 to about 6.0% by weight based on total weight of the cementitious reactive powder, and
    at least one of the group consisting of superplasticizers, air entraining agents, defoaming agents, organic rheology control agents, and film-forming polymers; and water,
    wherein the calcium sulfate has an average particle size from about 1 to about 100 microns.

2. The composition of claims 1,
    33 to 76.9% by weight Class C fly ash,
    8.7 to 43% by weight of the calcium sulfoaluminate cement,
    6.1 to 40% by weight of the calcium sulfate;
    wherein the chemical activator is selected from the group consisting of alkali metal citrate, alkali metal silicate, alkali metal hydroxide, and mixtures thereof.

3. The composition of claim 1, wherein the chemical activator is present in an amount equal to about 1.25 to 4.00% by weight based on total weight of the cementitious reactive powder, wherein the chemical activator is selected from at least one member of the group consisting of alkali metal citrate and alkali metal silicate.

4. The composition of claim 1, comprising the superplasticizer, wherein the chemical activator comprises alkali metal hydroxide.

5. The composition of claim 1, comprising the air entraining agent, wherein the air entraining agent is in an amount of about 0.01 to about 1 wt. % of the weight of the aluminosilicate geopolymer cementitious composition and the calcium sulfoaluminate cement in an amount of 15-100 parts by weight per 100 parts by weight of the thermally activated aluminosilicate mineral.

6. The composition of claim 1, wherein the calcium sulfate comprises calcium sulfate hemihydrate.

7. The composition of claim 1, wherein the calcium sulfate comprises calcium sulfate dihydrate.

8. The composition of claim 1, wherein the calcium sulfate comprises anhydrous calcium sulfate.

9. The composition of claim 1, wherein the cementitious reactive powder comprises:
    41 to 67% by weight Class C fly ash,
    8.7 to 15.9% by weight calcium sulfoaluminate cement, and
    47.7 to 36% by weight calcium sulfate;
    wherein the chemical activator is selected from at least one of the group consisting of sodium citrate, potassium citrate, and sodium hydroxide.

10. The composition of claim 1, wherein the cementitious reactive powder comprises 15.4 to 43% by weight calcium sulfoaluminate cement.

11. The composition of claim 1, wherein the reaction product is formed from
    the water; and
    the cementitious reactive powder comprising
        60% to 81.6% by weight Class C fly ash,
        8% to 30% by weight calcium sulfoaluminate cement, and
        4.35 to 26.2% by weight the calcium sulfate, and
    the chemical activator in an amount equal to about 1.5 to 4.0% by weight based on total weight of the cementitious reactive powder.

12. The composition of claim 1, wherein the composition has an absence of Portland cement and the cementitious reactive powder comprises 8.7 to 43% by weight calcium sulfoaluminate cement.

13. The composition of claim 1, wherein the cementitious reactive powder comprises less than about 15% by weight Portland cement.

14. The composition of claim 1, wherein the weight ratio of the water to cementitious reactive powder is about 0.15 to about 0.4, wherein the cementitious reactive powder comprises less than 5 wt. % Portland cement.

15. The composition of claim 1 forming a repair material for traffic bearing surfaces.

16. A method of preparing an aluminosilicate geopolymer cementitious composition of claim 1, comprising:
    reacting a mixture of
    a cementitious reactive powder comprising:
        33 to 81.6% by weight thermally activated aluminosilicate mineral comprising Class C fly ash,
        4.65 to 43% by weight calcium sulfoaluminate cement, wherein the calcium sulfoaluminate cement in an amount of 10-100 parts by weight per 100 parts by weight of thermally activated aluminosilicate mineral, and
        4.35 to 40% by weight calcium sulfate, wherein the calcium sulfate selected from the group consisting of calcium sulfate dihydrate, calcium sulfate hemihydrate, anhydrous calcium sulfate, and mixtures thereof, the calcium sulfate in an amount of up to 100 parts by weight per 100 parts by weight of calcium sulfoaluminate cement;

a chemical activator selected from a member of the group consisting of alkali metal salt, alkali metal base and mixtures thereof in an amount equal to about 1.0 to about 6.0% by weight based on total weight of the cementitious reactive powder;

water; and at least one of the group consisting of superplasticizers, air entraining agents, defoaming agents, bipolymers, organic rheology control agents, and film-forming polymers;

wherein the calcium sulfate has an average particle size from about 1 to about 100 microns.

17. The method of claim 16, wherein the cementitious reactive powder comprises:

33 to 76.9% by weight class C fly ash, and 8.7 to 43% by weight of calcium sulfoaluminate cement, 6.1 to 40% by weight of the calcium sulfate, and wherein the chemical activator is selected from the group consisting of alkali metal citrate, alkali metal silicate, and alkali metal hydroxide and mixtures thereof, wherein the mixture comprises the superplasticizer.

18. The method of claim 17, wherein the cementitious reactive powder comprises:

41 to 67% by weight said Class C fly ash, 8.7 to 43% by weight said calcium sulfoaluminate cement, and 7.7 to 36 by weight said calcium sulfate, wherein the amount of chemical activator equals about 2 to about 5.0% by weight of the cementitious reactive powder.

19. A settable mixture for forming an aluminosilicate geopolymer cementitious composition when reacted in water, comprising:

a cementitious reactive powder comprising:

33 to 81.6% by weight of a thermally activated aluminosilicate mineral comprising Class C fly ash;

4.65 to 43% by weight of a calcium sulfoaluminate cement, 4.35 to 40% by weight of a calcium sulfate selected from the group consisting of calcium sulfate dihydrate, calcium sulfate hem ihydrate, anhydrous calcium sulfate and mixtures thereof; and about 1.0 to about 6.0% by weight, based on weight of cementitious reactive powder, of a chemical activator selected from the group consisting of alkali metal salt, alkali metal base, and mixtures thereof; and at least one of the group consisting of superplasticizers, air entraining agents, defoaming agents, bipolymers, organic rheology control agents, and film-forming polymers;

wherein the calcium sulfate has an average particle size from about 1 to about 100 microns.

20. The alum inosiilcate geopolymer composition formed from the reaction of the mixture of claim 19 with water, wherein the weight ratio of the water to reactive powder is about 0.15 to about 0.4, wherein the chemical activtor is selected from the group consisting of alkali metal citrate, alkali metal silicates and alkali metal hydroxides and mixtures thereof.

* * * * *